US011611222B2

(12) United States Patent
Nook et al.

(10) Patent No.: US 11,611,222 B2

(45) Date of Patent: Mar. 21, 2023

(54) PORTABLE VEHICLE BATTERY JUMP STARTER WITH AIR PUMP

(71) Applicant: THE NOCO COMPANY, Glenwillow, OH (US)

(72) Inventors: Jonathan Lewis Nook, Gates Mills, OH (US); William Knight Nook, Shaker Heighls, OH (US); James Richard Stanfield, Glendale, AZ (US); Derek Michael Underhill, Tempe, AZ (US)

(73) Assignee: THE NOCO COMPANY, Glenwillow, OH (US)

( * ) Notice: Subject to any disclaimer, the term of this patent is extended or adjusted under 35 U.S.C. 154(b) by 0 days.

(21) Appl. No.: 16/772,344

(22) PCT Filed: Dec. 14, 2018

(86) PCT No.: PCT/US2018/065731

§ 371 (c)(1),
(2) Date: Jun. 12, 2020

(87) PCT Pub. No.: WO2019/143427

PCT Pub. Date: Jul. 25, 2019

(65) Prior Publication Data

US 2021/0075235 A1 Mar. 11, 2021

Related U.S. Application Data

(63) Continuation-in-part of application No. PCT/US2018/051964, filed on Sep. 20, 2018, which
(Continued)

(51) Int. Cl.
*H02J 7/00* (2006.01)
*B60S 5/04* (2006.01)
(Continued)

(52) U.S. Cl.
CPC ............... *H02J 7/0034* (2013.01); *B60S 5/04* (2013.01); *F02N 11/12* (2013.01); *F02N 11/14* (2013.01)

(58) Field of Classification Search
CPC . B60S 5/04; F02N 11/12; F02N 11/14; H01H 19/38; H01M 50/20;
(Continued)

(56) References Cited

U.S. PATENT DOCUMENTS 3,085,187 A 4/1963 Godshalk
3,105,183 A 9/1963 Hysler et al.
(Continued)

FOREIGN PATENT DOCUMENTS

AU 6997198 A 7/1998
AU 2015258229 1/2016
(Continued)

OTHER PUBLICATIONS

Exhibit 1008, www.xcar360.com.
(Continued)

*Primary Examiner* — Phutthiwat Wongwian
*Assistant Examiner* — Arnold Castro
(74) *Attorney, Agent, or Firm* — Jones Day

(57) ABSTRACT

A portable or handheld jump starting and air compressing apparatus for jump starting a vehicle engine and air inflating an article such as a tire. The apparatus can include a rechargeable lithium ion battery or battery pack and a microcontroller. The lithium ion battery is coupled to a power output port of the device through a FET smart switch actuated by the microcontroller. A vehicle battery isolation sensor connected in circuit with positive and negative polarity outputs detects the presence of a vehicle battery connected between the positive and negative polarity outputs. A reverse polarity sensor connected in circuit with the positive and negative polarity outputs detects the polarity of a vehicle battery connected between the positive and negative polarity outputs.

23 Claims, 104 Drawing Sheets

Related U.S. Application Data is a continuation-in-part of application No. PCT/US2018/051834, filed on Sep. 20, 2018, which is a continuation-in-part of application No. PCT/US2018/051655, filed on Sep. 19, 2018, which is a continuation-in-part of application No. PCT/US2018/050904, filed on Sep. 13, 2018, which is a continuation-in-part of application No. PCT/US2018/049548, filed on Sep. 5, 2018, which is a continuation-in-part of application No. PCT/US2018/042474, filed on Jul. 17, 2018, which is a continuation-in-part of application No. PCT/US2018/040919, filed on Jul. 5, 2018, which is a continuation-in-part of application No. PCT/US2018/035029, filed on May 30, 2018, which is a continuation-in-part of application No. PCT/US2018/034902, filed on May 29, 2018.

(60) Provisional application No. 62/598,871, filed on Dec. 14, 2017.

(51) Int. Cl.
*F02N 11/12* (2006.01)
*F02N 11/14* (2006.01)

(58) Field of Classification Search
CPC .... H01M 2220/20; H02J 1/122; H02J 7/0024; H02J 7/0031; H02J 7/0034; H02J 7/0042; H02J 7/0045; H02J 7/0047; H02J 2310/46; Y02E 60/10
See application file for complete search history.

(56) References Cited

U.S. PATENT DOCUMENTS

| | | | | |
|---|---|---|---|---|
| 3,267,452 | A | 8/1966 | Wolf | |
| 3,590,357 | A | 6/1971 | Reid | |
| 3,638,108 | A | 1/1972 | Channing | |
| 3,933,140 | A | 1/1976 | Gynn | |
| 4,041,445 | A | 8/1977 | Carter | |
| 4,142,771 | A | 3/1979 | Barnes | |
| 4,740,740 | A | 4/1988 | Taranto et al. | |
| 4,885,524 | A | 12/1989 | Wilburn | |
| 4,902,955 | A * | 2/1990 | Manis | H02J 7/0042 320/105 |
| 4,910,628 | A | 3/1990 | Minagawa et al. | |
| 4,931,731 | A | 6/1990 | Jenks | |
| 4,972,135 | A | 11/1990 | Bates et al. | |
| 4,990,723 | A | 2/1991 | Ziberna et al. | |
| 5,083,076 | A | 1/1992 | Scott | |
| 5,111,130 | A | 5/1992 | Bates | |
| 5,189,359 | A | 2/1993 | Kronberg | |
| 5,194,799 | A | 3/1993 | Tomantschger | |
| 5,281,904 | A | 1/1994 | Tomkins | |
| 5,319,298 | A | 6/1994 | Wanzong | |
| 5,486,434 | A | 1/1996 | Aoyama | |
| 5,496,658 | A | 3/1996 | Hein et al. | |
| 5,635,817 | A | 6/1997 | Shiska | |
| 5,635,818 | A | 6/1997 | Quintero | |
| 5,637,978 | A | 6/1997 | Kellett et al. | |
| 5,650,974 | A | 7/1997 | Yoshimura | |
| 5,707,257 | A | 1/1998 | Kotajima et al. | |
| 5,716,735 | A | 2/1998 | Muffoletto et al. | |
| 5,793,185 | A | 8/1998 | Prelec et al. | |
| 5,795,182 | A | 8/1998 | Jacob | |
| 5,820,407 | A | 10/1998 | Morse et al. | |
| 5,831,350 | A | 11/1998 | McConkey et al. | |
| 5,921,809 | A | 7/1999 | Fink | |
| 5,953,681 | A | 9/1999 | Cantatore et al. | |
| 5,965,998 | A | 10/1999 | Whiting et al. | |
| 6,002,235 | A | 12/1999 | Clore | |
| 6,054,779 | A | 4/2000 | Zubko | |
| 6,057,667 | A | 5/2000 | Mills | |
| 6,130,519 | A | 10/2000 | Whiting et al. | |

| | | | | |
|---|---|---|---|---|
| 6,140,796 | A | 10/2000 | Martin et al. | |
| 6,144,110 | A | 11/2000 | Matsuda et al. | |
| 6,147,471 | A | 11/2000 | Hunter | |
| 6,160,381 | A | 12/2000 | Peterzell | |
| 6,212,054 | B1 | 4/2001 | Chan | |
| 6,215,273 | B1 | 4/2001 | Shy | |
| 6,222,342 | B1 | 4/2001 | Eggert et al. | |
| 6,249,106 | B1 | 6/2001 | Turner et al. | |
| 6,262,492 | B1 | 7/2001 | Sheng | |
| 6,262,559 | B1 | 7/2001 | Eggert et al. | |
| 6,271,605 | B1 | 8/2001 | Carkner et al. | |
| 6,300,742 | B1 | 10/2001 | Hung | |
| 6,362,599 | B1 | 3/2002 | Turner et al. | |
| 6,384,573 | B1 | 5/2002 | Dunn | |
| 6,386,907 | B1 | 5/2002 | Ruff | |
| 6,344,733 | B1 | 7/2002 | Crass | |
| 6,424,158 | B2 | 7/2002 | Klang | |
| 6,426,606 | B1 | 7/2002 | Purkey | |
| 6,632,103 | B1 | 10/2003 | Liu | |
| 6,648,701 | B2 | 11/2003 | Mouissie | |
| 6,650,086 | B1 | 11/2003 | Chang | |
| 6,679,212 | B2 | 1/2004 | Kelling | |
| 6,679,708 | B1 | 1/2004 | Depp et al. | |
| 6,736,227 | B2 | 5/2004 | Huang et al. | |
| 6,756,764 | B2 | 6/2004 | Smith et al. | |
| 6,759,833 | B1 | 7/2004 | Chen | |
| 6,774,607 | B2 | 8/2004 | Moseneder et al. | |
| 6,799,993 | B2 | 10/2004 | Krieger | |
| 6,803,743 | B2 | 10/2004 | George et al. | |
| 6,822,425 | B2 | 11/2004 | Krieger et al. | |
| 6,856,764 | B2 | 2/2005 | Higuma | |
| 6,919,704 | B1 | 7/2005 | Healey | |
| 7,015,674 | B2 | 3/2006 | Vonderhaar | |
| 7,017,055 | B1 | 3/2006 | Ho | |
| 7,095,339 | B2 | 8/2006 | Peng et al. | |
| 7,148,580 | B2 | 12/2006 | Sodemann et al. | |
| 7,301,303 | B1 | 11/2007 | Hulden | |
| 7,339,347 | B2 | 3/2008 | Elder et al. | |
| 7,345,450 | B2 | 3/2008 | Krieger et al. | |
| 7,508,171 | B2 | 3/2009 | Carrier et al. | |
| 7,514,900 | B2 | 4/2009 | Sander et al. | |
| D597,029 | S | 7/2009 | Li | |
| 7,579,811 | B2 | 8/2009 | Satl et al. | |
| 7,656,118 | B2 | 2/2010 | Krieger et al. | |
| 7,675,261 | B2 | 3/2010 | Elder et al. | |
| 7,679,317 | B2 | 3/2010 | Vaselic | |
| 7,749,031 | B2 | 7/2010 | Detter | |
| 7,791,319 | B2 | 9/2010 | Veselic et al. | |
| D625,265 | S | 10/2010 | Dumelle et al. | |
| 7,847,520 | B2 | 12/2010 | Veselic et al. | |
| 7,868,582 | B2 | 1/2011 | Sander et al. | |
| 7,872,361 | B2 | 1/2011 | McFadden | |
| 7,887,303 | B2 * | 2/2011 | Sadkowski | F04B 41/02 417/234 |
| 7,893,558 | B2 | 2/2011 | Lee | |
| 7,893,655 | B2 | 2/2011 | Veselic | |
| 7,893,657 | B2 | 2/2011 | Chavakula | |
| 8,013,567 | B2 * | 9/2011 | Windsor | H01M 10/46 320/104 |
| 8,030,900 | B2 | 10/2011 | Hussain et al. | |
| D649,116 | S | 11/2011 | Nakatsuka | |
| 8,076,900 | B1 * | 12/2011 | Brown | F02N 11/14 320/105 |
| 8,125,181 | B2 | 2/2012 | Gregg et al. | |
| 8,172,603 | B1 | 5/2012 | Richardet, Jr. | |
| 8,199,024 | B2 | 6/2012 | Baxter et al. | |
| 8,221,915 | B2 | 7/2012 | Tikhonov et al. | |
| 8,362,745 | B2 | 1/2013 | Tinaphong | |
| 8,376,775 | B2 | 2/2013 | Rinehardt | |
| 8,493,021 | B2 | 7/2013 | Richardson et al. | |
| D689,020 | S | 9/2013 | Demirjian et al. | |
| 8,686,688 | B2 | 4/2014 | Han et al. | |
| 8,786,247 | B2 | 7/2014 | Ishino et al. | |
| 8,994,327 | B2 | 3/2015 | Kusch et al. | |
| D726,109 | S | 4/2015 | Nook et al. | |
| D726,114 | S | 4/2015 | Nook et al. | |
| D726,121 | S | 4/2015 | Nook et al. | |
| 9,007,015 | B1 * | 4/2015 | Nook | H02J 7/0034 320/105 |

(56) References Cited

U.S. PATENT DOCUMENTS 9,007,023 B2 4/2015 Dao
9,041,244 B2 5/2015 Graf
9,048,666 B2 6/2015 Su
9,070,938 B2 6/2015 Hashimoto et al.
D735,665 S 8/2015 Nook et al.
9,153,978 B2 10/2015 Reade
D746,774 S 1/2016 Nook et al.
9,243,601 B2 1/2016 Reichow
9,263,717 B2 2/2016 Nakano et al.
9,263,907 B2 2/2016 Richardson et al.
9,287,725 B2 3/2016 Huffman et al.
9,506,446 B2 11/2016 Xinfang
9,525,297 B2 12/2016 Wang
9,537,136 B2 1/2017 Ryu
9,601,800 B2 3/2017 Nakamoto et al.
9,608,294 B2 3/2017 Ko et al.
9,718,419 B2 8/2017 Proebstle
9,748,541 B2 8/2017 Burke
9,748,778 B2 8/2017 Toya
9,770,992 B2 9/2017 Nook et al.
9,809,183 B2 11/2017 Weflen
9,871,392 B2 1/2018 Do et al.
9,874,611 B2 1/2018 Whiting et al.
9,954,391 B2 4/2018 Lei
10,084,173 B2 9/2018 Ha
10,128,483 B2 11/2018 Lee
10,218,172 B2 2/2019 Chen et al.
10,328,806 B2 6/2019 Wang et al.
10,328,808 B2 6/2019 Nook et al.
10,604,024 B2 3/2020 Nook et al.
10,981,452 B2 * 4/2021 Nook .................... B60L 3/0046
2001/0025618 A1 10/2001 Kelling
2001/0003827 A1 11/2001 Resch et al.
2002/0041174 A1 4/2002 Purkey
2002/0007500 A1 6/2002 Fridman et al.
2002/0007699 A1 6/2002 Mouissie
2002/0121877 A1 9/2002 Smith et al.
2002/0155752 A1 10/2002 Winkle et al.
2003/0096158 A1 5/2003 Takano et al.
2003/0141845 A1 7/2003 Krieger
2004/0066168 A1 4/2004 George
2004/0106038 A1 6/2004 Shimamura et al.
2004/0130298 A1 7/2004 Krieger
2004/0150373 A1 8/2004 Chan
2004/0239290 A1 12/2004 Krieger
2005/0040788 A1 2/2005 Tseng
2005/0082833 A1 4/2005 Sodemann et al.
2005/0110467 A1 5/2005 Thomason
2005/0116688 A1 6/2005 Tin
2005/0162124 A1 7/2005 Bertness et al.
2005/0213867 A1 9/2005 Rajendran et al.
2005/0252573 A1 11/2005 Montani
2006/0071631 A1 4/2006 Cheung et al.
2006/0176011 A1 8/2006 Lui
2006/0220610 A1 10/2006 Solberg
2006/0244412 A1 11/2006 Bonzer
2007/0132427 A1 6/2007 Veselic
2007/0132537 A1 6/2007 Dsbun
2007/0178777 A1 8/2007 Miekka
2007/0182363 A1 8/2007 Vang
2007/0278990 A1 12/2007 Raichle et al.
2007/0285049 A1 12/2007 Krieger et al.
2008/0131764 A1 6/2008 Saiki
2008/0150473 A1 6/2008 Wise
2008/0143290 A1 7/2008 Chavakula
2008/0157732 A1 7/2008 Williams
2009/0008374 A1 * 1/2009 Fosbinder ............ B23K 9/1006
219/130.21
2009/0026837 A1 1/2009 Lee
2009/0039712 A1 2/2009 Czamyszka
2009/0108814 A1 4/2009 Wilkins et al.
2009/0174362 A1 7/2009 Richardson et al.
2009/0218988 A1 9/2009 Richardson et al.
2009/0230783 A1 * 9/2009 Weed ........................ H02J 7/35
307/150
2009/0236859 A1 9/2009 McFadden
2009/0253312 A1 10/2009 Detter et al.
2010/0001682 A1 1/2010 Dickson et al.
2010/0013302 A1 1/2010 Howell et al.
2010/0052620 A1 3/2010 Wong
2010/0055546 A1 3/2010 Elder et al.
2010/0129723 A1 5/2010 Noda et al.
2010/0173182 A1 7/2010 Baxter et al.
2010/0181959 A1 7/2010 Gibbs et al.
2010/0244766 A1 9/2010 Olsberg
2010/0283623 A1 11/2010 Baxter et al.
2010/0301800 A1 * 12/2010 Inskeep ................. H01M 10/48
320/105
2011/0068734 A1 3/2011 Waldron
2011/0117408 A1 5/2011 Lennox
2011/0127947 A1 6/2011 Hunter et al.
2011/0140651 A1 6/2011 Dai
2011/0175461 A1 7/2011 Tinaphong
2011/0214423 A1 * 9/2011 Givens .................... F02B 63/04
60/626
2011/0250473 A1 10/2011 Kim
2011/0268996 A1 11/2011 Lee
2011/0279089 A1 11/2011 Yeo
2011/0298415 A1 * 12/2011 Hetzroni ............... H01M 50/20
320/104
2011/0308856 A1 12/2011 Park
2012/0013189 A1 1/2012 Jenkins
2012/0025766 A1 2/2012 Reade
2012/0038365 A1 2/2012 Nagata et al.
2012/0068662 A1 3/2012 Durando et al.
2012/0091944 A1 4/2012 Rogers
2012/0126818 A1 5/2012 Ishihara
2012/0139498 A1 6/2012 Chang
2012/0169116 A1 7/2012 Graf
2012/0187897 A1 7/2012 Lenk et al.
2012/0270097 A1 10/2012 Yasul et al.
2012/0295150 A1 11/2012 Gao et al.
2012/0299533 A1 11/2012 Huffman et al.
2012/0319487 A1 12/2012 Shah
2013/0084471 A1 4/2013 Han et al.
2013/0104817 A1 5/2013 Miller
2013/0154543 A1 6/2013 Richardson et al.
2013/0154544 A1 6/2013 Yokoyama et al.
2013/0154550 A1 6/2013 Balmefrizol et al.
2013/0162029 A1 6/2013 Reichow
2013/0241488 A1 9/2013 Dao
2013/0241498 A1 9/2013 Koebler
2013/0295444 A1 11/2013 Kim et al.
2013/0314041 A1 11/2013 Proebstle
2014/0045001 A1 2/2014 Yang
2014/0077755 A1 3/2014 Zhang
2014/0084844 A1 3/2014 Weflen
2014/0113463 A1 4/2014 Peterson et al.
2014/0127550 A1 5/2014 Roh et al.
2014/0139175 A1 5/2014 Gonzalez
2014/0159509 A1 6/2014 Inskeep
2014/0210399 A1 7/2014 Urschel
2014/0299589 A1 * 10/2014 Fosbinder ........... B23K 9/1006
219/133
2014/0368155 A1 12/2014 Chen
2015/0012174 A1 1/2015 Kim et al.
2015/0015184 A1 1/2015 Su
2015/0037662 A1 2/2015 Pinon et al.
2015/0054336 A1 2/2015 Liu
2015/0087182 A1 3/2015 Zhao et al.
2015/0137740 A1 5/2015 Allos et al.
2015/0222060 A1 8/2015 Kim et al.
2015/0236329 A1 8/2015 Okuda et al.
2015/0306964 A1 10/2015 Wang
2015/0340907 A1 11/2015 Lei
2015/0380697 A1 12/2015 Osborne et al.
2016/0001666 A1 1/2016 Nook et al.
2016/0111914 A1 4/2016 Willard et al.
2016/0141728 A1 5/2016 Fauteux et al.
2016/0155996 A1 6/2016 Dai
2016/0181587 A1 6/2016 Koebler et al.
2017/0084899 A1 3/2017 Deng et al.
2017/0309872 A1 10/2017 Kuboki et al.
2018/0111491 A1 4/2018 Nook et al.

(56) References Cited

U.S. PATENT DOCUMENTS

| | | | |
|---|---|---|---|
| 2018/0215274 | A1 | 8/2018 | Nook et al. |
| 2018/0269703 | A1 | 9/2018 | Nook et al. |
| 2018/0342891 | A1 | 11/2018 | Nook et al. |
| 2018/0345803 | A1 | 12/2018 | Nook et al. |
| 2018/0369599 | A1 | 12/2018 | Smith |
| 2019/0081472 | A1 | 3/2019 | Guo et al. |
| 2019/0308518 | A1 | 10/2019 | Nook et al. |

FOREIGN PATENT DOCUMENTS

| | | | |
|---|---|---|---|
| AU | 2016269555 | | 1/2017 |
| AU | 2016392707 | A1 | 11/2017 |
| AU | 2017217661 | A1 | 12/2017 |
| AU | 2019201081 | | 3/2019 |
| AU | 2019201081 | A1 | 3/2019 |
| AU | 2019201559 | A1 | 3/2019 |
| AU | 2020201223 | A1 | 3/2020 |
| CA | 107977 | A | 10/1907 |
| CA | 105457 | S | 6/2005 |
| CA | 118796 | S | 1/2008 |
| CA | 137883 | S | 6/2011 |
| CA | 145036 | S | 2/2013 |
| CA | 2 916 782 | A1 | 1/2016 |
| CA | 2 957 431 | A1 | 8/2017 |
| CA | 3 005 971 | A1 | 8/2017 |
| CN | 1440892 | A | 9/2003 |
| CN | 201947042 | U | 8/2011 |
| CN | 202058834 | U | 11/2011 |
| CN | 102414923 | A | 4/2012 |
| CN | 102447288 | A | 5/2012 |
| CN | 202696190 | U | 1/2013 |
| CN | 103035874 | A | 4/2013 |
| CN | 103066662 | | 4/2013 |
| CN | 202918052 | U | 5/2013 |
| CN | 203211234 | U | 9/2013 |
| CN | 203504235 | U | 3/2014 |
| CN | 103715737 | A | 4/2014 |
| CN | 203522157 | U | 4/2014 |
| CN | 104118374 | A | 10/2014 |
| CN | 204113515 | U | 1/2015 |
| CN | 104442429 | A | 3/2015 |
| CN | 104488111 | A | 4/2015 |
| CN | 104795527 | A | 7/2015 |
| CN | 204516832 | U | 7/2015 |
| CN | 204966731 | U | 1/2016 |
| CN | 107852004 | A | 3/2018 |
| CN | 108884801 | A | 11/2018 |
| DE | 295 07 501 | U1 | 6/1995 |
| DE | 20 2009 016 260 | U1 | 3/2010 |
| DE | 102010062708 | | 6/2012 |
| DE | 20 2013 102 599 | U1 | 8/2013 |
| DE | 10 2014 114 997 | A1 | 1/2016 |
| DE | 11 2016 002 206 | T5 | 3/2018 |
| DE | 20 2014 011 413 | U1 | 4/2020 |
| EP | 2105980 | | 9/2009 |
| EP | 2 472 698 | A2 | 7/2012 |
| EP | 2472698 | A2 | 7/2012 |
| EP | 2605313 | | 6/2013 |
| EP | 0616409 | | 9/2014 |
| EP | 3286429 | A1 | 2/2018 |
| EP | 3308446 | A1 | 4/2018 |
| EP | 3407405 | A1 | 11/2018 |
| GB | 2265267 | A | 9/1993 |
| GB | 2527858 | A | 1/2016 |
| GB | 2527858 | B | 5/2017 |
| GB | 2557733 | A | 6/2018 |
| GB | 2562950 | A | 11/2018 |
| JP | 2001069673 | A | 3/2001 |
| JP | 2002141056 | A | 5/2002 |
| JP | 2003-112586 | A | 4/2003 |
| JP | 2008-146998 | A | 6/2008 |
| JP | 2011023249 | A | 2/2011 |
| JP | 2012-004106 | A | 1/2012 |
| JP | 2012169161 | A | 9/2012 |
| JP | 2012-230962 | A | 11/2012 |
| JP | 3182855 | U | 3/2013 |
| JP | 3182855 | U | 4/2013 |
| JP | 3185027 | U | 7/2013 |
| JP | 2014-523623 | A | 9/2014 |
| JP | 2014232666 | A | 12/2014 |
| JP | 2015-115979 | A | 6/2015 |
| JP | 2018-534892 | A | 11/2018 |
| JP | 2018-536789 | A | 12/2018 |
| PH | 1/2013/500793 | | 1/2017 |
| WO | 2000/024108 | A1 | 4/2000 |
| WO | 2004/036714 | A1 | 4/2004 |
| WO | 2005/038952 | A2 | 4/2005 |
| WO | 2006/057497 | | 6/2006 |
| WO | 2010-129723 | A2 | 11/2010 |
| WO | 2010/129723 | A2 | 11/2010 |
| WO | 2011/113734 | | 9/2011 |
| WO | 2012/036556 | | 3/2012 |
| WO | 2012/068635 | A1 | 5/2012 |
| WO | 2012/074548 | | 6/2012 |
| WO | 2012/080996 | | 6/2012 |
| WO | 2012/081140 | A1 | 6/2012 |
| WO | 2013-137873 | A1 | 9/2013 |
| WO | 2013/137873 | A1 | 9/2013 |
| WO | 2014/106407 | | 10/2014 |
| WO | 2014/206323 | | 12/2014 |
| WO | 2015/195321 | A1 | 12/2015 |
| WO | 2016/003471 | A1 | 1/2016 |
| WO | 2016/025869 | A1 | 2/2016 |
| WO | 2017/138963 | A1 | 8/2017 |
| WO | 2017/139524 | A1 | 8/2017 |

OTHER PUBLICATIONS

Exhibit 1009, www.electronicshub.org.

Exhibit 1010, USB Battery Charging 1.2 Compliance Plan.

The Petition for Inter Partes Review of U.S. Pat. No. 9,007,015; IPR 2020-00944, filed May 14, 2020, 99 pages.

Exhibit 1012, Model: Epower-20B brochure, 1 page.

Exhibit 1013, Model: Epower-21 brochure, 1 page.

Exhibit 1015, Fairchild Semiconductor brochure, MC78XX/LM78XX/MC78XXA, 28 pages.

Report on the filing or determination of an action regarding a patent or trademark, filed Oct. 19, 17, *The Noco Company, Inc.* v. *Shenzhen Valuelink E-Commerce Co., Ltd.*, U.S. District Court for the Northern District of Ohio, Eastern Division, 1 page.

Report on the filing or determination of an action regarding a patent or trademark, filed Oct. 19, 17, *The Noco Company, Inc.* v. *Shenzhen ChangXin Yang Technology Co., Ltd.*, U.S. District Court for the Northern District of Ohio, Eastern Division, 1 page.

Report on the filing or determination of an action regarding a patent or trademark, filed Oct. 19, 2017, *The Noco Company, Inc.* v. *SZ Jingxinghui Electronics Technology Co., Ltd.*, U.S. District Court for the Northern District of Ohio, Eastern Division, 1 page.

Report on the filing or determination of an action regarding a patent or trademark, filed Oct. 19, 2017, *The Noco Company, Inc.* v. *Shenzhen Anband Technology Co., Ltd.*, U.S. District Court for the Northern District of Ohio, Eastern Division, 1 page.

Report on the filing or determination of an action regarding a patent or trademark, filed Oct. 30, 2017, *The NOCO Company, Inc.* v. *Shenzhen Dika Na'er E-Commerce Co., Ltd.*, U.S. District Court for the Northern District of Ohio, Eastern Division, 1 page.

PTAB notice regarding petition filed in Patent No. 9007015, U.S. Appl. No. 14/325,938, filed Jan. 15, 2018, IPR2018-00503, 1 page.

Report on the filing or determination of an action regarding a patent or trademark, filed Sep. 13, 2018, *The Noco Company, Inc.* v *Halo2 Cloud, LLC, QVC, Inc.*, U.S District Court Delaware, 1 page.

Notice of Filing Date Accorded to Petition and Time for Filing Patent Owner Preliminary Response, mailed May 21, 2020, *Shenzhen Carku Technology Co., Ltd.* v. *The NOCO Company*, IPR2020-00944, U.S. Pat. No. 9,007,015, 4 pages.

International Search Report in corresponding PCT/US2014/045434, dated Nov. 3, 2014.

(56) References Cited

OTHER PUBLICATIONS

Australian Patent Opposition #1, Australian Patent Application No. 2016269555, Statement of Grounds of Particulars, Brown & Watson International Pty Ltd., Jun. 6, 2019, 6 pages; particular (e), the offering for sale and sale by Asia Bright Industrial (Hong Kong) Co, Ltd. of products identified as the JPS Jump Starter and the JPR Jump Starter prior to Jul. 2014.
Australian Patent Opposition #1, Australian Patent Application No. 2016269555, Evidence in Support, filed Sep. 6, 2019, 24 pages.
Australian Patent Opposition #1, Australian Patent Application No. 2016269555, Evidence in Support—Exhibits, filed Sep. 6, 2019,166 pages; Annexure MD-1, early specification sheets for "the BW Jumpstarter", 4 pages; Annexure MD-2, product manual for "the BW Jumpstarter", Projecta; "2x22 Amp Hour High Performance Jumpstarter"; 2013; 20 pages.
Australian Patent Opposition #2, Australian Patent Application No. 2019201559, Statement of Grounds and Particulars, filed May 21, 2020, 8 pages.
*The Noco Company* v. *Deltona Transformer Corporation and Deltran USA, LLC*, Defendant Deltran USA, LLC's Invalidity Contentions, In the United States District Court for the Middle District of Florida, Orlando Division, USB Implementers Forum, Inc.,Battery Charging Specification, Revision 1.1, Apr. 15, 2009 on p. 8, Prior Art Offered for Sale or Publicly Used or Known on pp. 8-10, MICRO-START/PPS, E-Power, Battery Tender Power Pack, PowerAll, and Electromate 400 on p. 10; 141 pages.
*The Noco Co., Inc.* v. *SmarTech Products, Inc., et al.*, Smartech, Inc. s Invalidity and Unenforceability Contents, Bestek 2400A Peak Current Portable Car Jump Starter Power Bank with 1000mAh Capacity (SmarTech 00062-00069)("Bestek") on p. 2; Halo 7800 mAh Portable Charger for Cell Phones & Tablets (SmarTech 00070-00071)("Halo") on p. 2; Schumacher Lithium Iron Jump Starter—SL1 Red Fuel (SmarTech 00072-00073)("Schumacher") on p. 2, filed Jun. 19, 2019, 8 pages.
*The Noco Company* V. *Shenzhen Dika Na'Er E-Commerce* (Lead Case No. 1:17-cv-02282), *The Noco Company* v. *Shenzhen Changxinyang Technology Co., Ltd* (Case No. 1:117-cv-02209). *The Noco Company* v. *Shenzhen Valuelink E-Commerces Co., Ltd* (Case No. 1:17-cv-02210), Defendants' Amended Final Invalidity and Unenforceability Contents, The Powerall PBJS12000RD Jump Starter ("Powerall Jump Starter"), offered for sale by Gryphon Mobile Electronics at least as early as Nov. 5, 2013, on p. 2, The Lightning 12V Jump Starter ("Lighting Jump Starter"), offered for sale by Pilot, Inc. as least as early as Mar. 2014, on p. 2, and The L3 Model Jump Starter, offered for sale by Shenzhen Tsevie Company at least as early as May 19, 2019, on p. 2, Sep. 23, 2019, 5 pages.
XP 55517268A 1, NOCO Product Brochure, Jump Starter, Lithium GB70 2000A 12V.
XP 55517270A 1, Noco Product Brochure, Jump Starter, Lithium GB40 1000A 12V.
USB Battery Charging Specification Version 1.2 (EX1009).
Datasheet for LM7805 Voltage Regulator from Fairchild Semiconductor (EX1019).
Grounds of Invalidity: Annex A to the Grounds of Invalidity; Projecta product manual for 2200A Jumpstarter, P/No.s HP 2012, HP 2200.; Carku E-Power 21 device.
Grounds of Invalidity: Prior use of the Carku E-Power 21 device ("Carku E-Power 21").; User manual for Carku E-Power 21 (Ann 1).; Specification sheet for Carku E-Power 21 (Ann 2).; Claimant's E-catalogue dated Apr. 22, 2014, which included Carku E-Power 21 (Ann 3).; Photograph of claimants' booth at 115th 2014 Canton Fair (Ann 4). Photographs and quotation sheet rcvd by Edelbert Lenz GmbH & Co. KG (Ann 5).; User manuals and specification sheets rcvd by Kaz Corp of Japan (Ann 6).; E-Catalogue rcvd by email by Krautli (Schweiz) AG (Ann 7).
Defendant Deltona Transformer Corporation'S Invalidity Contentions: USB Implementers Forum, Inc, Battery Charging Specification, Rev 1.1, Apr. 15, 2009.; MICRO-START/PPS, offered for sale as late as Jul. 29, 2013, by Antigravity Batteries.; E-Power, offered for sale as late as Apr. 15, 2013 by Carku.; Battery Tender Power Pack, offered for sale prior to Jul. 3, 2014 by Carku/Deltran USA LLC.; PowerAll, offered for sale as late as Mar. 26, 2014 by Gryphon Mobile Electronics LLC.; Electromate 400, offered for sale as late as 2013 by Black & Decker.
Defendant TII Trading Inc.'S Invalidity Contentions.
Defendant'S Invalidity and Unenforceability Contentions: USB Battery Charging Spec Ver 1.2.; E-flite EC Connector Assembly Instruct w 2008.; Datasheet for LM7805 Voltage Regulator from Fairchild Semiconductor.; Carku Product Brochure for Epower-20 jump starter product.; Carku Product Brochure for Epower-21 jump starter product.; MC78XX/LM78XX/MC78XXA 3-Terminal 1A Positive Voltage Regulator from Fairchild Semiconductor Corp 2001.; Patent Owner The Noco Company's Preliminary Response in Dongguan IPR.
Memo Opin and Order of US Dist Ct Jud Barker construing disputed terms of claims 1, 9 and 19 of the '015 issued *Noco* v. *SmarTech Produts, Inc.*, 1:18-cv-2780 (N.D. Ohio Apr. 2, 2020; Noco Amend Compl *Noco* v *Shenzhen Lianfa Tong Tech Co., Ltd., et al.*, 1:19-cv-01855 (N.D. Ohio Apr. 2, 2020; Dec Wan; Dec Hartup; Dec Kirtley; Special Waster Report on Prop Claim Const For U.S. Pat. No. 9,007,015 issued *Noco* v. *Shenzhen Dika Na'Er E-Commerce Co.*, 1:17CV2282 (N.D. Ohio Jun. 28, 2018) acc/adopt by US Dist Ct Jud Boyko, 2019 WL 1723358.
Defendants' Amended Final Invalidity and Unenforceability Contentions: The Powerall PBJS12000RD Jump Starter, offered for sale by Gryphon Mobile Electronics at least as early as Nov. 5, 2013.; The-Lightning 12V Jump Starter, offered for sale by Pilot, Inc. at least as early as Mar. 2014.; The L3 Model Jump Starter, offered for sale by Shenzhen Tsevie Company at least as early as May 19, 2019.
Statement of Defense and Counterclaim: Carku Epower-20 jump starter; Carku Epower-21 jump starter; Carku Product Brochure for the Epower-20 jump starter product; Carku Product Brochure for the Epower-21 jump starter product.
Declaration by Cory Seligman (30 Pages) and Annexure marked CS-1 (137 Pages), in the matter of AU 2019201559 and Opposition by Brown & Watson; Nov. 23, 2020.
Petition for Inter Partes Review of U.S. Pat. No. 9,007,015 for *Shenzhen Mediatek Tong Technology* v. *Noco Company* (69 Pages); IPR2020-01387; Jul. 29, 2020.
Petition for Inter Partes Review of U.S. Pat. No. 9,007,015 for *Guangdong Boltpower Energy Co., Ltd.* v *Noco Company* (106 Pages); IPR2021-00309; Dec. 11, 2020.
Exhibit 1004 from IPR2021-00309; PTAB Decision Denying Institution of Inter Partes Review of the '015 patent in Case IPR2018-00503.
Exhibit 1016 from IPR2020-01387; *The Noco Company, Inc.* v. *Shenzhen Lianfa Tong Technology Co. Ltd., et al.*, Case No. 1:19-cv-01855, (N.D. Ohio) First Amended Complaint for Patent Infringement.
Australian Office Action for AU Patent Application No. AU2020201224, dated Oct. 26, 2021.
The Petition for Inter Partes Review of U.S. Pat. No. 9,007,015; 49 pages, filed Jan. 15, 2018, IPR2018-00503.
Report on the filing or determination of an action regarding a patent; U.S. Pat. No 9,007,015; dated Oct. 23, 2018; 1 page.
Report on the filing or determination of an action regarding a patent; U.S. Pat. No 9,007,015; dated Sep. 21, 2018; 1 page.
Report on the filing or determination of an action regarding a patent; U.S. Pat. No 9,007,015; dated Feb. 27, 2018; 1 page.
Report on the filing or determination of an action regarding a patent; U.S. Pat. No 9,007,015; dated Dec. 5, 2017; 1 page.
The International Search Report and Written Opinion in corresponding PCT/US2014/045434, dated Nov. 3, 2014.
The Petition for Inter Parties Review of U.S. Pat. No. 9,007,015; 49 pages, filed Jan. 15, 2019.
Report on the filing determination of an action regarding a patent: U.S. Pat. No. 9,007,015; issued Oct. 30, 2017; 1 page.
Report on the filing determination of an action regarding a patent: U.S. Pat. No. 9,007,015; issued Oct. 19, 2017; 1 page.
Projecta; 2x22 Amp Hour High Performance Jumpstarter; 2013; pp. 1-20.
Report on the filing determination of an action regarding a patent: U.S. Pat. No. 9,007,015; issued Sep. 13, 2018; 1 page.
UK decision issued on Aug. 4, 2022 in connection with GB2257858, 51 pages.

(56) References Cited

OTHER PUBLICATIONS

Report on the Filing or Determination of an Action Regarding a Patent or Trademark, filed Aug. 14, 2019, *The Noco Company, Inc.* v. *Shenzhen Lianfa Tong Technology Co., Ltd. and Shenzhen Meditek Tong Technology Co., Ltd.*, 1 page.
Report on the Filing or Determination of an Action Regarding a Patent or Trademark, filed Aug. 14, 2019, *The Noco Company, Inc.* v. *Sictec Instruments Company Limited*, 1 page.
Decision Granting Institution of Inter Partes Review, U.S. Pat. No. 9,007,015, U.S. Appl. No. 14/325,938 on Nov. 12, 2020, IPR2020-00944, 70 pages.
Report on the Filing or Determination of an Action Regarding a Patent or Trademark, filed May 28, 2020, *The Noco Company, Inc.* v. *Shenzhen Yike Electronics*, 1 page.
Report on the Filing or Determination of an Action Regarding a Patent or Trademark, filed May 28, 2020, *The Noco Company, Inc.* v. *Guangzhou Unique Electronics Co., Ltd. and Sui Cheng Limited*, 1 page.
Report on the Filing or Determination of an Action Regarding a Patent or Trademark, filed May 28, 2020, *The Noco Company, Inc.* v. *Zhejiang Quingyou Electronic Commerce Co., Ltd.*, 1 page.
Report on the Filing or Determination of an Action Regarding a Patent or Trademark, filed May 28, 2020, *The Noco Company, Inc.* v. *Shenzhen GOOLOO E-Commerce Co., Ltd.*, 1 page.
Report on the Filing or Determination of an Action Regarding a Patent or Trademark, filed May 28, 2020, *The Noco Company, Inc.* v. *Nice Team Enterprise Limited*, 1 page.
Report on the Filing or Determination of an Action Regarding a Patent or Trademark, filed May 28, 2020, *The Noco Company, Inc.* v. *Aukey Technology Co., Ltd.*, 1 page.
Report on the Filing or Determination of an Action Regarding a Patent or Trademark, filed Mar. 16, 2020, *The Noco Company, Inc.* v. *Nekteck, Inc.*, 1 page.
Report on the Filing or Determination of an Action Regarding a Patent or Trademark, filed Mar. 13, 2020, *The Noco Company, Inc.* v. *Medcursor, Inc.*, 1 page.
Australian Patent Opposition #2, Notice of Opposition, Australian Patent Application No. 2019201559, Brown & Watson International Pty Ltd., Feb. 21, 2020, 1 page.
The offering for sale and sale by ATD Tools, Inc of a product identified as the ADT 5900 Jump Starter prior to Jul. 2014.
Australian Patent Opposition #3, Notice of Opposition, Australian Patent Application No. 2020201223, Brown & Watson International Pty Ltd , Aug. 7, 2020.
German Patent Opposition. German Patent Application No. 102014114997.
D21 advertisement brochure of the opponent transmitted on Dec. 22, 2013.
D22 advertisement brochure of the opponent transmitted on Apr. 23, 2014.
D23 SGS test report relating to jump start devices of the opponent dated Apr. 21, 2014.
D24 TWM417714U1.
D24a machine translation of D24.
D25 data sheet of TopComTechnology Co., Ltd., for the product "Universal Power Bank", dated Nov. 15, 2011.
D28 affidavit of the manager of the requesting party, 2013.
German Nullity Action, German Patent Application No. 202014011347.5.
*The Noco Companyv. Ring Automotive Limited*, HP-2020-000022, Grounds of Invalidity, In the High Court of Justice Business And Property Courts of England and Wales Intellectual Property List (ChD) Patents Court, 2 pages.
The making available to the public by supply, description and/or use of the HP2200 jump starter described in the manual dated Aug. 2013 at Annex A Before Jul. 3, 2014 including in and after Aug. 2013('HP2200') (cited on p. 1 of reference *The Noco Company* v. *Ring Automotive Limited*, HP-2020-000022, Grounds of Invalidity).
The Carku E-Power 21 device in so far as it is established to have been made available to the public in the Earlier Proceedings (Carku E-Power 21) (cited on p. 2 of reference *The Noco Company* v. *Ring Automotive Limited*, HP-2020-000022, Grounds of Invalidity).
*The Noco Company* v. *Shenzhen ValueLink E-Commerces Co., Ltd*, Case No. 1:17-cv-02210, Defendants' Amended Final Invalidity and Unenforceability Contents, Sep. 23, 2019, 5 pages.; The Powerall PBJS12000RD Jump Starter ("Powerall Jump Starter"), offered For sale by Gryphon Mobile Electronics at least as early as Nov. 5, 2013; The Lightning 12V Jump Starter (Lightning Jump Starter), offered for sale by Pilot, Inc. at least as early as Mar. 2014; The L3 Model Jump Starter, offered for sale by Shenzhen Tsevie Company as Eady as May 19, 2019.
*The Noco Company, Inc.* v. *Shenzhen Changxintang Technology Co., Ltd.*, Case No. 1:17-cv-02209, Defendants' Amended Final Invalidity and Unenforceability Contents, In the US District Court of Northern Ohio, Eastern District. The Powerall PBJS12000RD Jump Starter ("Powerall Jump Starter"), offered For sale by Gryphon Mobile Electronics at least as early Nov. 5, 2013; The Lightning 12V Jump Starter (Lightning Jump Starter), offered for sale by Pilot, Inc. at least as early Mar. 2014; The L3 Model Jump Starter, offered for sale by Shenzhen Tsevie Co as Early May 19, 2019.
Notification of Material filed under Section 27, Australian Government IP Australia, Nov. 8, 2016 (3 pages); Declaration of Sheridan Lee (8 pages); Annexure SL-1 (8 pages); Annexure SL-2 (10 pages); Annexure SL-3 (9 pages); Annexure SL-4 (18 pages); Annexure SL-5, JP 3185027 (14 pages); Annexure SL-6 of English Translation of JP 3185027 (17 pages) and US 2004/0130298 (14 pages).
This Portable USB Charger Battery Pack Can Also Jump Start Your Car (viewed on Internet on Oct. 27, 2020] <URL: https://www.howto geek.com/179499/this-portable-usb-charger-battery-pack-can-also-jump-start-your-car/>, published on Jan. 13, 2014.
Clore Automotive, LLC, U.S. International Trade Commission, Investigation No. 337-TA-1256, Response of Clore Automotive, LLC to the Amended Complaint and Notice of Investigation, pp. 150-151.
Deltran USA, LLC, U.S. International Trade Commission, Investigation No. 337-TA-1256 Deltran USA, LLC'S Response To the Amended Complaint and Notice of Investigation, pp. 196-219.
Schumaker Electric Corporation and Schumacher Power Technology (Binhai) Co. Ltd., U.S. International Trade Commission, Investigation No. 337-TA-1256, Response of Schumacher Electric Corporaton and Schumacher Power Technology (Binhai) Co. Ltd., to the Complaint of the Noco Company Under Section 337 of the Tariff Act Of 1930 And Notice of Investigation, pp. 180-184.
Best Buy Co., Inc.., U.S. International Trade Commission, Investigation No. 337-TA-1256, Response of Best Buy Co., Inc. to the First Amended Complaint and the Notice of Investigation, pp. 69-71.
Guangdong Boltpower Energy Co, Ltd., U.S. International Trade Commission, Investigation No. 337-TA-1256, Response of Guangdong Boltpower Energy Co., Ltd. to the First Amended Complaint and the Notice of Investigation, pp. 73-74.
Winplus North America, Inc. U.S. International Trade Commission, Investigation No. 337-TA-1256, Response of Winplus North America, Inc. to the Amended Complaint and the Commissioner'S Notice of Investigation, Exhibit B, pp. 1-5.
Autozone, lnc.,, U.S. International Trade Commission, Investigation No. 337-TA-1256, Respondents Autozone, Inc. and Best Parts, Inc.'S Response to the Amended Complaint and Notice of Investigation.
Shenzhen Carku Technology Co., Ltd., 70MAI Co., Ltd., Antigravity Batteries LLC, Gooloo Technoligies LLC, Great Neck Saw Manufactures, Inc., Horizon Tool, Inc., Matco Tools Corporation, Nekteck, Inc., Paris Corporation, Powermax Battery (U.S.A.), Inc., and Shenzhen Gooloo E-Commerce Co., Ltd. U.S. International Trade Commission, Investigation No. 337-TA-1256, Shenzhen Carku Technology Co., Ltd., 70MAI Co., Ltd., Antigravity Batteries LLC, Gooloo Technologies LLC, Great Neck Saw Manufacturers, Inc., Horizon Tool, Inc., Matco Tools Corporation Nekteck, Inc., Paris Corporation, PowerMax Battery (U.S.A.), Inc. and Shenzhen Gooloo E-Commerce Co., Ltd.'s Response to the Amended Complaint and Notice of Inveestigation, Exhibit B, pp. 1-3.

(56) References Cited

OTHER PUBLICATIONS

Walmart Inc., U.S. International Trade Commission, Investigation No. 337-TA-1256, Response of Walmatr Inc., to the Complaint of the Noco Company Under Section 337 of the Tariff Act Of 1930 And Notice of Investigation.
Smartech Products, Inc., U.S. International Trade Commission, Investigation No. 337-TA-1256, Respondent Smartech Products, Inc.'S Response To the Complaint Under 337 Of the Tariff Act Of 1930, As Amended, and Notice of Investigation, pp. 98-102.
Halo2cloud, LLC and Zagg Inc., U.S. International Trade Commission, Investigation No. 337-TA-1256, Response of Halo2Cloud, LLC and Zagg Inc To the Second Amended Complaint and Notice of Nvestigation, pp. 141-142.
QVC, Inc., U.S. International Trade Commission, Investigation No. 337-1256, Response of QVC, Inc. To the Second Amended Complaint and Notice of Investigation, pp. 144-145.
In re Certain Portable Battery Jumpstarters and Components Thereof, 3370TA01256, United States International Trade Commission (Mar. 17, 2021).
Fairchild MC78XX/LM78XX/MC78XXA 3-Terminal 1A Positive Voltage Regulator.
USB Battery Charging 1.2 Compliance Plan, Rev. 1.0.
Xysemi XR3403.
Texas Instruments LM2621.
USB Implementers Forum, Inc., Battery Charging Specification, Revision 1.1.
Carku Epower-20B catalog information.
USB Power Delivery Specification 1.0, Jul. 16, 2012, Exhibit 1045.

* cited by examiner

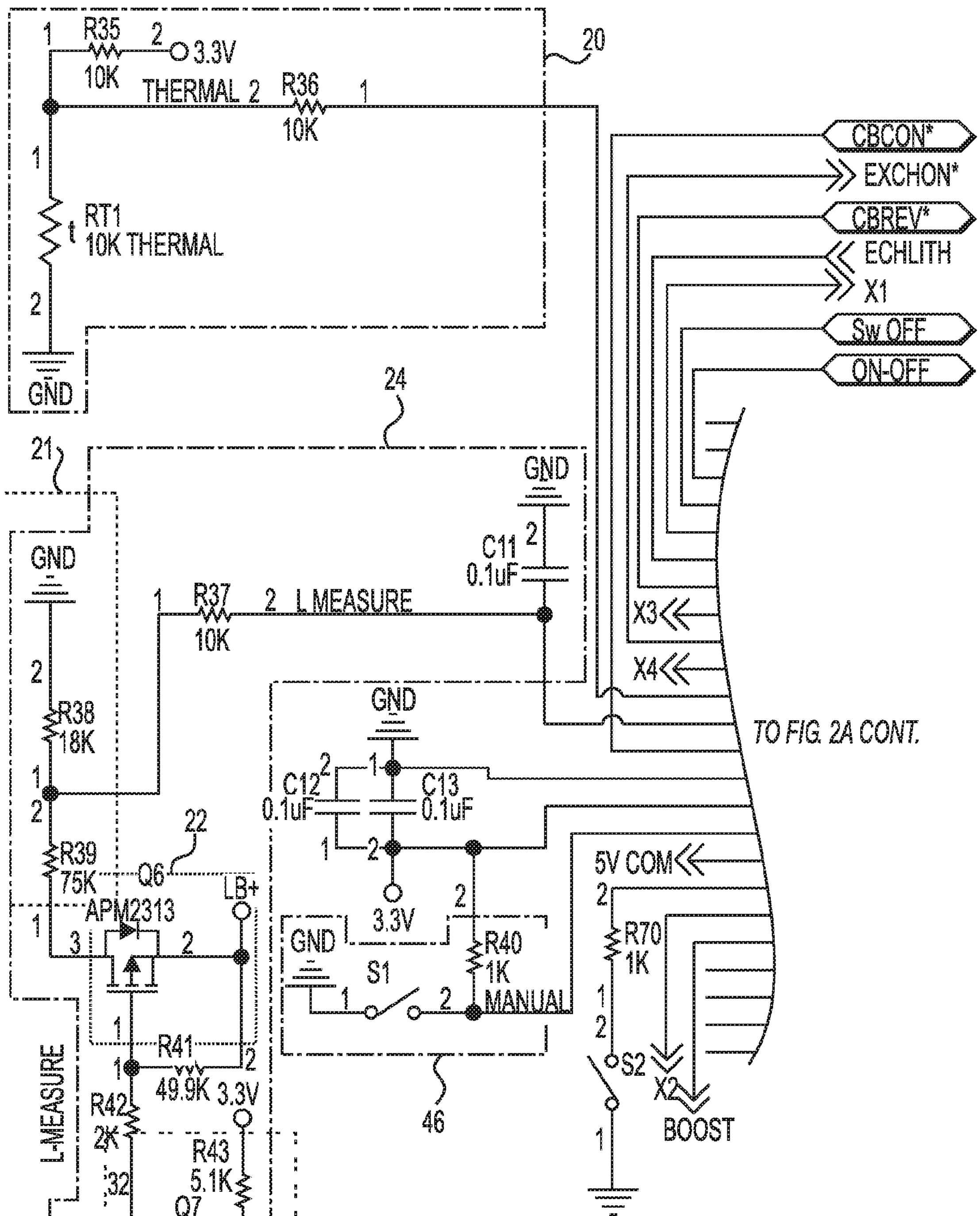
FIG. 2A
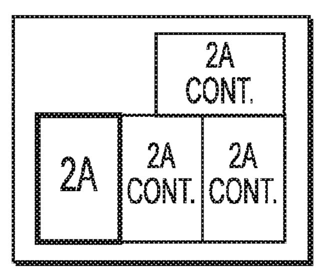

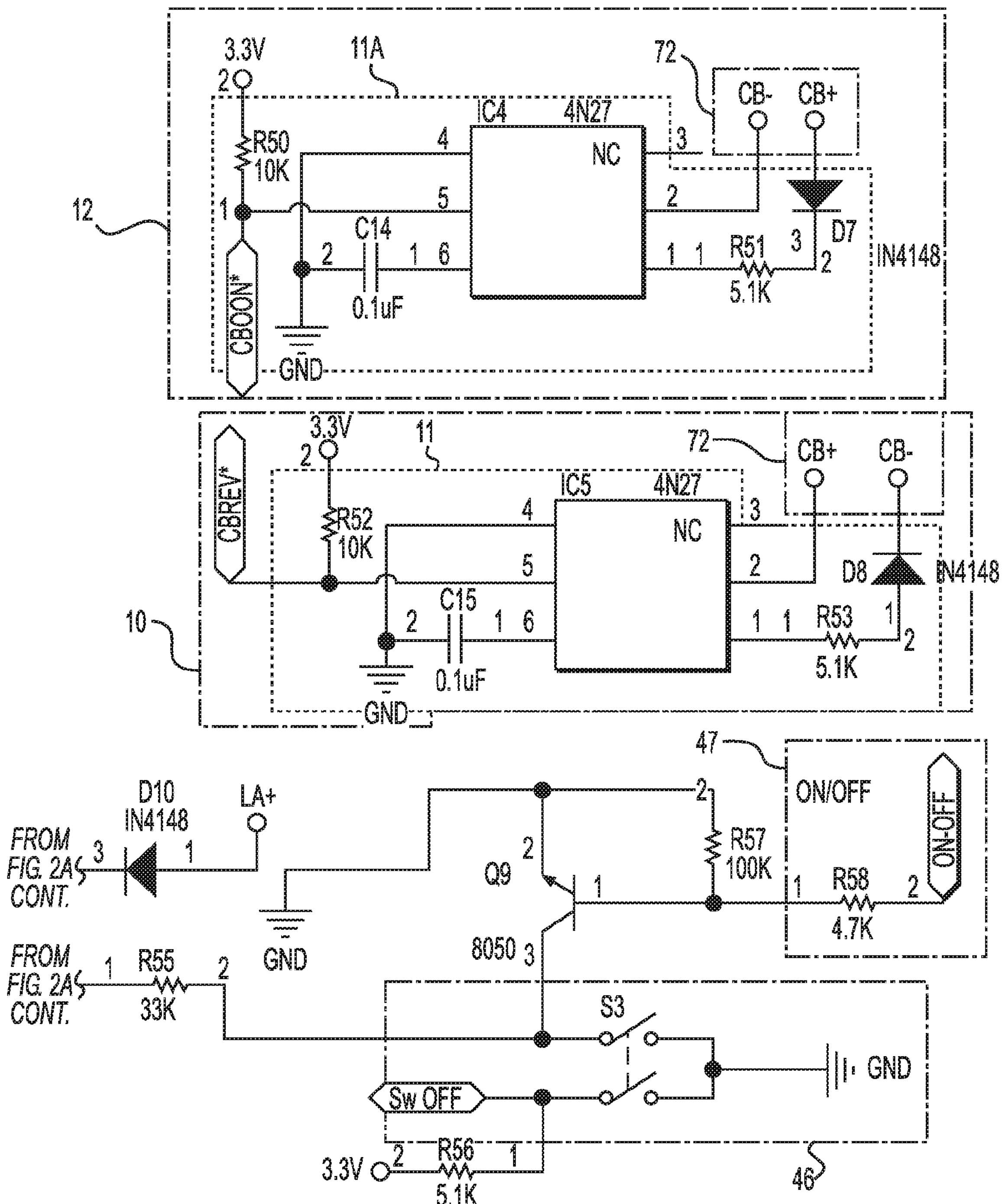
FIG. 2A CONT.
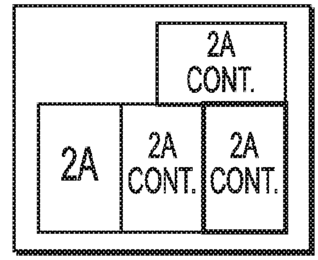

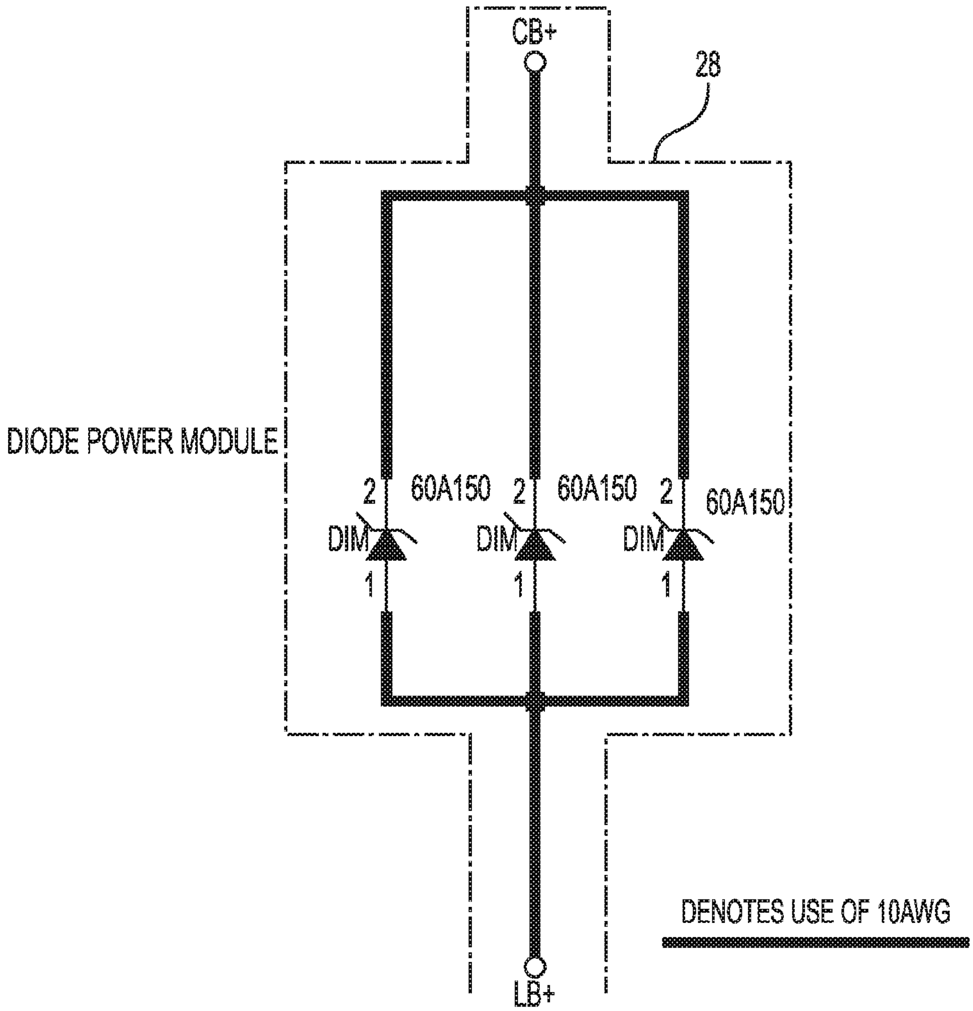
FIG. 2B
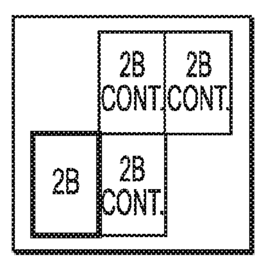

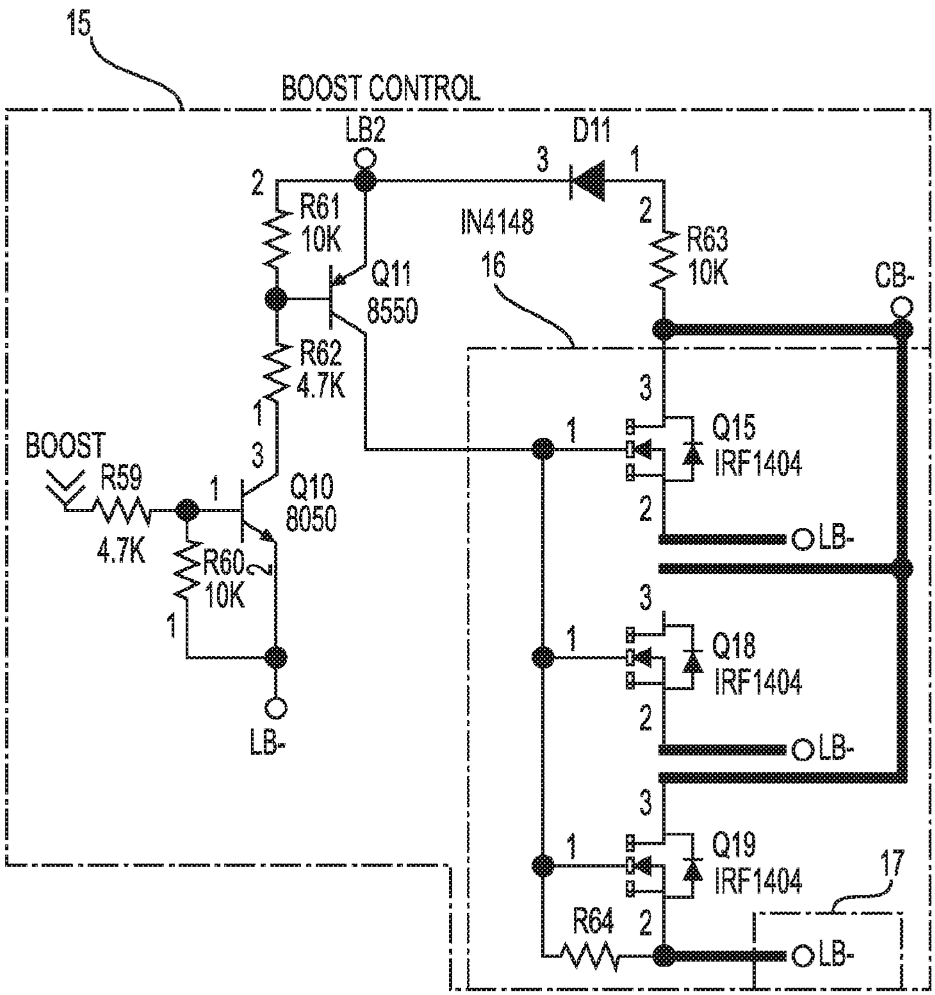
FIG. 2B CONT.
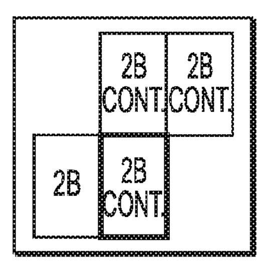

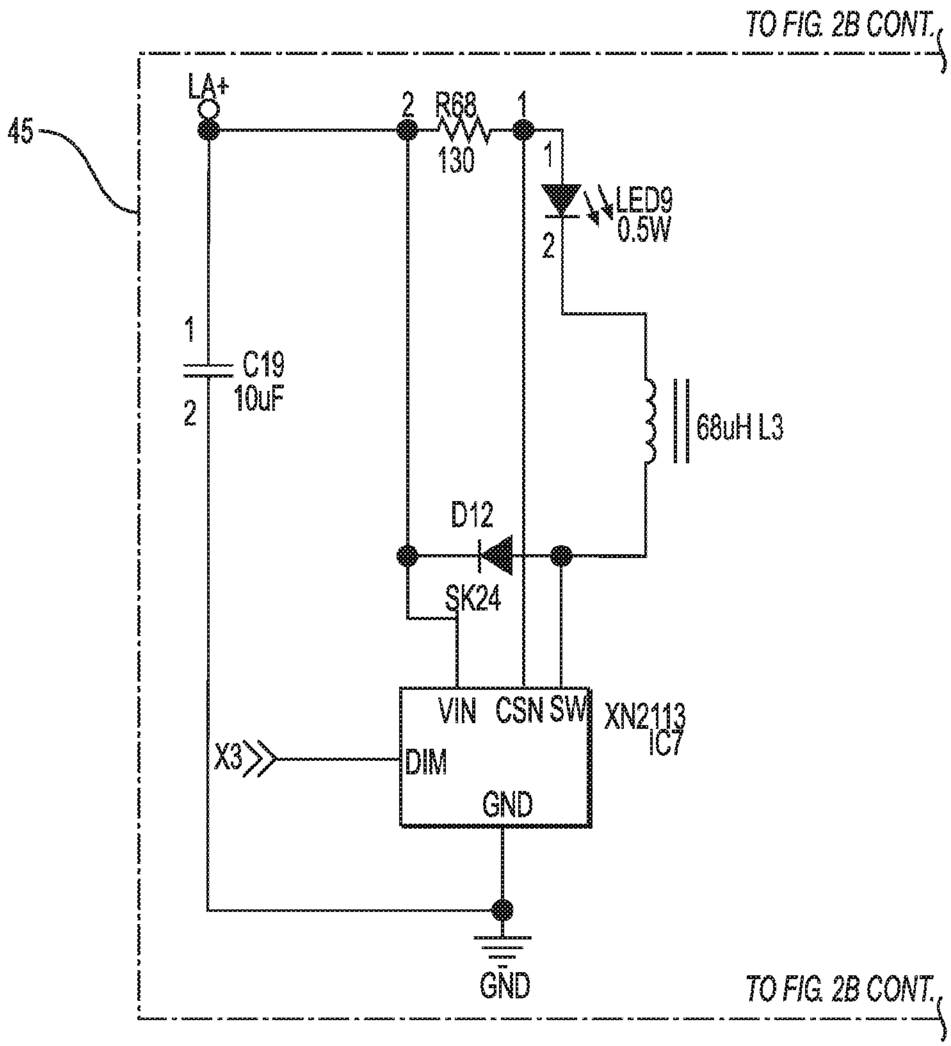
FIG. 2B CONT.
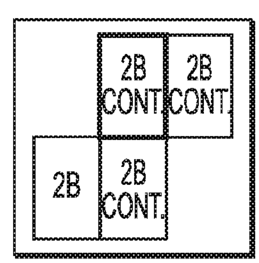

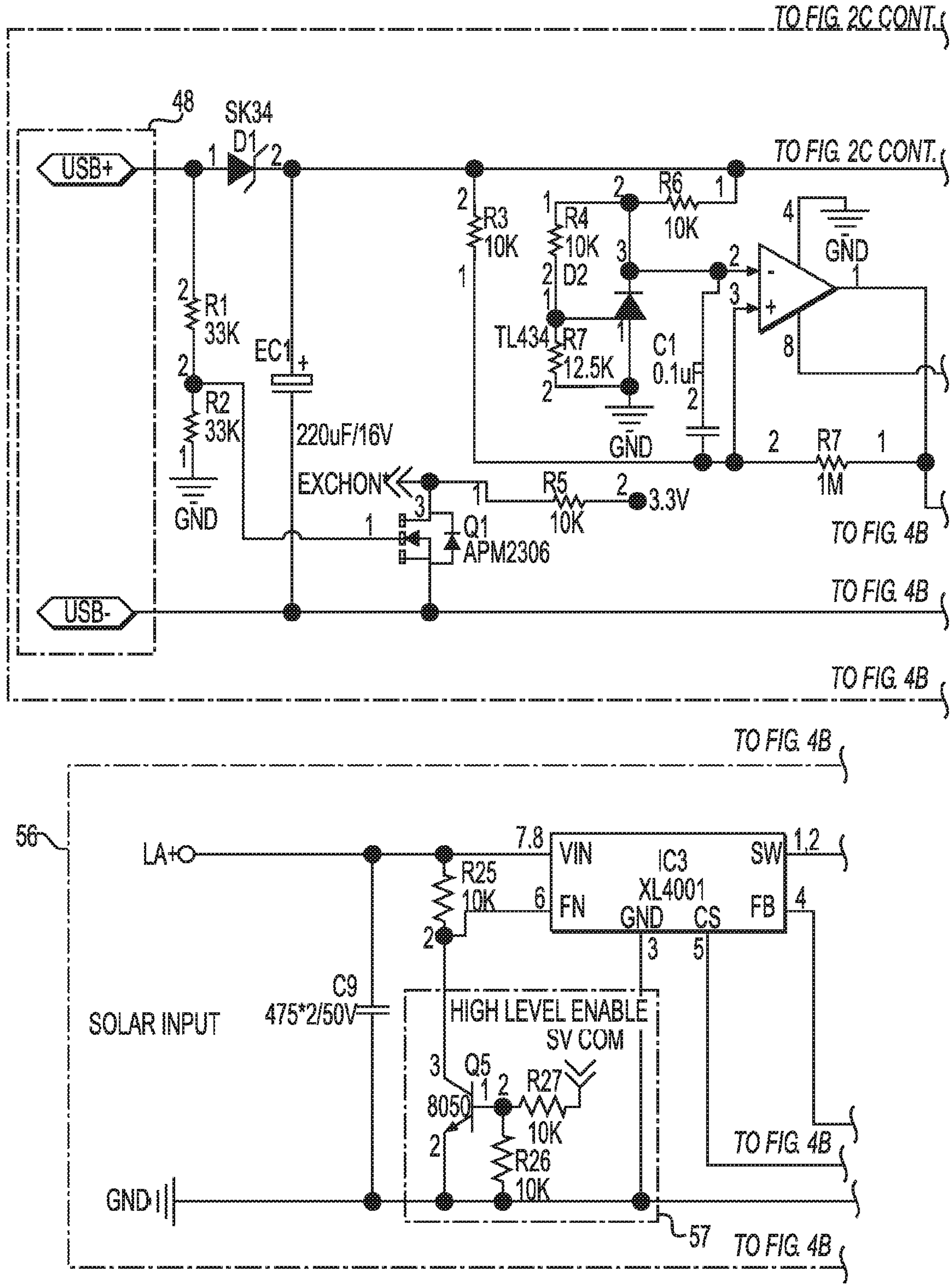
FIG. 2C
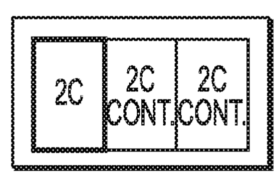

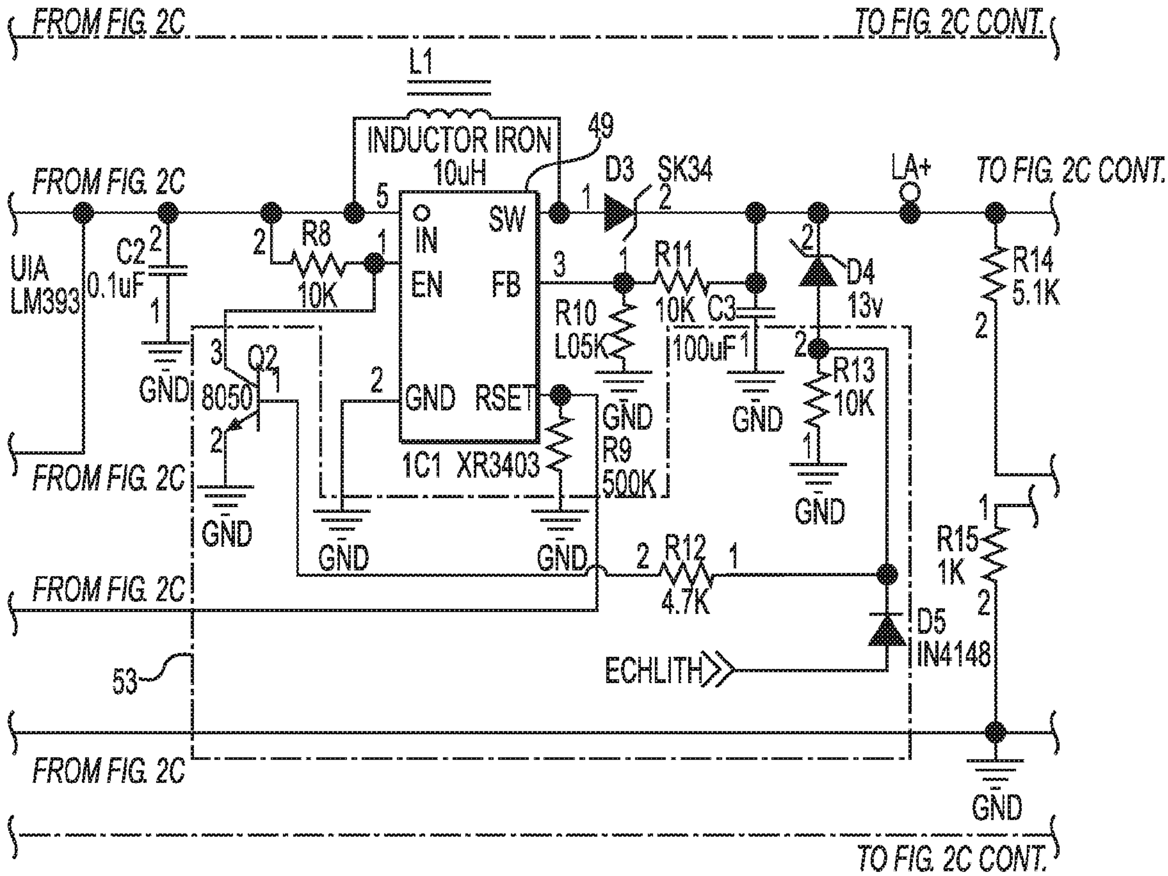
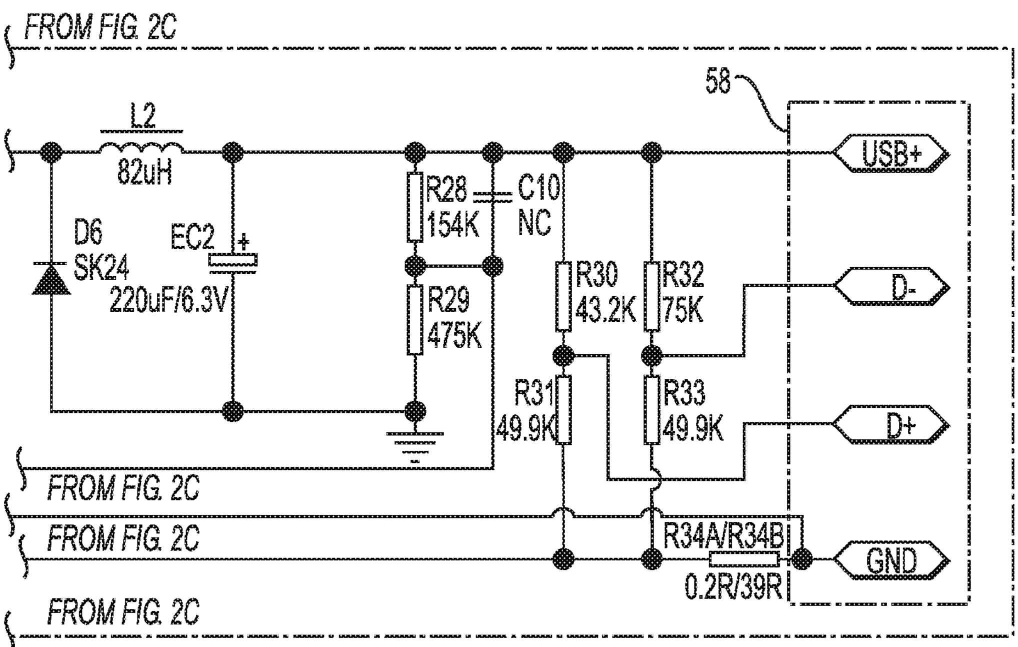
FIG. 2C CONT.
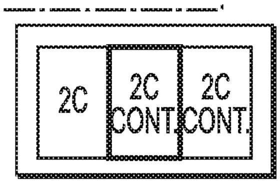

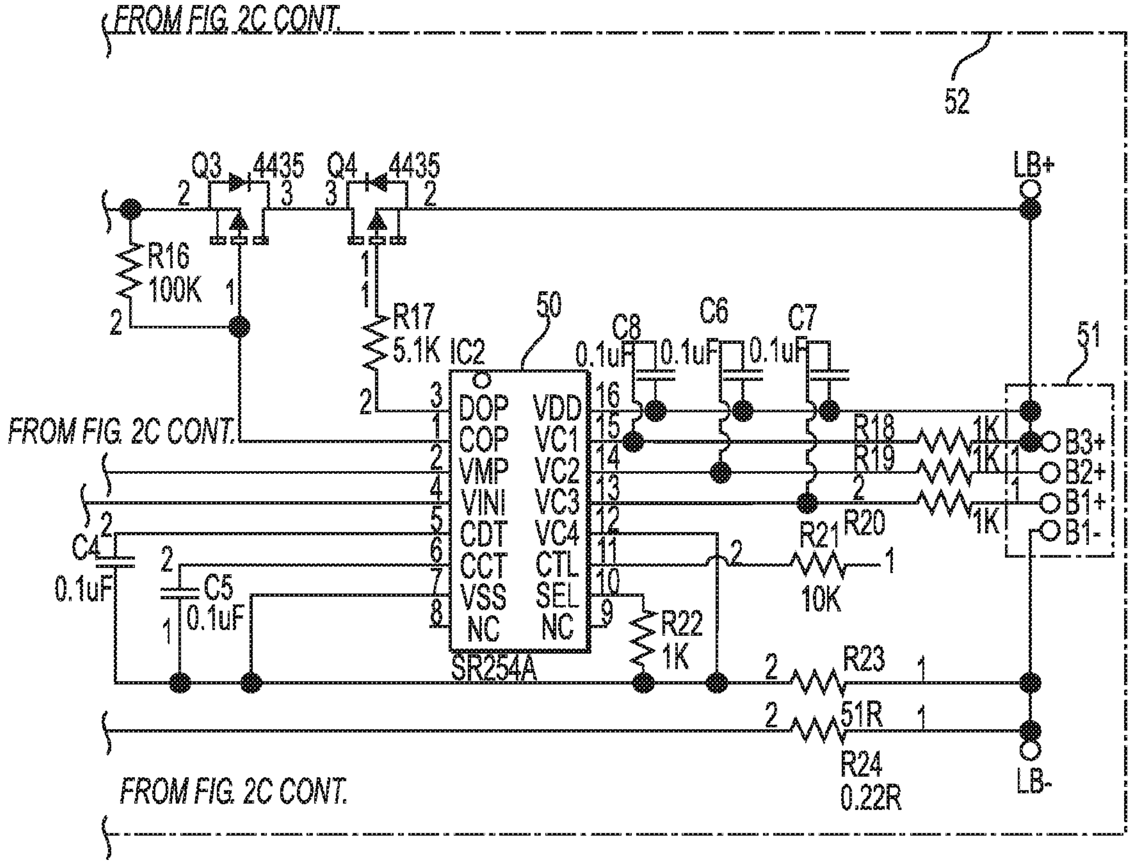
FIG. 2C CONT.
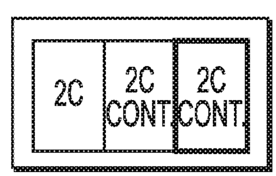

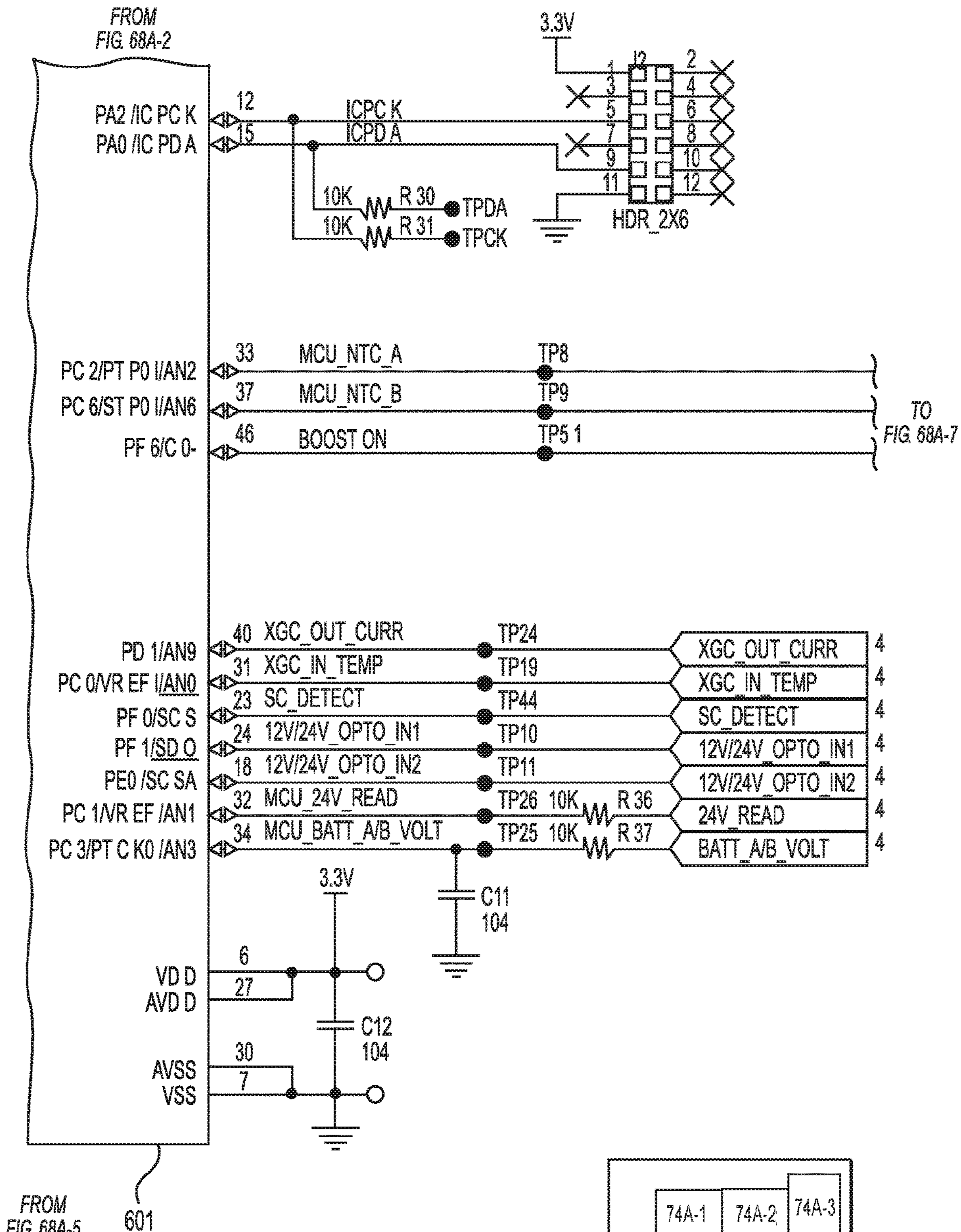
FIG. 74A-6
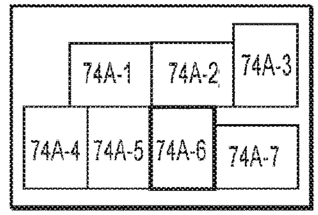

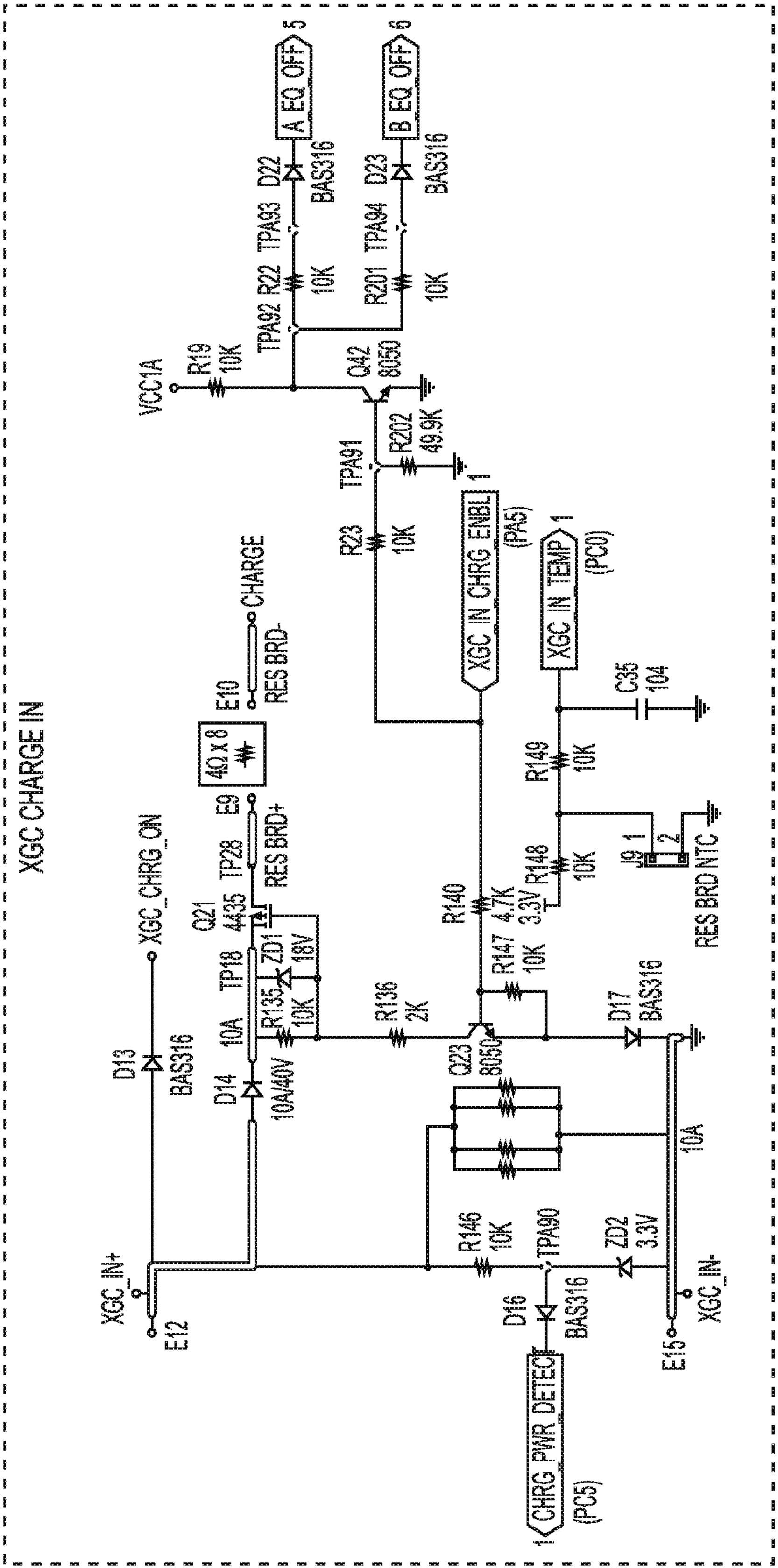
FIG. 74D-2
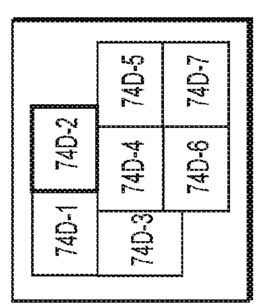

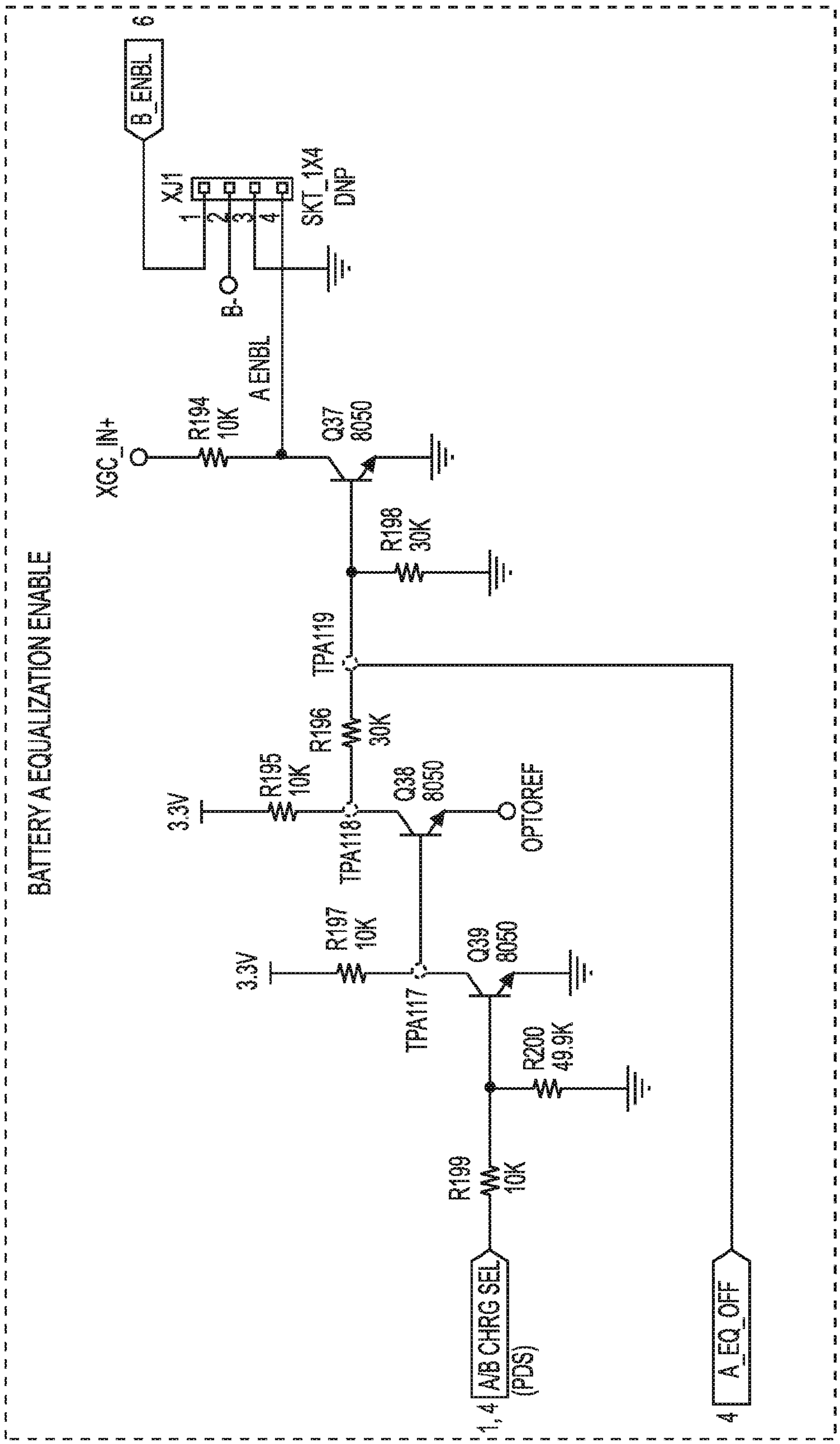
*FIG. 74E-1*
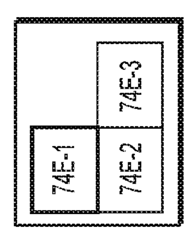

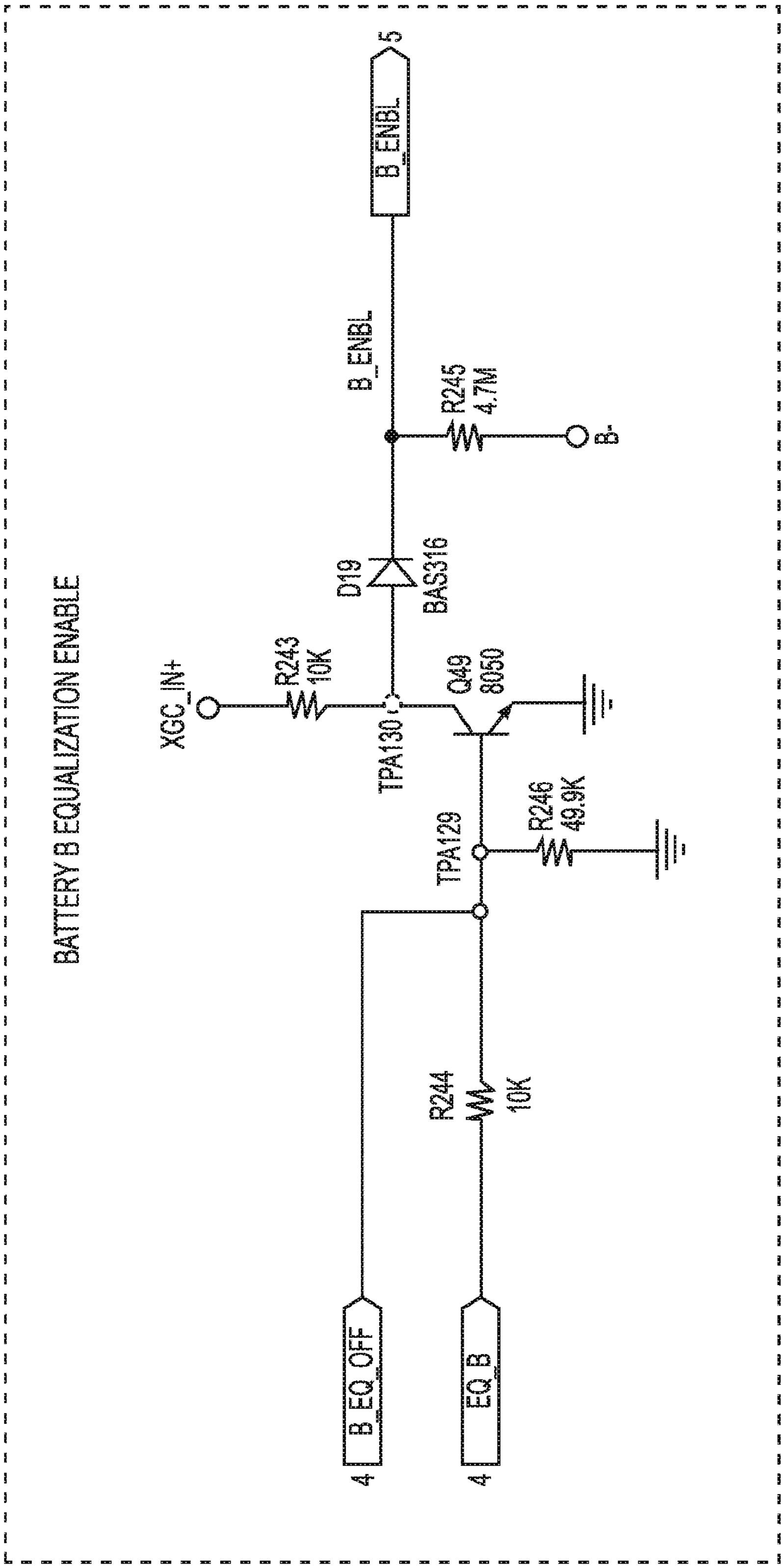
FIG. 74F-1
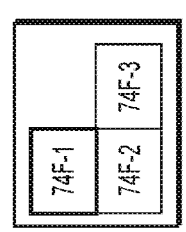

PORTABLE VEHICLE BATTERY JUMP STARTER WITH AIR PUMP

RELATED APPLICATIONS

This PCT application claims priority to PCT/US18/51964 filed on Sep. 20, 2018, PCT/US18/51834 filed on Sep. 20, 2018, PCT/US18/51665 filed on Sep. 19, 2018, PCT/US18/50904 filed on Sep. 13, 2018, PCT/US18/49548 filed on Sep. 5, 2018, PCT/US18/42474 filed on Jul. 17, 2018, PCT/US18/40919 filed on Jul. 5, 2018, PCT/US18/35029 filed on May 30, 2018, PCT/US18/34902 filed on May 29, 2018, U.S. provisional application No. 62/598,871 filed Dec. 14, 2017, U.S. provisional application No. 62/569,355 filed Oct. 6, 2017, U.S. provisional application No. 62/569,243 filed Oct. 6, 2017, U.S. provisional application No. 62/568,967 filed Oct. 6, 2017, U.S. provisional application No. 62/568,537 filed Oct. 5, 2017, U.S. provisional application No. 62/568,044 filed Oct. 4, 2017, U.S. provisional application No. 62/567,479 filed Oct. 3, 2017, U.S. provisional application No. 62/562,713 filed Sep. 25, 2017, U.S. provisional application No. 62/561,850 filed Sep. 22, 2017, U.S. provisional application No. 62/561,751 filed Sep. 22, 2017, which are all hereby incorporated by reference herein in their entirety.

FIELD

The present invention relates to a vehicle battery jump starter with a battery powered air pump (e.g. air compressor) for providing jump starting of vehicles (e.g. cars, trucks, van, motorcycles, boat, aircraft, and other vehicles or equipment having a starting battery) and for providing a supply of pressurized air, for example, for inflating vehicle tires. The vehicle battery jump starter relates generally to a device or apparatus for jump-starting a vehicle having a depleted or discharged vehicle battery.

BACKGROUND

Vehicles such as automobiles, trucks, and buses require an air pump for providing pressured air, for example, for inflating the vehicle tires. Advancements in battery technology allow for the development of a portable jump starter with air pump in a single self-contained product.

Currently, portable vehicle air pumps typically have loud air compressors that heavily vibrate, and have DC power cords that have to be routed and plugged into a vehicle's accessory port (e.g. cigarette liter port). Further, the power cord and air hose need to be long enough to reach the vehicle's tires.

Further, jump starting a car can be difficult because the user needs to have jumper cables and access to another vehicle. Safety is also a concern because there is always a danger with attaching the clamps improperly.

A jump starter with an air pump provides essential functions that may be critical, since without such a device having both functions, a vehicle and its driver can be stranded out on a highway.

In addition, prior art devices are known, which provide either a pair of electrical connector cables that connect a fully-charged battery of another vehicle to the engine start circuit of the dead battery vehicle, or portable booster devices which include a fully-charged battery, which can be connected in circuit with the vehicle's engine starter through a pair of cables.

Problems with the prior art devices arose when either the jumper terminals or clamps of the cables were inadvertently brought into contact with each other while the other ends were connected to a charged battery, or when the positive and negative terminals were connected to the opposite polarity terminals in the vehicle to be jumped, thereby causing a short circuit resulting in sparking and potential damage to batteries and/or bodily injury.

Various attempts to eliminate these problems have been made in the prior art.

U.S. Pat. No. 6,212,054 issued Apr. 3, 2001, discloses a battery booster pack that is polarity sensitive and can detect proper and improper connections before providing a path for electric current flow. The device uses a set of LEDs connected to optical couplers oriented by a control circuit. The control circuit controls a solenoid assembly controlling the path of power current. The control circuit causes power current to flow through the solenoid assembly only if the points of contact of booster cable clamp connections have been properly made.

U.S. Pat. No. 6,632,103 issued Oct. 14, 2003, discloses an adaptive booster cable connected with two pairs of clips, wherein the two pairs of clips are respectively attached to two batteries to transmit power from one battery to the other battery. The adaptive booster cable includes a polarity detecting unit connected to each clip, a switching unit and a current detecting unit both provided between the two pairs of clips. After the polarity of each clip is sensed by the polarity detecting unit, the switching unit generates a proper connection between the two batteries. Therefore, the positive and negative terminals of the two batteries are correctly connected based on the detected result of the polarity detecting unit.

U.S. Pat. No. 8,493,021 issued Jul. 23, 2013, discloses apparatus that monitors the voltage of the battery of a vehicle to be jump started and the current delivered by the jump starter batteries to determine if a proper connection has been established and to provide fault monitoring. Only if the proper polarity is detected can the system operate. The voltage is monitored to determine open circuit, disconnected conductive clamps, shunt cable fault, and solenoid fault conditions. The current through the shunt cable is monitored to determine if there is a battery explosion risk, and for excessive current conditions presenting an overheating condition, which may result in fire. The system includes an internal battery to provide the power to the battery of the vehicle to be jump started. Once the vehicle is started, the unit automatically electrically disconnects from the vehicle's battery.

U.S. Pat. No. 5,189,359 issued Feb. 23, 1993, discloses a jumper cable device having two bridge rectifiers for developing a reference voltage, a four-input decoder for determining which terminals are to be connected based on a comparison of the voltage at each of the four terminals to the reference voltage, and a pair of relays for effecting the correct connection depending on the determination of the decoder. No connection will be made unless only one terminal of each battery has a higher voltage than the reference voltage, indicating "positive" terminals, and one has a lower voltage than the reference voltage, indicating "negative" terminals, and that, therefore, the two high voltage terminals may be connected and the two lower voltage terminals may be connected. Current flows once the appropriate relay device is closed. The relay device is preferably a MOSFET combined with a series array of photodiodes that develop MOSFET gate-closing potential when the decoder output causes an LED to light.

U.S. Pat. No. 5,795,182 issued Aug. 18, 1998, discloses a polarity independent set of battery jumper cables for jumping a first battery to a second battery. The apparatus includes a relative polarity detector for detecting whether two batteries are configured cross or parallel. A three-position high current capacity crossbar pivot switch is responsive to the relative polarity detector for automatically connecting the plus terminals of the two batteries together and the minus terminals of the two batteries together regardless of whether the configuration detected is cross or parallel, and an undercurrent detector and a delay circuit for returning the device to its ready and unconnected state after the device has been disconnected from one of the batteries. The crossbar pivot switch includes two pairs of contacts, and a pivot arm that pivots about two separate points to ensure full electrical contact between the pairs of contacts. The invention can also be used to produce a battery charger that may be connected to a battery without regard to the polarity of the battery.

U.S. Pat. No. 6,262,492 issued Jul. 17, 2001, discloses a car battery jumper cable for accurately coupling an effective power source to a failed or not charged battery, which includes a relay switching circuit connected to the power source and the battery by two current conductor pairs. First and second voltage polarity recognition circuits are respectively connected to the power source and the battery by a respective voltage conductor pair to recognize the polarity of the power source and the battery. A logic recognition circuit produces a control signal subject to the polarity of the power source and the battery, and a driving circuit controlled by the control signal from the logic recognition circuit drives the relay switching circuit, enabling the two poles of the power source to be accurately coupled to the two poles of the battery.

U.S. Pat. No. 5,635,817 issued Jun. 3, 1997, discloses a vehicle battery charging device that includes a control housing having cables including a current limiting device to prevent exceeding of a predetermined maximum charging current of about 40 to 60 amps. The control housing includes a polarity detecting device to verify the correct polarity of the connection of the terminals of the two batteries and to electrically disconnect the two batteries if there is an incorrect polarity.

U.S. Pat. No. 8,199,024 issued Jun. 12, 2012, discloses a safety circuit in a low-voltage connecting system that leaves the two low-voltage systems disconnected until it determines that it is safe to make a connection. When the safety circuit determines that no unsafe conditions exist and that it is safe to connect the two low-voltage systems, the safety circuit may connect the two systems by way of a "soft start" that provides a connection between the two systems over a period of time that reduces or prevents inductive voltage spikes on one or more of the low-voltage systems. When one of the low-voltage systems has a completely-discharged battery incorporated into it, a method is used for detection of proper polarity of the connections between the low-voltage systems. The polarity of the discharged battery is determined by passing one or more test currents through it and determining whether a corresponding voltage rise is observed.

U.S. Pat. No. 5,793,185 issued Aug. 11, 1998, discloses a hand-held jump starter having control components and circuits to prevent overcharging and incorrect connection to batteries.

While the prior art attempted solutions to the abovementioned problems as discussed above, each of the prior art solutions suffers from other shortcomings, either in complexity, cost or potential for malfunction. Accordingly, there exists a need in the art for further improvements to vehicle jump start devices.

U.S. Pat. No. 9,007,015 issued Apr. 14, 2015, discloses a portable vehicle battery jump start apparatus with safety protection by the same inventors and assignee as the present invention, and provides solutions to the problems as discussed above. U.S. Pat. No. 9,007,015 is fully incorporated by reference herein.

Also, currently there exists battery jump starters for lighter duty applications such as jump starting automobiles. These jump starters are lighter duty, and have the battery cables directly connected to the internal electrical assembly of the battery jump starter. Thus, there exists a need for a portable battery jump starting device having detachable battery cables.

Further, there exist heavy duty battery jump starters using conventional lead acid batteries. These jump starters are very heavy in weight (e.g. hundreds of pounds) and are large dimensional requiring same to be moved using a fork lift. The current battery jump starter is not portable in any manner.

Thus, there exists a need for a heavy duty portable battery jump starting device having significantly reduced weight and size to replace conventional heavy duty battery jump starters.

There exists a need for a portable battery jump starting device having a master switch back light system to assist a user viewing the master switch and control mode in day light, sunshine, low light, and in the dark.

There exists a need for a portable battery jump starting device having a 12V operational mode and a 24V operational mode.

There exists a need for a portable battery jump starting device having a dual battery diode bridge or a back-charge diode module.

There exists a need for a portable battery jump starting device having a leapfrog charging system.

There exists a need for a highly conductive frame, for example, a highly conductive rigid frame for a portable battery jump starting device for quickly moving as much power as possible from the battery(ies) of the portable battery jump starting device to a vehicle battery being jump started.

There exists a need for an improved battery assembly, for example, a Li-ion battery assembly for use with an electronic device.

Lithium batteries include power management circuits (PMC) to protect the cells from overcharge as well as over-discharge. The PMC will automatically disconnect the battery cells to the external battery terminals when it senses the cell voltage is too high or too low. This is an important safety feature because the lithium can become unstable if charged too high or discharged too low. This "automatic disconnect" can create problems for smart chargers that require sensing the batteries presence before beginning to charge.

A unique solution to this problem has been invented that involves generating a "wake up" signal that the PMC responds to and reconnects the lithium cells to enable charging. Thus, there exists a need for this improved battery wake up system for an electronic device such as a portable jump starting device.

SUMMARY

To solve the problems mentioned above, a product must be built that can provide easy safe portable jump-starting for vehicles as well as a portable self-contained battery powered air compressor. Lithium battery technology already exists, and can support both functions in a single product.

A hand-held, portable device powered by its internal battery source for inflating air into tires, as well as, jump starting a vehicles engine, can comprise a rechargeable lithium ion (Li-ion) battery pack, a DC motor, and a micro controller.

The lithium ion (Li-ion) battery is coupled to the DC motor and a smart switch actuated by the micro controller. A vehicle battery isolation sensor connected in circuit with positive and negative polarity outputs detects the presence of a vehicle battery connected between the positive and negative polarity outputs.

A reverse polarity sensor connected in circuit with the positive and negative polarity outputs detects the polarity of a vehicle battery connected between the positive and negative polarity outputs, such that the micro controller will enable power to be delivered from the lithium ion power pack to the output port only when a good battery is connected to the output port.

A DC motor is coupled with the lithium ion battery pack to provide the motor's sole power source without connecting to A/C or secondary power source. The micro controller allows the DC motor to inflate air into a tire to a set limit without over inflating a tire with an auto shut-off sensor, and an internal memory storage device to record and display the last known value.

Power Pass Through technology is included to allow for charging the lithium battery while pumping tires simultaneously. Sound dampening technology is built in to reduce the decibel level of the tire pump and vibration reduction technology is included to allow for stable tire pumping.

Also, in accordance with an aspect of the invention, apparatus is provided for jump starting a vehicle engine, including: an internal power supply; an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs; a power FET switch connected between said internal power supply and said output port; and a microcontroller configured to receive input signals from said vehicle isolation sensor and said reverse polarity sensor, and to provide an output signal to said power FET switch, such that said power FET switch is turned on to connect said internal power supply to said output port in response to signals from said sensors indicating the presence of a vehicle battery at said output port and proper polarity connection of positive and negative terminals of said vehicle battery with said positive and negative polarity outputs.

In accordance with another aspect of the invention, the internal power supply is a rechargeable lithium ion battery pack.

In accordance with yet another aspect of the invention, a jumper cable device is provided, having a plug configured to plug into an output port of a handheld battery charger booster device having an internal power supply; a pair of cables integrated with the plug at one respective end thereof; said pair of cables being configured to be separately connected to terminals of a battery at another respective end thereof.

The presently described subject matter is directed to a new battery jump starting and air compressing apparatus.

The presently described subject matter is directed to an improved battery jump starting and air compressing device. The presently described subject matter is directed to a heavy duty jump starting and air compressing apparatus.

The presently described subject matter is directed to a battery jump starting and air compressing apparatus comprising or consisting of one or more batteries connected to a conductive frame.

The presently described subject matter is directed to a battery jump starting and air compressing apparatus comprising or consisting of one or more Lithium-ion batteries ("Li-ion") connected to a conductive frame.

The presently described subject matter is directed to a battery jump starting and air compressing apparatus comprising or consisting of one or more Lithium-ion batteries ("Li-ion") connected to a highly conductive frame.

The presently described subject matter is directed to a battery jump starting and air compressing apparatus comprising or consisting of one or more Lithium-ion batteries ("Li-ion") connected to a highly conductive and high ampere ("amp") current capacity frame.

The presently described subject matter is directed to a battery jump starting and air compressing apparatus comprising or consisting of two or more batteries connected to a conductive frame.

The presently described subject matter is directed to a battery jump starting and air compressing apparatus comprising or consisting of two or more Li-ion batteries connected to a conductive frame.

The presently described subject matter is directed to a battery jump starting and air compressing apparatus comprising two or more Li-ion batteries connected to a highly conductive frame.

The presently described subject matter is directed to a battery jump starting and air compressing apparatus comprising or consisting of two or more Li-ion batteries connected to a highly conductive and high amp current capacity frame.

The presently described subject matter is directed to a battery jump starting and air compressing apparatus comprising or consisting of one or more batteries connected to a conductive frame configured to at least partially surround the one or more batteries.

The presently described subject matter is directed to a battery jump starting and air compressing apparatus comprising or consisting of one or more batteries connected to a conductive rigid frame configured to at least partially surround the one or more batteries.

The presently described subject matter is directed to a battery jump starting device comprising or consisting of one or more batteries connected to a conductive frame configured to fully surround the one or more batteries.

The presently described subject matter is directed to a battery jump starting and air compressing apparatus comprising or consisting of one or more batteries connected to a conductive frame configured to fully surround the one or more batteries.

The presently described subject matter is directed to a battery jump starting and air compressing apparatus comprising or consisting of one or more Li-ion batteries connected to a conductive frame configured to at least partially surround the one or more batteries.

The presently described subject matter is directed to a battery jump starting and air compressing apparatus comprising or consisting of one or more Li-ion batteries connected to a conductive frame configured to at least partially surround the one or more batteries.

The presently described subject matter is directed to a battery jump starting and air compressing apparatus comprising or consisting of one or more Li-ion batteries connected to a conductive frame configured to fully surround the one or more batteries.

The presently described subject matter is directed to a battery jump starting and air compressing apparatus comprising or consisting of one or more Li-ion batteries connected to a conductive frame configured to fully surround the one or more batteries.

The presently described subject matter is directed to a battery jump starting and air compressing apparatus comprising or consisting of one or more batteries connected to a rigid conductive frame.

The presently described subject matter is directed to a battery jump starting and air compressing apparatus comprising or consisting of one or more batteries connected to a rigid conductive frame comprising one or more conductive frame members.

The presently described subject matter is directed to a battery jump starting and air compressing apparatus comprising or consisting of one or more batteries connected to a conductive frame comprising one or more conductive frame members.

The presently described subject matter is directed to a battery jump starting and air compressing apparatus comprising or consisting of one or more batteries connected to a conductive frame comprising one or more conductors such as metal wire, rod, bar and/or tubing.

The presently described subject matter is directed to a battery jump starting and air compressing apparatus comprising or consisting of one or more batteries connected to a conductive frame comprising one or more conductors such as Copper (Cu) wire, rod, bar and/or tubing.

The presently described subject matter is directed to a battery jump starting and air compressing apparatus comprising or consisting of one or more batteries connected to a highly conductive rigid frame comprising one or more rigid conductors such as Copper (Cu) wire, rod, bar and/or tubing.

The presently described subject matter is directed to a highly conductive cam-lock electrical connecting device.

The presently described subject matter is directed to a highly conductive cam-lock electrical connecting device according to the present invention in combination with a battery jump starting and air compressing apparatus.

The presently described subject matter is directed to a highly conductive cam-lock electrical connecting device according to the present invention in combination with a battery jump starting and air compressing apparatus according to the present invention.

The presently described subject matter is directed to a highly conductive cam-lock electrical connecting device comprising or consisting of a male cam-lock end detachably connected to a female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the connecting arrangement is configured to tighten when the male cam-lock end is rotated within the female cam-lock device.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the receptacle of the female cam-lock end is provided with internal threading for cooperating with the tooth of the male cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the receptacle of the female cam-lock end is provided with internal threading for cooperating with the tooth of the male cam-lock end, wherein the male cam-lock end includes an end face portion and the female cam-lock end includes an end face portion, wherein the end face portions engage each other when the cam-lock connection device is fully tightened.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a rubber molded cover fitted over the male cam-lock end and another rubber molded cover fitted over the female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a rubber molded cover fitted over the male cam-lock end and another rubber molded cover fitted over the female cam-lock end, wherein the female cam-lock end is provided with an outer threaded portion and a nut for securing the rubber molded cover on the female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a rubber molded cover fitted over the male cam-lock end and another rubber molded cover fitted over the female cam-lock end, wherein the male cam-lock end is provided with one or more outwardly extending protrusions cooperating with one or more inner slots in the rubber molded cover.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the slot is provided with an inner surface serving as a stop for the tooth of the pin of the female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable, including a battery jump starting and air compressing apparatus, wherein the female cam-lock end is connected to a battery jump starting and air compressing apparatus.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable, including a battery jump starting and air compressing apparatus, wherein the female cam-lock end is connected to a battery jump starting and air compressing apparatus, wherein the battery jump starting and air compressing apparatus comprises a highly conductive rigid frame connected to one or more batteries, and wherein the female cam-lock is connected to the highly conductive frame.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable, including a battery jump starting and air compressing apparatus, wherein the female cam-lock end is connected to a battery jump starting and air compressing apparatus, wherein the battery jump starting and air compressing apparatus comprises a highly conductive rigid frame connected to one or more batteries, and wherein the female cam-lock is connected to the highly conductive frame, wherein the battery jump starting and air compressing apparatus, comprising a positive battery cable having a positive battery clamp, the positive battery cable connected to the highly conductive rigid frame; and a negative battery cable having a negative battery clamp, the negative battery cable being connected to the highly conductive rigid frame.

The presently described subject matter is directed to an improved electrical control switch.

The present described subject matter is directed to an improved electrical control switch having a control knob provided with backlighting.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, wherein the control knob comprises a light blocking opaque portion and a clear portion or see through portion configured for serving as the light window.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising a printed circuit board located behind the control knob, the backlight being a light emitting diode (LED) mounted on the printed circuit board.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the electronic device is a battery jump starting and air compressing apparatus.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump staring device comprises a cover; a battery disposed within the cover; a positive cable having a positive clamp, the positive cable connected to the battery; and a negative cable having a negative clamp, the negative cable connected to the highly conductive rigid frame.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump starting device comprises a cover; a first 12V battery disposed within the cover; a second 12V battery disposed within the cover; a positive cable having a positive clamp, the positive cable connected to the battery; and a negative cable having a negative clamp, the negative cable connected to the highly conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump starting device comprises a cover; a first 12V battery disposed within the cover; a second 12V battery disposed within the cover; a highly conductive rigid frame connected to the first 12V battery and the second 12V battery; a backlight LED for lighting up the clear portion or see through portion of the control knob, the backlight LED being mounted on the printed circuit board; a positive cable having a positive clamp, the positive cable connected to the battery; a negative cable having a negative clamp, the negative cable connected to the highly conductive rigid frame; and a printed circuit board disposed within the cover, wherein the control switch extends through the cover, the control switch being electrically connected to the highly conductive rigid frame, the control knob configured to selectively rotate between a 12V operating position and a 24V operating position, the control switch configured to selectively operate the device in a 12V mode or 24V mode.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, wherein the system is configured to light up the backlight when the system is turned on.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators, and wherein the one or more backlight indicators are configured for selectively displaying a voltage mode of operation of the device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators, and wherein the one or more backlight indicators are configured for variably displaying the real time operating voltage of the device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators, and wherein the one or more backlight indicators are configured for lighting up when the device is turned on.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump staring device comprises a cover; a battery disposed within the cover; a positive cable having a positive clamp, the positive cable connected to the battery; and a negative cable having a negative clamp, the negative cable connected to the highly conductive rigid frame, wherein the battery is a first 12V battery and a second 12V battery.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump staring device comprises a cover; a battery disposed within the cover; a positive cable having a positive clamp, the positive cable connected to the battery; and a negative cable having a negative clamp, the negative cable connected to the highly conductive rigid frame, wherein the battery is a Li-ion battery.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, the electronic device being a battery jump charging device comprising a cover; a first 12V battery disposed within the cover; a second 12V battery disposed within the cover; a positive cable having a positive clamp, the positive cable connected to the battery; and a negative cable having a negative clamp, the negative cable connected to the highly conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode, further comprising a highly conductive rigid frame electrically connected to the first 12V battery, second 12V battery, and the control switch, and configured to selectively operate the device in a 12V mode or 24V mode.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, the electronic device being a battery jump charging device comprising a cover; a first 12V battery disposed within the cover; a second 12V battery disposed within the cover; a positive cable having a positive clamp, the positive cable connected to the battery; and a negative cable having a negative clamp, the negative cable connected to the highly conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode, further comprising a highly conductive rigid frame electrically connected to the first 12V battery, second 12V battery, and the control switch, and configured to selectively operate the device in a 12V mode or 24V mode, and further comprising an interface disposed between the control knob and the cover of the device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, the electronic device being a battery jump charging device comprising a cover; a first 12V battery disposed within the cover; a second 12V battery disposed within the cover; a positive cable having a positive clamp, the positive cable connected to the battery; and a negative cable having a negative clamp, the negative cable connected to the highly conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode, further comprising a highly conductive rigid frame electrically connected to the first 12V battery, second 12V battery, and the control switch, and configured to selectively operate the device in a 12V mode or 24V mode, and further comprising an interface disposed between the control knob and the cover of the device, wherein the interface comprises a 12V backlight indicator and a 24V backlight indicator, the device configured to selectively turn on the 12V backlight indicator or 24V backlight indicator when a 12V or 24V mode of operation is selected by rotating the control know of the control switch.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, further comprising an enable circuit configured to reduce parasite current when the system is in an "off" state, wherein the circuit comprises a transistor acting as an electrical switch when the system is in an "on" state.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, further comprising an enable circuit configured to reduce parasite current when the system is in an "off" state, wherein the circuit comprises a transistor acting as an electrical switch when the system is in an "on" state, wherein the circuit is configured so that when the transistor is "on", current flows from the first battery to the second battery when the batteries are connected in parallel.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, further comprising an enable circuit configured to reduce parasite current when the system is in an "off" state, wherein the circuit comprises a transistor acting as an electrical switch when the system is in an "on" state, wherein the circuit is configured so that when the transistor is "on", current flows from the first battery to the second battery when the batteries are connected in parallel, wherein the circuit is configured so that no current flows from the first battery to the second battery when the batteries are connected in series.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, wherein the circuit is configured so that when there is current flow or lack thereof, this allows the optical coupler to provide a signal to the microcontroller indicating to the microcontroller which position the control switch is in.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, wherein the circuit is configured so that when there is current flow or lack thereof, this allows the optical coupler to provide a signal to the microcontroller indicating to the microcontroller which position the control switch is in, wherein the circuit is configured so that an opposite signal is provided as a separate input to the microcontroller so that the microcontroller can determine when the control switch is an "in between" position between a 12V position and a 24V position.

The presently described subject matter is directed to a portable battery jump starting and air compressing apparatus, comprising or consisting of a first 12V battery; a second 12V battery; a conductive frame connected to the first 12V battery and second 12V battery; an electrical control switch electrically connected to the conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the conductive frame; and a dual battery diode bridge connected to the conductive frame, the dual battery diode bridge having two channels of diodes supporting the first 12V battery and the second 12V battery for protecting against back-charge after jump starting a vehicle.

The presently described subject matter is directed to a portable battery jump starting and air compressing apparatus, comprising or consisting of a first 12V battery; a second 12V battery; a conductive frame connected to the first 12V battery and second 12V battery; an electrical control switch electrically connected to the conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the conductive frame; and a dual battery diode bridge connected to the conductive frame, the dual battery diode bridge having two channels of diodes supporting the first 12V battery and the second 12V battery for protecting against back-charge after jump starting a vehicle, wherein dual battery diode bridge is a back-charge diode module.

The presently described subject matter is directed to a portable battery jump starting and air compressing apparatus, comprising or consisting of a first 12V battery; a second 12V battery; a conductive frame connected to the first 12V battery and second 12V battery; an electrical control switch electrically connected to the conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the conductive frame; and a dual battery diode bridge connected to the conductive frame, the dual battery diode bridge having two channels of diodes supporting the first 12V battery and the second 12V battery for protecting against back-charge after jump starting a vehicle, wherein the back-charge diode module comprises an upper channel of diodes supporting current through the first 12V battery and a lower channel of diodes supporting current through the second 12V battery.

The presently described subject matter is directed to a portable battery jump starting and air compressing apparatus, comprising or consisting of a first 12V battery; a second 12V battery; a conductive frame connected to the first 12V battery and second 12V battery; an electrical control switch electrically connected to the conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the conductive frame; and a dual battery diode bridge connected to the conductive frame, the dual battery diode bridge having two channels of diodes supporting the first 12V battery and the second 12V battery for protecting against back-charge after jump starting a vehicle, wherein the back-charge diode module comprises an upper channel of diodes supporting current through the first 12V battery and a lower channel of diodes supporting current through the second 12V battery, wherein the upper channel of diodes and lower channel of diodes are connected to a bar of the conductive frame leading to a positive output of the battery jump starting and air compressing apparatus for combining current from the upper channel of diodes and lower channel of diodes.

The presently described subject matter is directed to a portable battery jump starting and air compressing apparatus, comprising or consisting of a first 12V battery; a second 12V battery; a conductive frame connected to the first 12V battery and second 12V battery; an electrical control switch electrically connected to the conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the conductive frame; and a dual battery diode bridge connected to the conductive frame, the dual battery diode bridge having two channels of diodes supporting the first 12V battery and the second 12V battery for protecting against back-charge after jump starting a vehicle, wherein dual battery diode bridge is a back-charge diode module, wherein the back-charge diode module comprises an upper conductive bar electrically connected to the upper channel of diodes, a lower conductive bar electrically connected to the lower channel of diodes, and a center conductive bar located between the upper conductive bar and lower conductive bar and electrically connected to both the upper channel of diodes and lower channel of diodes.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, wherein the charger is configured to incrementally charge the first 12V battery and the second 12V battery to maintain the first 12V battery and second 12V battery closed to the same potential during the charging sequence.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, wherein the charger is operated to first charge the first 12V battery or second 12V battery, whichever has the lowest voltage or charge.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, wherein the charger is configured to incrementally charge the first 12V battery and the second 12V battery to maintain the first 12V battery and second 12V battery closed to the same potential during the charging sequence, wherein the charger is operated to first charge the first 12V battery or second 12V battery, whichever has the lowest voltage or charge.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, wherein the charger is configured to sequentially charge the first 12V battery and second 12V battery incrementally in fixed voltage increases.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, wherein the charger is configured to sequentially charge the first 12V battery and second 12V battery incrementally in varying voltage increases.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, wherein the charger is configured to sequentially charge the first 12V battery and second 12V battery incrementally in random voltage increases.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, wherein the charger is configured to sequentially charge the first 12V battery and second 12V battery incrementally in fixed voltage increases, wherein the charger is configured to sequentially charge the first 12V battery and second 12V battery incrementally in 100 millivolt (mV) increases.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, wherein the charger is operated to first charge the first 12V battery or second 12V battery, whichever has the lowest voltage or charge, wherein voltage charging increments are a portion or fraction of a total voltage charge required to fully charge the first 12V battery or second 12V battery.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, further comprising a programmable microcontroller electrically connected to the charger for controlling operation of the charger.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, further comprising a peak voltage shutoff to prevent overcharging the first 12V battery and second 12V battery.

The presently described subject matter is directed to a portable battery jump starting system, comprising or consisting of a first 12V battery; a second 12V battery; a conductive wiring assembly or frame connected to the first 12V battery and second 12V battery; an electrical control switch electrically connected to the conductive wiring or frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or frame, the charger configured for sequentially charging the first 12V battery and the second 12V battery, wherein the charger is configured to sequentially charge the first 12V battery and second 12V battery incrementally in varying voltage increases, wherein the programmable microcontroller is configured to provided charge timeouts.

The presently described subject matter is directed to a leapfrog charging method for an electronic device having at least a first rechargeable battery and second rechargeable battery, comprising or consisting of selectively charging the first rechargeable battery and second rechargeable battery in a charge sequence.

The presently described subject matter is directed to a leapfrog charging method for an electronic device having at least a first rechargeable battery and second rechargeable battery, comprising or consisting of selectively charging the first rechargeable battery and second rechargeable battery in a charge sequence, wherein the charge sequence is an incremental charge sequence.

The presently described subject matter is directed to a leapfrog charging method for an electronic device having at least a first rechargeable battery and second rechargeable battery, comprising or consisting of selectively charging the first rechargeable battery and second rechargeable battery in a charge sequence, wherein the charge sequence is an incremental charge sequence, wherein the incremental charge sequence charges the first 12V battery or second 12V battery in increments less than a total charge increment to fully charge the first 12V battery or second 12V battery.

The presently described subject matter is directed to a leapfrog charging method for an electronic device having at least a first rechargeable battery and second rechargeable battery, comprising or consisting of selectively charging the first rechargeable battery and second rechargeable battery in a charge sequence, wherein the charging sequence is a back-and-forth charging sequence between the first 12V battery and second 12V battery.

The presently described subject matter is directed to a leapfrog charging method for an electronic device having at least a first rechargeable battery and second rechargeable battery, comprising or consisting of selectively charging the first rechargeable battery and second rechargeable battery in a charge sequence, wherein the charging sequence includes back-to-back charges of a same battery of the first 12V battery and second 12V battery two or more times prior to sequencing to the other battery.

The presently described subject matter is directed to a leapfrog charging method for an electronic device having at least a first rechargeable battery and second rechargeable battery, comprising or consisting of selectively charging the first rechargeable battery and second rechargeable battery in a charge sequence, wherein the sequence is a programmed sequence.

The presently described subject matter is directed to a leapfrog charging method for an electronic device having at least a first rechargeable battery and second rechargeable battery, comprising or consisting of selectively charging the first rechargeable battery and second rechargeable battery in a charge sequence, wherein the charging sequence includes one or more charging pauses.

The presently described subject matter is directed to a leapfrog charging method for an electronic device having at least a first rechargeable battery and second rechargeable battery, comprising or consisting of selectively charging the first rechargeable battery and second rechargeable battery in a charge sequence, wherein the sequence is a programmed sequence, wherein charging time increments, voltage increase amounts, and charging rates are all adjustable in the programmed sequence.

The presently described subject matter is directed to a portable battery jump starting and air compressing apparatus, comprising or consisting of a first 12V battery; a second 12V battery; and a highly conductive frame connected to the first 12V battery and second 12V battery.

The presently described subject matter is directed to a portable battery jump starting and air compressing apparatus, comprising or consisting of a first 12V battery; a second 12V battery; and a highly conductive frame connected to the first 12V battery and second 12V battery, further comprising an electrical control switch electrically connected to the highly conductive frame, the first 12V battery, and the second 12V battery, the electrical control switch having a parallel switch position for connecting the first 12V battery and second 12V battery in parallel, the electrical control switch having a series switch position for connecting the first 12V battery and second 12V battery in series.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame is semi-rigid.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame is rigid.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame is a three-dimensional (3D) frame structure.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame comprises multiple highly conductive frame members.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes a through hole.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes a through hole, wherein the at least one through hole is located at one end thereof.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes a through hole, wherein the at least one through hole is located at one end thereof, wherein adjacent conductive frame members are fastened together using a highly conductive bolt and nut fastener.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame comprises multiple highly conductive frame members, wherein at least one frame member is provided with at least one bend end having a through hole.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes a through hole, wherein the at least one frame member is provided on at least one end with a ring-shaped through hole.

The presently described subject matter is directed to a portable battery jump starting and air compressing apparatus, comprising or consisting of a first 12V battery; a second 12V battery; and a highly conductive frame connected to the first 12V battery and second 12V battery, wherein other electrical components of the portable jump starting device bolt onto the highly conductive frame.

The presently described subject matter is directed to a portable battery jump starting and air compressing apparatus, comprising or consisting of a first 12V battery; a second 12V battery; and a highly conductive frame connected to the first 12V battery and second 12V battery, further comprising an electrical control switch electrically connected to the highly conductive frame, the first 12V battery, and the second 12V battery, the electrical control switch having a parallel switch position for connecting the first 12V battery and second 12V battery in parallel, the electrical control switch having a series switch position for connecting the first 12V battery and second 12V battery in series, wherein the control switch bolts onto the highly conductive frame.

The presently described subject matter is directed to a portable battery jump starting and air compressing apparatus, comprising or consisting of a first 12V battery; a second 12V battery; and a highly conductive frame connected to the first 12V battery and second 12V battery, wherein the highly conductive frame comprises multiple highly conductive frame members, wherein the highly conductive frame members are made of flat metal stock material.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the positive highly conductive member and negative highly conductive member are both oriented transversely relative to a length of the positive and negative foil, respectively.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the positive highly conductive member and negative highly conductive member are both oriented transversely relative to a length of the positive and negative foil, respectively, wherein the highly conductive members are wider than the positive and negative foil, respectively.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the highly conductive members are oriented flat against opposite ends of the at least one battery cell.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the highly conductive members are provided with a through hole for connection with the electronic device using a bolt and nut fastener.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the highly conductive members are made from plate or bar type material.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the positive foil at least partially wraps around the positive highly conductive member, and the negative foil at least partially wraps around the negative highly conductive member.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the positive foil at least partially wraps around the positive highly conductive member, and the negative foil at least partially wraps around the negative highly conductive member, wherein the positive foil and negative foil fully wrap around the positive highly conductive member and the negative highly conducive member, respectively.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the positive foil is soldered or welded to the positive highly conductive member and the negative foil is soldered or welded to the negative highly conductive member.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the at least one battery cell is multiple battery cells layered one on top of the other.

The presently described subject matter is directed to a battery assembly for use in an electronic device, comprising or consisting of at least one battery cell having a positive foil end and a negative foil end; a positive highly conductive member connected to the positive foil; and a positive highly conductive member connected to the positive foil, wherein the battery assembly is covered with heat shrink material.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, and wherein the internal power supply is a rechargeable battery.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, wherein the internal power supply is a rechargeable battery, and wherein the rechargeable battery is a Li-ion rechargeable battery.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, further comprising an air hose.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, and wherein the cover comprises an air supply port for connecting with the air hose.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, wherein the cover comprises an air supply port for connecting with the air hose, and wherein the cover and air pump provide an air supply port for connecting with the hose.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, wherein the cover comprises an air supply port for connecting with the air hose, and further comprising an internal air hose connecting the air pump to the air supply port.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, and wherein the internal power supply is a single battery supplies power to vehicle battery jump starter and the air pump.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, and wherein the internal power supply comprises a first battery for powering the vehicle battery jump starter and a second battery for powering the air pump.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, and further comprising a switch for selectively powering the vehicle battery jump starter or the air pump.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, further comprising a switch for selectively powering the vehicle battery jump starter or the air pump, and wherein the switch is configured to also supply power to both the vehicle battery jump starter and the air pump.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, further comprising an internal fan for cooling the device.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, and wherein the air pump comprise an air compressor.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, wherein the air pump comprise an air compressor, and wherein the air compressor is a rotary air compressor.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, wherein the air pump comprise an air compressor, and wherein the air pump further comprises an air tank connected to the air supply port.

The presently described subject matter is directed to a vehicle battery jump starter with air pump device, the device comprising or consisting of a cover; an internal power supply disposed within the cover; a vehicle battery jump starter disposed within the cover, the jump starter configured to jump start a vehicle battery; and an air pump disposed within the cover, the air pump configured for providing a supply of pressurized air, wherein the internal power supply provides power to the jump starter device and/or the air pump device, and wherein the air pump is connected to the air supply port.

In addition, the battery jump starter with air pump according to the present invention is configured to maximize the amount of power transmission from the one or more batteries (e.g. Li-ion) to the battery being jump started. This requires a power circuit having a high or very high conductivity path from the one or more batteries to the battery clamps. This physically requires the use of high or very high conductivity conductors such as copper rods, plates, bars, tubing, and cables.

The "rigidity" and "strength" of the highly conductive rigid frame provides structurally stability during storage and use of the battery jump starting and air compressing apparatus. This is important especially during use when high current is flowing through the highly conductive rigid frame potentially heating and softening the rigid frame. It is highly desired that the highly conductive rigid frame maintains structurally stability and configuration during such use so as to avoid the risk of contact and electrically shorting with other electrical components of the battery jump starting and air compressing apparatus. This is especially true when making a compact and portable configuration of the battery jump starting and air compressing apparatus to allow minimizing distances between electrical components.

BRIEF DESCRIPTION OF THE DRAWINGS

FIGS. 2A-1-2C-3 are schematic circuit diagrams of an example embodiment of a handheld vehicle battery boost apparatus or a portable vehicle battery jump starter in accordance with an aspect of the invention.

FIG. 3 is a perspective view of a handheld jump starter booster device or a portable vehicle battery jump starter in accordance with one example embodiment of the invention.

FIGS. 74A-1-74F-3 are schematic circuit diagrams of an example embodiment of another portable vehicle battery boost apparatus or portable vehicle battery jump starter in accordance with an aspect of the invention.

DETAILED DESCRIPTION

Figure 1:
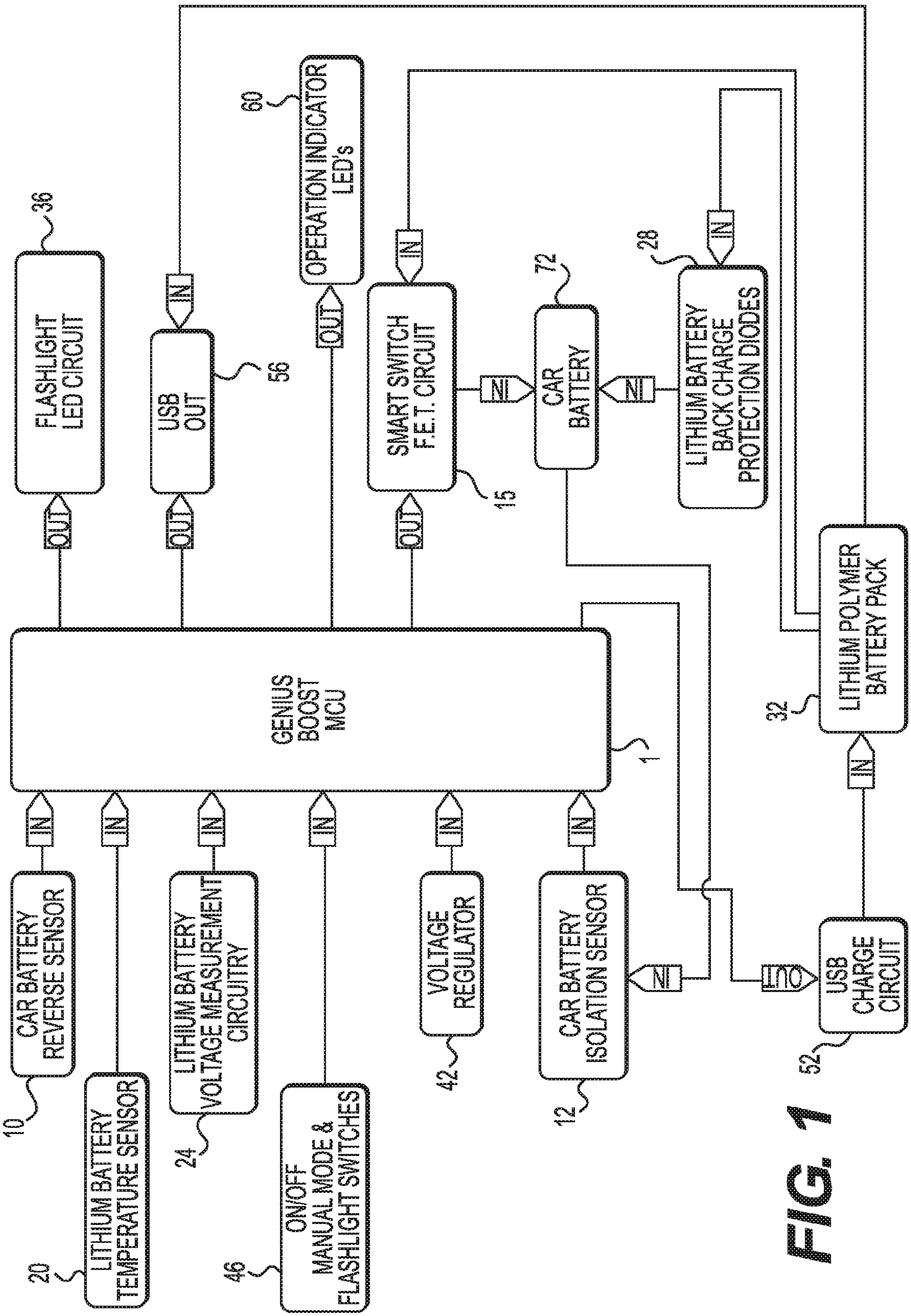
FIG. 1 is a functional block diagram of a handheld vehicle battery boost apparatus or jump starter in accordance with one aspect of the present invention.

FIG. 1 is a functional block diagram of a handheld battery booster according to one aspect of the invention. At the heart of the handheld battery booster is a lithium polymer battery pack 32, which stores sufficient energy to jump start a vehicle engine served by a conventional 12 volt lead-acid or valve regulated lead-acid battery. In one example embodiment, a high-surge lithium polymer battery pack includes three 3.7V, 2666 mAh lithium polymer batteries in a 3S1P configuration. The resulting battery pack provides 11.1V, 2666 Ah (8000 Ah at 3.7V, 29.6 Wh). Continuous discharge current is 25C (or 200 amps), and burst discharge current is 50C (or 400 amps). The maximum charging current of the battery pack is 8000 mA (8 amps).

The handheld or portable battery booster shown in FIG. 1 is provided with an air pump (e.g. air compressor device) to provide a jump starter/air pump having a jump starter device for jump starting a vehicle and an air pump for providing a source of pressurized air for filling articles such as a vehicle tire. The jump starter/air pump device is described in detail below.

A programmable microcontroller unit (MCU) 1 receives various inputs and produces informational as well as control outputs. The programmable MCU 1 further provides flexibility to the system by allowing updates in functionality and system parameters, without requiring any change in hardware. According to one example embodiment, an 8 bit microcontroller with 2K×15 bits of flash memory is used to control the system. One such microcontroller is the HT67F30, which is commercially available from Holtek Semiconductor Inc.

A car battery reverse sensor 10 monitors the polarity of the vehicle battery 72 when the handheld battery booster device is connected to the vehicle's electric system. As explained below, the booster device prevents the lithium battery pack from being connected to the vehicle battery 72 when the terminals of the battery 72 are connected to the wrong terminals of the booster device. A car battery isolation sensor 12 detects whether or not a vehicle battery 72 is connected to the booster device, and prevents the lithium battery pack from being connected to the output terminals of the booster device unless there is a good (e.g. chargeable) battery connected to the output terminals.

A smart switch FET circuit 15 electrically switches the handheld battery booster lithium battery to the vehicle's electric system only when the vehicle battery is determined by the MCU 1 to be present (in response to a detection signal provided by isolation sensor 12) and connected with the correct polarity (in response to a detection signal provided by reverse sensor 10). A lithium battery temperature sensor 20 monitors the temperature of the lithium battery pack 32 to detect overheating due to high ambient temperature conditions and overextended current draw during jump starting. A lithium battery voltage measurement circuit 24 monitors the voltage of the lithium battery pack 32 to prevent the voltage potential from rising too high during a charging operation and from dropping too low during a discharge operation.

Lithium battery back-charge protection diodes 28 prevent any charge current being delivered to the vehicle battery 72 from flowing back to the lithium battery pack 32 from the vehicle's electrical system. Flashlight LED circuit 36 is provided to furnish a flashlight function for enhancing light under a vehicle's hood in dark conditions, as well as providing SOS and strobe lighting functions for safety purposes when a vehicle may be disabled in a potentially dangerous location. Voltage regulator 42 provides regulation of internal operating voltage for the microcontroller and sensors. On/Off manual mode and flashlight switches 46 allow the user to control power-on for the handheld battery booster device, to control manual override operation if the vehicle has no battery, and to control the flashlight function. The manual button functions only when the booster device is powered on. This button allows the user to jump-start vehicles that have either a missing battery, or the battery voltage is so low that automatic detection by the MCU is not possible. When the user presses and holds the manual override button for a predetermined period time (such as three seconds) to prevent inadvertent actuation of the manual mode, the internal lithium ion battery power is switched to the vehicle battery connect port. The only exception to the manual override is if the car battery is connected in reverse. If the car battery is connected in reverse, the internal lithium battery power shall never be switched to the vehicle battery connect port.

USB charge circuit 52 converts power from any USB charger power source, to charge voltage and current for charging the lithium battery pack 32. USB output 56 provides a USB portable charger for charging smartphones, tablets, and other rechargeable electronic devices. Operation indicator LEDs 60 provides visual indication of lithium battery capacity status as well as an indication of smart switch activation status (indicating that power is being provided to the vehicle's electrical system).

Figure 2A:
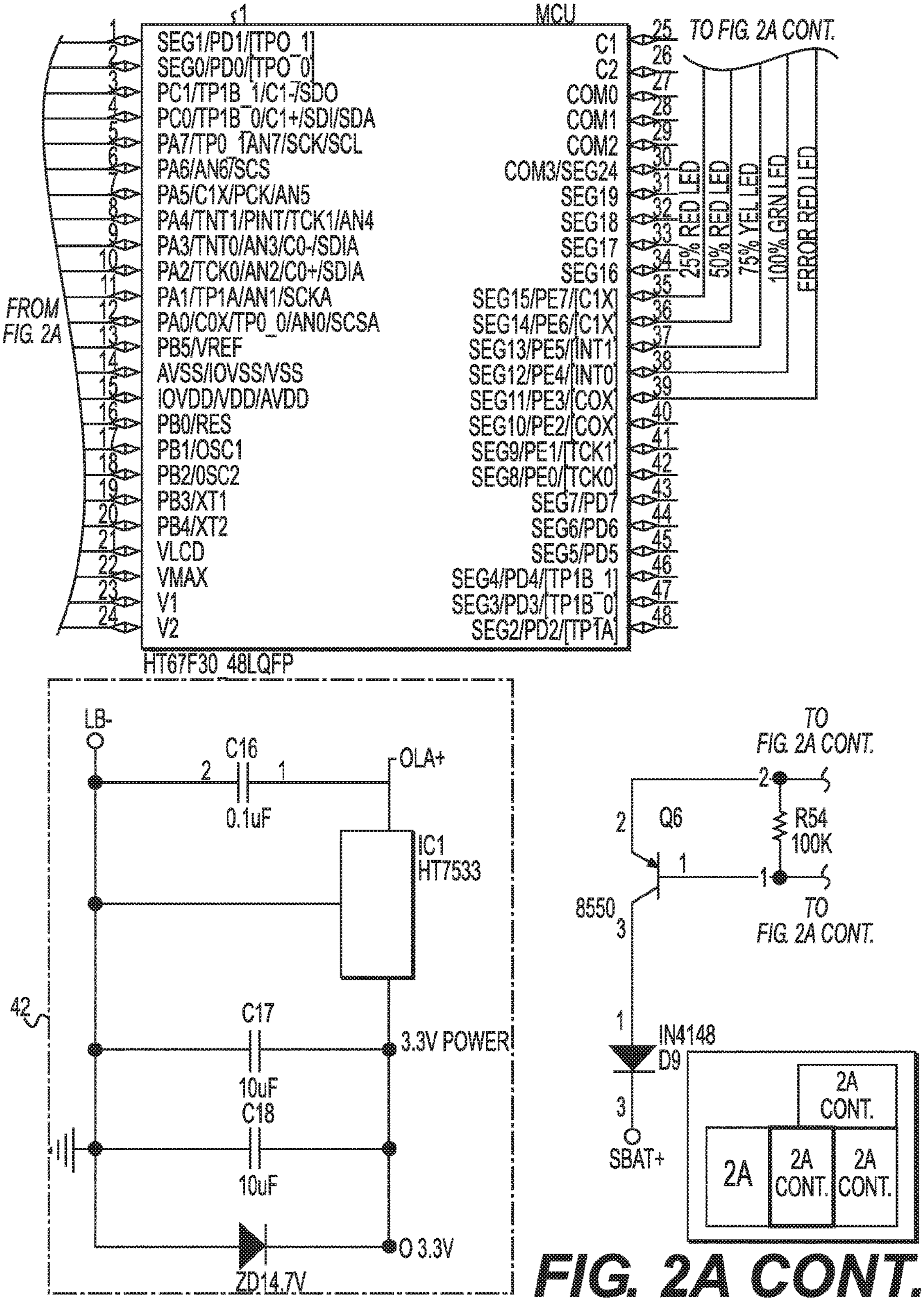
Figure 2A:
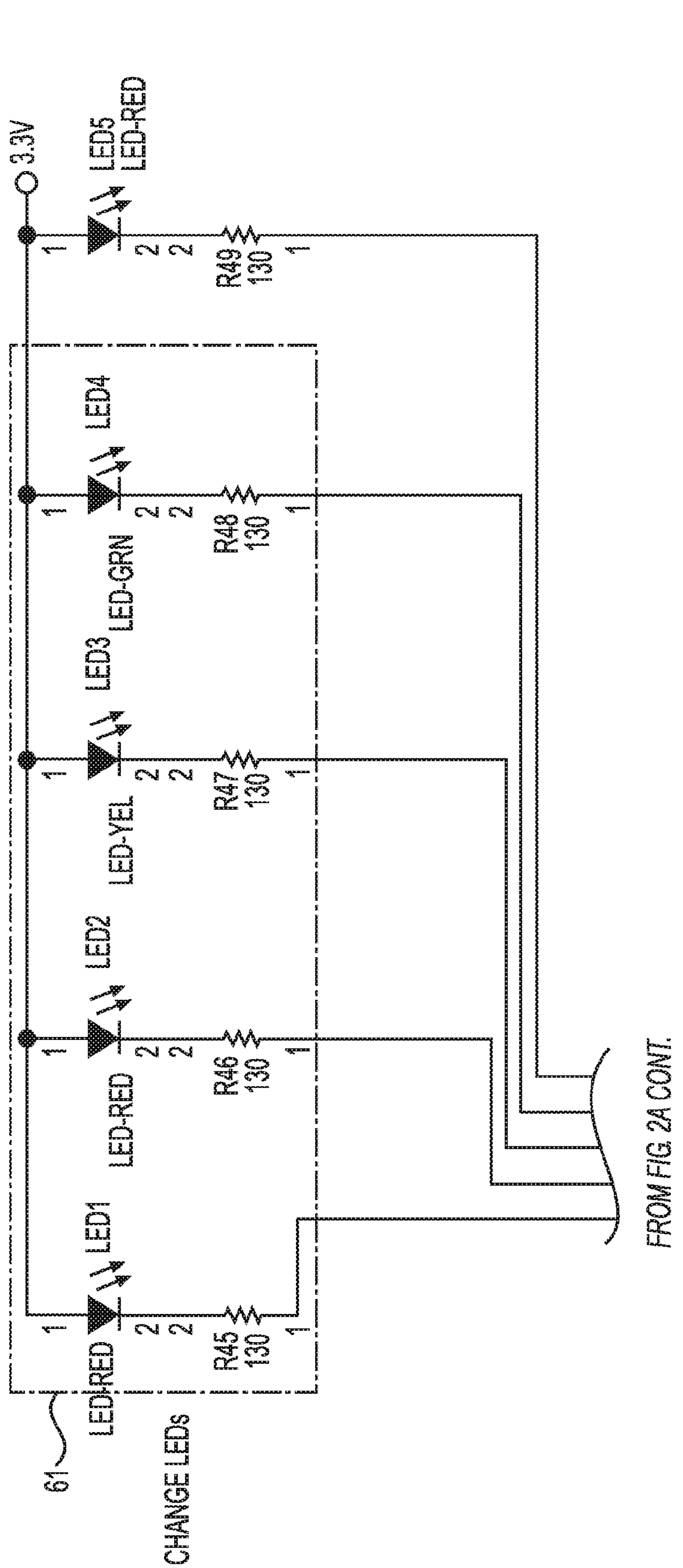
Figure 2A:
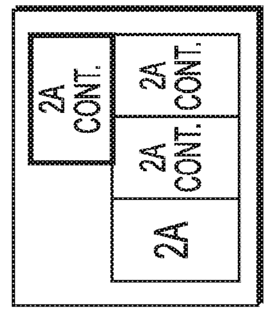

Detailed operation of the handheld booster device will now be described with reference to the schematic diagrams of FIGS. 2A-2C. As shown in FIG. 2A, the microcontroller unit 1 is the center of all inputs and outputs. The reverse battery sensor 10 comprises an optically coupled isolator phototransistor (4N27) connected to the terminals of vehicle battery 72 at input pins 1 and 2 with a diode D8 in the lead conductor of pin 1 (associated with the negative terminal CB−), such that if the battery 72 is connected to the terminals of the booster device with the correct polarity, the optocoupler LED 11 will not conduct current, and is therefore turned off, providing a "1" or high output signal to the MCU 1. The car battery isolation sensor 12 comprises an optically coupled isolator phototransistor (4N27) connected to the terminals of vehicle battery 72 at input pins 1 and 2 with a diode D7 in the lead conductor of pin 1 (associated with the positive terminal CB+), such that if the battery 72 is connected to the terminals of the booster device with the correct polarity, the optocoupler LED 11A will conduct current, and is therefore turned on, providing a "0" or low output signal to the MCU, indicating the presence of a battery across the jumper output terminals of the handheld booster device.

If the car battery 72 is connected to the handheld booster device with reverse polarity, the optocoupler LED 11 of the reverse sensor 10 will conduct current, providing a "0" or low signal to microcontroller unit 1. Further, if no battery is connected to the handheld booster device, the optocoupler LED 11A of the isolation sensor 12 will not conduct current, and is therefore turned off, providing a "1" or high output signal to the MCU, indicating the absence of any battery connected to the handheld booster device. Using these specific inputs, the microcontroller software of MCU 1 can determine when it is safe to turn on the smart switch FET 15, thereby connecting the lithium battery pack to the jumper terminals of the booster device. Consequently, if the car battery 72 either is not connected to the booster device at all, or is connected with reverse polarity, the MCU 1 can keep the smart switch FET 15 from being turned on, thus prevent sparking/short circuiting of the lithium battery pack.

Figure 2B:
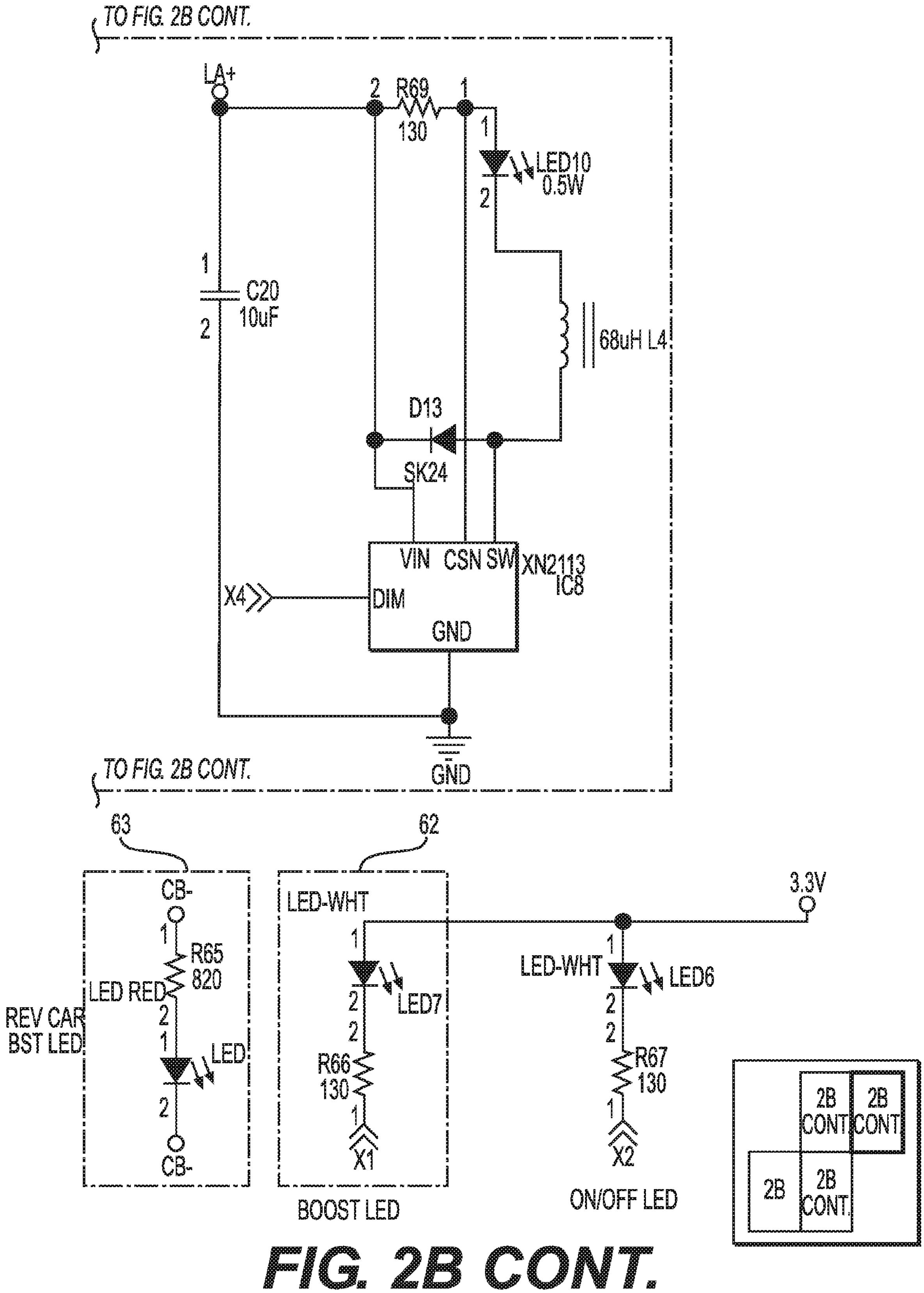

As shown in FIG. 2B, the FET smart switch 15 is driven by an output of the microcontroller 1. The FET smart switch 15 includes three FETs (Q15, Q18, and Q19) in parallel, which spreads the distribution of power from the lithium battery pack over the FETs. When that microcontroller output is driven to a logic low, FETs 16 are all in a high resistance state, therefore not allowing current to flow from the internal lithium battery negative polarity contact 17 to the car battery 72 negative contact. When the micro controller output is driven to a logic high, the FETs 16 (Q15, Q18, and Q19) are in a low resistant state, allowing current to flow freely from the internal lithium battery pack negative contact 17 (LB−) to the car battery 72 negative contact (CB−). In this way, the microcontroller software controls the connection of the internal lithium battery pack 32 to the vehicle battery 72 for jumpstarting the car engine.

Referring back to FIG. 2A, the internal lithium battery pack voltage can be accurately measured using circuit 24 and one of the analog-to-digital inputs of the microcontroller 1. Circuit 24 is designed to sense when the main 3.3V regulator 42 voltage is on, and to turn on transistor 23 when the voltage of regulator 42 is on. When transistor 23 is conducting, it turns on FET 22, thereby providing positive contact (LB+) of the internal lithium battery a conductive path to voltage divider 21 allowing a lower voltage range to be brought to the microcontroller to be read. Using this input, the microcontroller software can determine if the lithium battery voltage is too low during discharge operation or too high during charge operation, and take appropriate action to prevent damage to electronic components.

Still referring to FIG. 2A, the temperature of the internal lithium battery pack 32 can be accurately measured by two negative temperature coefficient (NTC) devices 20. These are devices that reduce their resistance when their temperature rises. The circuit is a voltage divider that brings the result to two analog-to-digital (A/D) inputs on the microcontroller 1. The microcontroller software can then determine when the internal lithium battery is too hot to allow jumpstarting, adding safety to the design. The main voltage regulator circuit 42 is designed to convert internal lithium battery voltage to a regulated 3.3 volts that is utilized by the microcontroller 1 as well as by other components of the booster device for internal operating power. Three lithium battery back charge protection diodes 28 (see FIG. 2B) are in place to allow current to flow only from the internal lithium battery pack 32 to the car battery 72, and not from the car battery to the internal lithium battery. In this way, if the car electrical system is charging from its alternator, it cannot back-charge (and thereby damage) the internal lithium battery, providing another level of safety.

The main power on switch 46 (FIG. 2A) is a combination that allows for double pole, double throw operation so that with one push, the product can be turned on if it is in the off state, or turned off if it is in the on state. This circuit also uses a microcontroller output 47 to "keep alive" the power when it is activated by the on switch. When the switch is pressed the microcontroller turns this output to a high logic level to keep power on when the switch is released. In this way, the microcontroller maintains control of when the power is turned off when the on/off switch is activated again or when the lithium battery voltage is getting too low. The microcontroller software also includes a timer that turns the power off after a predefined period of time, (such as, e.g. 8 hours) if not used.

The flashlight LED circuit 45 shown in FIG. 2B controls the operation of flashlight LEDs. Two outputs from the microcontroller 1 are dedicated to two separate LEDs. Thus, the LEDs can be independently software-controlled for strobe and SOS patterns, providing yet another safety feature to the booster device. LED indicators provide the feedback the operator needs to understand what is happening with the product. Four separate LEDs 61 (FIG. 2A) are controlled by corresponding individual outputs of microcontroller 1 to provide indication of the remaining capacity of the internal lithium battery. These LEDs are controlled in a "fuel gauge" type format with 25%, 50%, 75% and 100% (red, red, yellow, green) capacity indications. An LED indicator 63 (FIG. 2B) provides a visual warning to the user when the vehicle battery 72 has been connected in reverse polarity. "Boost" and on/off LEDs 62 provide visual indications when the booster device is provide jump-start power, and when the booster device is turned on, respectively.

A USB output 56 circuit (FIG. 2C) is included to provide a USB output for charging portable electronic devices such as smartphones from the internal lithium battery pack 32. Control circuit 57 from the microcontroller 1 allows the USB Out 56 to be turned on and off by software control to prevent the internal lithium battery getting too low in capacity. The USB output is brought to the outside of the device on a standard USB connector 58, which includes the standard voltage divider required for enabling charge to certain smartphones that require it.

The USB charge circuit 52 allows the internal lithium battery pack 32 to be charged using a standard USB charger. This charge input uses a standard micro-USB connector 48 allowing standard cables to be used. The 5V potential provided from standard USB chargers is up-converted to the 12.4 VDC voltage required for charging the internal lithium battery pack using a DC-DC converter 49. The DC-DC converter 49 can be turned on and off via circuit 53 by an output from the microcontroller 1.

In this way, the microcontroller software can turn the charge off if the battery voltage is measured to be too high by the A/D input 22. Additional safety is provided for helping to eliminate overcharge to the internal lithium battery using a lithium battery charge controller 50 that provides charge balance to the internal lithium battery cells 51. This controller also provides safety redundancy for eliminating over discharge of the internal lithium battery.

Figure 3:
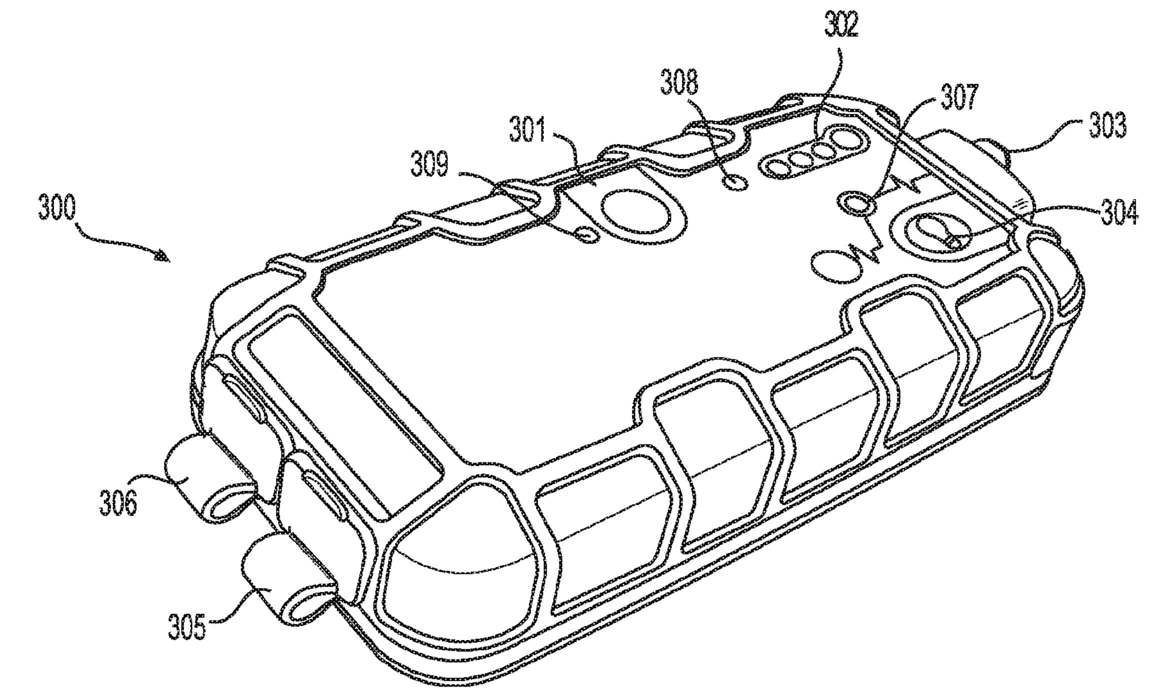

FIG. 3 is a perspective view of a handheld device 300 in accordance with an exemplary embodiment of the invention. 301 is a power on switch. 302 shows the LED "fuel gauge" indicators 61. 303 shows a 12 volt output port connectable to a cable device 400, described further below. 304 shows a flashlight control switch for activating flashlight LEDs 45. 305 is a USB input port for charging the internal lithium battery, and 306 is a USB output port for providing charge from the lithium battery to other portable devices such as smartphones, tablets, music players, etc. 307 is a "boost on" indicator showing that power is being provided to the 12V output port. 308 is a "reverse" indicator showing that the vehicle battery is improperly connected with respect to polarity. 309 is a "power on" indicator showing that the device is powered up for operation.

Figure 4:
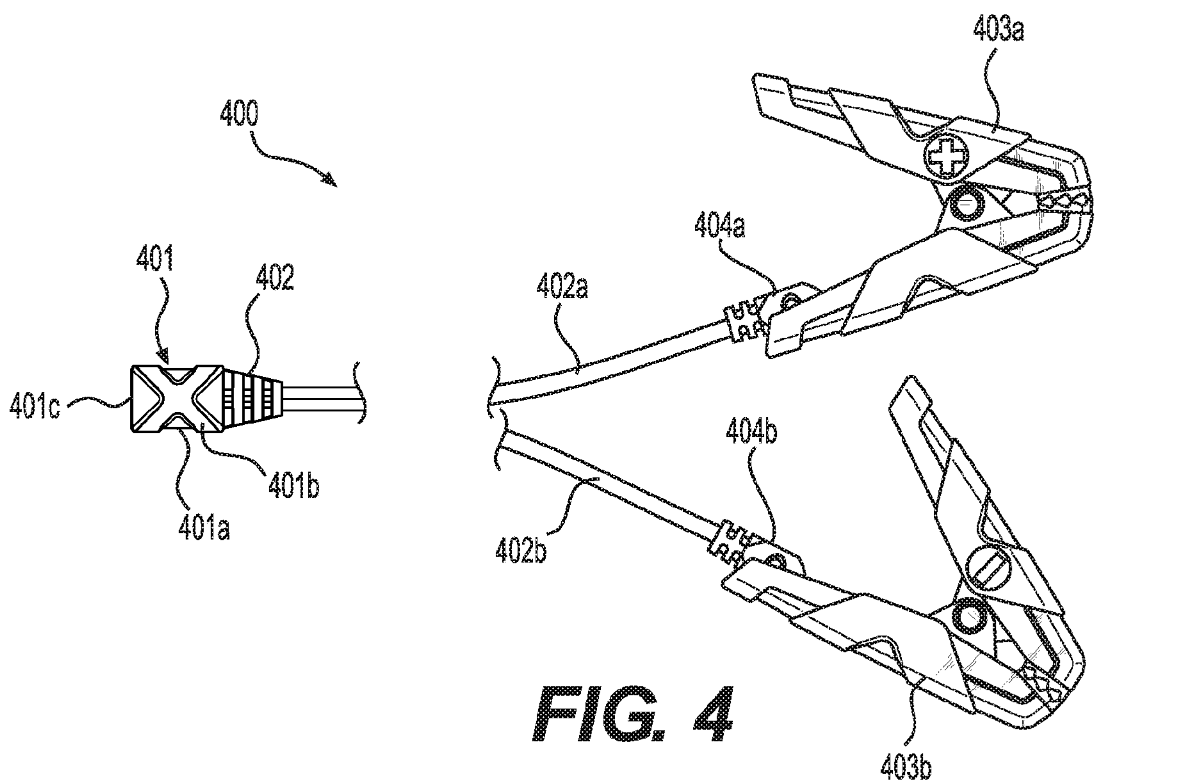
FIG. 4 is a plan view of a jumper cable usable with the handheld jump start booster device in accordance with another aspect of the invention.

FIG. 4 shows a jumper cable device 400 specifically designed for use with the handheld device 300. Device 400 has a plug 401 configured to plug into 12 volt output port 303 of the handheld device 300. A pair of cables 402*a* and 402*b* are integrated with the plug 401, and are respectively connected to battery terminal clamps 403*a* and 403*b* via ring terminals 404*a* and 404*b*. The output port 303 and plug 401 may be dimensioned so that the plug 401 will only fit into the output port 303 in a specific orientation, thus ensuring that clamp 403*a* will correspond to positive polarity, and clamp 403*b* will correspond to negative polarity, as indicated thereon. Additionally, the ring terminals 404*a* and 404*b* may be disconnected from the clamps and connected directly to the terminals of a vehicle battery. This feature may be useful, for example, to permanently attach the cables 302*a*-302*b* to the battery of a vehicle. In the event that the battery voltage becomes depleted, the handheld booster device 300 could be properly connected to the battery very simply by plugging in the plug 401 to the output port 303.

Figure 5:
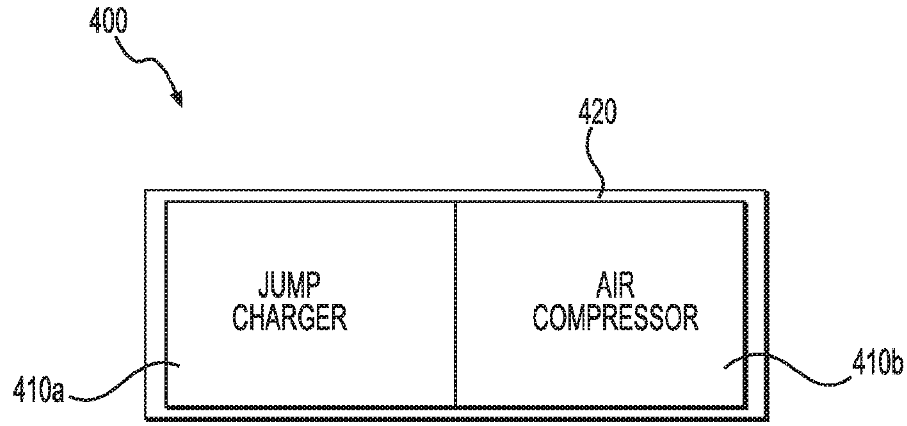
FIG. 5 is a block diagram of the portable vehicle battery jump starter with air pump according to the present invention.

FIG. 5 is a diagrammatic view showing a jump starter/air pump device 400 comprising a jump starter or jump charger 410*a* with an air pump or air compressor 410*b*. The jump starter or jump charger 410*a* and the air pump or air compressor 410*b* can be located within a single cover 420 (e.g. housing or casing), or alternatively in separate covers (e.g. covers connecting together, one cover nesting within other cover, and one covering docketing within other cover). For example, the air pump or air compressor 410*b* can be removable installed within the jump starter or jump charger 410*a*. The air pump, for example, can comprise one or more selected from the group consisting of an air compressor, rotary air compressor, reciprocal air compressor, an air tank, electric motor, hydraulic motor, pneumatic motor, control, conduits, and air hose. Other known air pump constructions, arrangements, or systems can be used in the combined jump starter/air pump 400. The control for the air pump or air compressor 410*b* can be incorporated into the MCU 1 shown in FIG. 1 and/or a separate control can be provided, an controlled, for example, by the MCU 1. The jump starter or jump charger 410*a* and air pump or air compressor 410*b* can be powered by the same battery (e.g. rechargeable battery, rechargeable Li-ion battery located within or outside the cover 420 shown in FIG. 5). Alternatively, the jump starter or jump charge 410*a* and air pump or air compressor can be powered with separate batteries (e.g. separate rechargeable battery, separate Li-ion battery).

Figure 6:
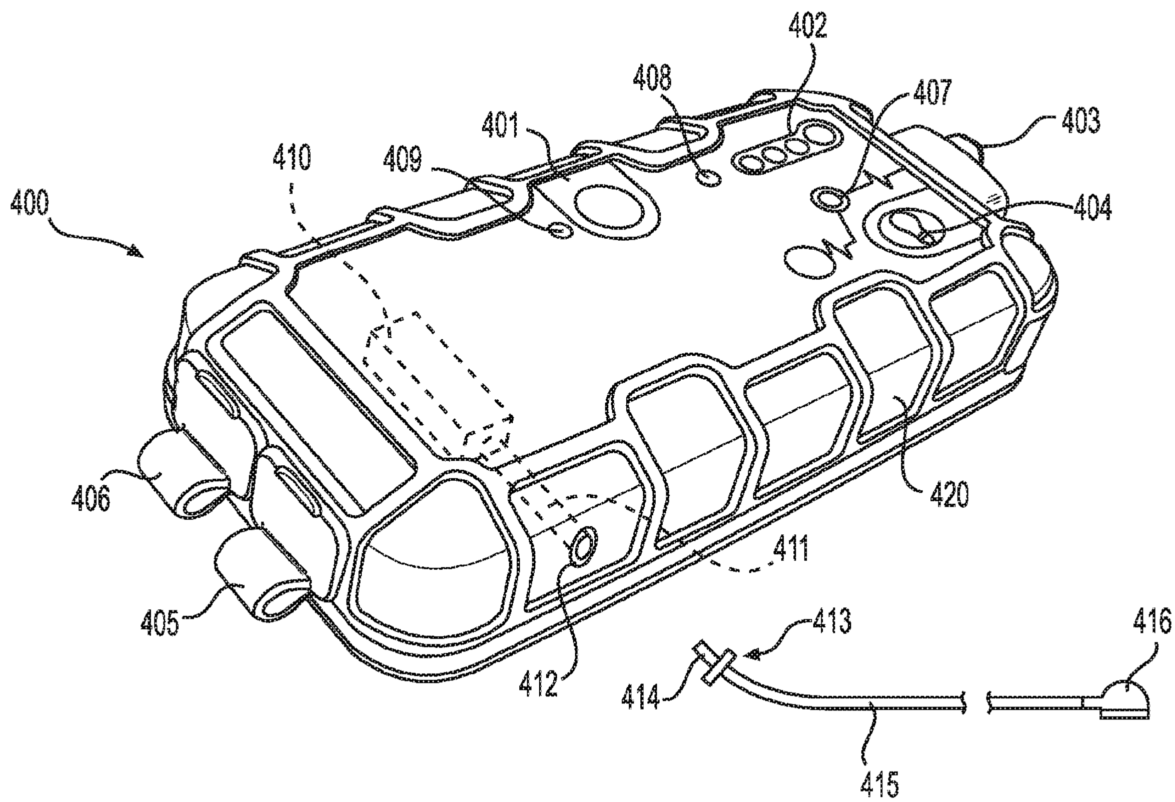
FIG. 6 is a perspective view of the portable vehicle battery jump starter shown in FIG. 3 with an air pump.

FIG. 6 shows a jump starter/air pump device 400 according to the present invention. For example, the vehicle battery jump starter shown in FIG. 3, is provided with an air pump 410 to provide components and features of both a jump starter and an air pump located within the same cover 420 (e.g. cover, housing, or casing). The jump starter/air pump device 400 contains all of the components and parts of the jump starter device 300 shown in FIGS. 1-4, and described above, in combination with the components and parts of an air pump (e.g. air pump 410*b* shown in FIG. 5) to supply pressurized air. For example, the jump starter/air pump device 400 comprises an air hose 411, an air supply port 412, an air hose connector 413 having a connecting end 414, an external air hose 415, and an air valve connector 416 (e.g. tire valve connector). The air hose connector 413, external air hose 415, and air valve connector 416 are connected together. For example, the components are connected together, and are removably connected as a unit from the jump starter/air pump device 400. The air supply port can extend through the cover, display, and/or cover/display.

The jump starter/air pump device 400 can have a single battery (e.g. Li-ion battery) for supplying electrical power to the jump starter or jump charger 410*a* (FIG. 5) and/or the air pump or air compressor 410*b*. A manual or electrical switch can be incorporated to allow powering both the jump starter or jump charger 410*a* and air pump or air compressor 410*b* at the same time, or selectively. Again, alternatively, the jump starter/air pump device 400 comprises two or more batteries for independently supplying electrical power to the jump starter or jump charger 410*a* and the air pump or air compressor 410*b*.

The jump starter/air pump device 400 can include a fan for cooling down same before, during and/or after use. Alternatively, or in addition, the jump starter/air pump device 420 can used the air pump or air compressor 410*b* to supply cooling air internally to cool down the combined jump starter/air compressor 400. For example, the internal high pressure air hose 411 (FIG. 6) can have a vent and/or valve to controllably release air within the cover 420 and out a vent to cool same.

The jump starter/air pump device 400 can be controlled (e.g. manual or electrical switch) and operated (e.g. with control and control circuit and/or MCU1) to utilize one or more batteries (e.g. rechargeable battery(ies), rechargeable Li-ion battery(ies)) located, for example, within the jump starter/air pump device 400 to power the jump starter or jump charger 410*a* and the air pump or air compressor 410*b*. Alternatively, the one or more batteries, for example, located within the jump starter/air pump device 400 in combination with an external battery (e.g. vehicle battery) can be utilized to electrically power the jump starter/air pump device 400. For example, the jump starter/air pump device 400 can be electrically connected to the vehicle battery using the cable assembly with clamps and/or connected to the cigarette lighter port using a power cable. The jump starter/air pump device 400 can include the following additional features:

1) a digital air pressure (e.g. psi) gauge or display (e.g. a digital air pressure gauge located on the front display located on the cover of the combined jump starter/air pump 400);
2) a switch for presetting a target air pressure (e.g. a switch on the front display or cover, in addition to the display);
3) separately powering the jump starter/air pump device 400 (e.g. manual and/or auto switch connected to power circuit);
4) providing one battery operating modes (e.g. one Li-ion battery powers both jump starter or jump charger 410*a* and the air pump or air compressor 410*b*);
5) providing multiple batteries providing various operating modes (e.g. using one or two batteries to operate jump starter device and/or air compressor device;
6) use DC or AC power with appropriate charger or converter to charge battery(ies) and/or power the jump starter or jump charger 410*a* and the air pump or air compressor 410*b* (e.g. integrated electrical and air supply port (e.g. a single port located on cover and configured to provide power connection and air supply connection);
7) operating cooling fan in various modes (e.g. cooling fan operates only when the jump starter/air pump device 400 is operating; cooling fan operates after a jump starter run; internal temperature sensor with preset temperature level controls operation of the cooling fan; and
8) cooling fan powered by separate battery (e.g. a separate battery is provided for powering cooling fan when simultaneously operating combined jump starter/air pump 400).

Another vehicle battery jump starter 1010 according to the present invention is shown in FIGS. 7-14. The battery jump starter 1010 can be provided with an air pump to provide a jump starter/air pump device.

The battery jump starting device 1010 can be fitted with an air pump to provide both a jump starting feature and an air pump feature. The jump starting feature is provided by a jump starter for jump starting a vehicle and the air pump feature is provided by an air pump to provide pressurized air for filling articles such as a vehicle tire. The detailed arrangement or configuration of the combined jump starter and air pump are described in detail below. The vehicle battery jump starter 1010 comprises a cover 1012 fitted with a handle 1014, as shown in FIGS. 7-14 and having a particular design shown.

The vehicle battery jump starter 1010 comprises a front interface 1016 having a power button 1017 for turning the power on or off, and an electrical control switch 1018 having a control knob 18*a* for operating an internally located control. The control switch 1018 is configured so that the control knob 1018*a* can be rotated back-and-forth between a first position (12V mode) to a second position (24V mode) depending on the particular voltage system of the vehicle being jump started (e.g. 12V, 24V).

Figure 7:
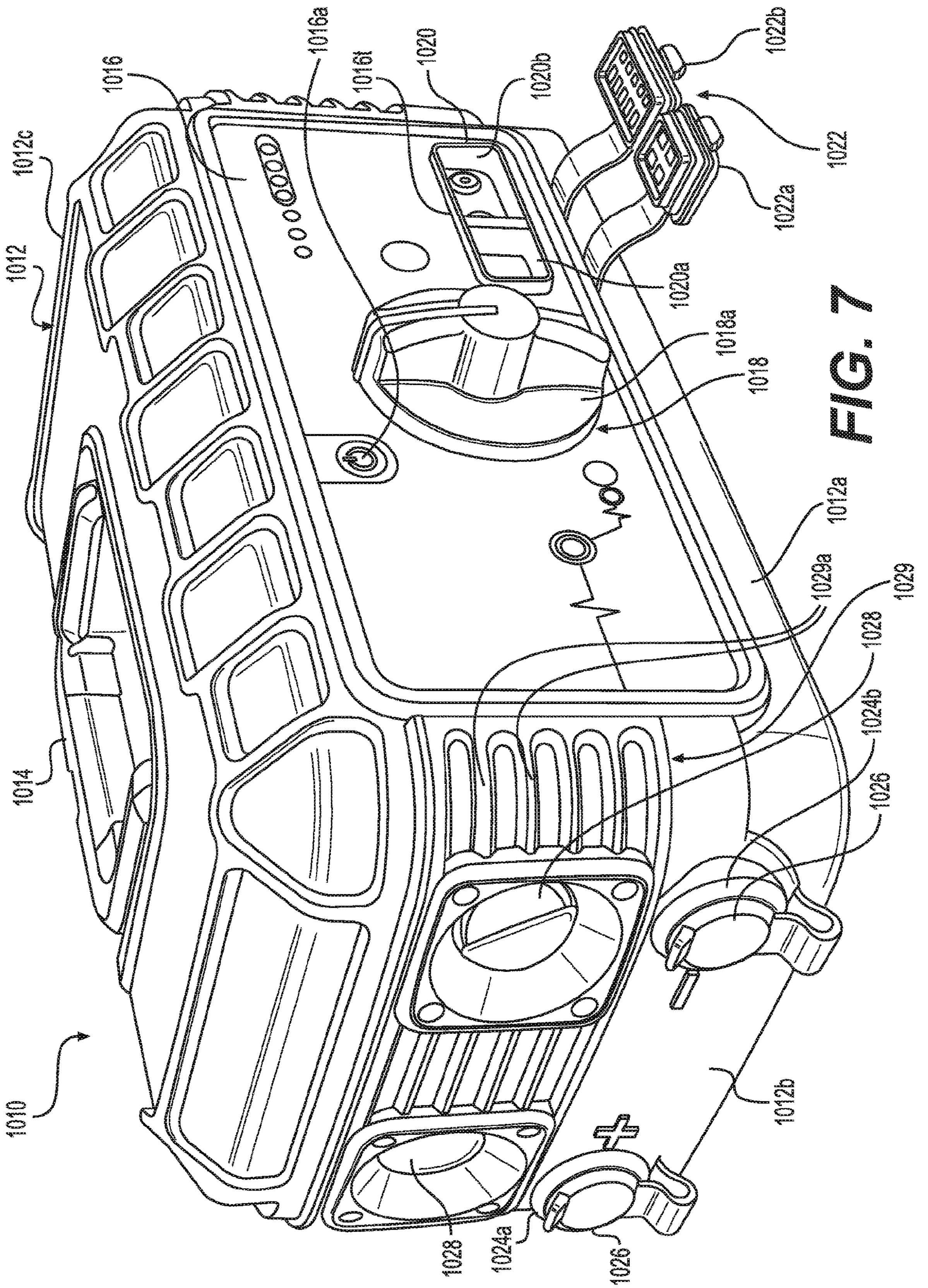
FIG. 7 is a front perspective view of another a handheld vehicle battery boost apparatus or portable vehicle battery jump starter according to the present invention.

The interface 1016 can be provided with the following features as shown in FIG. 7, including:

1) Power Button 1017;
2) Power LED (e.g. White colored LED);
3) 12V Mode LED (e.g. White colored LED);
4) 24V Mode LED (e.g. Blue colored LED);
5) Error LED (e.g. Red colored LED);
6) Cold Error LED (e.g. Blue colored LED);
7) Hot Error LED (e.g. Red colored LED);
8) Internal Battery Fuel Gauge LEDs (e.g. Red, Red, Amber, Green LEDs);
9) Flashlight Mode Button;
10) Flashlight LED (e.g. White colored LED);
12) 12V IN LED (e.g. White/Red LED);
13) 12V OUT LED (e.g. White/Red LED);
14) USB OUT LED (e.g. White LED);
15) Manual Override Button:
16) Manual Override LED Red:
17) Voltmeter Display LED (e.g. White colored LED);
18) 12V Mode LED (e.g. White colored LED);
19) 24V Mode LED (e.g. Blue colored LED); and
20) Boost LED (e.g. White colored LED).

The above features can be modified with different colors, and/or arrangements on the face of the interface 1016.

Figure 8:
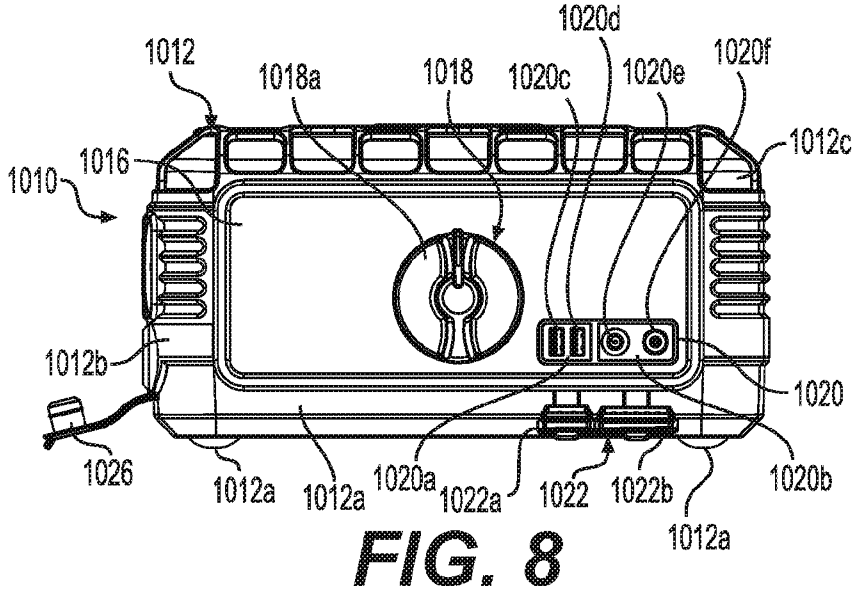
FIG. 8 is a front elevational view of the portable vehicle battery jump starter shown in FIG. 7.
Figure 9:
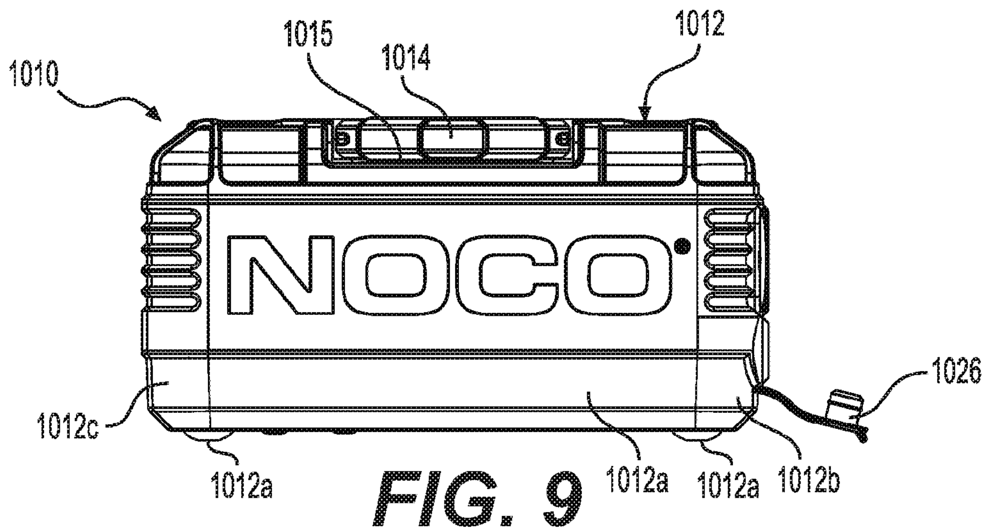
FIG. 9 is a rear elevational view of the portable vehicle battery jump starter in FIG.

The vehicle battery jump starter 1010 further comprises a port 1020 having left-side port 1020*a* and right-side port 1020*b*, as shown in FIG. 8. The port 1020 is configured to extend through a through hole 1016*a* located in the lower right side of the interface 1016. The left-side port 1020*a* accommodates dual 2.1 amp (A) USB OUT ports 1020*c*, 1020*d* and the right-side port 1020*b* accommodates an 18A 12V XGC OUT port 1020*e* and a 5A 12V XGC IN port 1020*e*, as shown in FIG. 8. The cover 1012 is provided with the resilient sealing cap 1022, including left sealing cap 1022*a* for sealing left port 1020*a* and right sealing cap 1022*b* for sealing right port 1020*b* during non-use of the vehicle battery jump starter 1010.

Figure 10:
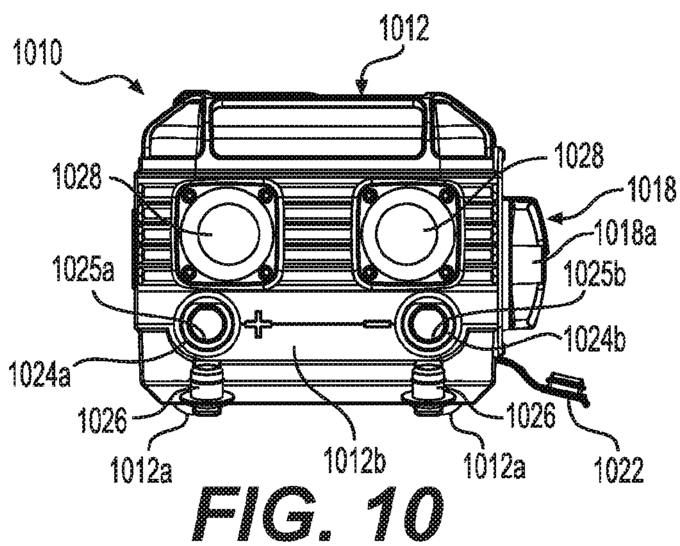
FIG. 10 is a left side elevational view of the portable vehicle battery jump starter shown in FIG. 7.
Figure 11:
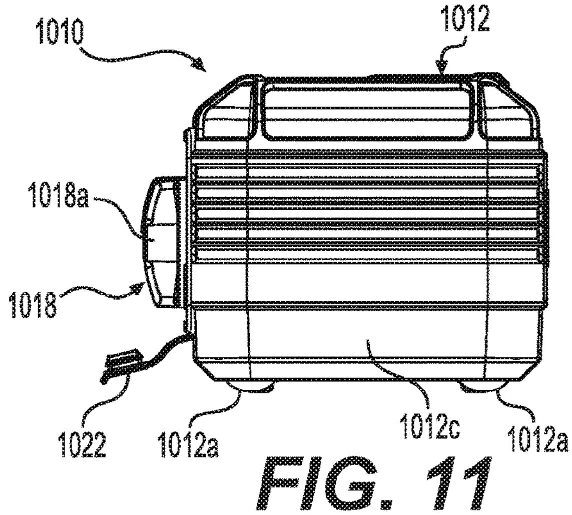
FIG. 11 is a right side elevational view of the portable vehicle battery jump starting device shown in FIG. 7.
Figure 12:
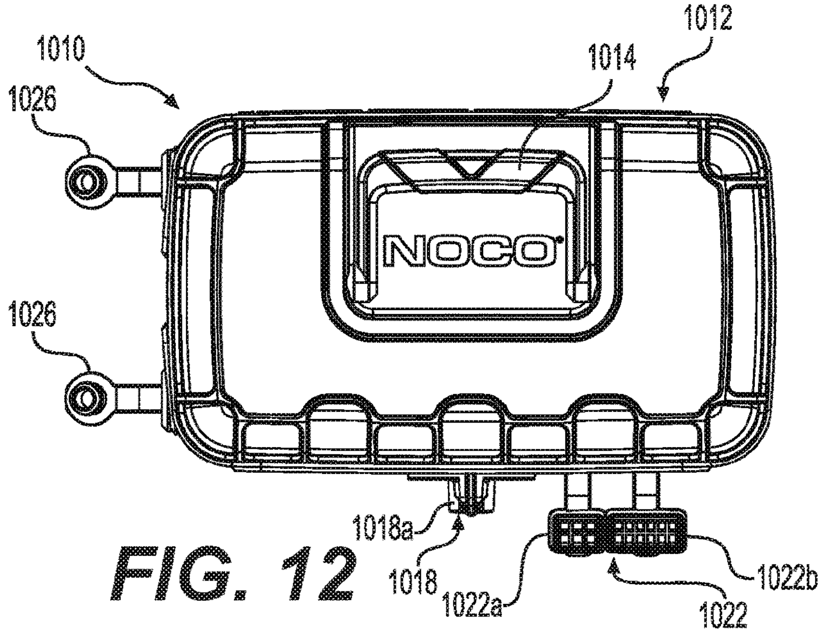
FIG. 12 is a top planar view of the portable vehicle battery jump starter shown in FIG. 7.
Figure 13:
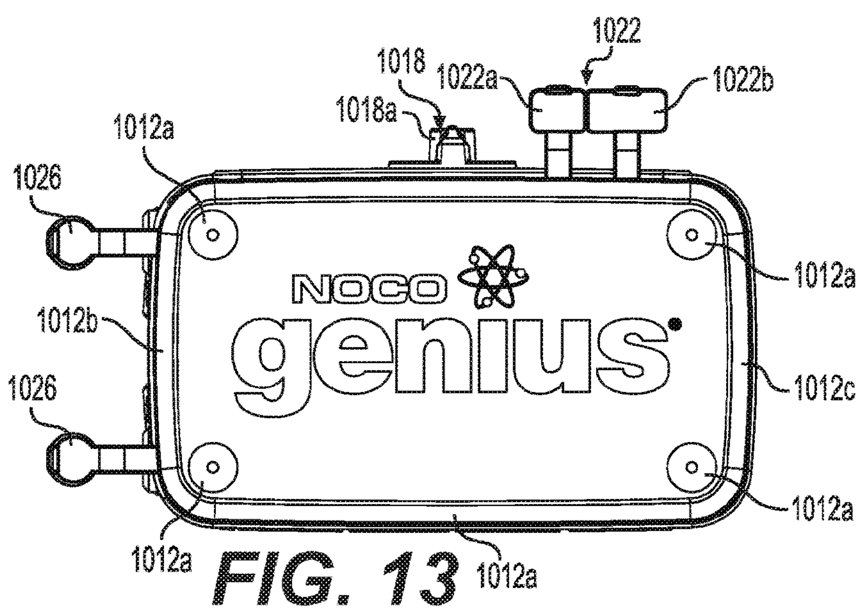
FIG. 13 is a bottom planar view of the portable vehicle battery jump starter shown in FIG. 7.
Figure 14:
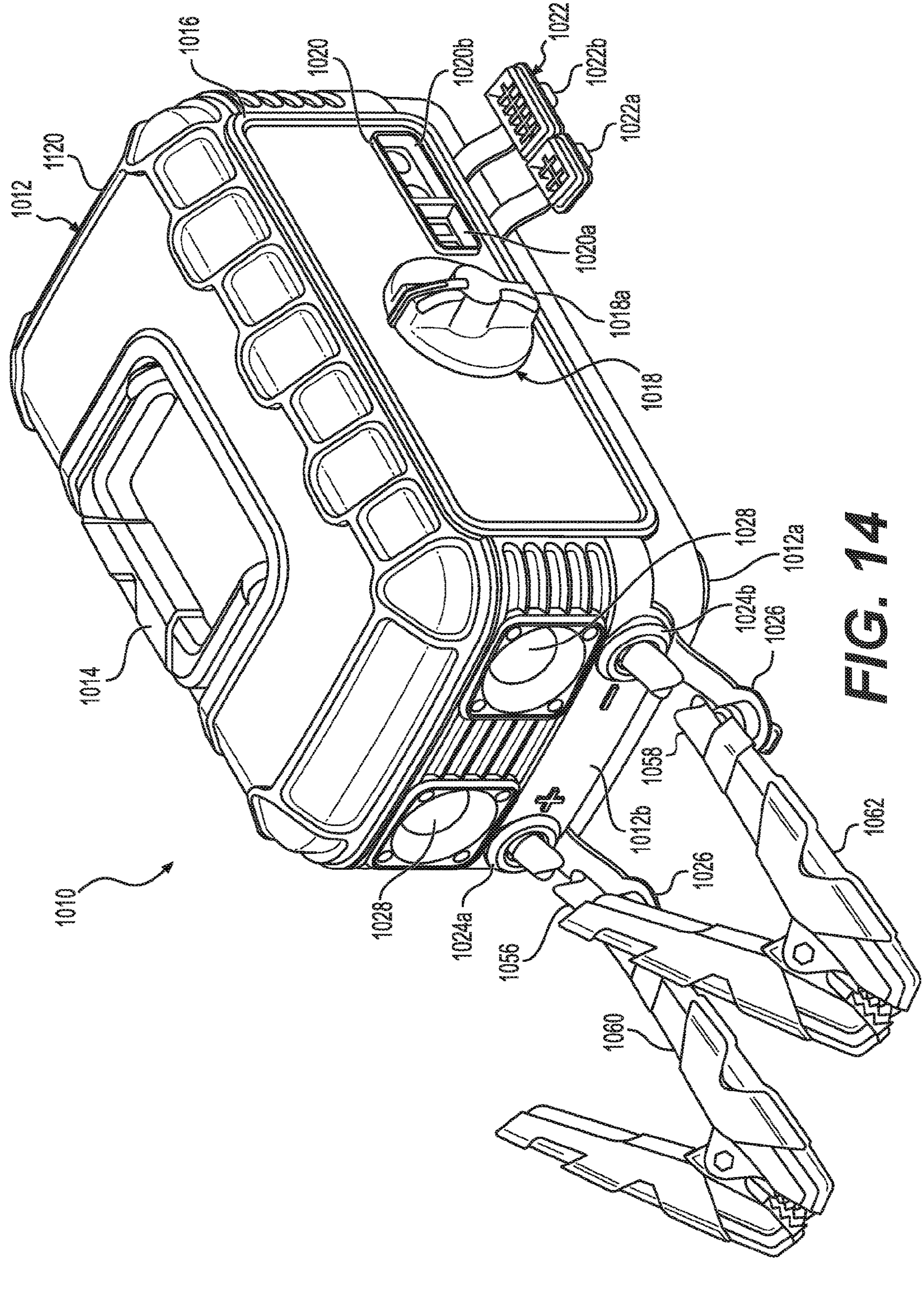
FIG. 14 is a perspective view of the portable vehicle battery jump starter shown in FIG. 7 with detachable battery cables attached to the battery jump starting and air compressing apparatus.

The left side of the vehicle battery jump starter 1010 is also fitted with a pair of light emitting diodes 1028 (LEDS) for using the vehicle battery jump starter 1010 as a work light. For example, the LEDs 1028 are dual 1100 Lumen high-intensity LED floodlights), as shown in FIGS. 7, 10, and 14. The LEDs 1028 are configured to have seven (7) operational modes, including 100% intensity, 50% intensity, 10% intensity, SOS (emergency protocol), Blink, Strobe, and Off.

The vehicle battery jump starter 1010 is fitted with a heat sink 1029 (FIG. 7) for dissipating heat from the LEDs 1028. For example, the heat sink 1029 is made of a heat conductive material (e.g. molded or die cast aluminum heat sink). The rib design shown (FIG. 7) facilitates the heat sink 1029 transferring heat to the surrounding atmosphere to prevent the LEDs 1028 from overheating.

The vehicle battery jump starter 1010 is shown in FIG. 7 without battery cables having battery clamps for connecting the vehicle battery jump starter 1010 to a battery of a vehicle to be jump started. The vehicle battery jump starter 1010 can be configured to detachably connect to a set of battery cables each having a battery clamps (e.g. positive battery cable with a positive clamp, negative battery cable with a negative clamp). Alternatively, the battery jump starting and air compressing apparatus can be fitted with battery cables hard wired directly to the device and being non-detachable.

In the vehicle battery jump starter 1010 shown in FIGS. 7 and 10, the left side of the vehicle battery jump starter 1010 is provided with POSITIVE (+) cam-lock 1024*a* and NEGATIVE (−) cam-lock 1024*b*. The cam-locks 1024*a*, 1024*b* include receptacles 1025*a*, 1025*b* (FIG. 10) configured for detachably connecting with connecting end 1056*a* (FIG. 11) of the positive battery cable 1056 and the connecting end 1058*a* of negative battery cable 1058, respectively. The cam-locks 1024*a*, 1024*b* are fitted with sealing caps 1026 (FIG. 7) for closing and sealing the receptacles 1025*a*, 1025*b* of the cam-locks 1024*a*, 1024*b*, respectively, during non-use of the vehicle battery jump starter 1010.

Figure 15:
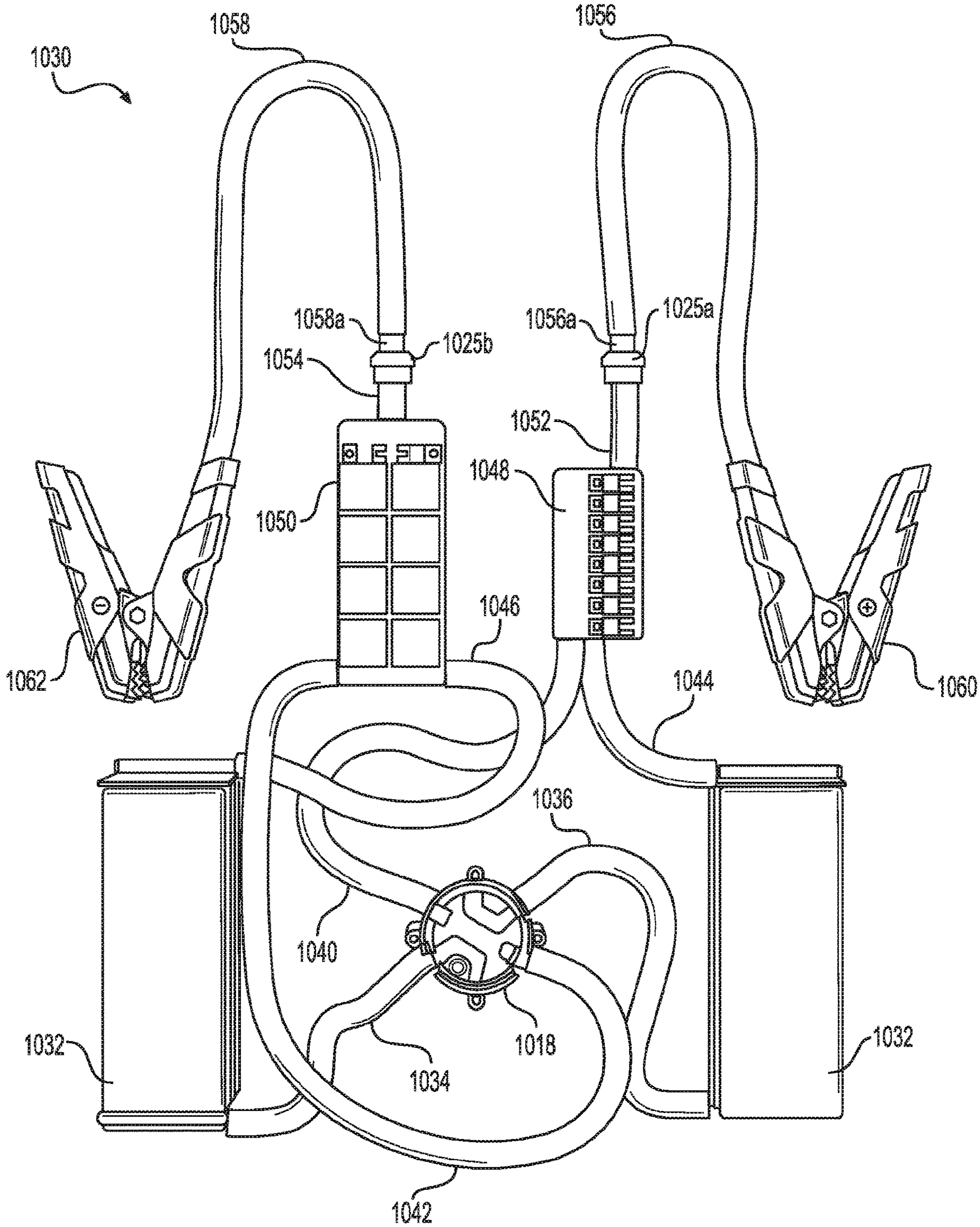
FIG. 15 is a top view of the layout of interior components of the portable vehicle battery jumper shown in FIG. 7 having detachable battery cables.

The power circuit 1030 of the vehicle battery jump starter 1010 is shown in FIG. 15. The power circuit 1030 comprises two (2) separate Lithium ion (Li-ion) batteries 1032 (e.g. two (2) 12V Li-ion batteries) connected to the control switch 1018 via a pair of cable sections 1034, 1036 (e.g. insulated copper cable sections), respectively. The control switch 1018 is connected to the reverse currently diode array 1048 (i.e. reverse flow protection device) via the cable section 1044, and the control switch 1018 is connected to the smart switch 1050 (e.g. 500A solenoid device) via cable section 1040, as shown in FIG. 15.

The reverse current diode array 1048 is connected to the one battery 1032 via cable section 1044, and the smart switch 1050 is connected to the other battery 1032 via cable section 1046, as shown in FIG. 15.

The positive battery cable 1056 having a positive battery clamp 1060 is detachably connected to the positive cam-lock 1025*a* (FIG. 15), which is connected to the reverse current diode array 1048 via cable section 1052.

The negative battery cable 1058 having a negative battery clamp 1062 is detachably connected to the negative cam-lock 1025*b* (FIG. 15), which is connected to the smart switch 1050 via cable section 1054.

In the above described first embodiment of the power circuit 1030, the electrical components of the power circuit 1030 are connected together via cable sections (e.g. heavy gauge flexible insulated copper cable sections). The ends of cable sections are soldered and/or mechanically fastened to the respective electrical components to provide highly conductive electrical connections between the electrical components.

Figure 16:
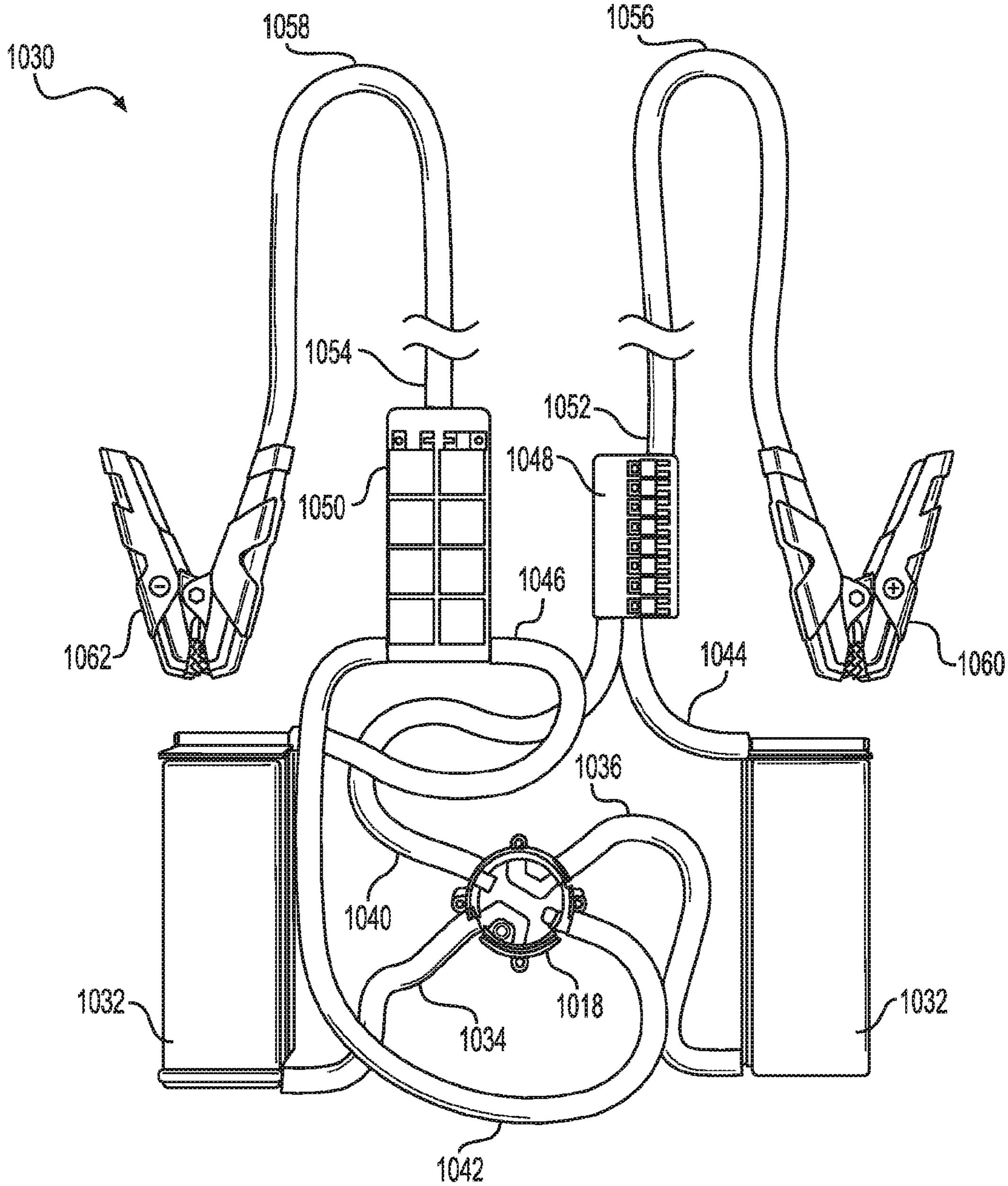
FIG. 16 is a top view of the layout of interior components of the portable vehicle battery jump starter shown in FIG. 7 having non-detachable battery cables.

In a modified first embodiment shown in FIG. 16, the battery cables 1056, 1058 are directly hard wired to the reverse current diode array 1048 and smart switch 1050, respectively, eliminating the cam-locks 1025*a*, 1025*b*, so that the battery cables 1056, 1058 are no longer detachable.

In a second embodiment of the power circuit to be described below, the cable sections 1036, 1040, 1042, 1044 located between the Li-ion batteries 1032 and the reverse current diode array 1048 and smart switch 1050, respectively, are replaced with a highly conductive rigid frame.

Figure 18:
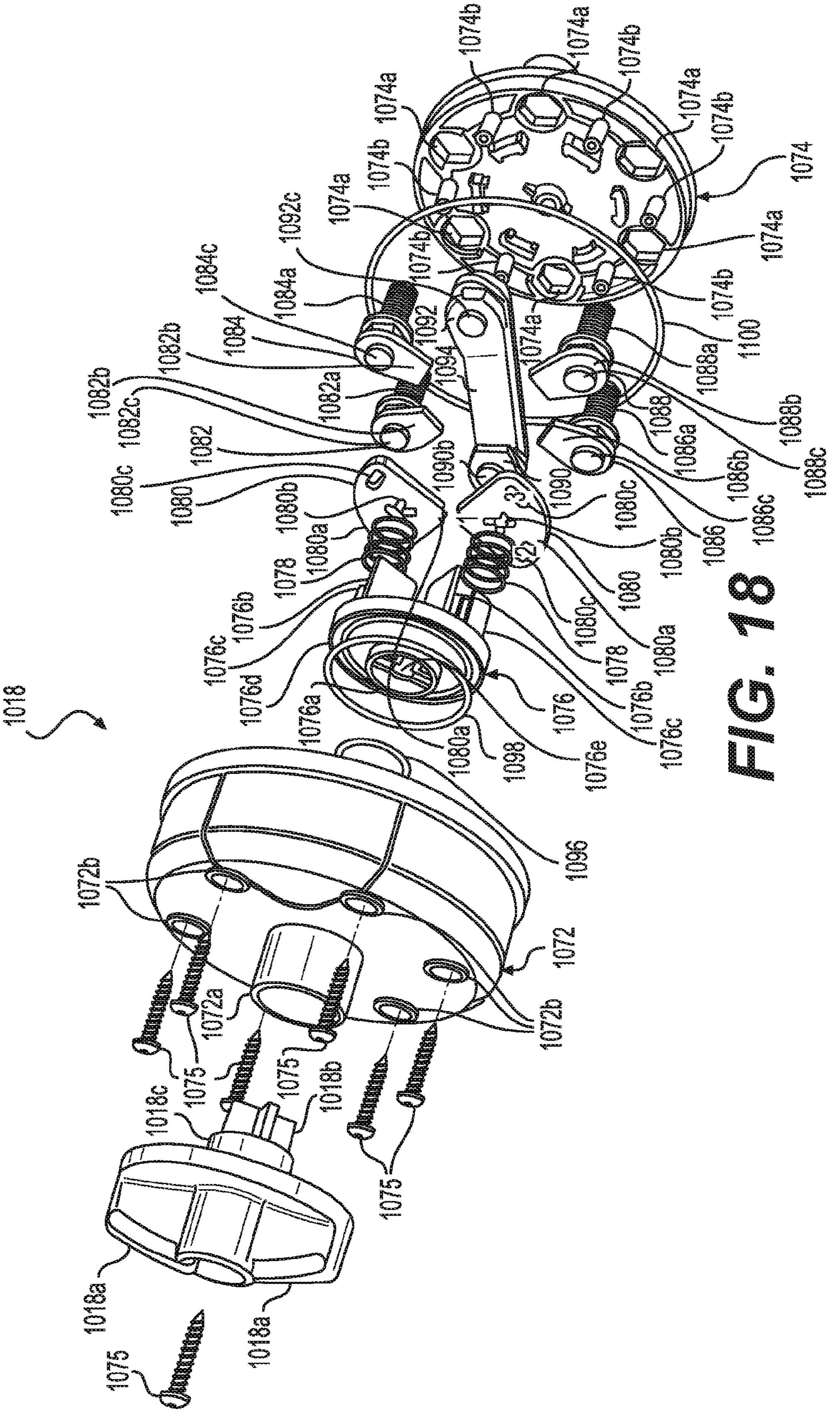
FIG. 18 is an exploded perspective view of the control switch installed on the front of the portable vehicle battery jump starter shown in FIG. 7.

The control switch 1018 assembly is shown in FIGS. 18-18. The control switch 1018 comprises the following:

1) control knob 1018*a;*
2) front housing 1072;
3) rear housing 1074;
4) rotor 1076 having a collar 1076*a*, legs 1076*b*, and legs 1076*c;*
5) springs 1078;
6) pivoting contact 1080 each having two (2) points of contact (e.g. slots 1080*c*);
7) separate terminals 1082, 1084, 1086,1088;
8) connected terminals 1090, 1092;
9) conductive bar 1094;
10) O-ring 1096;
11) O-ring 1098; and
12) O-ring 10100.

The control knob 1018*a* comprises rear extension portions 1018*b*, 1018*c*. The extension portion 1018*c* has a T-shaped cross section to connect into a T-shaped recess 1076*e* (FIG. 18) in rotor 1076 when assembled. The rotor 1076 is provided with a flange 1076*a* configured to accommodate the rear extension portion 1018*b* (e.g. round cross-section) therein.

The pair of legs 1076*c* (e.g. U-shaped legs) of the rotor 1076 partially accommodate the springs 1078, respectively, and the springs 1078 apply force against the pivoting contacts 1080 to maintain same is highly conductive contact with the selected contacts 1082*b*-1092*c* of the terminals 1082-1092.

The pivoting contacts 1080 each have a pivoting contact plate 1080*a* having a centered slot 1080*b* configured to accommodate an end of each leg 1076*b* of the rotor 1076. When the rotor 1076 is turned, each leg 1076*b* actuates and pivots each pivoting contact plate 1080*a*.

Further, the pivoting contact plates 1080*a* each having a pair of spaced apart through holes 1080*c* (e.g. oval-shaped through holes) serving as two (s) points of contact with selected contacts 1082*c*-1092*c* of the terminals 1082-1092.

The terminals 1082-1092 have threaded posts 1082*a*-1092*a*, spacer plates 1082*b*-1092*b*, and conductive bar 1094, respectively, configured so that the contacts 1082*c*-1092*c* are all located in the same plane (i.e. plane transverse to longitudinal axis of the control switch 1018) to allow selective pivoting movement of the pivoting contacts 1080. The threaded posts 1082*a*-1092*a* of the terminals 1082-1092 are inserted through the through holes 1074*a*, respectively, of the rear housing 1074. The O-rings 1096, 1098, 1100, as shown in FIG. 18, seal the separate the various components of the control switch 1018 as shown. After assembly of the control switch 1018, a set of screws 1075 connect with anchors 1074*b* of the rear housing 1074 to secure the front housing 1072 to the rear housing 1074 as shown in FIG. 18.

Figure 19:
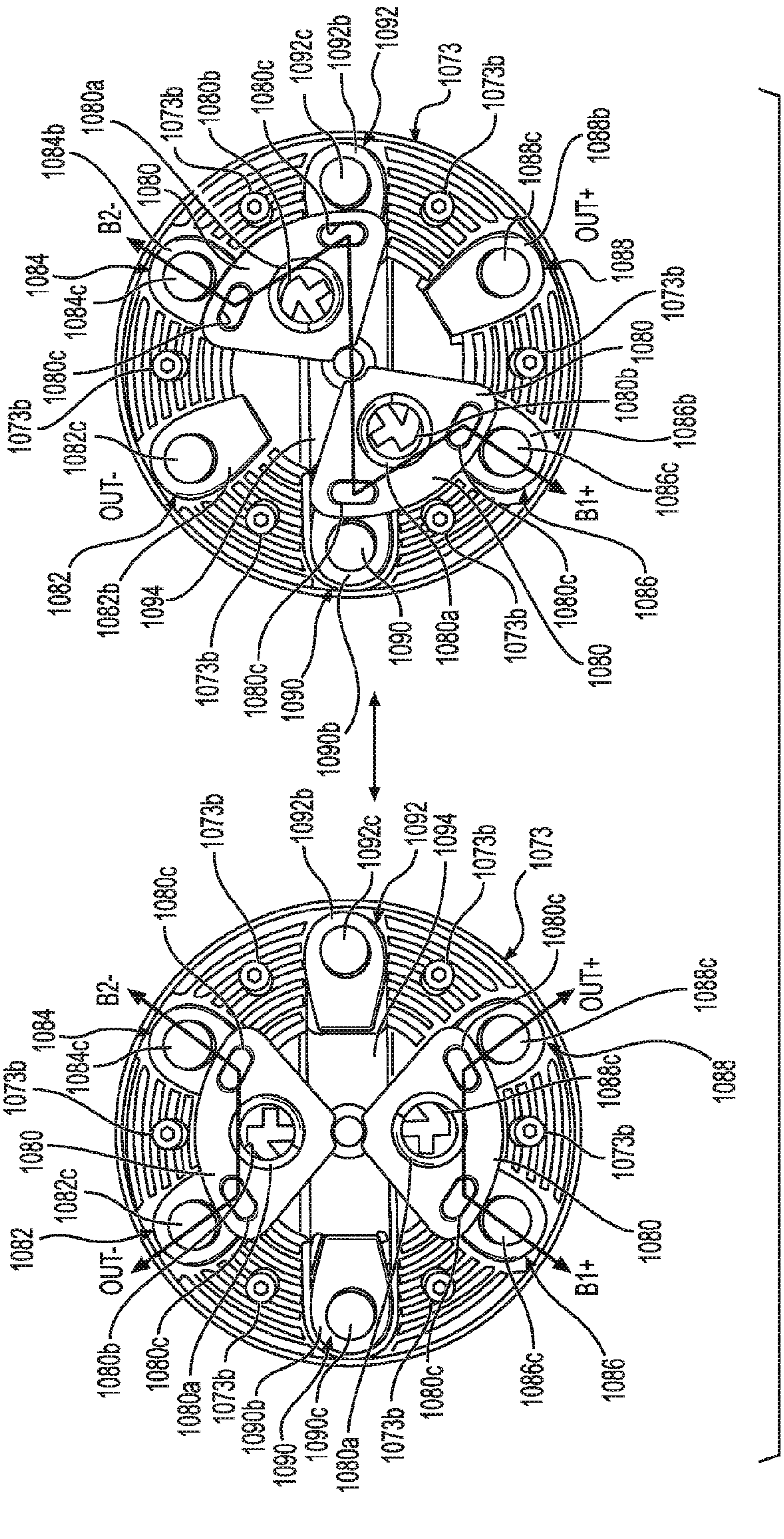
FIG. 19 is a front elevational view of the switch plate of the control switch shown in FIG. 18 operable between a first position and second position.

The control switch 1018 is a 12V/24V selective type switch as shown in FIG. 19. The configuration of the pivoting contacts 1080 in the first position or Position 1 (i.e. Parallel position) is shown on the left side of FIG. 19, and the second position or Position 2 (i.e. Series position) is shown on the right side of FIG. 19.

Figure 21:
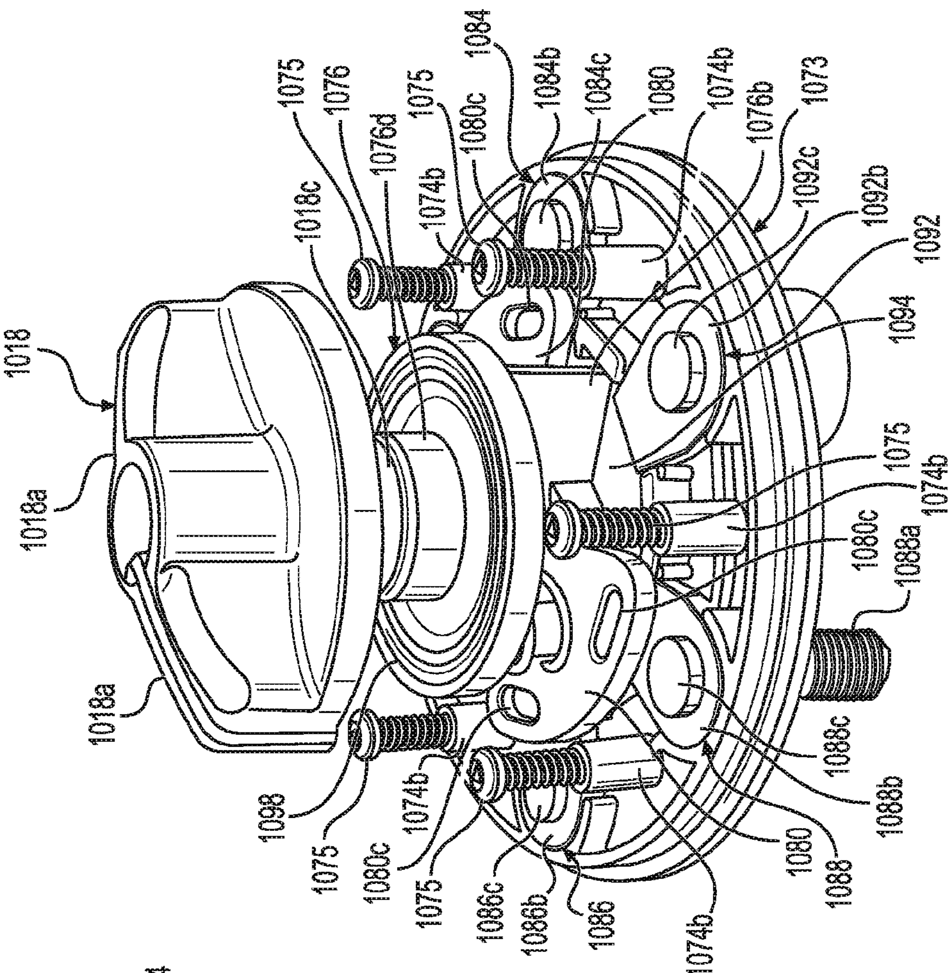
FIG. 21 is a perspective view of the control switch shown in FIG. 18.
Figure 20:
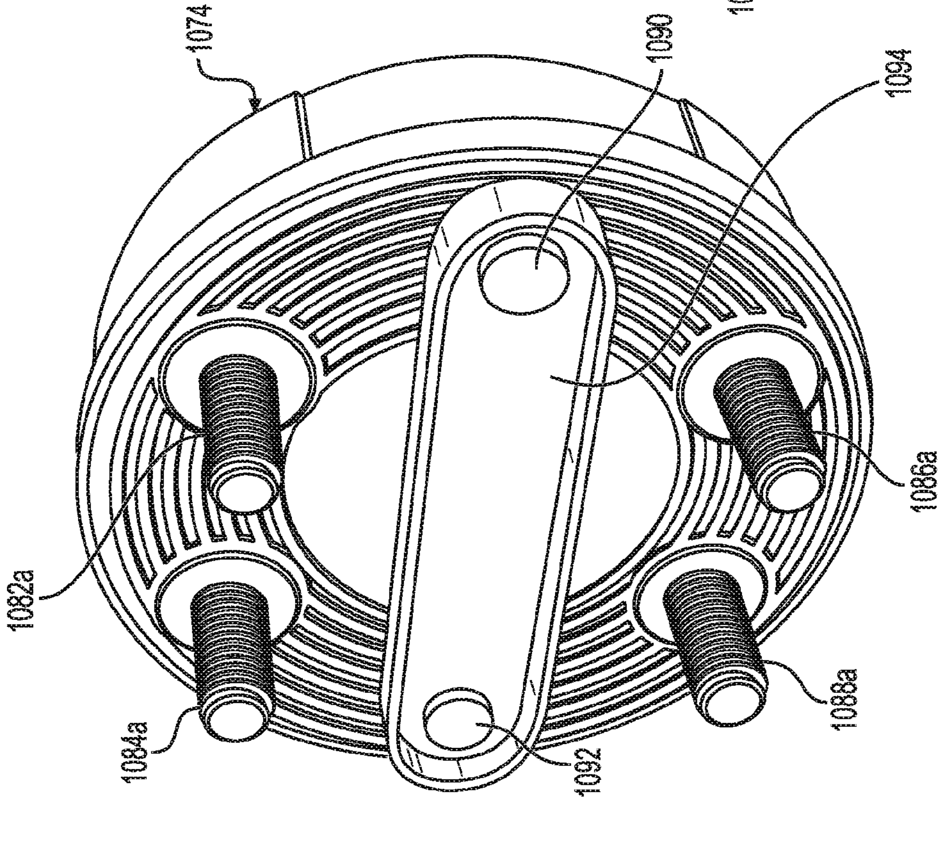
FIG. 20 is a rear perspective view of the switch plate shown in FIG. 19.

The rear side of the control switch 1018 is shown in FIG. 20. Another highly conductive bar 1094 is provided on the rear outer surface of the rear housing 1074. The fully assembled control switch 1018 is shown in FIG. 21.

The second embodiment of the vehicle battery jump starter 1110 is shown in FIGS. 20-25 with the cover 1112 removed. The cover for the battery jump starting and air compressing apparatus 1110 is the same as the cover 1012 of the battery jump starting and air compressing apparatus 1010 shown in FIGS. 7-14.

In a second embodiment of the vehicle battery jump starter 1110 compared to the battery jump starting and air compressing apparatus 1010 shown in FIGS. 7-14, the cable sections 1034, 1036, 1040, 1042, 1044, 1046 (FIG. 15) in the first embodiment are replaced with a highly conductive frame 1170.

The vehicle battery jump starter 1110 comprises a pair of 12V Li-ion batteries 1132 directly connected to the highly conductive rigid frame 1170. Specifically, the tabs (not shown) of the Li-ion batteries are soldered to the highly conductive rigid frame 1170.

The vehicle battery jump starter 1110 is fitted with an air compressor device to provide a jump starting and air compressing apparatus having a jump starter device for jump starting a vehicle and an air compressor device for providing a source of high pressure air for filling articles such as a vehicle tire. The jump starting and air compressing device, jump starter device, and air compressor device are described in detail below.

The highly conductive rigid frame 1170 is constructed of multiple highly conductive rigid frame members 1134, 1136, 1140, 1142, 1144, 1146, 1152, 1154 connected together by mechanical fasteners (e.g. copper nut and/or bolt fasteners) and/or soldering. For example, the highly conductive rigid frame members are made of highly conductive rigid copper rods. Alternatively, the highly conductive rigid copper rods can be replaced with highly conductive rigid copper plates, bars, tubing, or other suitably configured highly conductive copper material (e.g. copper stock material). The highly conductive rigid frame members 1134, 1136, 1140, 1142, 1144, 1146 can be insulated (e.g. heat shrink) in at least key areas to prevent any internal short circuiting.

The highly conductive rigid frame members can be configured with flattened end portions (e.g. flattened by pressing) each having a through hole to provide part of a mechanical connection for connecting successive or adjacent highly conductive rigid frame members and/or electrical components together using a highly conductive nut and bolt fastener (e.g. copper bolt and nut). In addition, the highly conductive rigid frame member can be formed into a base (e.g. plate or bar portion) for an electrical component. For example, the reverse flow diode assembly 1148 has three (3) base portions, including (1) an upper highly conductive rigid bar 1148*a* (FIG. 22) having a flattened end portion 1148*aa* connected to the flattened end portion 1144*a* of highly conductive rigid frame member 1144 using a highly conductive fastener 1206 (e.g. made of copper) having a highly conductive bolt 1206*a* and highly conductive nut 1206*b*; (2) a lower highly conductive rigid bar 1148*b* made from a flattened end portion of highly conductive rigid frame member 1144; and (3) a center highly conductive rigid bar 1148*c* made from a flattened end portion of the highly conductive rigid frame member 1152.

As another example, the smart switch 1150 (FIG. 22) comprises a highly conductive rigid plate 1150*a* serving as a base supporting the solenoid 1150*b*. The highly conductive rigid plate 1150*a* is provided with through holes for connecting highly conductive rigid frame members to the smart switch 1150 (e.g. highly conductive rigid frame member 1142) using highly conductive fasteners 1206.

The stock material (e.g. copper rod, plate, bar, tubing) selected for construction of the highly conductive rigid frame 1170 has substantial gauge to provide high conductivity and substantial rigidity. The "rigid" nature of the highly conductive rigid frame 1170 provides the advantage that the highly conductive rigid frame remains structurally stiff and stable during storage and use of the battery jump starting and air compressing apparatus 1110.

For example, the highly conductive rigid frame 1170 is designed and constructed to sufficiently prevent flexing, movement, bending and/or displacement during storage or use so as to prevent electrical shortages of the highly conductive rigid frame touching other internal electrical components or parts of the electronic assembly. This "rigid" nature is important due to the high conductivity path of electrical power from the Li-ion batteries flowing through the power circuit and reaching the battery clamps. It is a desired goal and feature of the present invention to conduct as much power as possible from the Li-ion batteries to the battery being jump started by the battery jump starting and air compressing apparatus by reducing or minimizing any electrical resistance by using the heavy duty and highly conductive rigid frame 1170 arrangement disclosed.

As an alternative, the highly conductive rigid frame 1170 can be constructed as a single piece having no mechanically fastened joints. For example, the highly conductive rigid frame can be made from a single piece of stock material and then formed into the highly conductive rigid frame. For example, a billet of highly conductive copper can be machined (e.g. milled, lathed, drilled) into the highly conductive rigid frame. As another example, a copper sheet or plate can be bent and/or machined into the highly conductive rigid frame. As a further alternative, the highly conductive rigid frame can be metal molded (e.g. loss wax process).

As another alternative, the highly conductive rigid frame 1170 is made of multiple highly conductive rigid frame members connected together into a unitary structure. For example, the highly conductive rigid frame is made of highly conductive sections of stock material (e.g. copper rod, plate, bar, tubing), which are bent and soldered and/or welded together.

Figure 23:
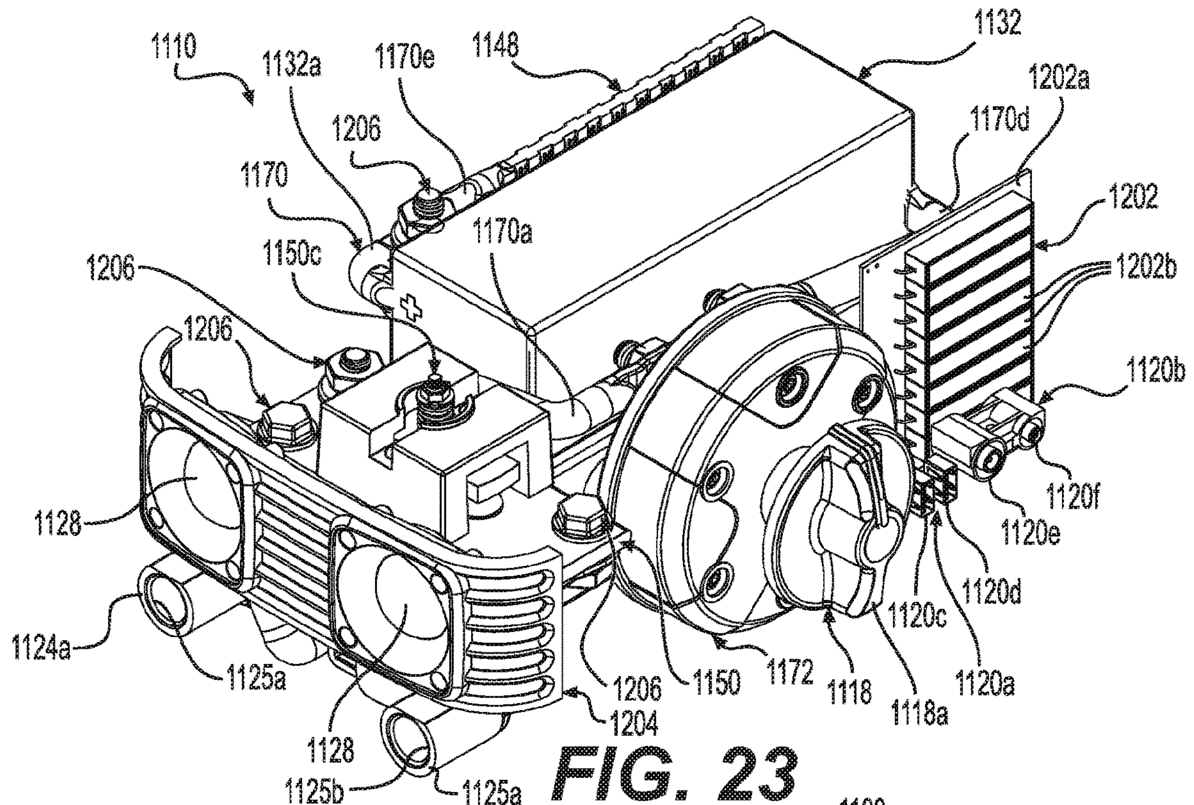
FIG. 23 is a front and left side perspective view of the portable vehicle battery jump starter shown in FIG. 7 with the cover removed.
Figure 25:
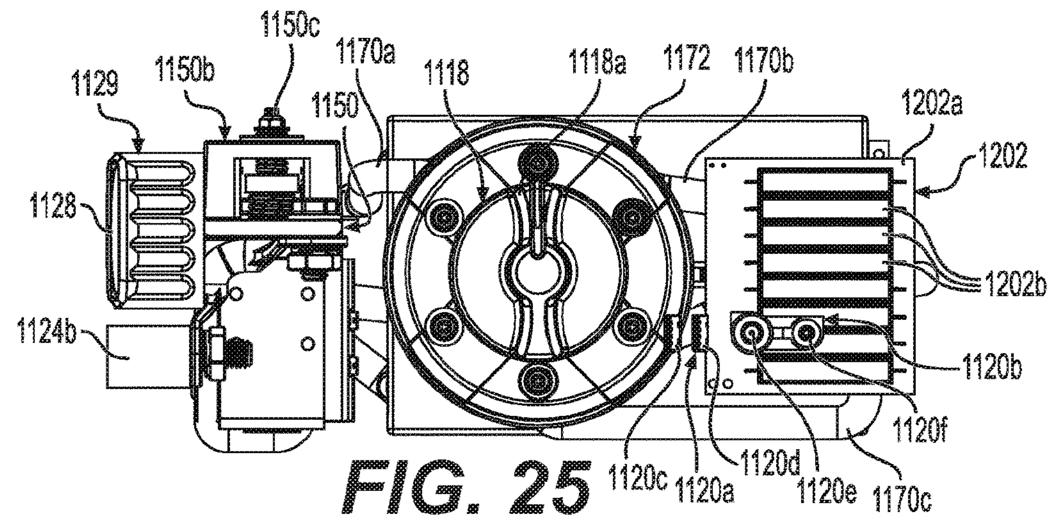
FIG. 25 is a front elevational view of the portable vehicle battery jump starter shown in FIG. 7 with the cover removed.

The vehicle battery jump starter 1110 further comprises a resistor array 1202 (e.g. 12 V 5A XGC) comprising a printed circuit board (PCB) 1202*a* serving as a base supporting an array of individual resistors 1202*b*, as shown in FIGS. 23 and 25. The PCB 1202*a* also supports the dual 2.1 amp (A) USB OUT ports 1120*c*, 1120*d*, the 18A 12V XGC OUT port 1020*e*, and the 5A 12V XGC IN port 1020*e*.

Figure 22:
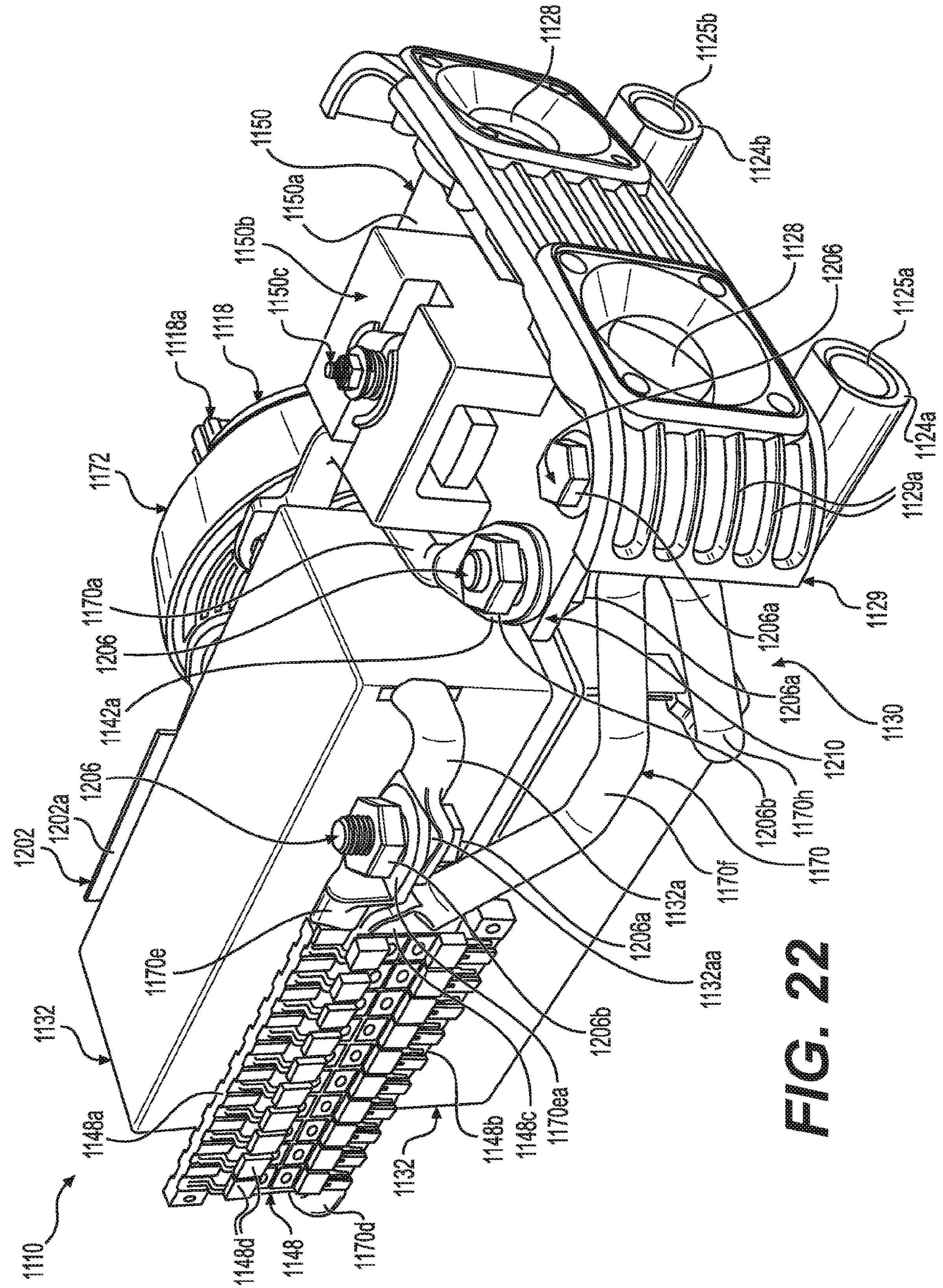
FIG. 22 is a rear and left side perspective view of the portable vehicle battery jump starter shown in FIG. 7 with the cover removed.

The left side of the vehicle battery jump starter 1110 is also fitted with a pair of light emitting diodes 1128 (LEDS) for using the vehicle battery jump starter 1110 as a work light. For example, the LEDs 1128 are dual 1100 Lumen high-intensity LED floodlights), as shown in FIG. 22. The LEDs 1128 are configured to have seven (7) operational modes, including 100% intensity, 50% intensity, 10% intensity, SOS (emergency protocol), Blink, Strobe, and Off.

The vehicle battery jump starter 1110 is fitted with a heat sink 1129 (FIG. 22) for dissipating heat from the LEDs 1128. For example, the heat sink 1129 is made of a heat conductive material (e.g. molded or die cast metal plate). The heat sink 1129 is provided with ribs 1129*a* transferring heat to the surrounding atmosphere to prevent the LEDs 1128 from overheating.

The vehicle battery jump starter 1110 is shown in FIG. 22 without any battery cables having battery clamps for connecting the battery jump starting and air compressing apparatus 1110 to a battery of a vehicle to be jump started. The vehicle battery jump starter 1110 can be configured to detachably connect to a set of battery cables having battery clamps (e.g. positive battery cable with a positive clamp, negative battery cable with a negative clamp). For example, see the detachable battery cables 1056, 1058 and battery clamps 1060, 1062 in FIG. 15, which can be detachably connected to the cam-locks 1124*a*, 1124*b* of the battery jump starting and air compressing apparatus 1110. Alternatively, the vehicle battery jump starter 1110 can be fitted with battery cables having clamps hard wired to the device and non-detachable that same or similar to those shown in FIG. 16.

Figure 17:
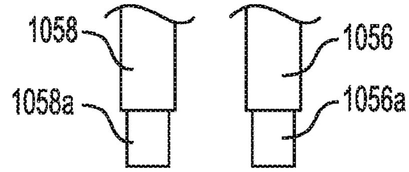
FIG. 17 is a top view of the connection ends of the detachable battery cables shown in FIG. 15.

For example, the left side of the vehicle battery jump starter 1110 is provided with POSITIVE (+) cam-lock 1124*a* and NEGATIVE (−) cam-lock 1124*b*, as shown in FIG. 22. The cam-locks 1124*a*, 1124*b* include receptacles 1125*a*, 1125*b* configured for detachably connecting with connecting end 1156*a* (FIG. 17) of the positive battery cable 156 and the connecting end 158*a* of negative battery cable 158, respectively. The cam-locks 1124*a*, 1124*b* can be fitted with sealing caps the same or similar to the sealing caps 126 (FIG. 7) for closing and sealing the receptacles 1125*a*, 1125*b* of the cam-locks 1124*a*, 1124*b*, respectively, during non-use of the battery jump starting and air compressing apparatus 1110.

The battery jump starting and air compressing apparatus 1110 comprises a main printed circuit board 1208 serving as a base for LEDs for the control knob 1018*a* and interface 1016, and for supporting other electrical components of the battery jump starting and air compressing apparatus 1110.

A third embodiment of the vehicle battery jump starter 1210 is shown in FIGS. 32-37. In this embodiment, the highly conductive rigid frame is made from flat copper bar stock material having a rectangular-shaped cross-sectional profile. The flat copper bar is bent to at least partially wrap around and envelop the Li-ion batteries.

Cam-Lock Connectors

Again, the battery cables 1056, 1058 (FIG. 16) can be detachably connected to the battery jump starting and air compressing apparatus 1010 via cam-locks 1024*a*, 1024*b* (FIG. 7) or cam-locks 1124*a*, 1124*b* (FIG. 22).

The cam-locks 1024*a*, 1124*a*, 1024*b*, 1124*b* and cables 1056, 1058 (FIG. 15) having conductive ends 1056*a*, 1056*b* (FIG. 17) can each have the construction of the cam-lock connector 1027, as shown in FIGS. 38-51.

The cam-lock connector 1027 can be used for other applications for detachably connecting a conductive electrical cable to an electronic device other than the battery jump starting and air compressing apparatus according to the present invention.

The cam-lock connector 1027 comprises a male cam-lock end 1027*a* and a female cam-lock end 1027*b* for detachable connecting the battery cables 1056, 1058 (FIG. 16), respectively, to the vehicle battery jump starter 1010.

The male cam-lock end 1027*a* comprises a pin 1027*aa* having a tooth 1027*ab*. The female cam-lock end 1027*b* comprises a receptacle 1027*ba* having a slot 1027*bb* together located in a hex portion 1027*bc*. The receptacle 1027*ba* is configured to accommodate the pin 1027*aa* and tooth 1027*ab* of the male cam-lock end 1027*a*. Specifically, the pin 1027*aa* and tooth 1027*ab* of the male cam-lock end 1027*a* can be inserted (FIG. 39) into the receptacle 1027*ba* and slot 1027*bb* a fixed distance until the tooth 1027*ab* contacts an interior surface of the internal thread of the female cam-lock 1027*b* to be described below. The male cam-lock end 1027*a* can be rotated (e.g. clockwise) to tighten within the female cam-lock end 1027*b* until the end face portion 1027*ac* of the male cam-lock end 1027*a* engages with the end face portion 1027*bc* of the female cam-lock end 1027*b*. The more the cam-lock 1024 is tightened, the better the electrical connection is between the male cam-lock end 1027*a* and the female cam-lock end 1027*b*.

Figure 40:
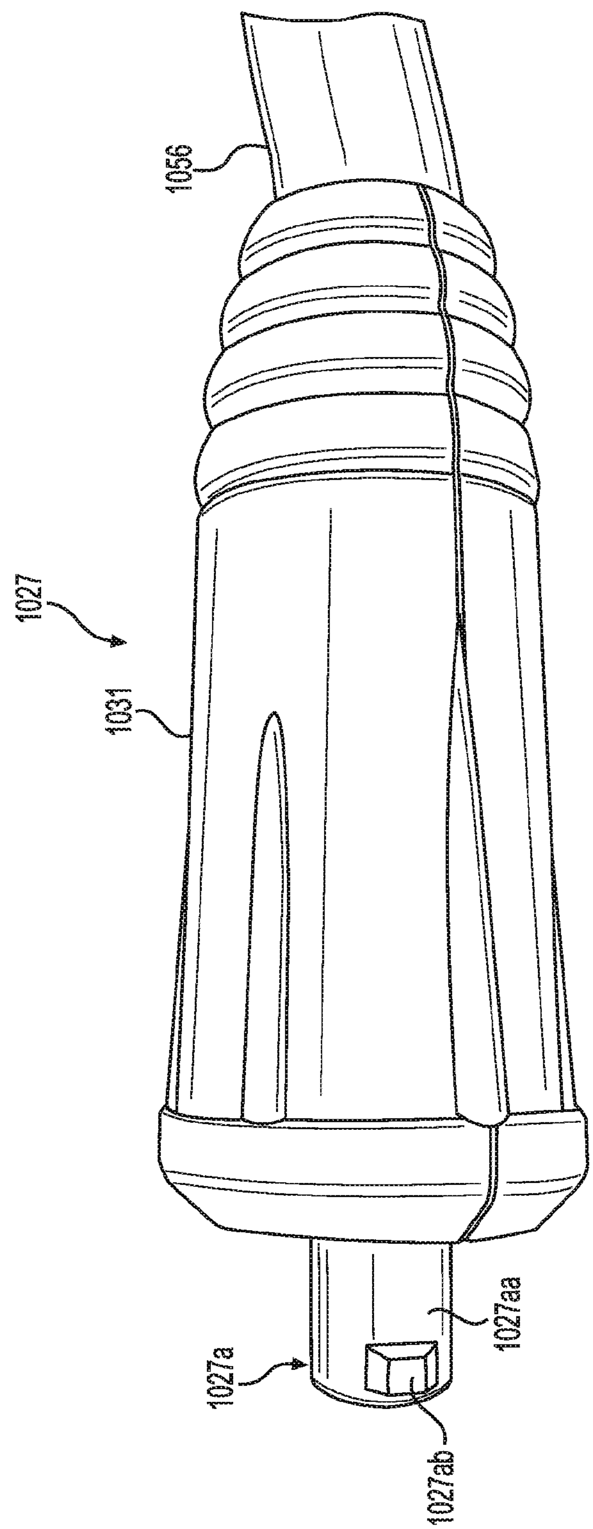
FIG. 40 is a perspective view of the male cam-lock end of the cam-lock connecting device shown in FIG. 38.

The male cam-lock end 1027*a* is fitted with a rubber molded cover 1031, as shown in FIG. 40, to insulate and improve the grip on the male cam-lock end 1027*a*. The highly conductive cable 1033 is electrically and mechanically connected to the male cam-lock end 1027*a*, and is fitted through a passageway in the rubber molded cover 1031.

Figure 41:
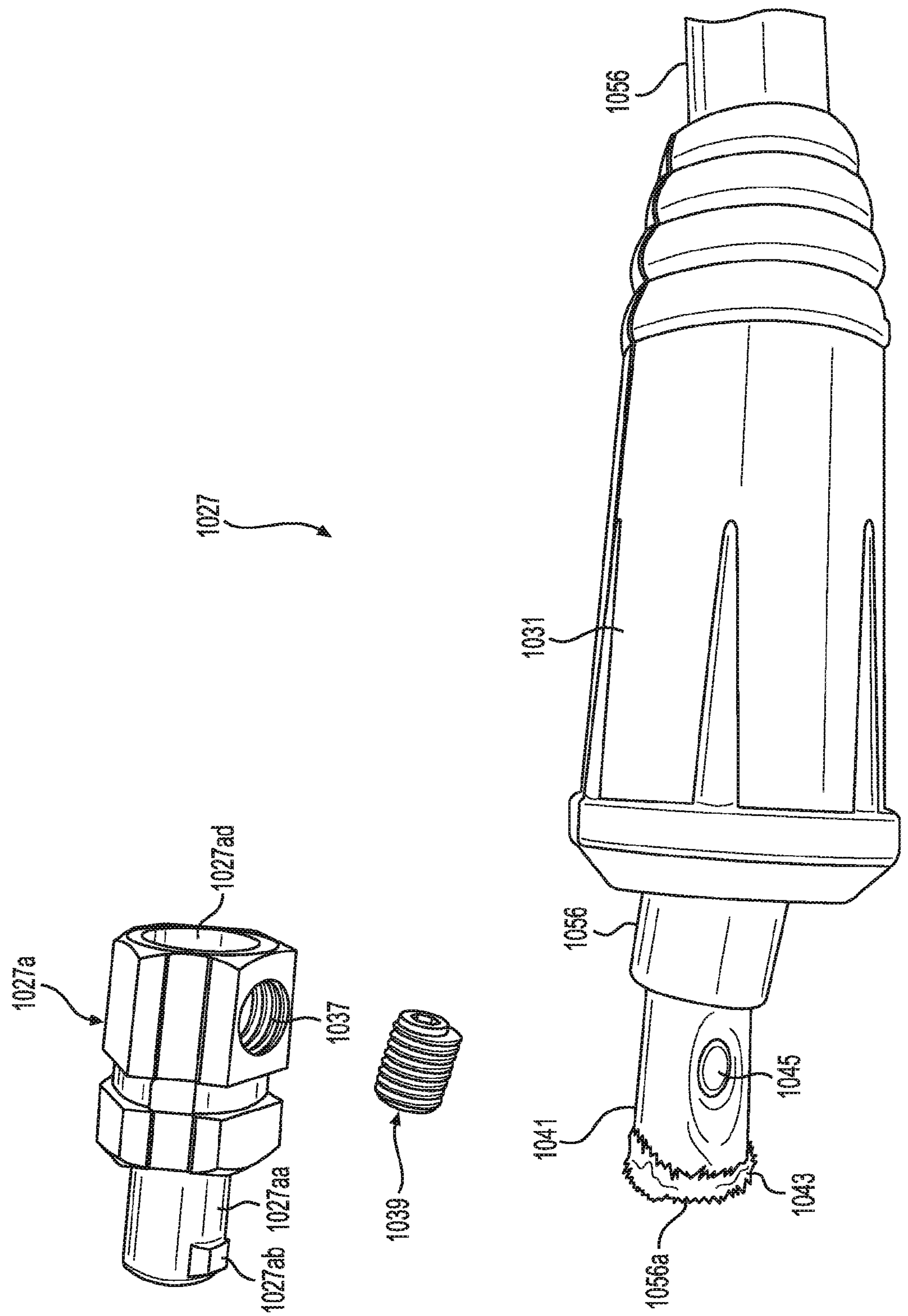
FIG. 41 is a disassembled perspective view of the male cam-lock end of the cam-lock connecting device shown in FIG. 38.

The assembly of the male cam-lock 1027*a* is shown in FIG. 41. The male cam-lock 1027*a* is provided with a thread hole 1037 for accommodating Allen head fastener 1039. The one end of the male cam-lock 1027*a* is provided with a receptacle 1027*ad* for accommodating the copper sleeve 1041 fitted onto the end of the inner conductor 1056*a* of the battery cable 1056. The copper sleeve 1041 is soldered onto the inner conductor 1056*a* using solder 1043.

Figure 42:
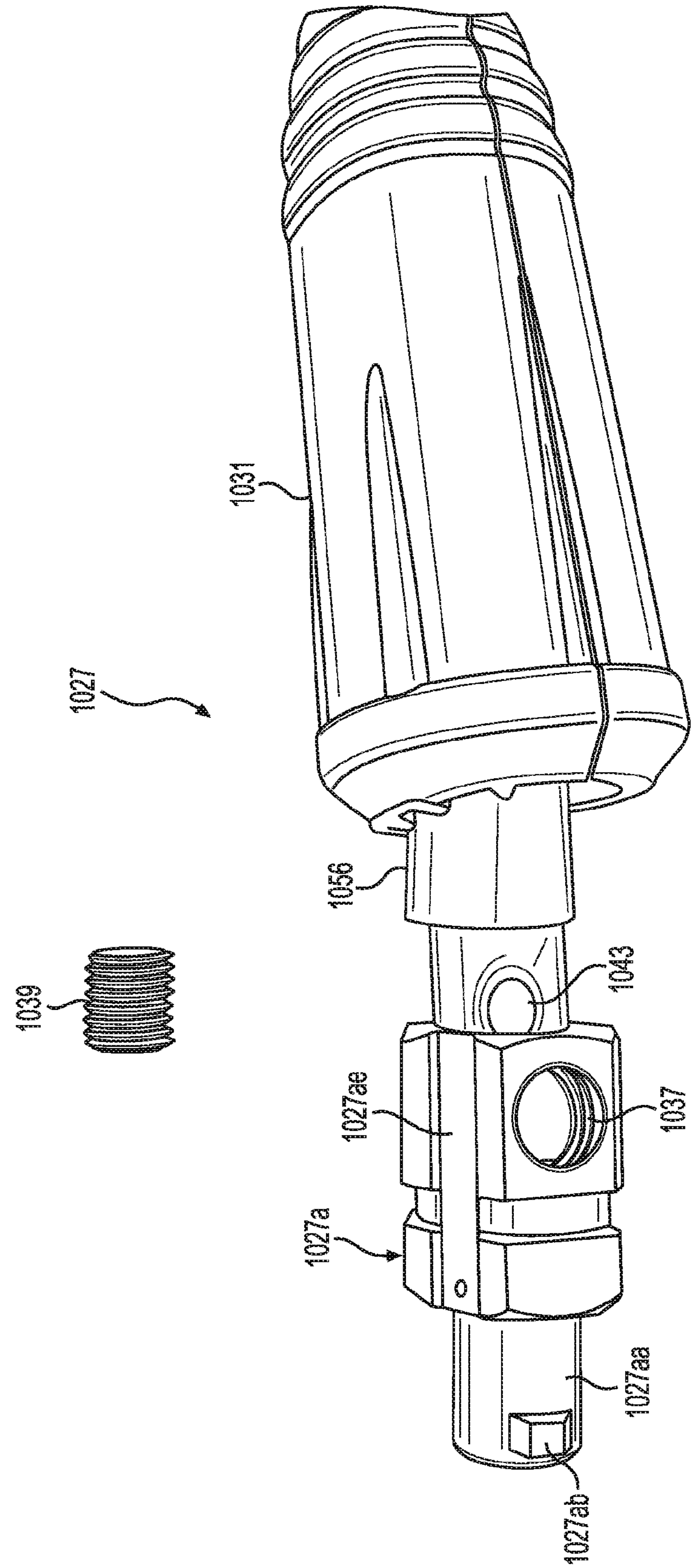
FIG. 42 is a partially assembled perspective view of the male cam-lock end of the cam-lock connecting device shown in FIG. 38.
Figure 43:
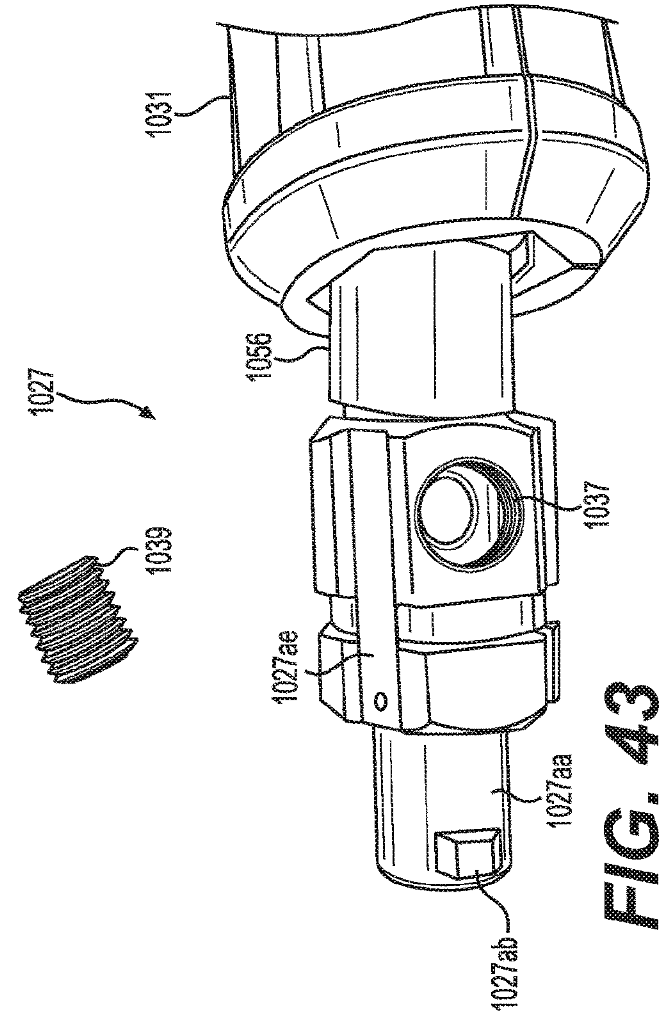
FIG. 43 is a partially assembled perspective view of the male cam-lock end of the cam-lock connecting device shown in FIG. 38.

The copper sleeve 1041 is fitted into the receptacle 1027*ad* of the male cam-lock end 1027*a*, as shown in FIG. 42. When the copper sleeve 1041 is fully inserted into the receptacle 1027 of the male cam-lock end 1027*a*, as shown in FIG. 42, then the Allen head fastener is threaded into the threaded hole 1037 and tightened, as shown in FIG. 43.

Figure 44:
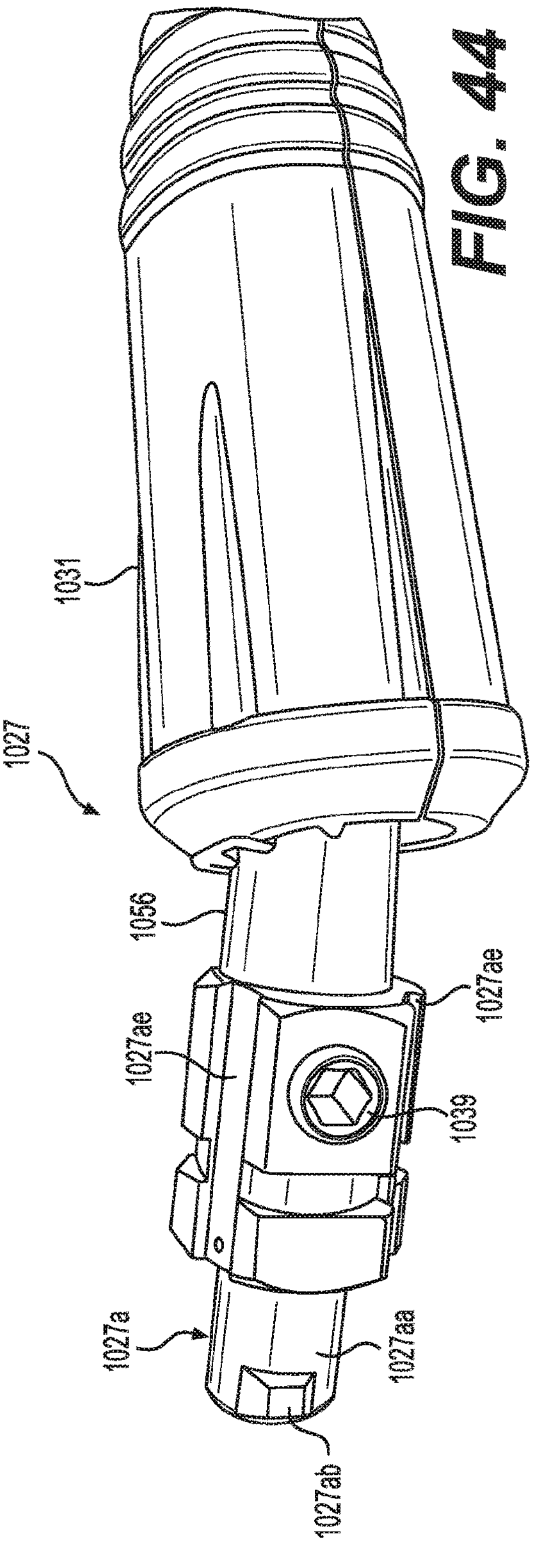
FIG. 44 is a fully assembled perspective view of the male cam-lock end of the cam-lock connecting device shown in FIG. 38.
Figure 45:
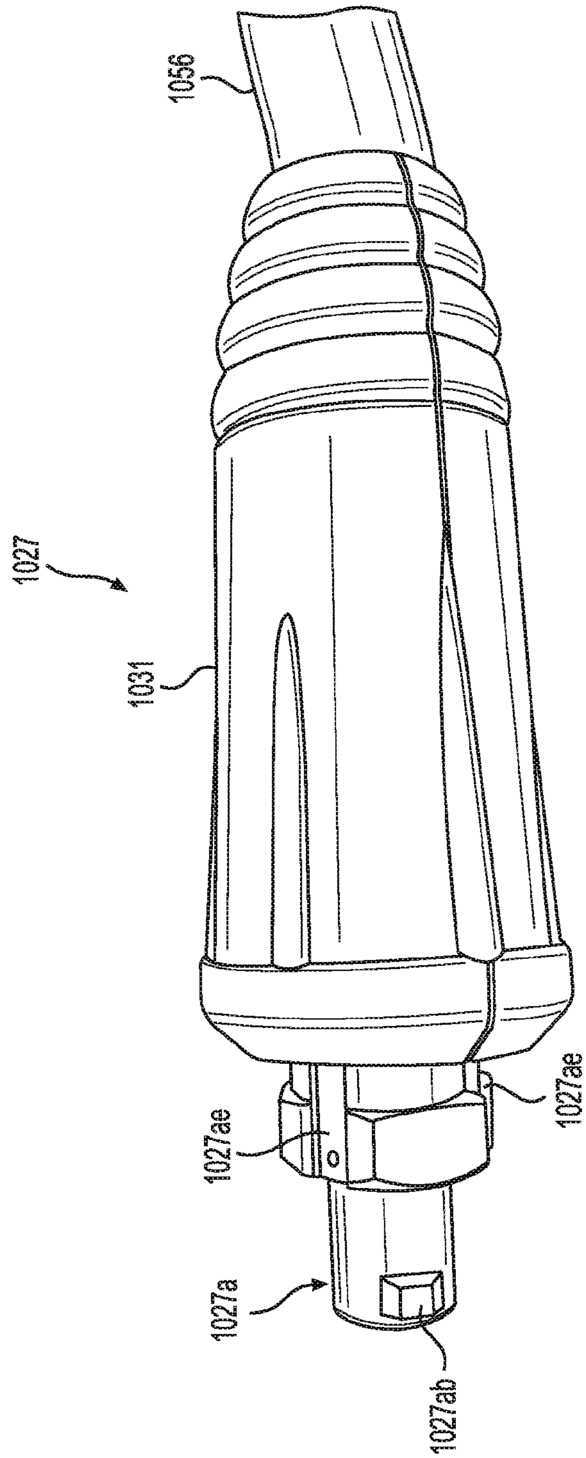
FIG. 45 is a partially assembled perspective view of the male cam-lock end of the cam-lock connecting device shown in FIG. 38.

It is noted that the inner end of the Allen head fastener makes an indent 1045 when sufficiently tightened to firmly anchor the copper sleeve 1041 and inner conductor 1056*a* of the battery cable 1056 to mechanically and electrically connect the cable 1056 to the male cam-lock end 1027*a*. The rubber molded cover 1031 is provided with one or more inwardly extending protrusions 1031*a* (FIG. 32) cooperating with one or more slots 1027*ae* in an outer surface of the male cam-lock end 1027*a* (FIG. 44).

Again, the male cam-lock end 1027*a* and the female cam-lock end 1027*b* are configured so as to tighten together when rotating the male cam-lock end 1027*a* when inserted within the female cam-lock end 1027*b*.

Figure 46:
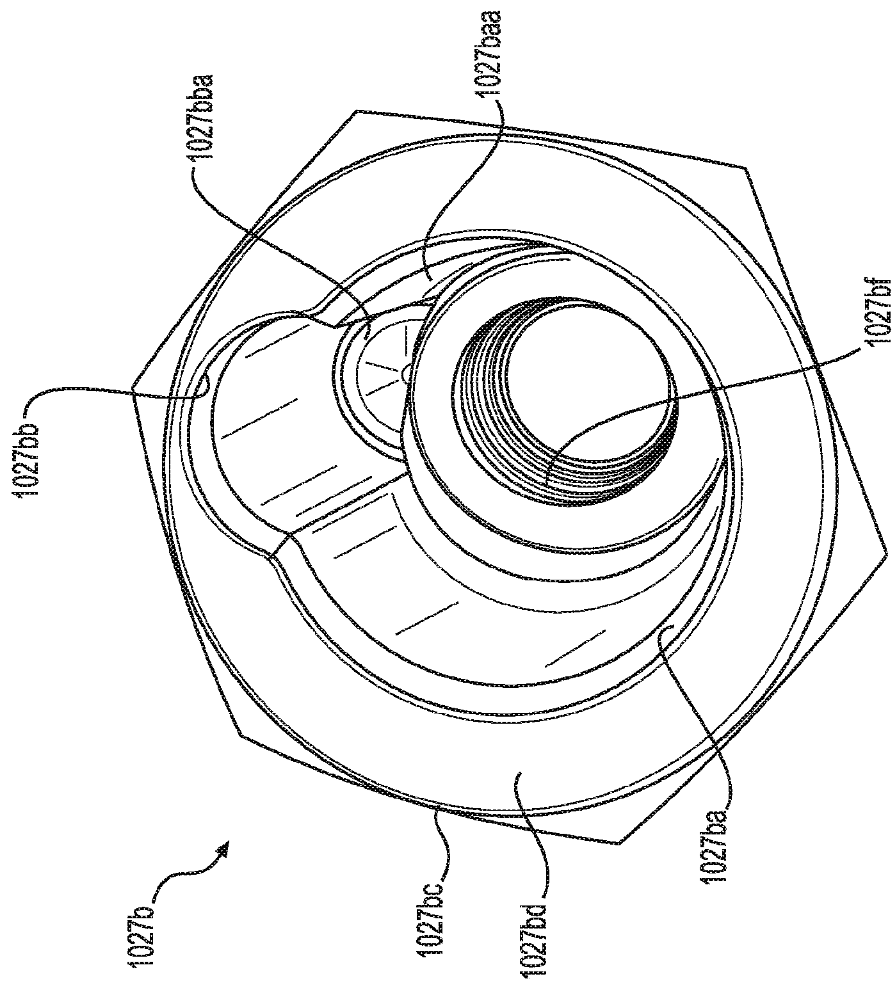
FIG. 46 is a disassembled perspective end view of the female cam-lock end of the cam-lock connecting device shown in FIG. 38.

The female cam-lock end 1027*b*, as shown in FIG. 46, is provided with the receptacle 1027*ba* and slot 1027*bb* for accommodating the end of the male cam-lock end 1027*a*. The slot 1027*bb* is provided with a surface 1027*bba* serving as a stop for the tooth 1027*ab* of the male cam-lock end 1027*a*. The receptacle 1027*ba* is provided with inner threading 1027*baa* for cooperating with the tooth 1027*ab* of the male cam-lock end 1027*a* to provide a threaded connection therebetween. Specifically, the tooth 1027*ab* engages with the surface 1027*bba* and is stopped from being further inserted into the receptacle 1027*ba* of the female cam-lock end 1027*b*. When the male cam-lock end 1027*a* is rotated, the tooth 1027*ab* engages and cooperates with the inner threading 1027*baa* of the receptacle 1027*ba* of the female cam-lock end 1027*b* to begin tightening the male cam-lock end 1027*a* within the female cam-lock end 1027*b* with the tooth 1027*ab* riding against an edge of the inner thread 1027*baa*. The male cam-lock end 1027*a* is further rotated to further tighten the connection with the female cam-lock end 1027*b*. When the face 1027*ac* (FIG. 38) of the male cam-lock end 1027*a* engages with the face 1027*bd* of the female cam-lock end 1027*b*, then the cam-locks ends 1027*a*, 1027*b* are fully engage and rotation is stopped.

The female cam-lock end 1027*b* is accommodated with a rubber molded cover 1051 having cover portions 1051*a*, 1051*b*, as shown in FIGS. 48-51. The female cam-lock end 1027*b* (FIGS. 46 and 47) is provided with inner threading 1027*bf* (FIG. 46) to accommodate the bolt 1047 and lock washer 1049 (FIG. 47) for connecting the female cam-lock end 1027*b* to the battery jump starting and air compressing apparatus 1010 (e.g. connects to base plate for smart switch 1050 (FIG. 15)).

Figure 47:
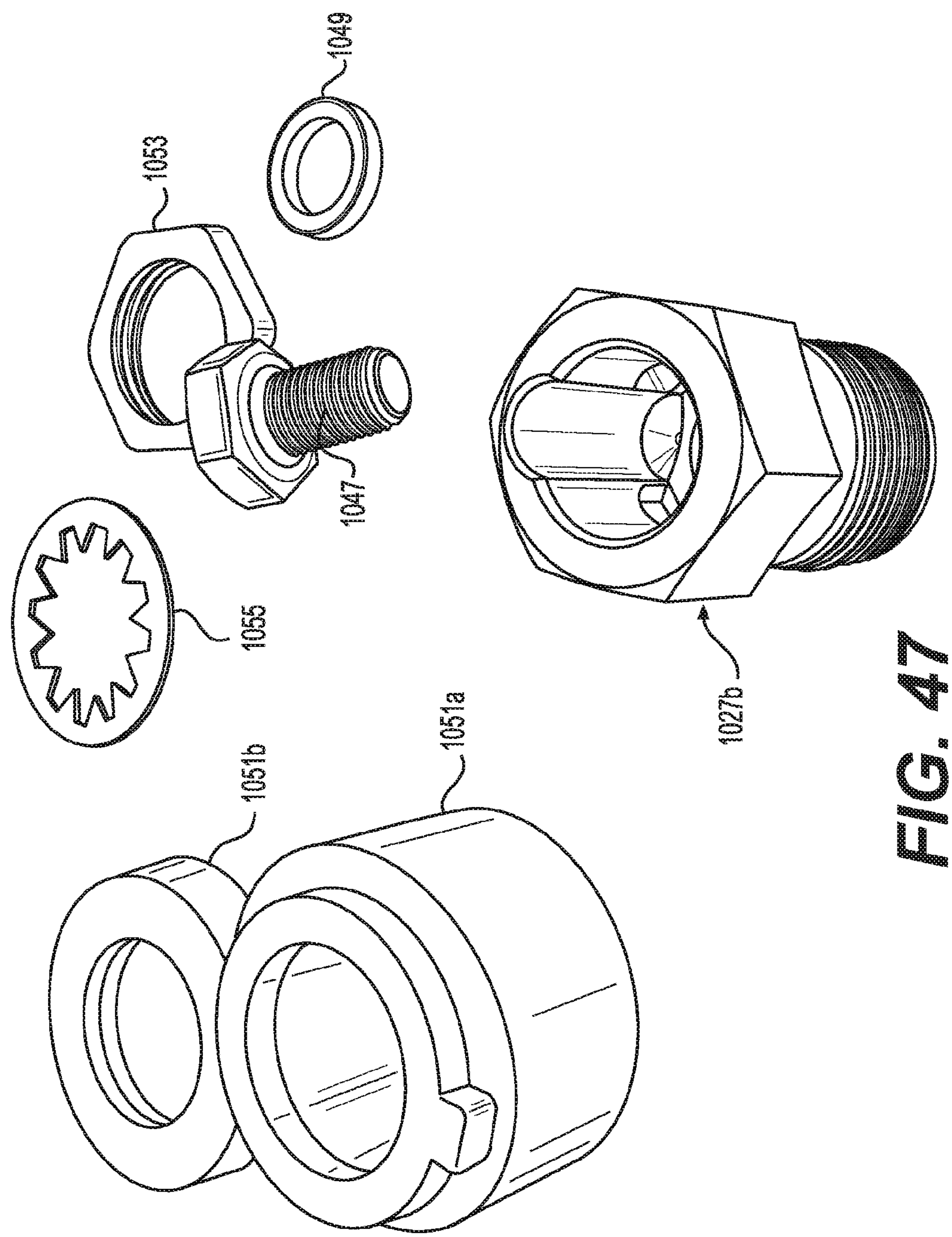
FIG. 47 is a disassembled perspective end view of the female cam-lock end of the cam-lock connecting device shown in FIG. 38.
Figure 48:
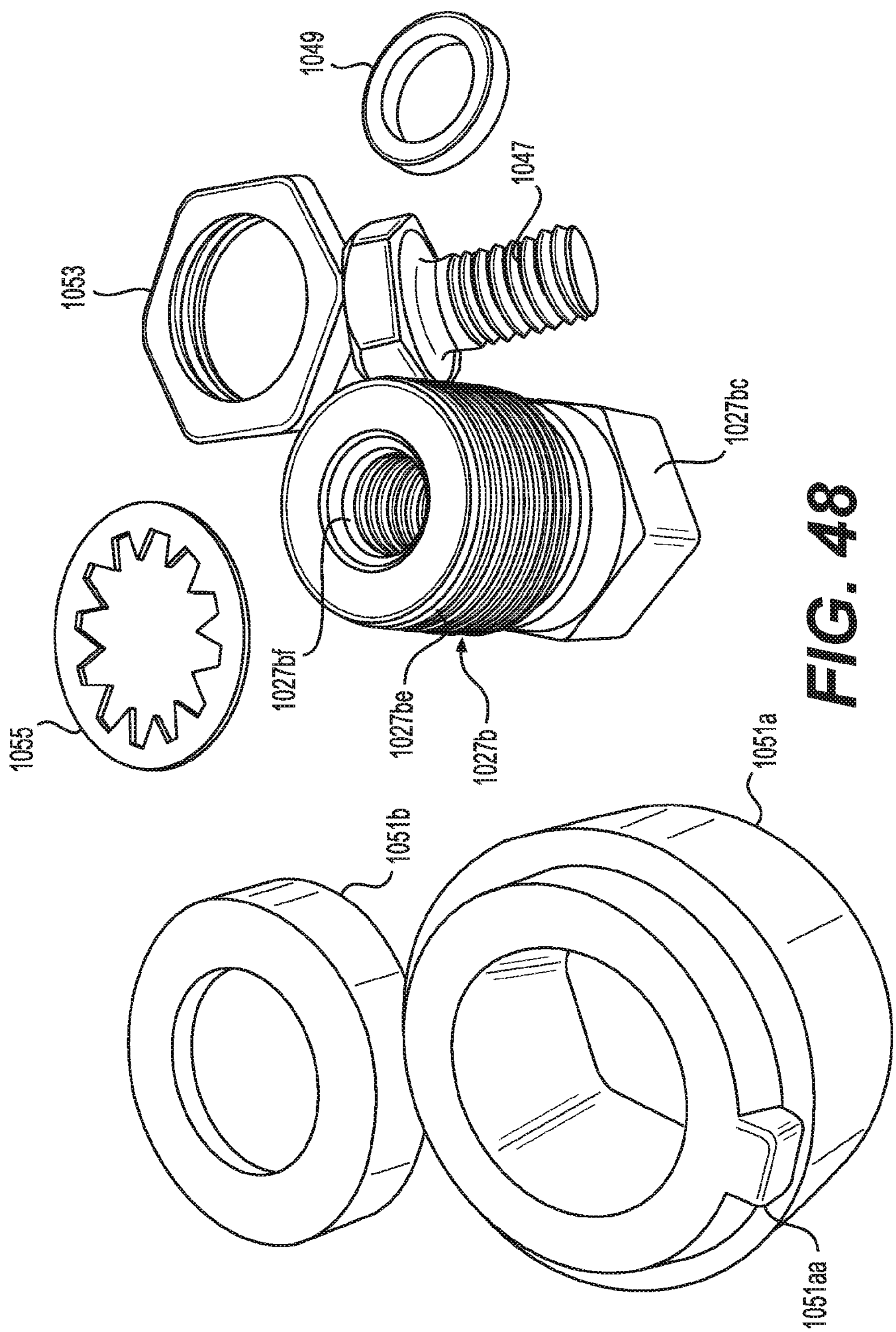
FIG. 48 is a disassembled perspective end view of the female cam-lock end of the cam-lock connecting device shown in FIG. 38.
Figure 49:
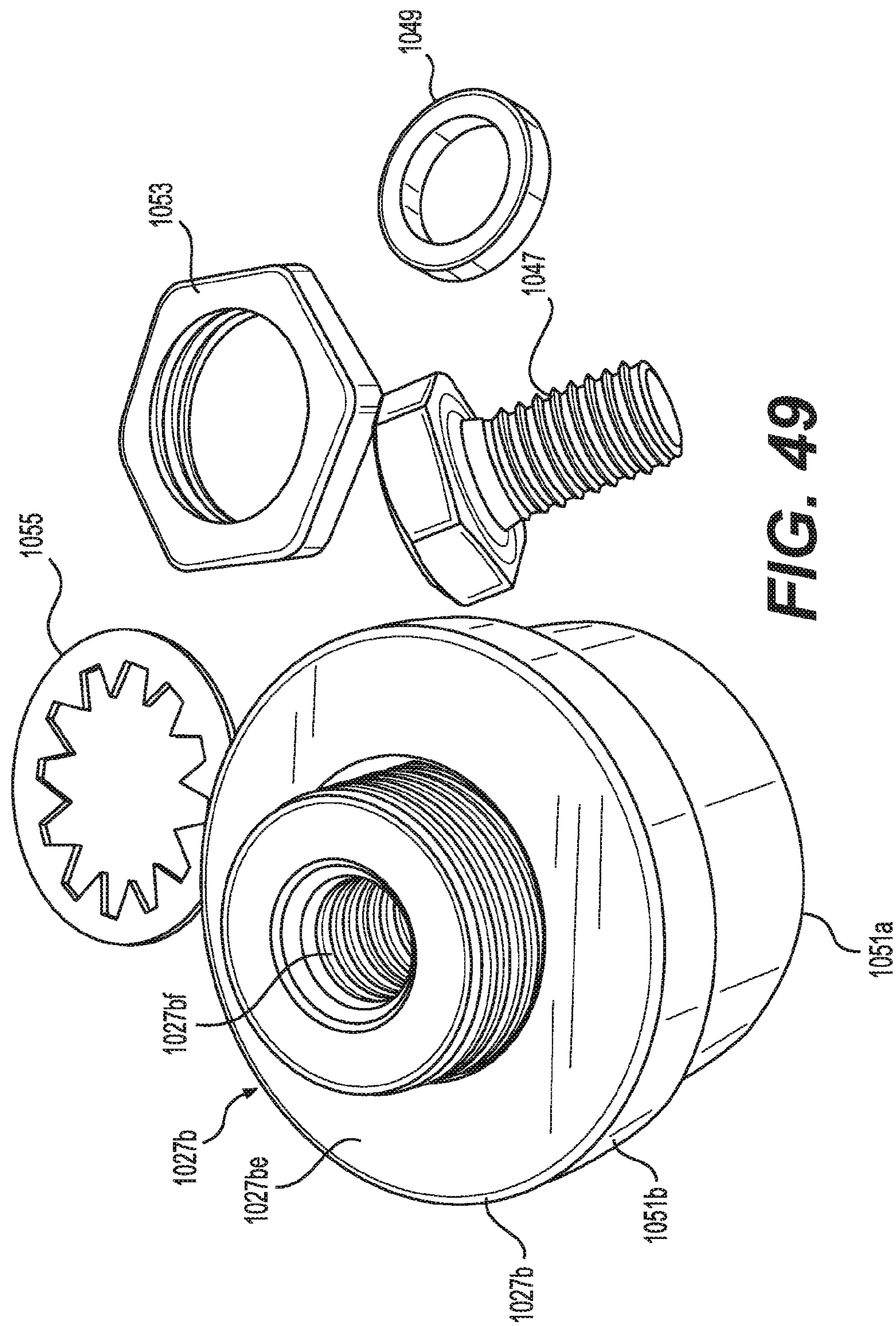
FIG. 49 is a partially assembled perspective end view of the female cam-lock end of the cam-lock connecting device shown in FIG. 38.
Figure 50:
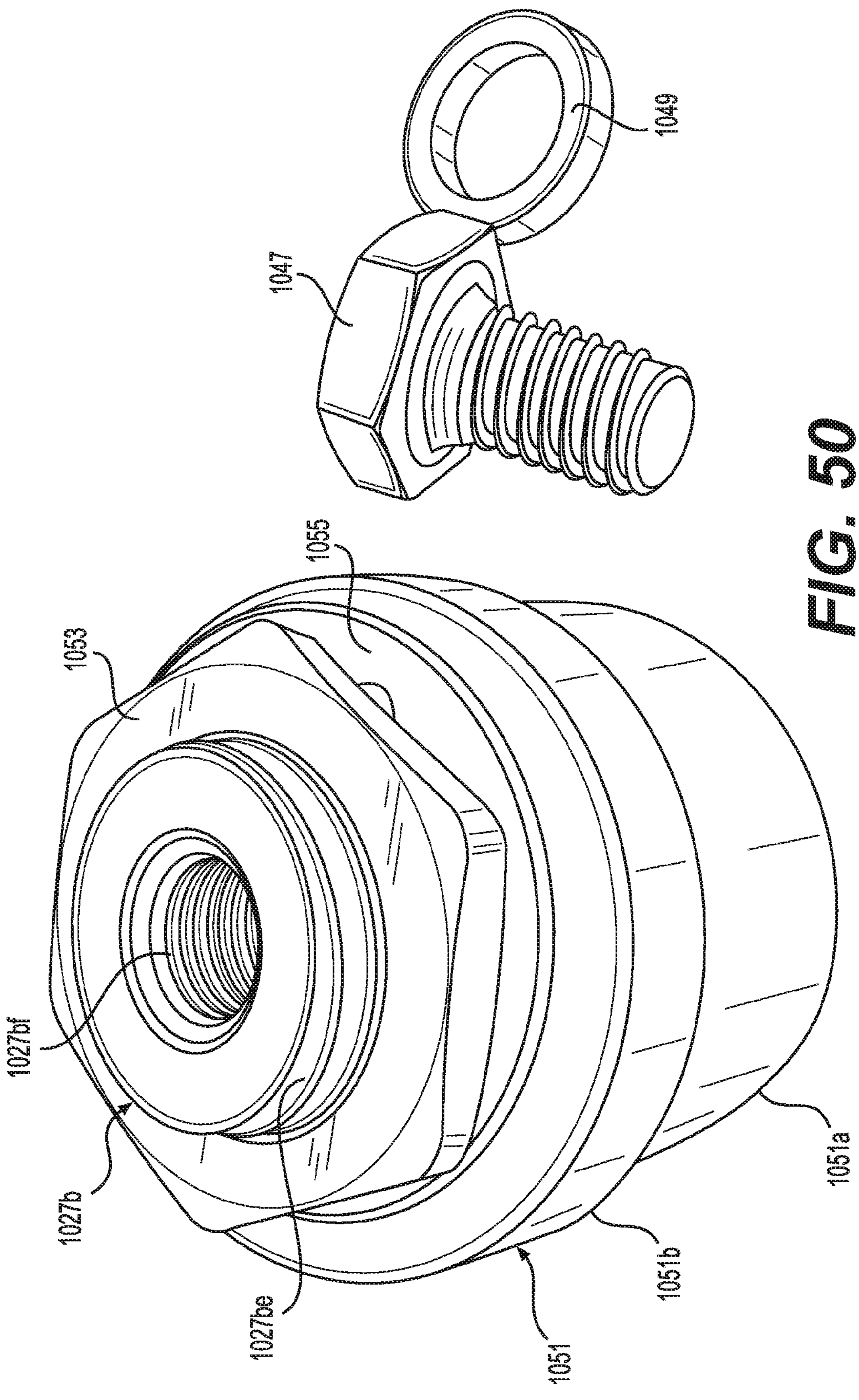
FIG. 50 is an assembled perspective end view of the female cam-lock end of the cam-lock connecting device shown in FIG. 38.
Figure 51:
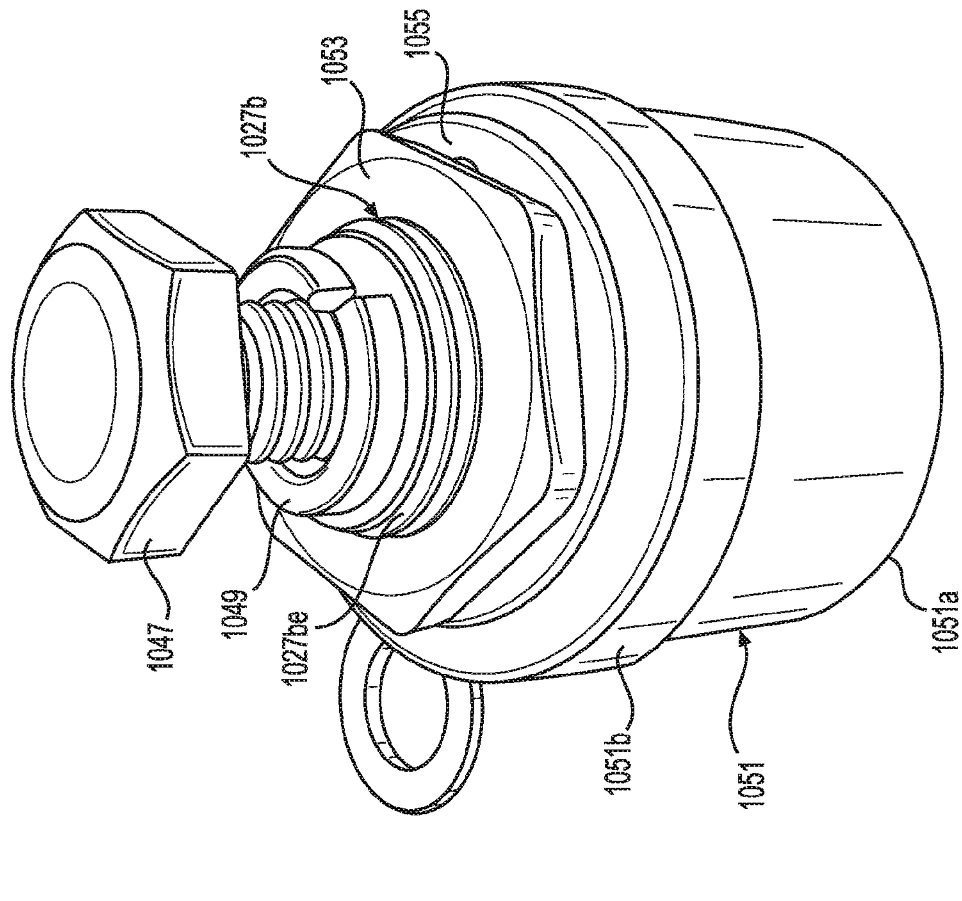
FIG. 51 is an assembled perspective end view of the female cam-lock end of the cam-lock connecting device shown in FIG. 38 along with a bolt for connecting to conductor such as a highly conductive frame of the vehicle battery jump starter according to the present invention.
Figure 52:
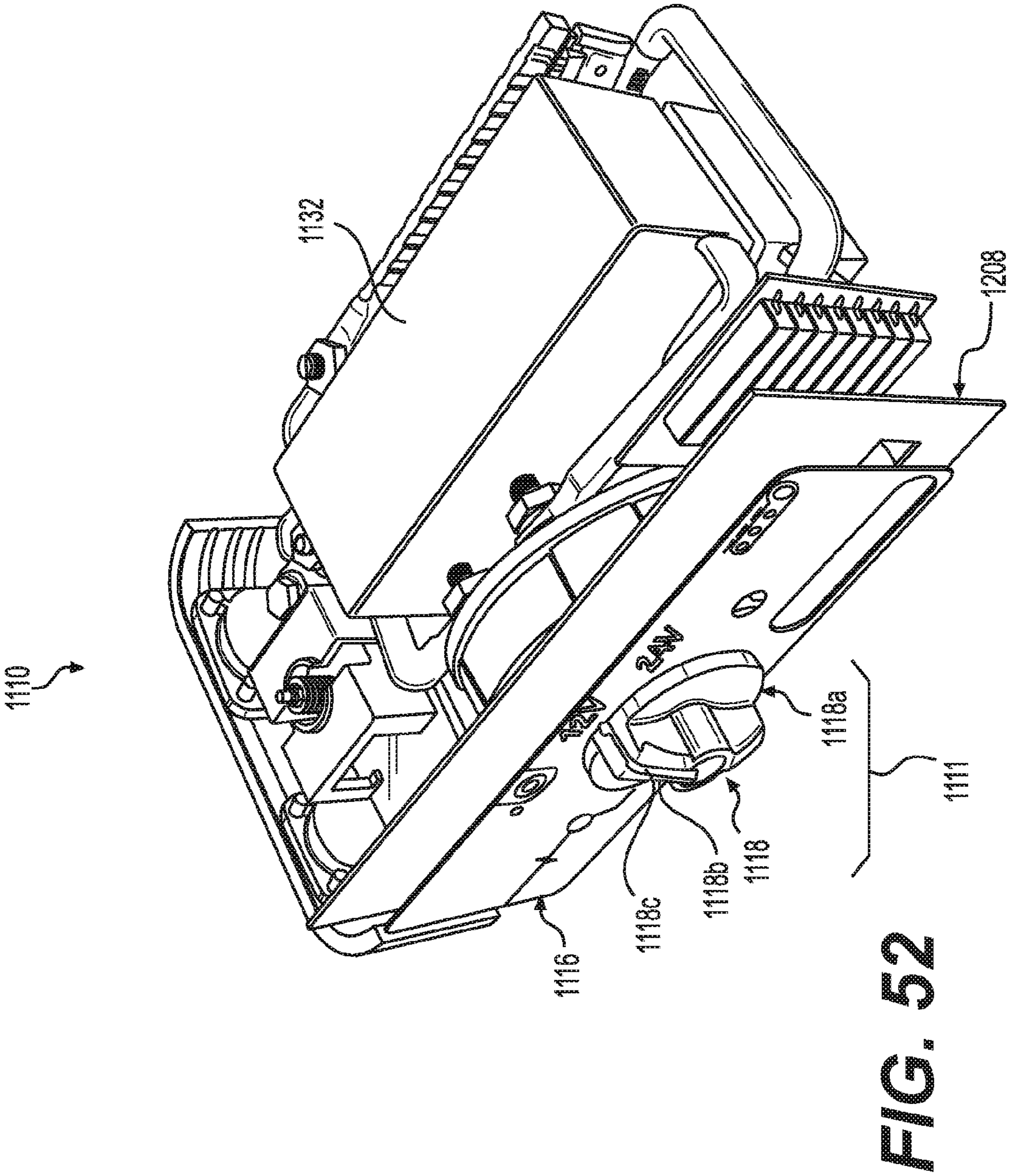
FIG. 52 is a front perspective view of the portable vehicle battery jump starter shown in FIG. 7 with the cover removed showing the master control switch and interface backlight system according to the present invention.
Figure 54:
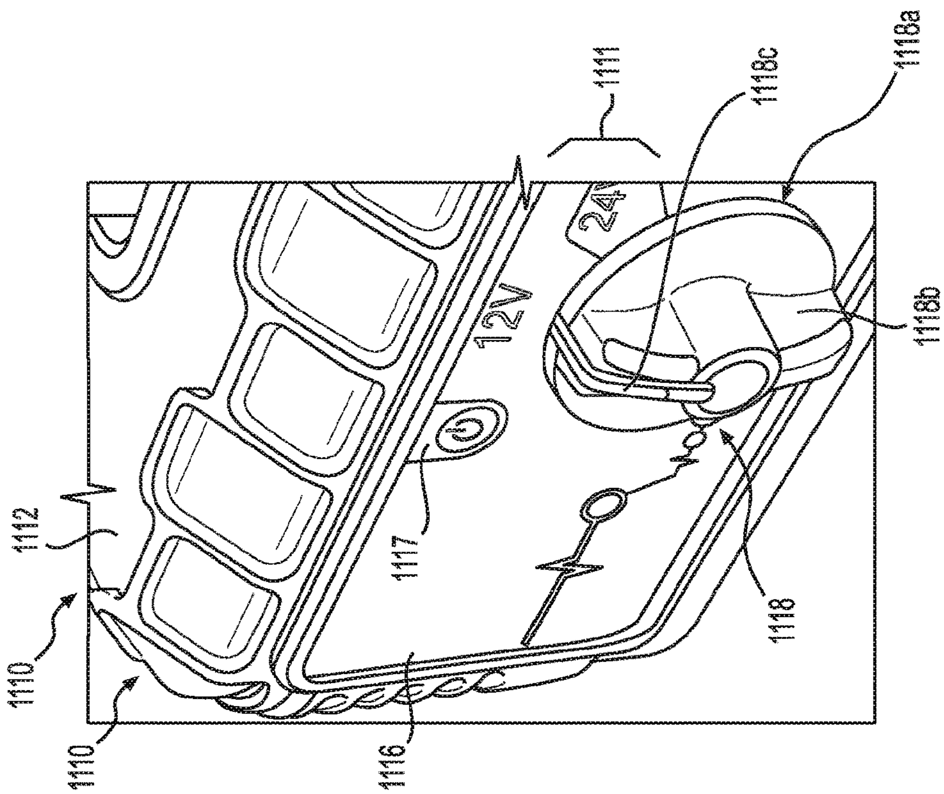
FIG. 54 is a partial front perspective view of the portable vehicle battery jump starter shown in FIG. 7 with the backlight of the control knob of the control switch for 12V turned "off."
Figure 53:
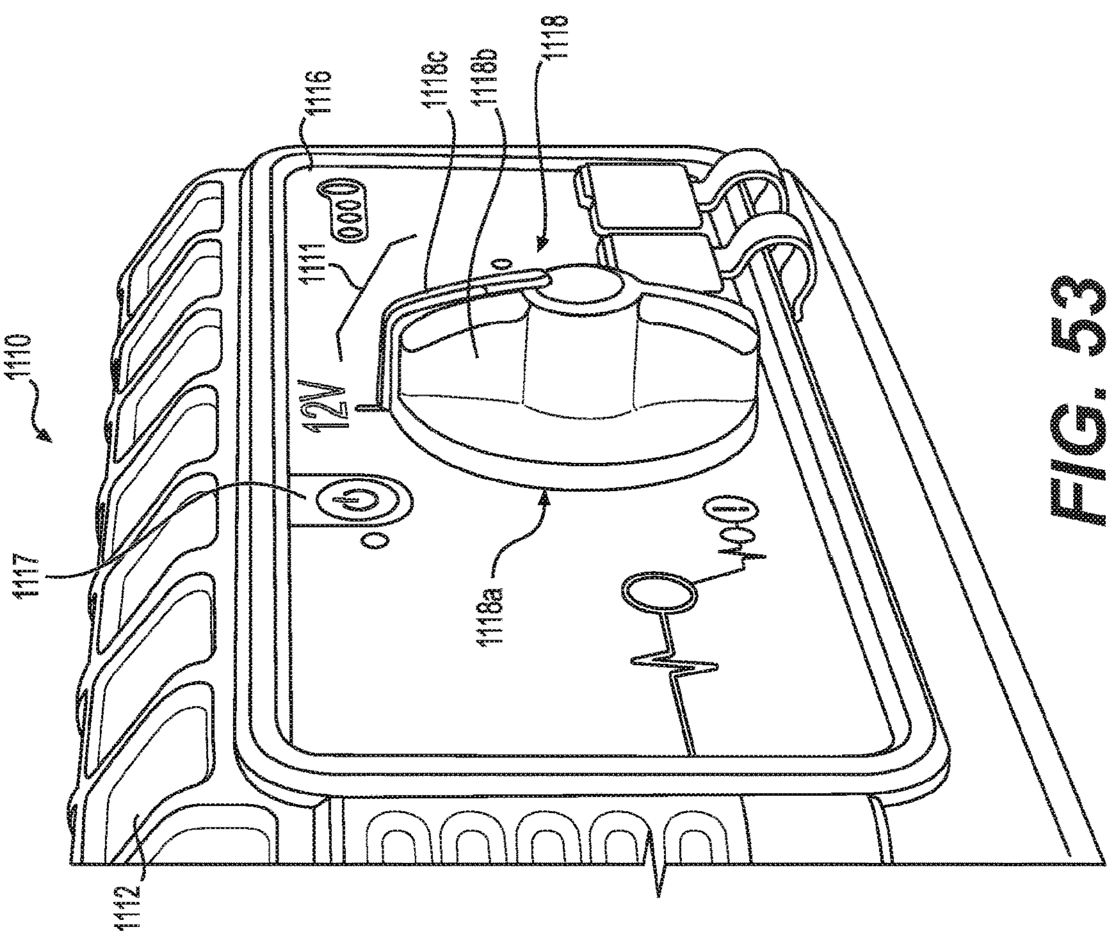
FIG. 53 is a partial front perspective view of the portable vehicle battery jump starter shown in FIG. 7 with the backlight of the control knob of the control switch for 12V turned "on."

The female cam-lock end 1027*b* is accommodated within the molded rubber cover portions 1051*a*, 1051*b*, as shown in FIGS. 47-49. The molded rubber cover portions 1051*a*, 1051*b* are fitted onto the threaded portion 1027*be* of the female cam-lock end 1027*b* (FIG. 51), and then secured in place using nut 1053 and lock washer 1055. The molded rubber cover portion 1051*a* includes an outwardly extending protrusion 1051*aa*.

Electrical Control Switch Backlight System

The vehicle battery jump charger 1010 or 1110 can be provided with an electrical control switch backlight system 1200, for example, as shown in FIGS. 52-56.

The electrical control switch backlight system 200, for example, comprises control switch 1018 having the control knob 1018*a*, the interface 1016 (e.g. membrane label), and the main printed circuit board 1208.

The control knob 1018*a* is made of plastic (e.g. injection molded plastic part). For example, the control knob 1018*a* is mainly made of a colored opaque plastic material selected to prevent the transmission of light therethrough provided with a clear plastic slot 1018*b* molded therein (e.g. insert molded). The clear plastic slot 1018*b* serves as a light window to allow light from one or more backlight LEDs mounted on the printed circuit board 1208 to pass through the interface 1016 and the light window when the power button 1017 of the interface 1016 is turned on (e.g. touch power switch) lighting the one or more LEDs. Alternatively, the clear plastic slot 1018*b* can be replaced with an open slot in the control knob 1018*b* serving as the light window.

The control switch 1018 is rotatable between a first position (Position 1) for a 12V mode of operation of the battery jump starting and air compressing apparatus 1010 and a second position (Position 2) for a 24V mode of operation of the battery jump starting and air compressing apparatus 1010. The power is shown "on" in FIG. 53 and "off" in FIG. 54.

Figure 55:
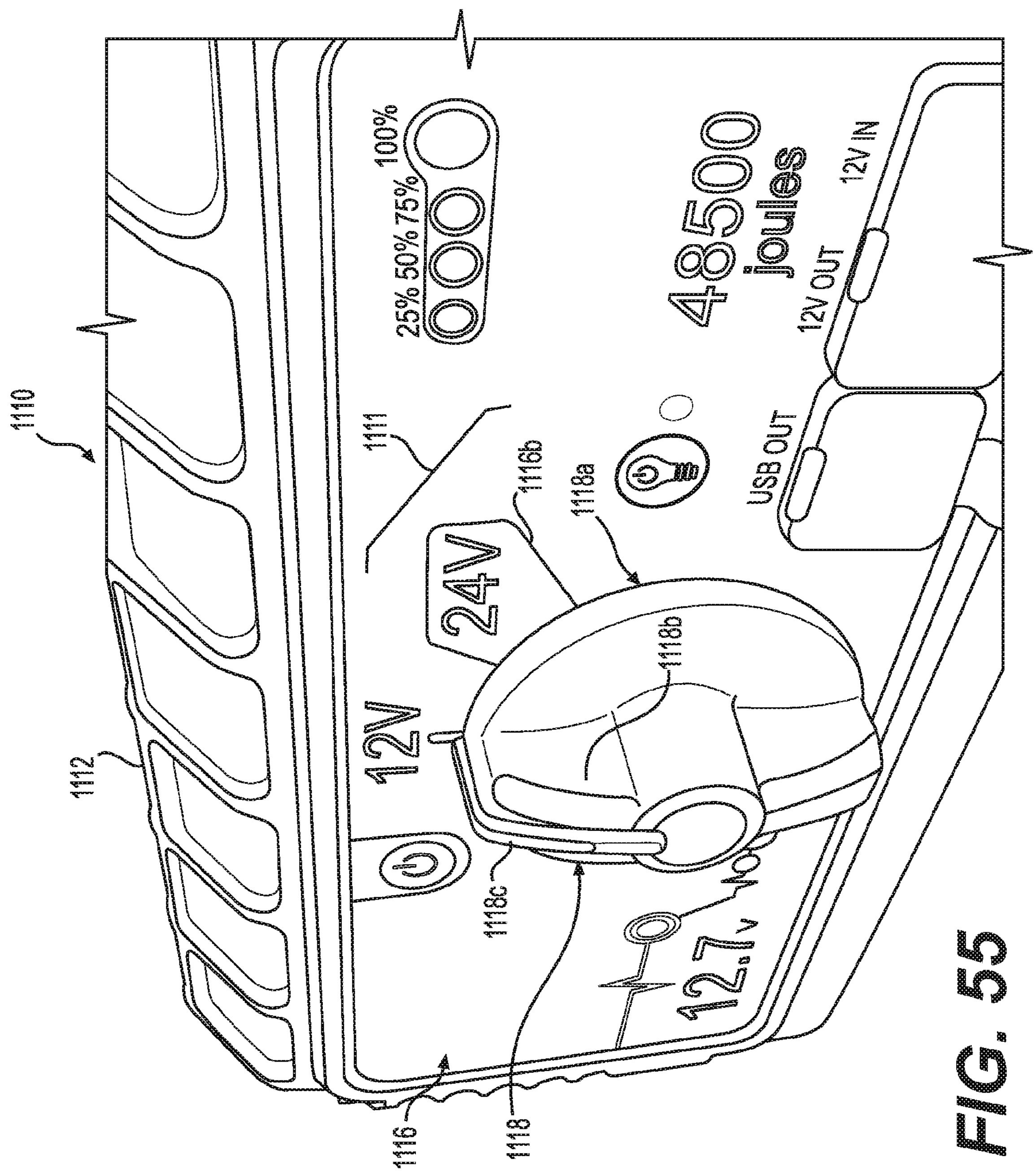
FIG. 55 is a partial front perspective view of the portable vehicle battery jump starter shown in FIG. 7 with the backlight of the control knob of the control switch for 12V turned "on", the backlight indicator for 12V on the interface turned "on", the variable backlight indicator on the indicator showing 12.7V turned "on", and the backlight for power "on."

The interface 1016 is provided with a 12V backlight indicator 1016*a*, a 24V backlight indicator 1016*b*, a 12V backlight indicator 1016*c*, a 24V backlight indicator 1016*d*, a variable display backlight indicator 1016*e* for indicating the actual operating voltage of the battery jump charging device 1010, and a power "on" indicator 1016*f*, as shown in FIG. 55.

Figure 56:
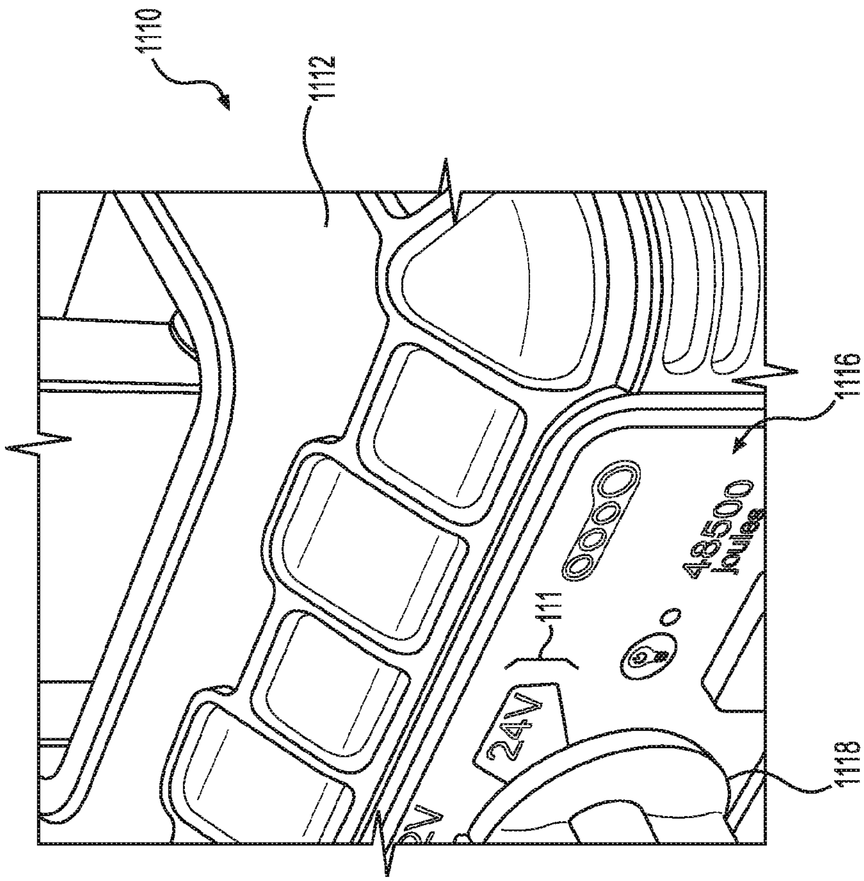
FIG. 56 is a partial front perspective view of the portable battery jump starter shown in FIG. 7 with the backlight of the control knob of the control switch for 24V turned "on."

The electrical control switch backlight system 1200 can be configured to turn on white LEDs mounted on the printed circuit board 1208 when the control switch 1018 is located at Position 1 for the 12V mode of operation of the battery jump starting and air compressing apparatus 1010, and turn on blue LEDs mounted on the printed circuit board 1208 when the control switch 1018 is located at Position 2 for the 24V mode of operation of the battery jump starting and air compressing apparatus 1010. As show in FIG. 53, the light window provided by slot 1018*b* on the control knob 1018 lights up along with 12V backlight indicators 1016*a*, 1016*c* on the interface 1016 when the control knob 1018*a* is in Position 1. As shown in FIG. 56, the 24V backlight indicator 1016*b* lights up along with the 24V backlight indicator 1016*d* when the control knob 1018*b* is in Position 2.

Electrical Optical Position Sensing Switch System

Figure 57:
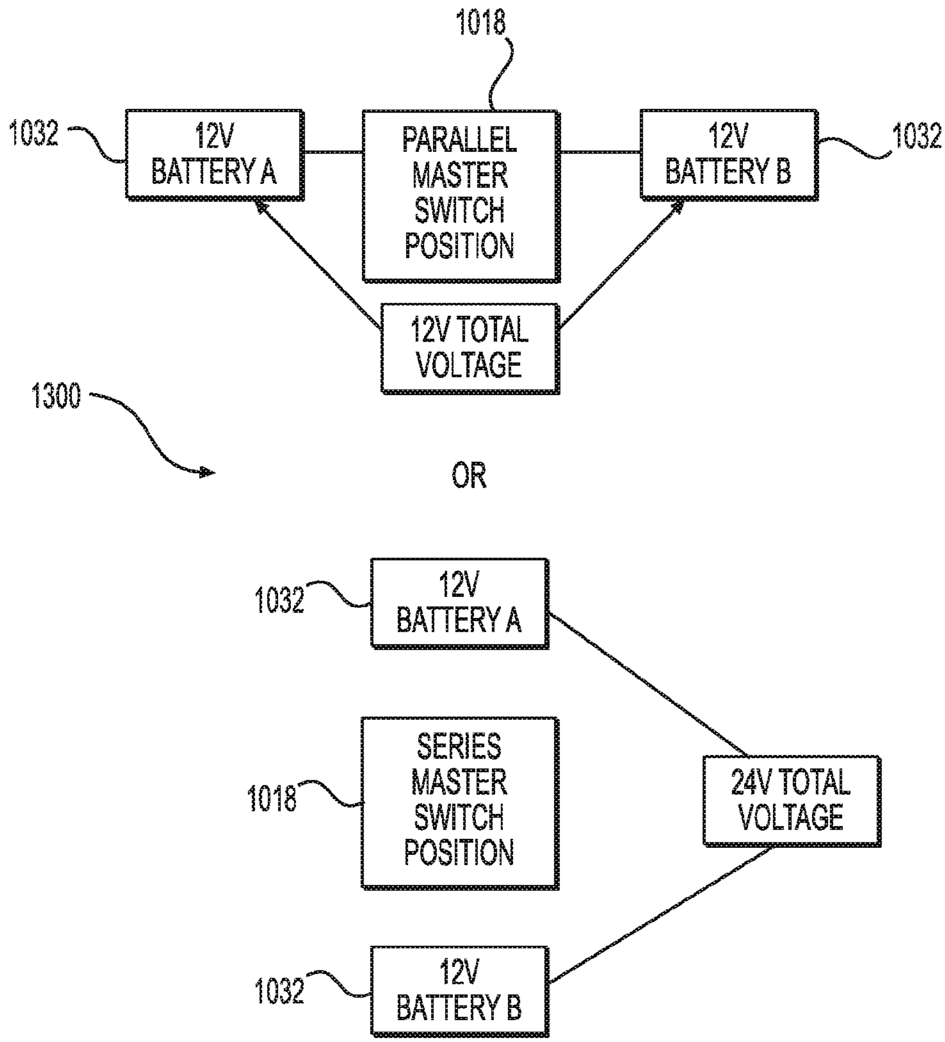
FIG. 57 is a block diagram showing the 12V or 24V portable battery jump starter operational modes.

The portable jump starting and air compressing device 1010 or 1110, for example, can be configured as a dual purpose Li-ion jump starter to allow for jump starting either a 12V or 24V heavy duty vehicle or piece of equipment. This lightweight portable unit utilizes the manual rotary control switch 1018 with the control knob 1018*a* for switching between 12V or 24V jump starting or operational modes. Any of the above described portable jump starting devices according to the present invention can be provided with the electrical optical position sensing system 1300, as shown in FIGS. 57-59.

The portable jump starting device 1010 uses two 12V Li-ion batteries that are connected in parallel for 12V jumpstarting and in series for 24V jump starting. The series or parallel connections are accomplished with the rotary control switch 1018 (e.g. Master Switch), as shown in FIG. 57.

Figure 58:
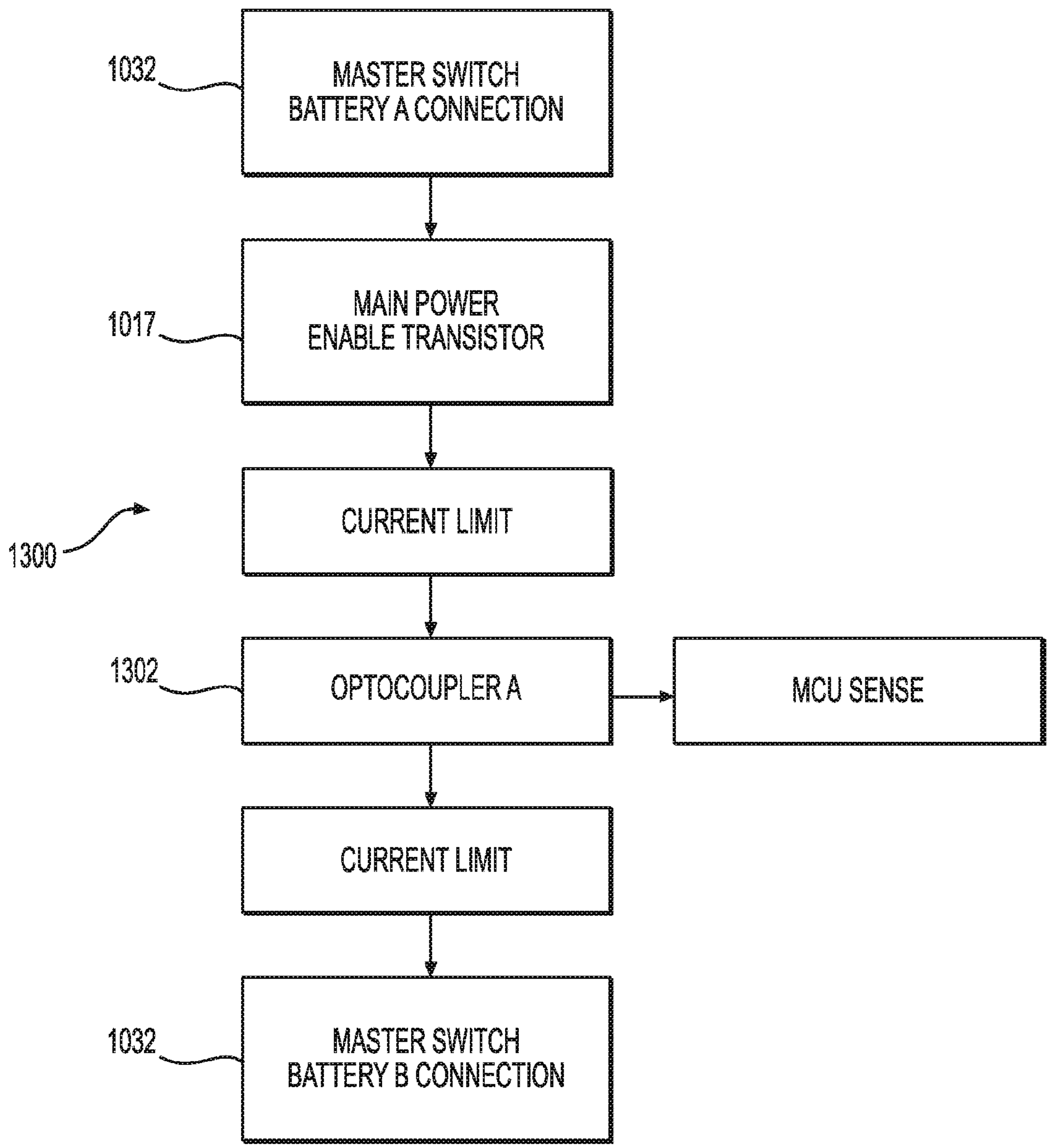
FIG. 58 is a block diagram showing the electrical optical position sensing system according to the present invention.

The electrical optical position sensing system 1300 is shown in FIG. 58. The optical position sensing system 1300 is configured to allow for a safe and effective method for the system microcontroller to read the position of the control switch 1018. The optical position sensing system 1300 comprises a sensor 1302 (FIG. 58) using optical coupling to insure the integrity of isolation on the 12V to 24V rotary control switch 1018.

Figure 59:
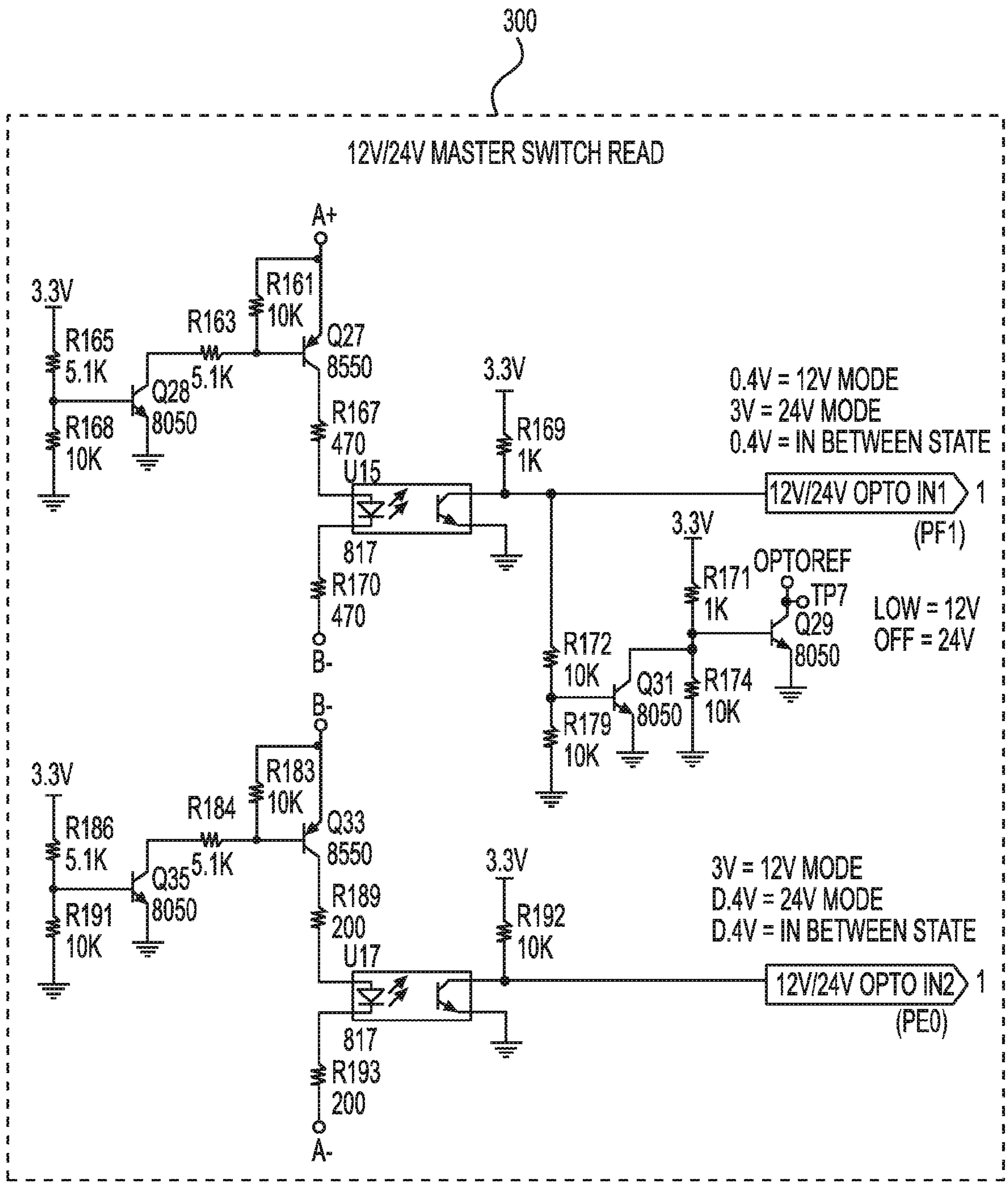
FIG. 59 is an electrical schematic diagram of the 12V/24V master switch read.

A schematic of the circuit of the optical position sensing system1300 is shown in FIG. 59. The top left portion of the schematic includes transistor Q28 and resistors R165, R168, R161 and R163. This circuit acts as an electrical enable when the main system 3.3V power is turned "on." The purpose of this enable is to reduce parasite current when the portable jump starting device 10 is in the "off" state. When "on", this enables current from battery A+ to flow through Q27, which acts as an electrical switch.

If Q27 is "on", it allows current to flow from Battery A+ to Battery B− when the batteries are connected in parallel. When they are connected in series, no current flows because A+ and B− are connected together through the control switch 1018.

The result of current flow or lack thereof, allows the optical coupler to provide a signal to the microcontroller telling it which position the Master Switch is in.

The second portion of the schematic (i.e. schematic located just below the first schematic), allows the opposite signal to be provided to a separate input of the microcontroller. The result of this is to provide the microcontroller an effective method of determining when the switch is "In Between" meaning it is not in 12V position or 24V position and is in between those two positions. This allows the microcontroller to provide diagnostics in case a user leaves the switch in an unusable position.

Dual Battery Diode Bridge

Figure 60:
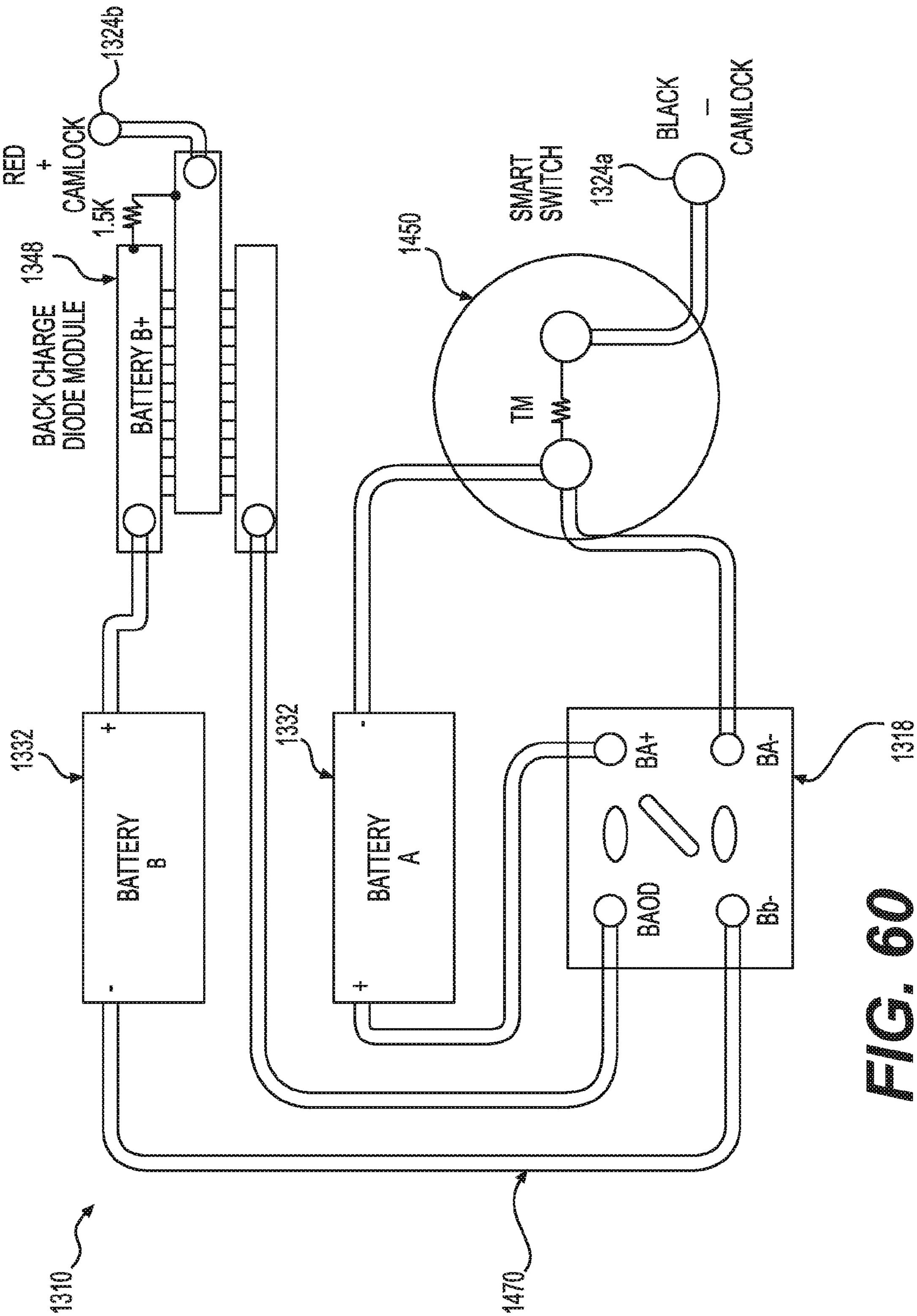
FIG. 60 is a diagrammatic view showing a single connection or dual connection arrangement of the battery jump starter shown in FIG. 7.

The vehicle battery jump starter 1010 or 1110, for example, can be provided with a dual diode battery bridge, for example, in the form of a back-charge diode module 1148 configured for protecting against back-charge after a vehicle battery has been jump charged, as shown in FIG. 60.

The back-charge diode module 1148 is configured to provide two (2) channels 1148*a*, 1148*b* of diodes to support the two (2) battery system (e.g. two batteries of jump starting device 1110) and are bridged together to provide peak current output during jump starts.

The single wiring connection and dual wiring connections of vehicle battery jump starter 1110 is shown in FIG. 60. The components are connected together by the highly conductive rigid frame 1170, including copper bar member 1152. The copper bar members making up the highly conductive rigid frame 1170 are more conductive than 2/0 copper cable. Further, the connection points between copper bar members of the highly conductive rigid frame 1170 are configured to reduce power losses compared to copper cable. The copper bar members of the highly conductive rigid frame 1170 can be replaced with other highly conductive metals (e.g. aluminum, nickel, plated metal, silver plated metal, gold plated metal, stainless steel, and other suitable highly conductive metal alloys).

Figure 61:
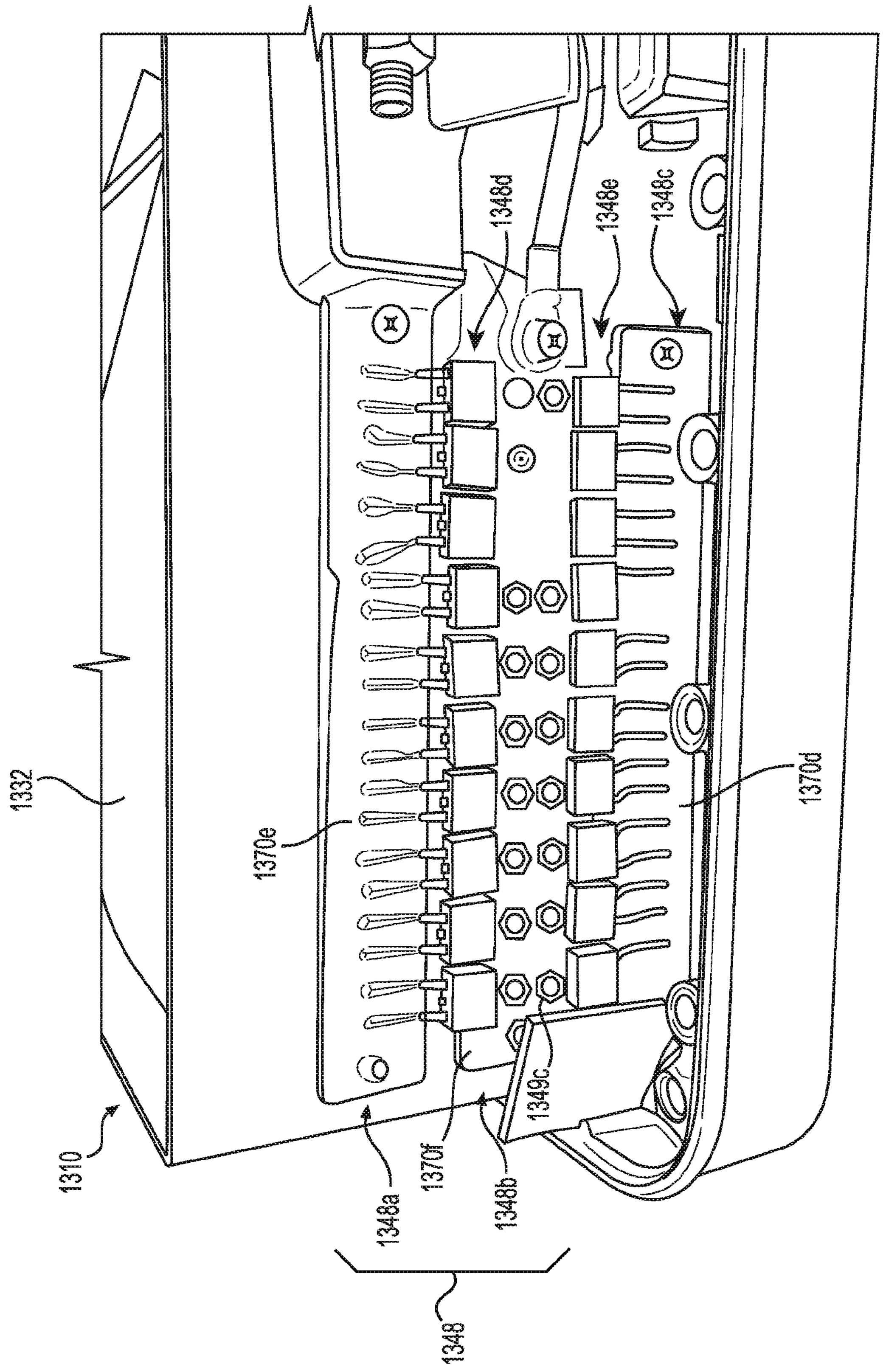
FIG. 61 is a rear elevational view of the portable vehicle battery jump starter shown in FIG. 7, with the cover removed, showing the dual battery diode bridge according to the present invention.
Figure 62:
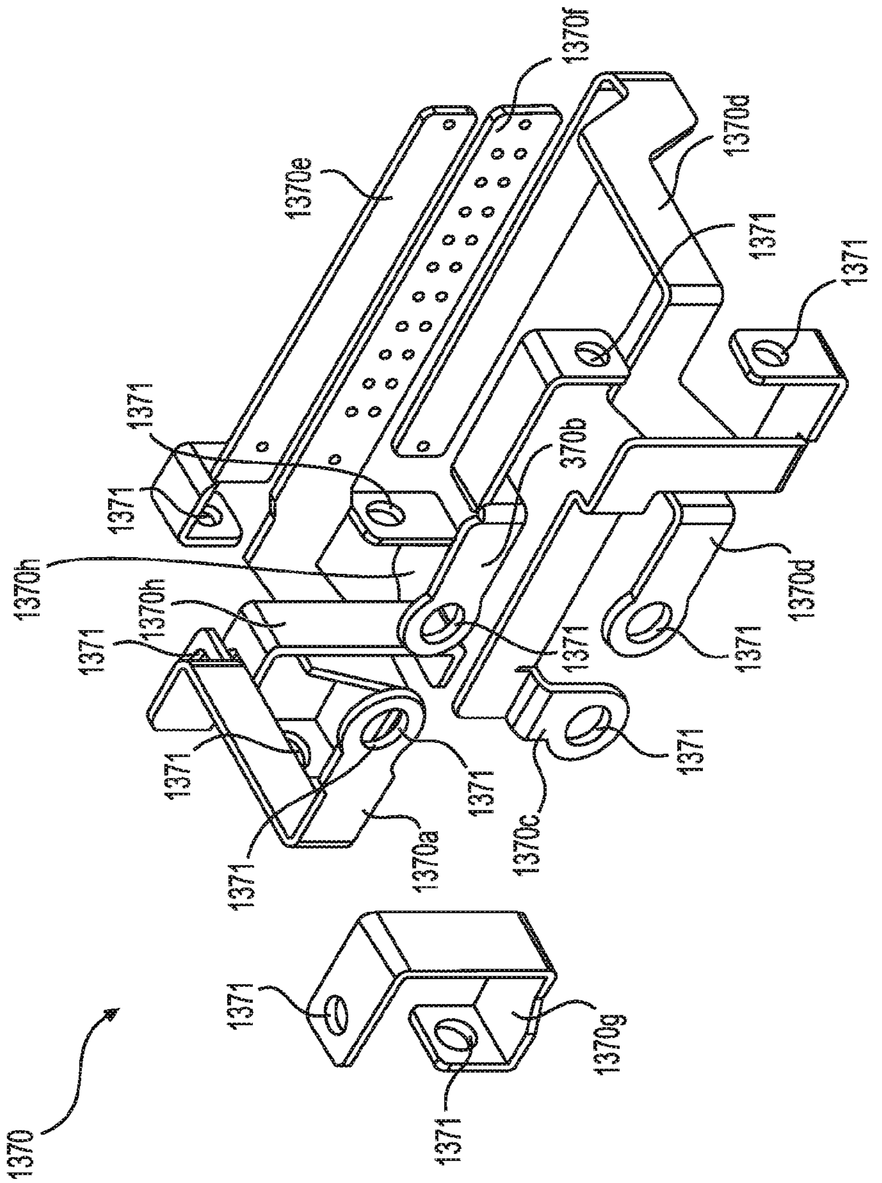
FIG. 62 is a perspective view of the highly conductive frame according to the present invention.
Figure 63:
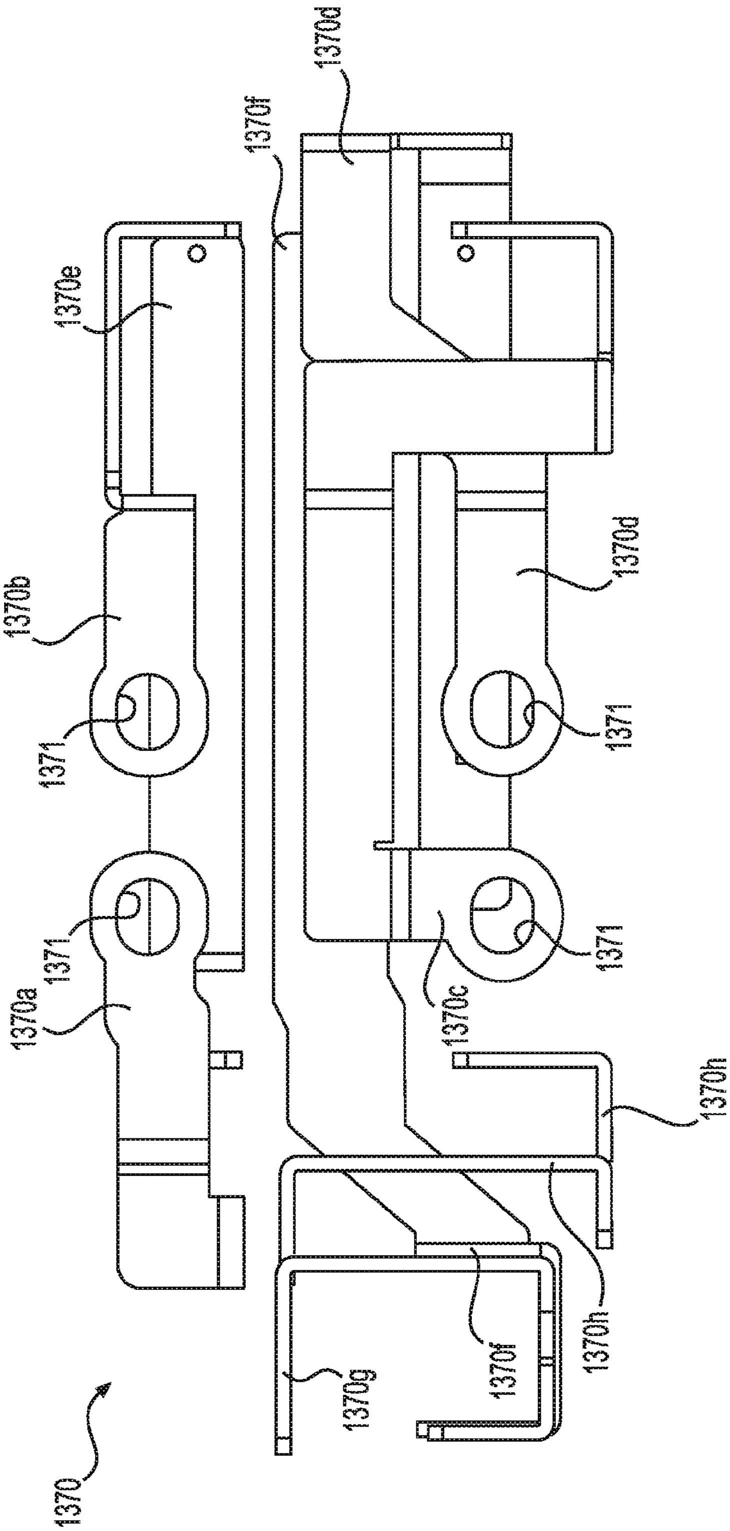
FIG. 63 is a front elevational view of the highly conductive frame shown in FIG. 62.
Figure 64:
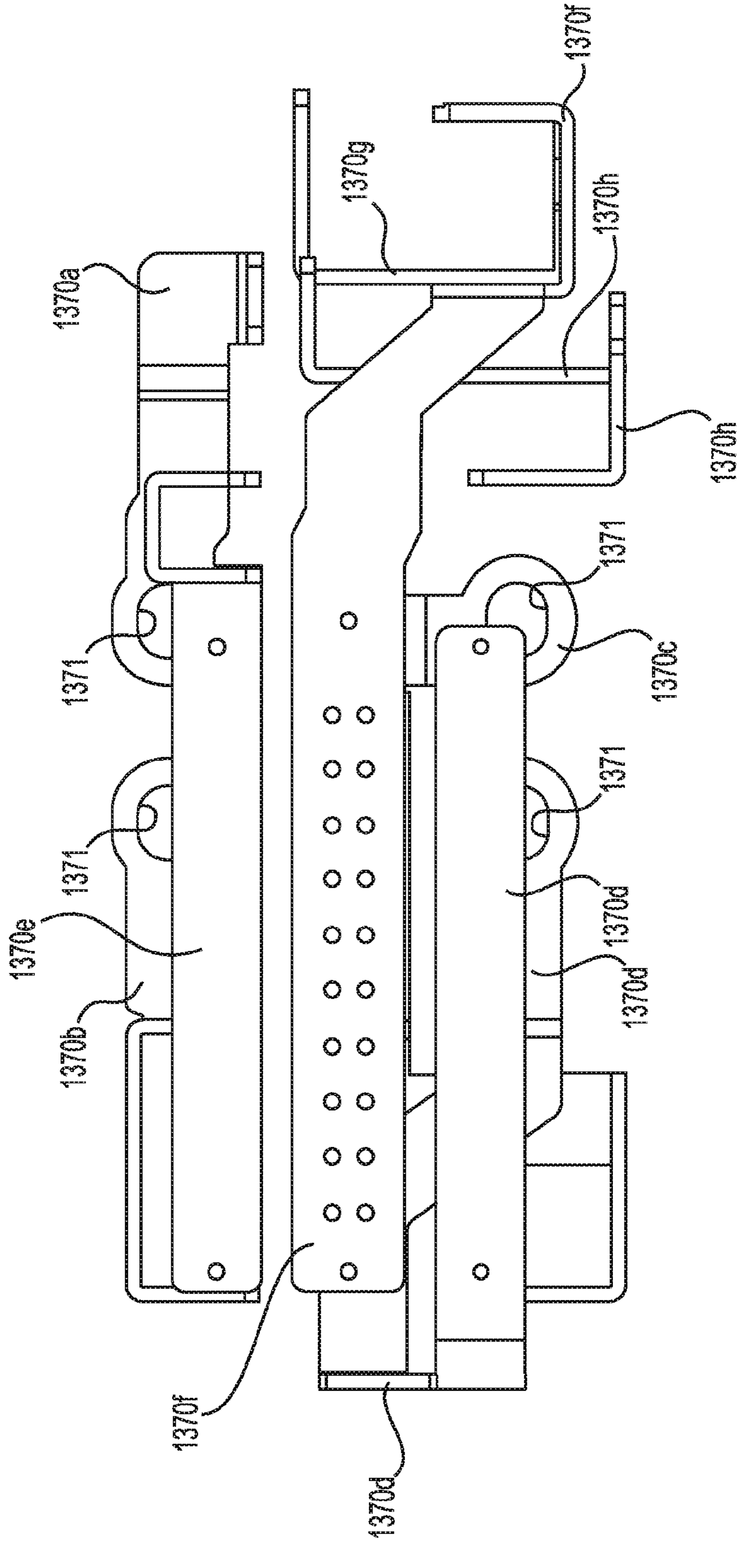
FIG. 64 is a rear elevational view of the highly conductive frame shown in FIG. 62.
Figure 65:
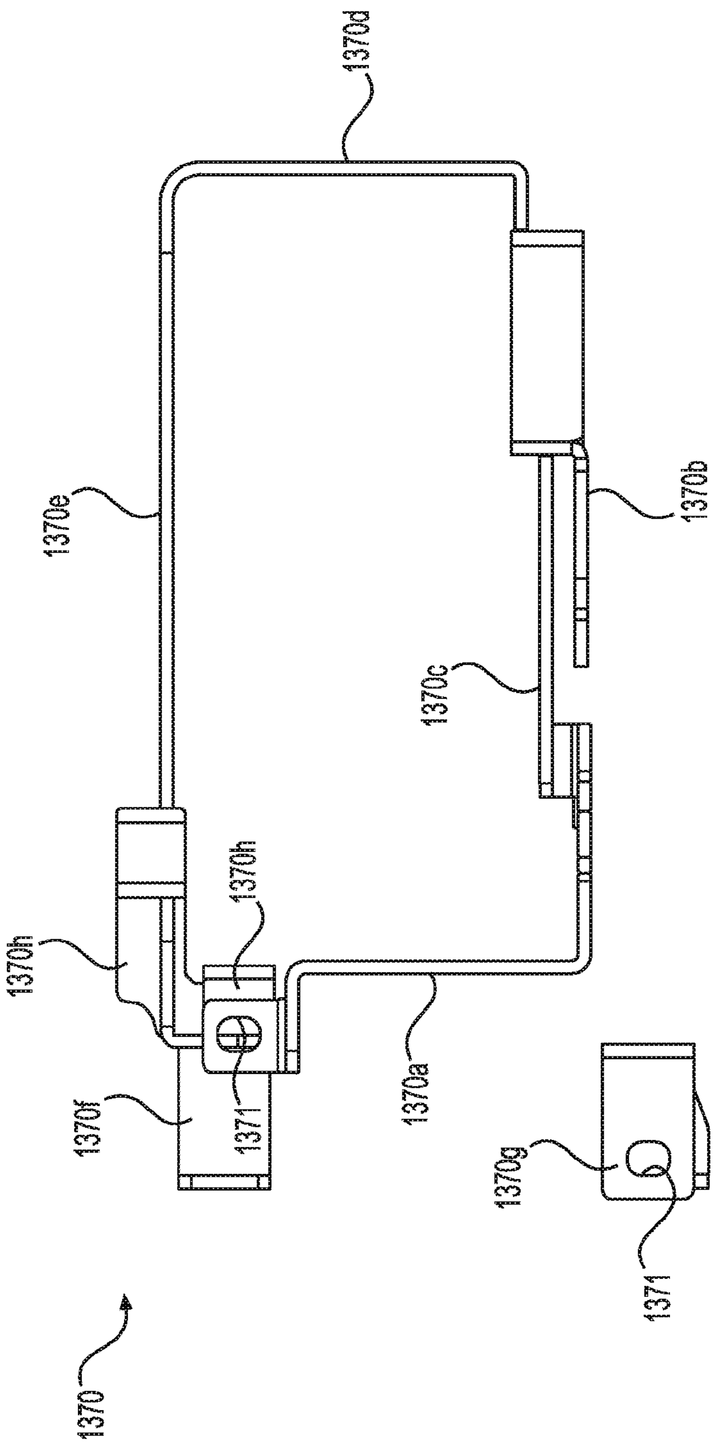
FIG. 65 is a top planar view of the highly conductive frame shown in FIG. 62.
Figure 66:
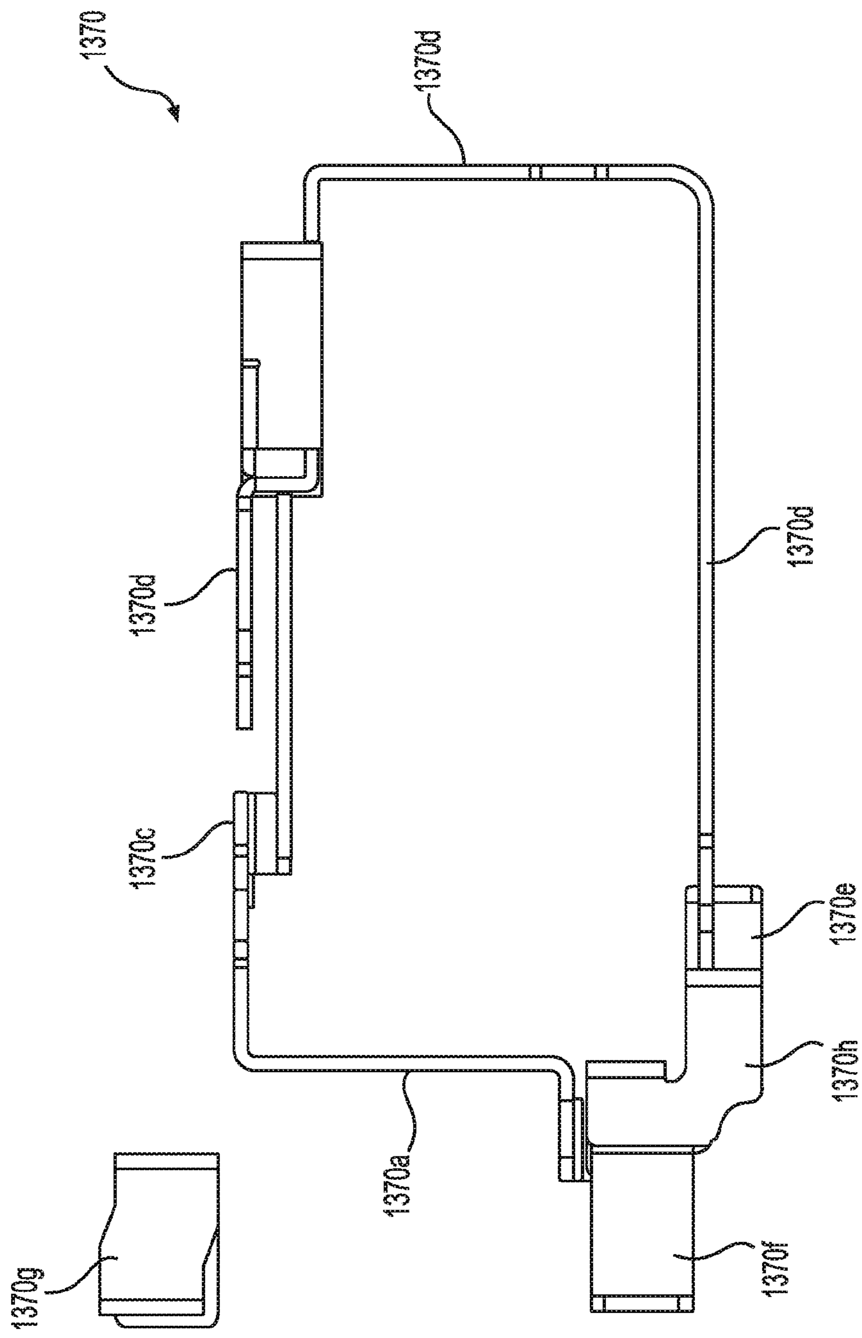
FIG. 66 is a bottom planar view of the highly conductive frame shown in FIG. 62.
Figure 67:
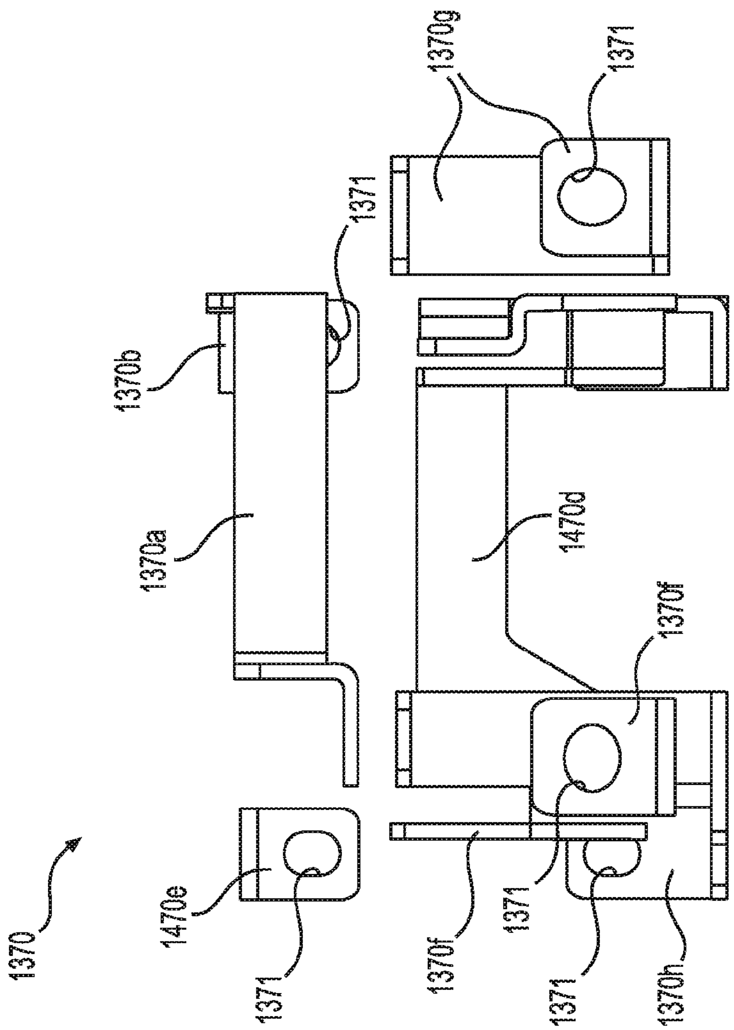
FIG. 67 is a left side elevational view of the highly conductive frame shown in FIG. 62.
Figure 68:
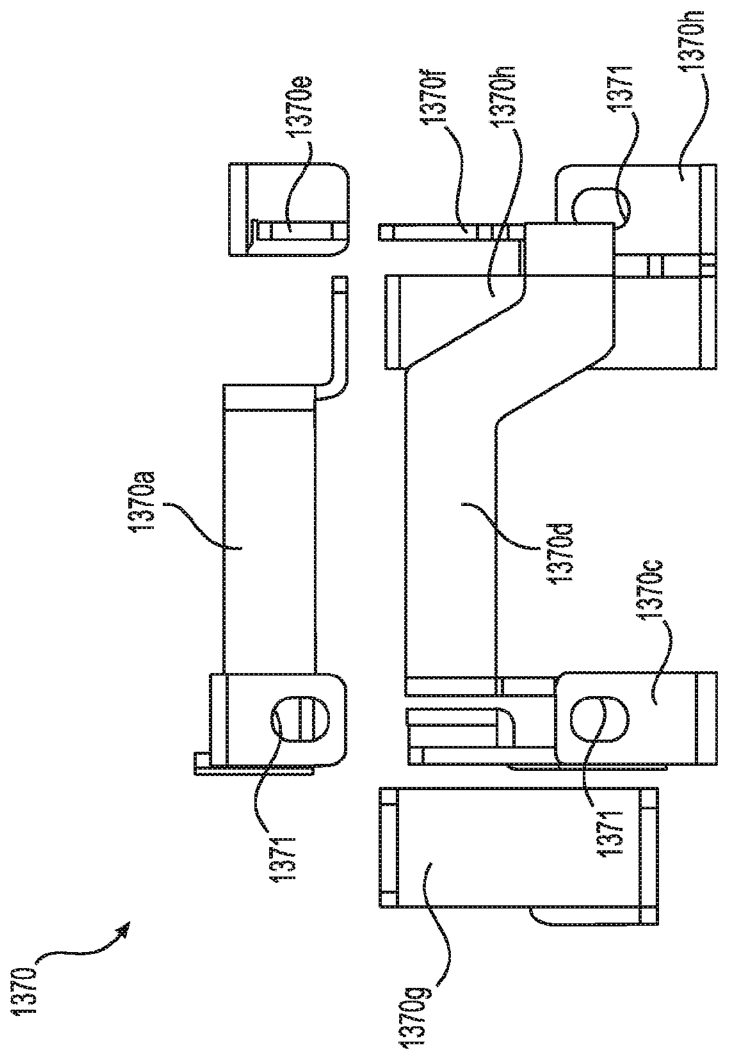
FIG. 68 is a right side elevational view of the highly conductive frame shown in FIG. 62.
Figure 69:
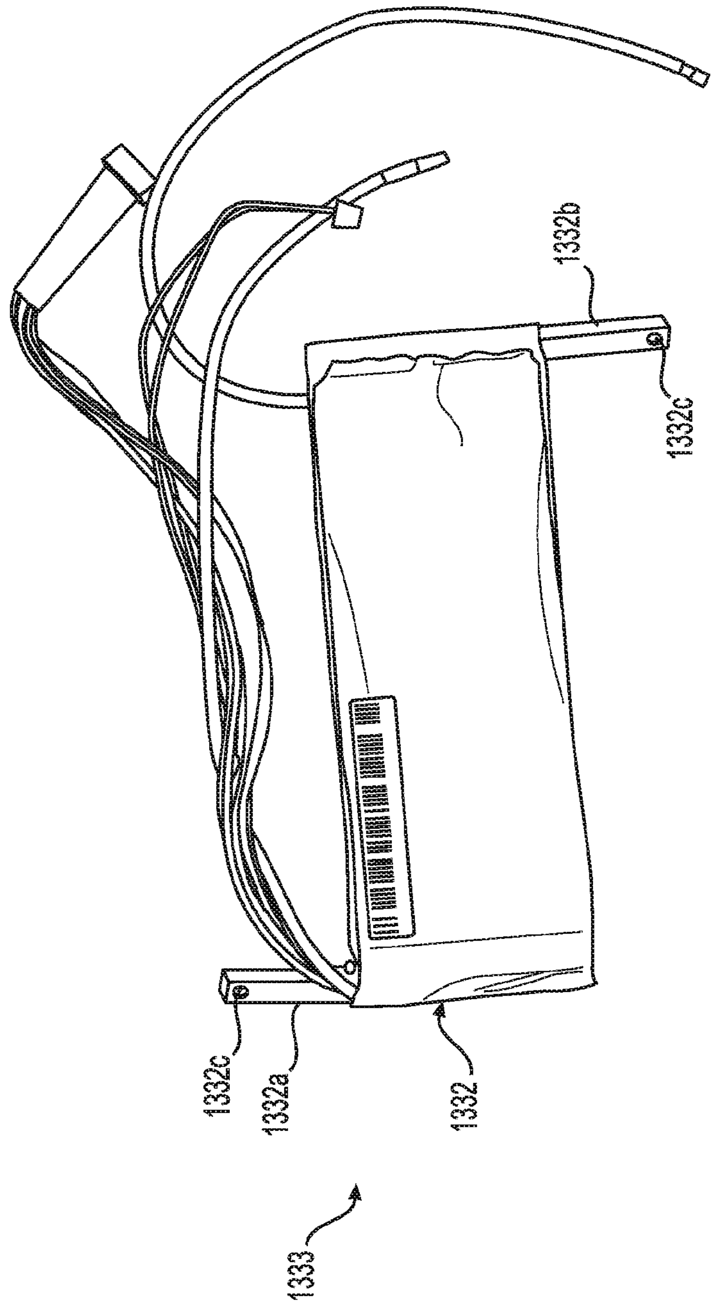
FIG. 69 is a top planar view of an assembled Li-ion battery assembly according to the present invention.
Figure 70:
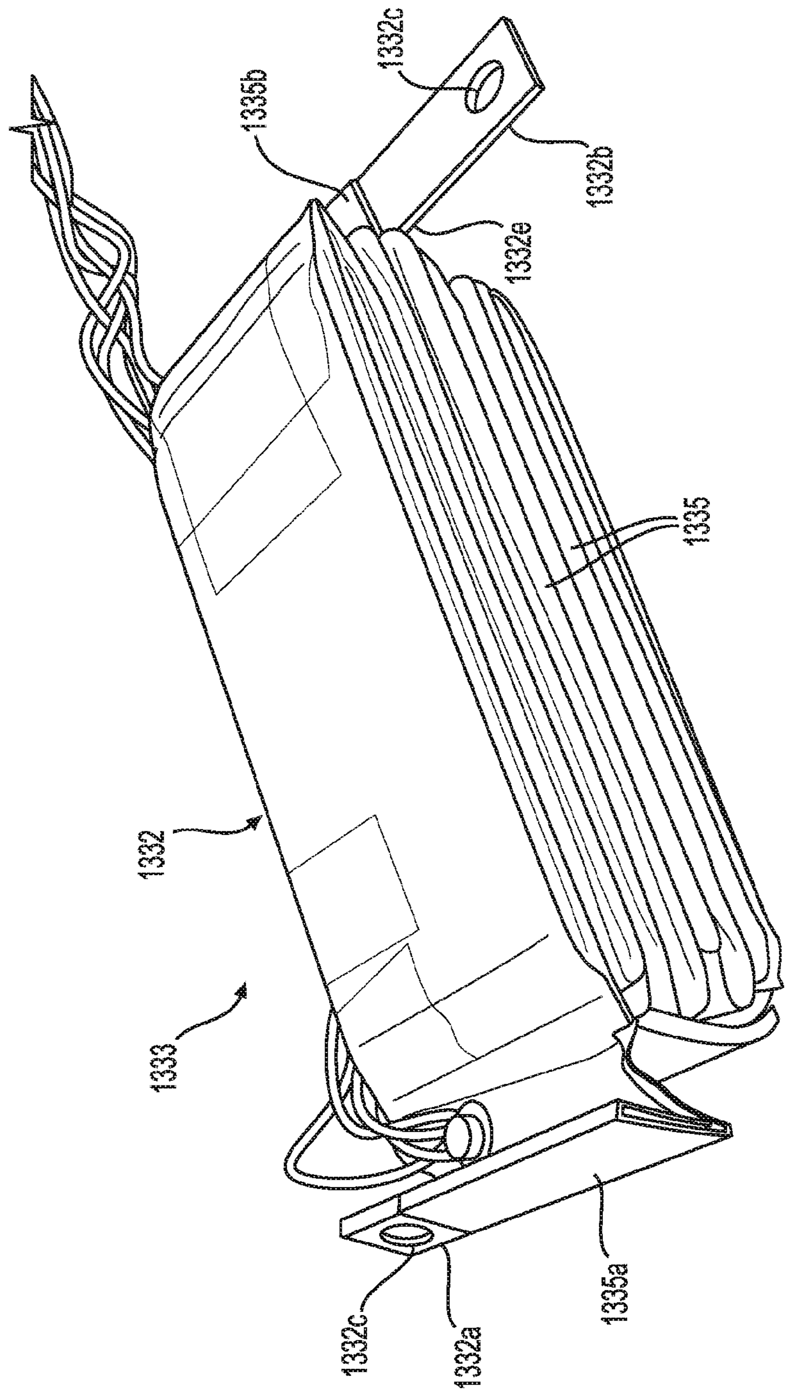
FIG. 70 is a perspective view of the Li-ion battery assembly shown in FIG. 69 with the covering removed.
Figure 71:
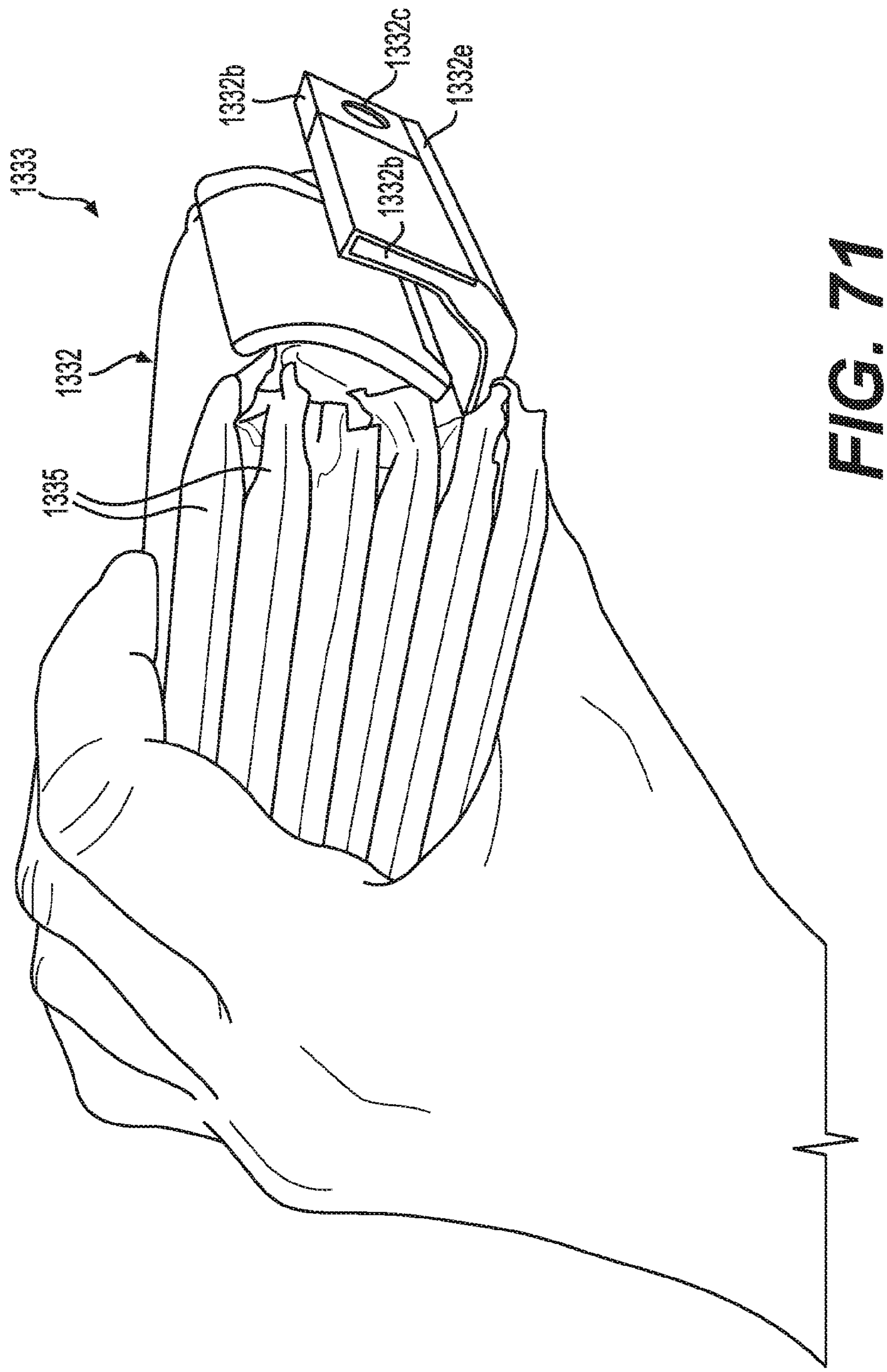
FIG. 71 is a perspective view of the Li-ion battery assembly shown in FIG. 69 with the covering removed.
Figure 72:
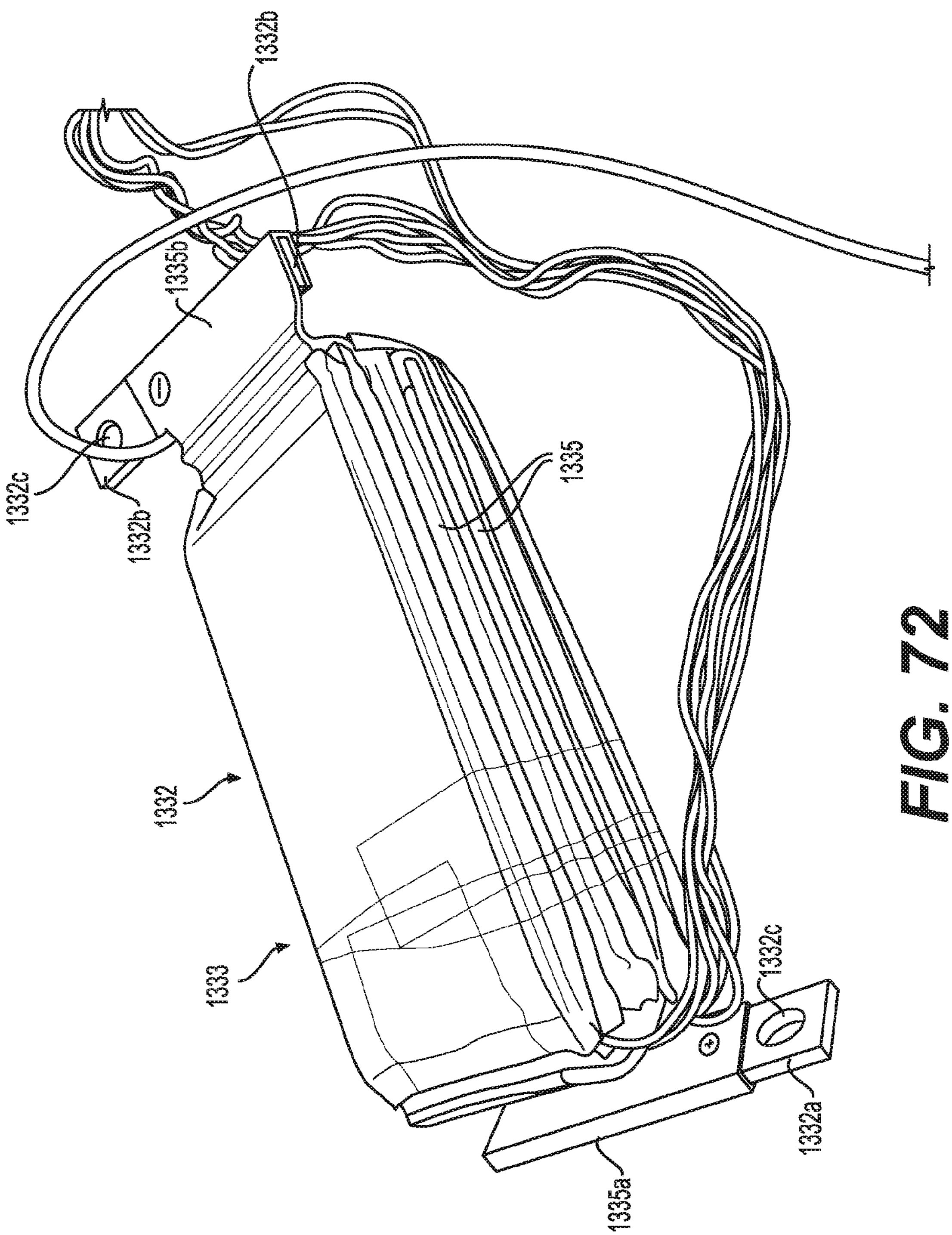
FIG. 72 is a perspective view of the Li-ion battery assembly shown in FIG. 69 with the covering removed.
Figure 73:
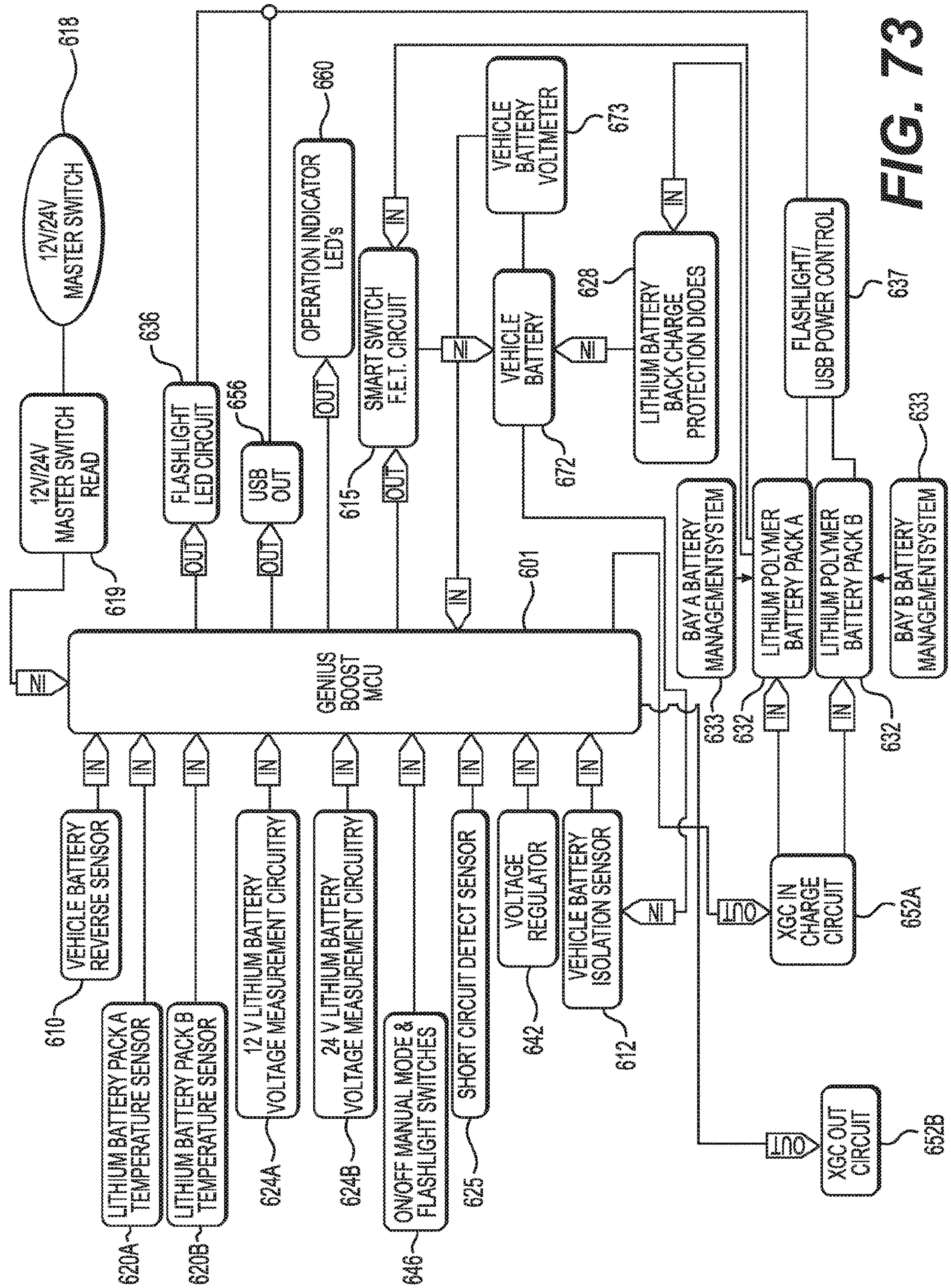
FIG. 73 is a functional block diagram of the portable vehicle battery boost apparatus or portable vehicle battery jump starter in accordance with one aspect of the present invention.
Figures 1, 74A:
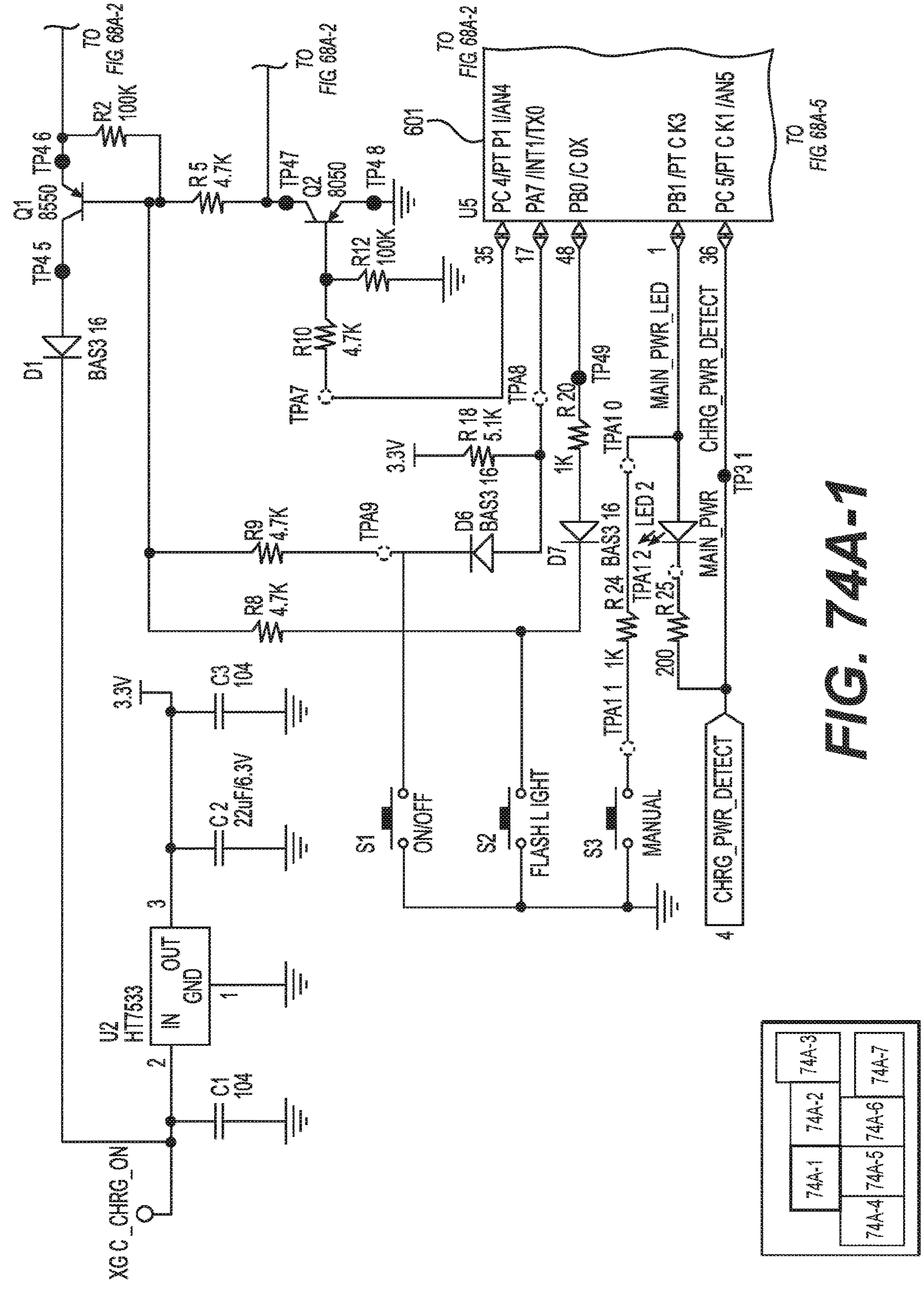
Figures 2, 74A:
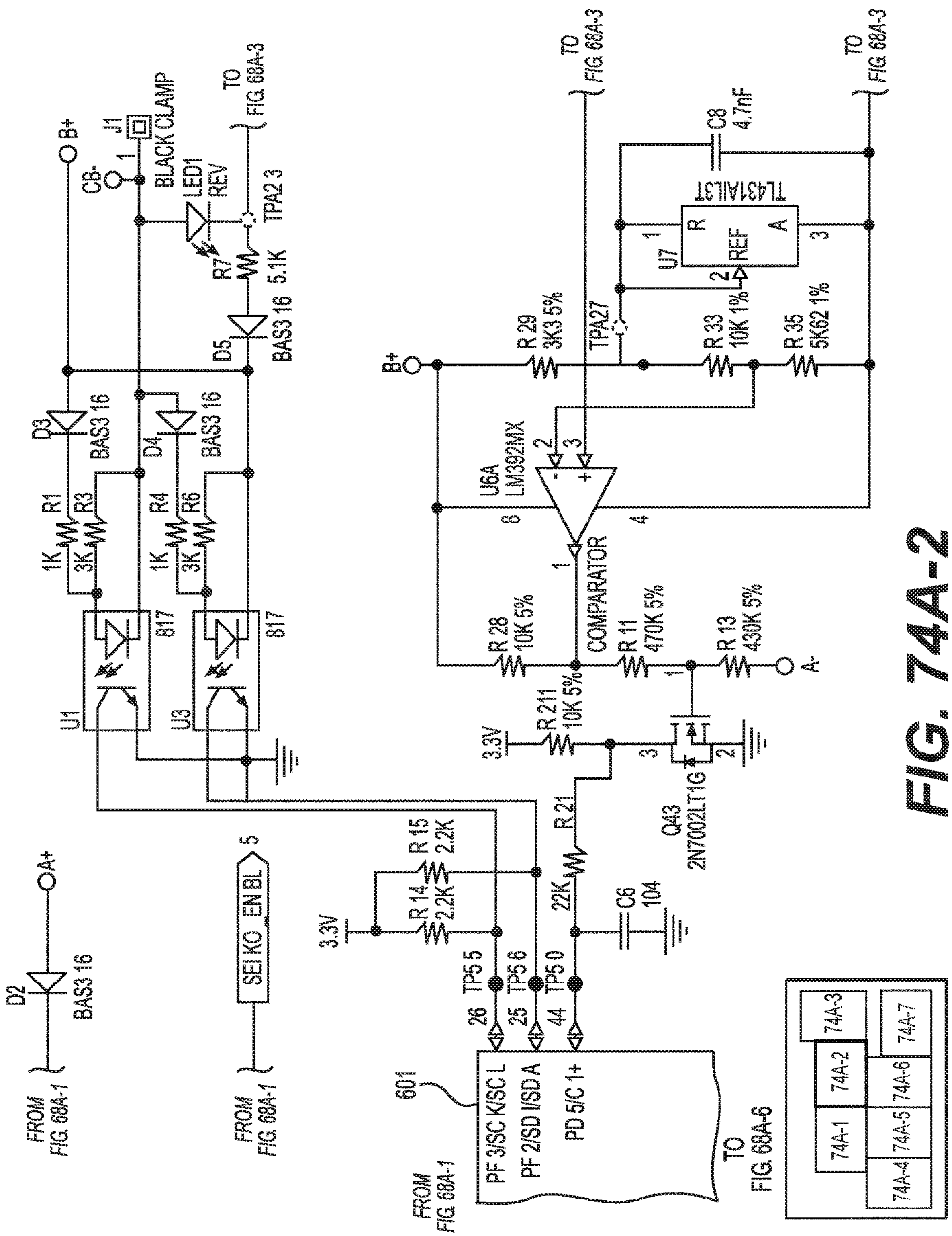
Figure 74A:
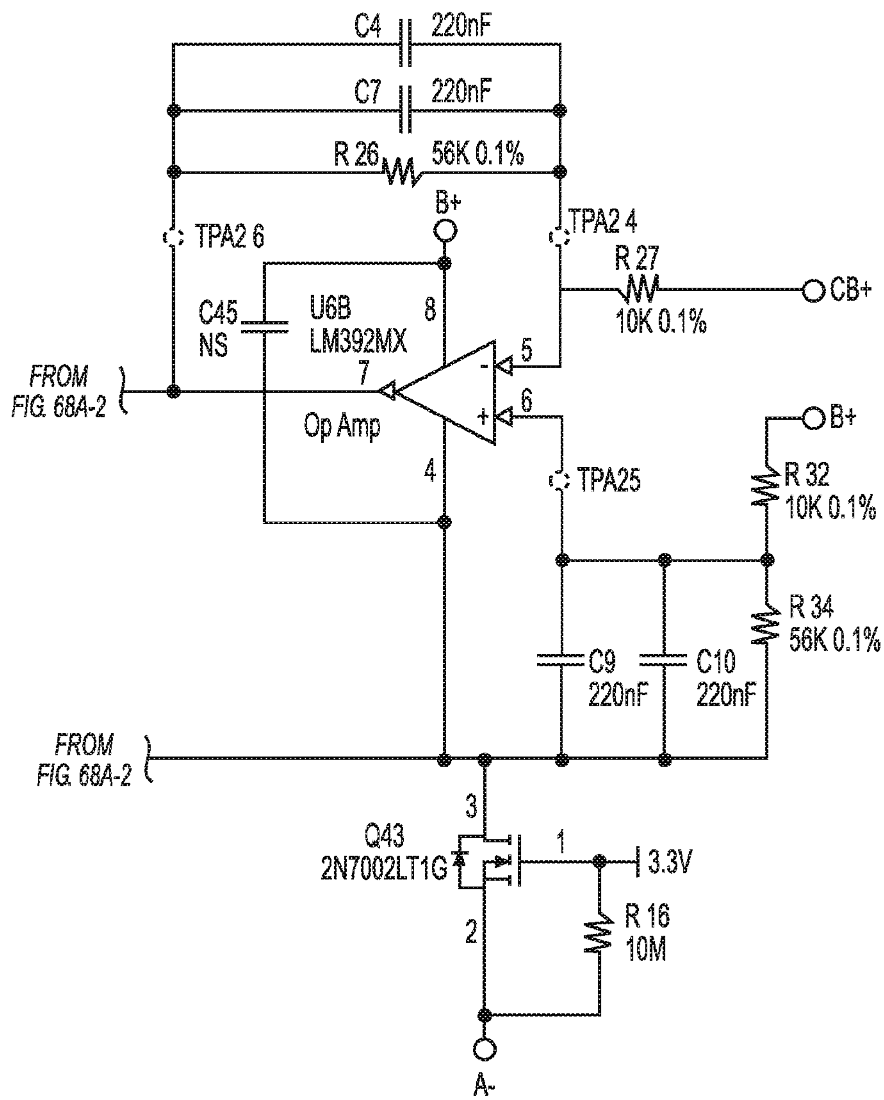
Figure 3:
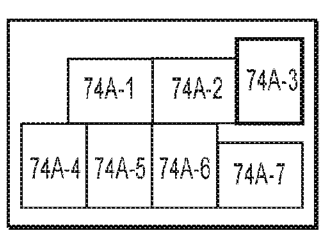
Figures 4, 74A:
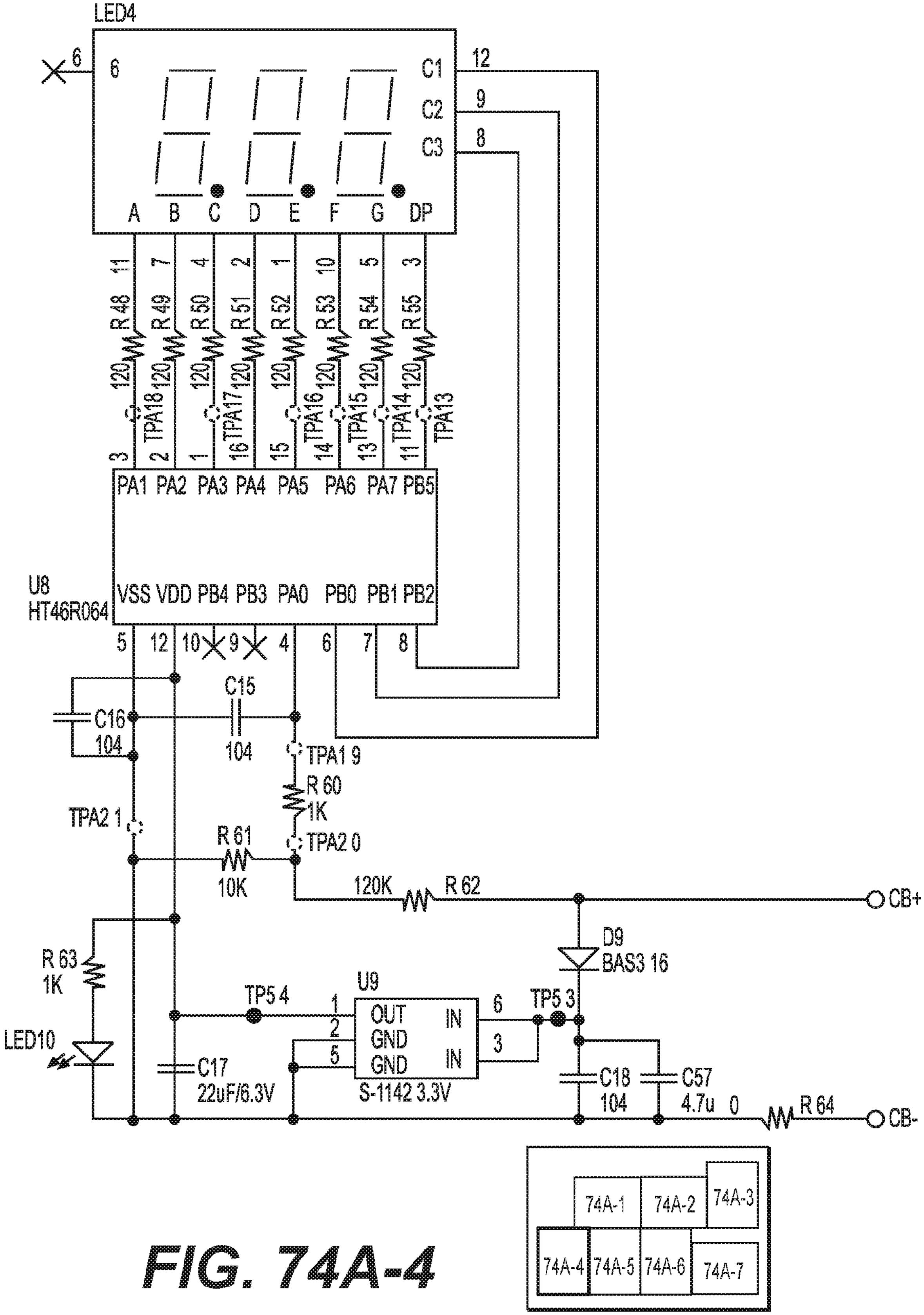
Figures 5, 74A:
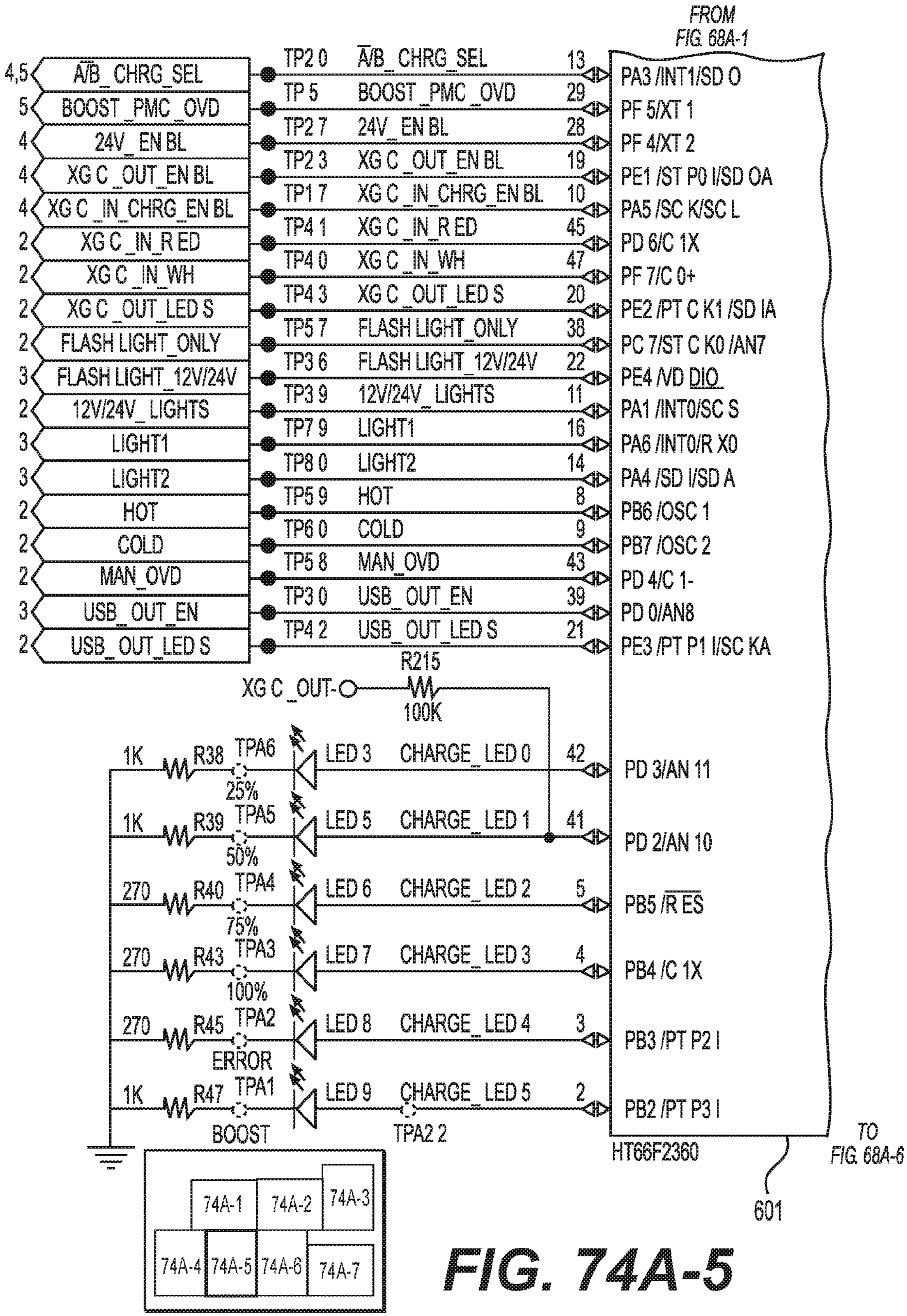
Figures 7, 74A:
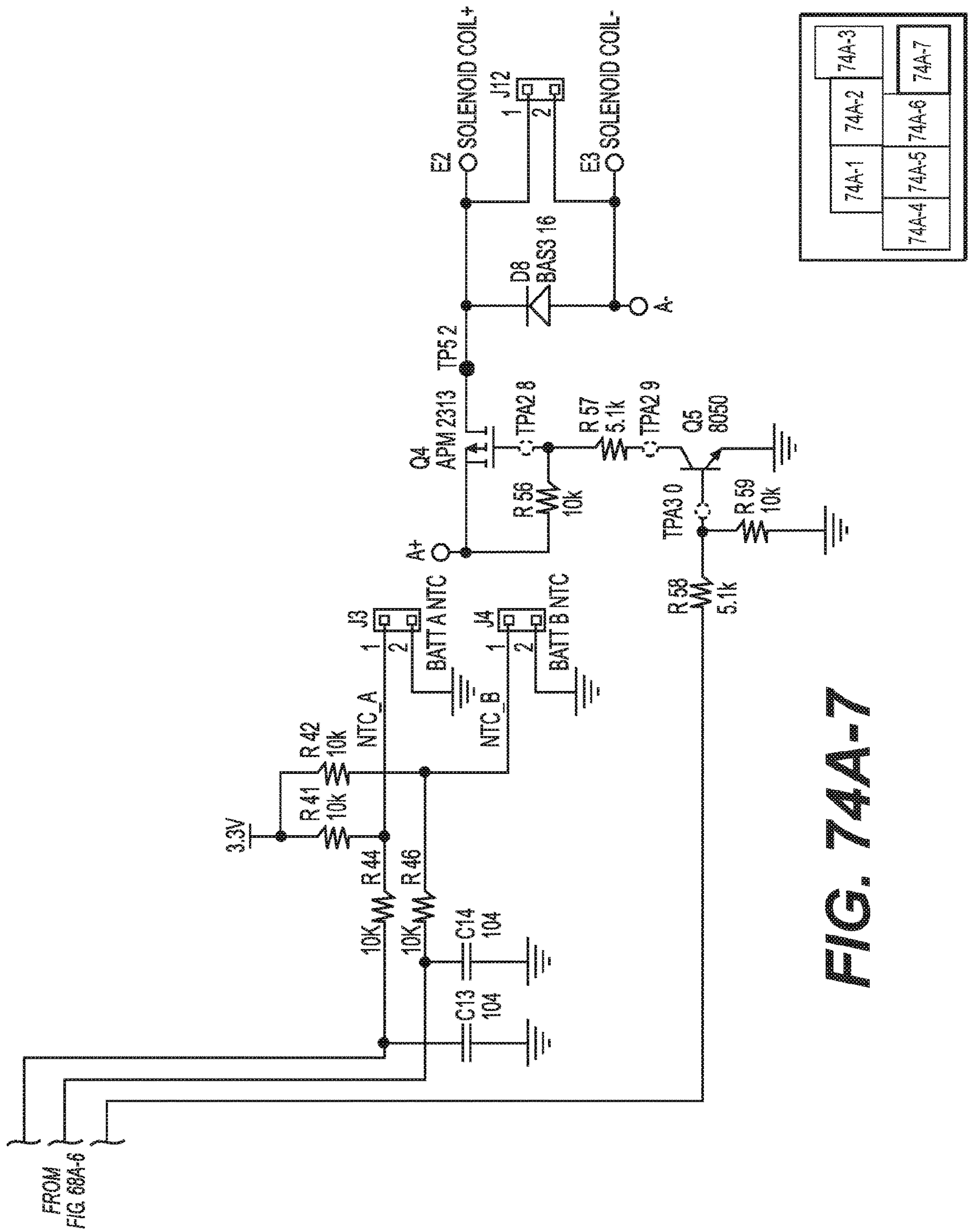
Figures 1, 74B:
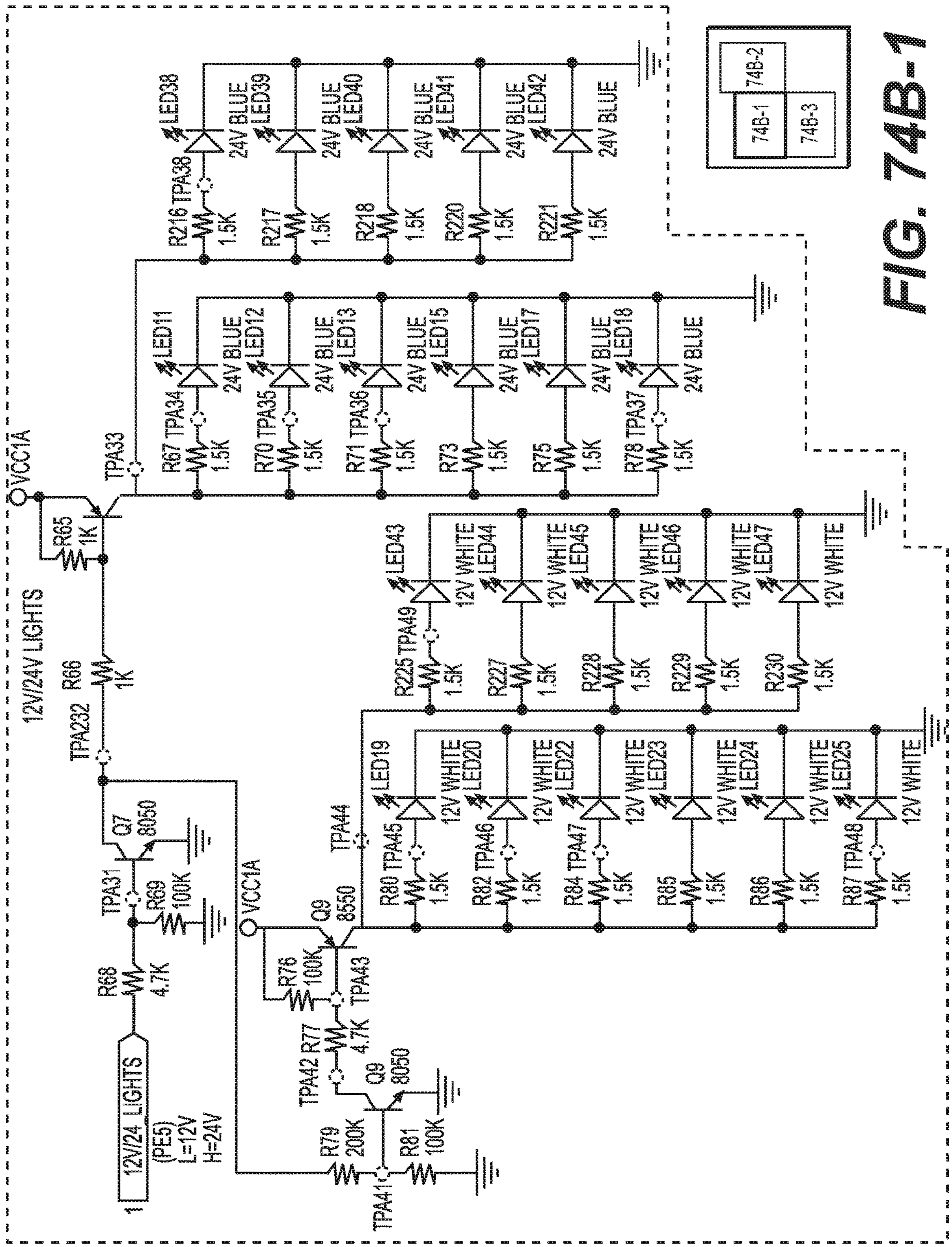
Figures 2, 74B:
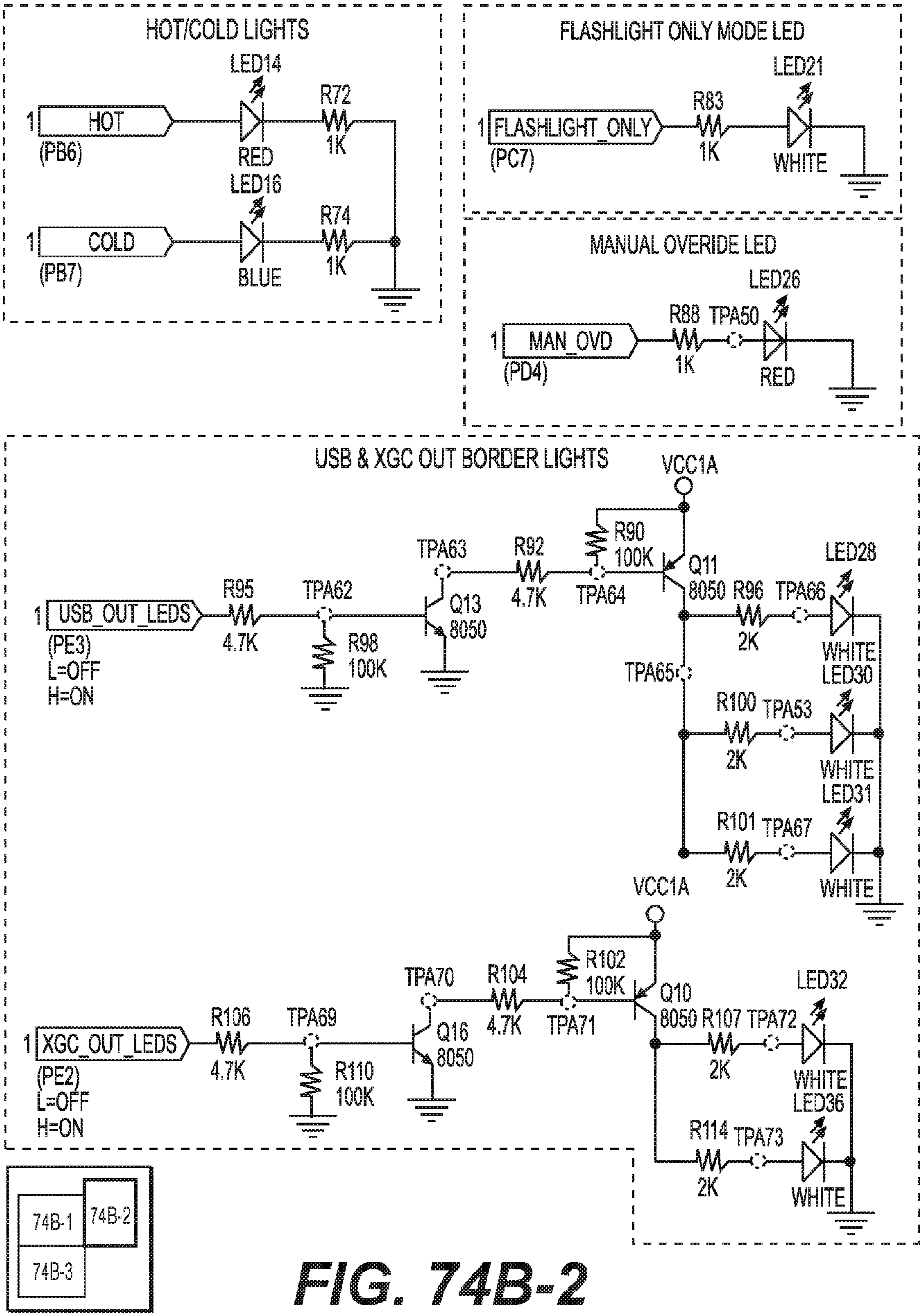
Figures 3, 74B:
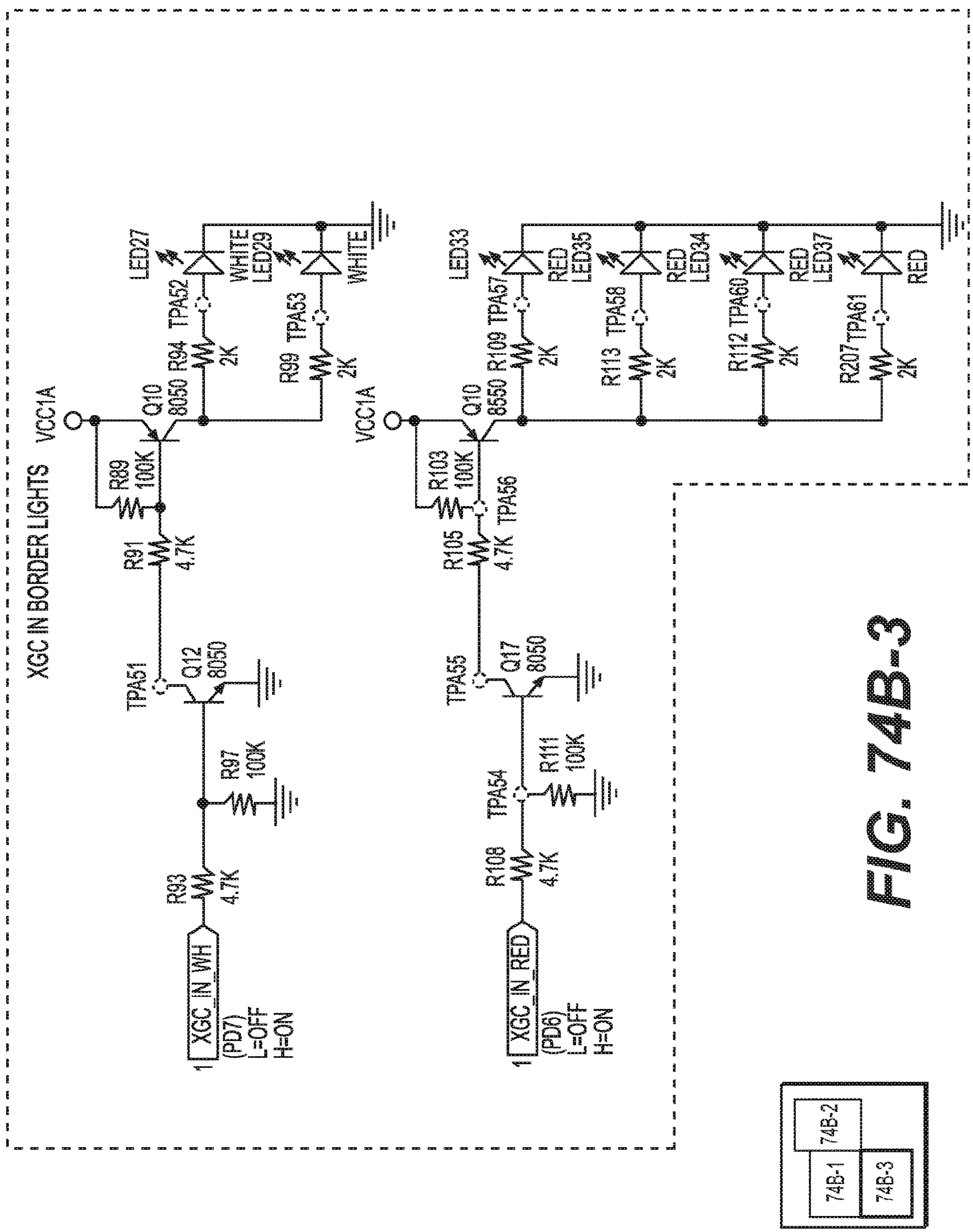
Figures 1, 74C:
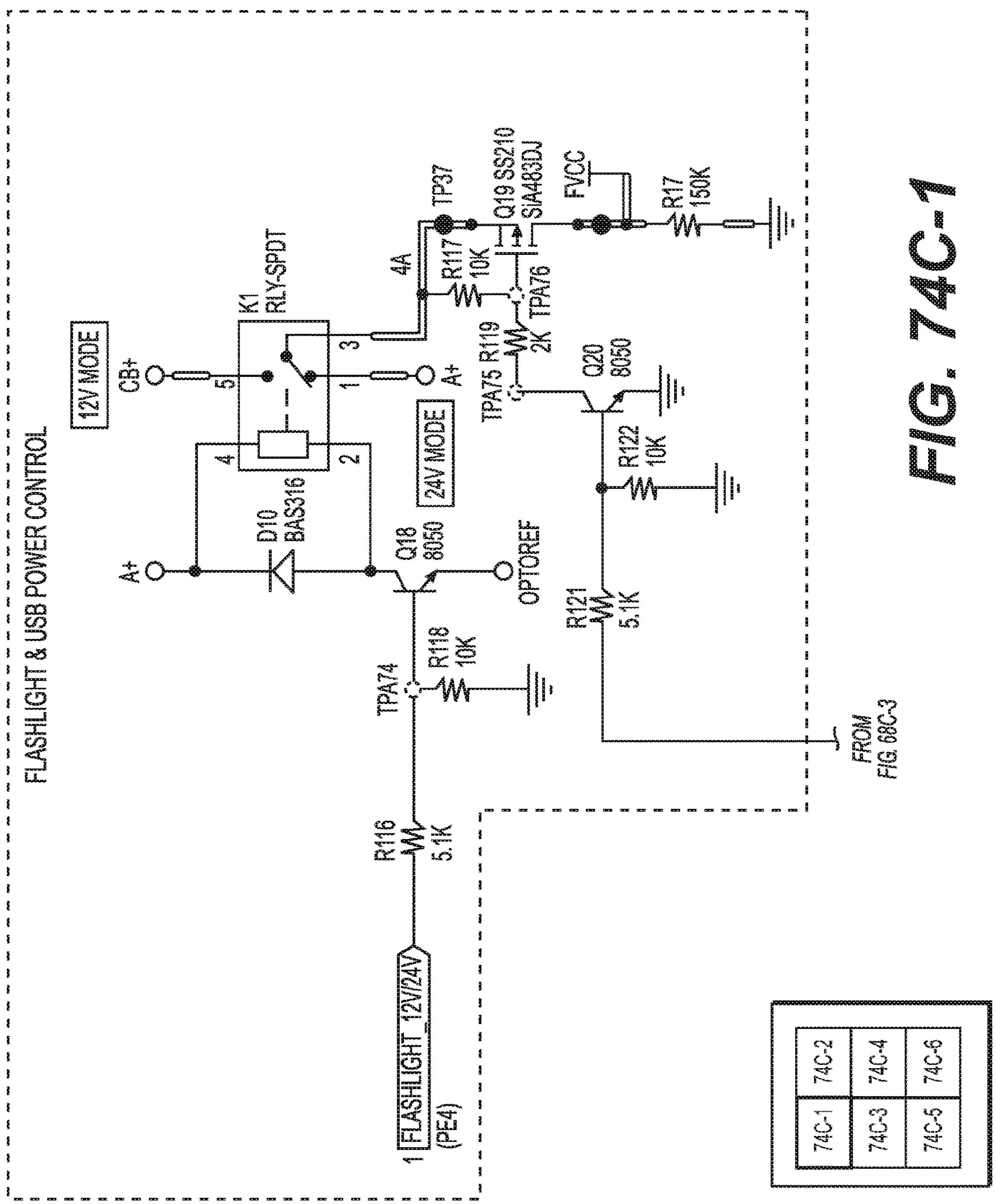
Figures 2, 74C:
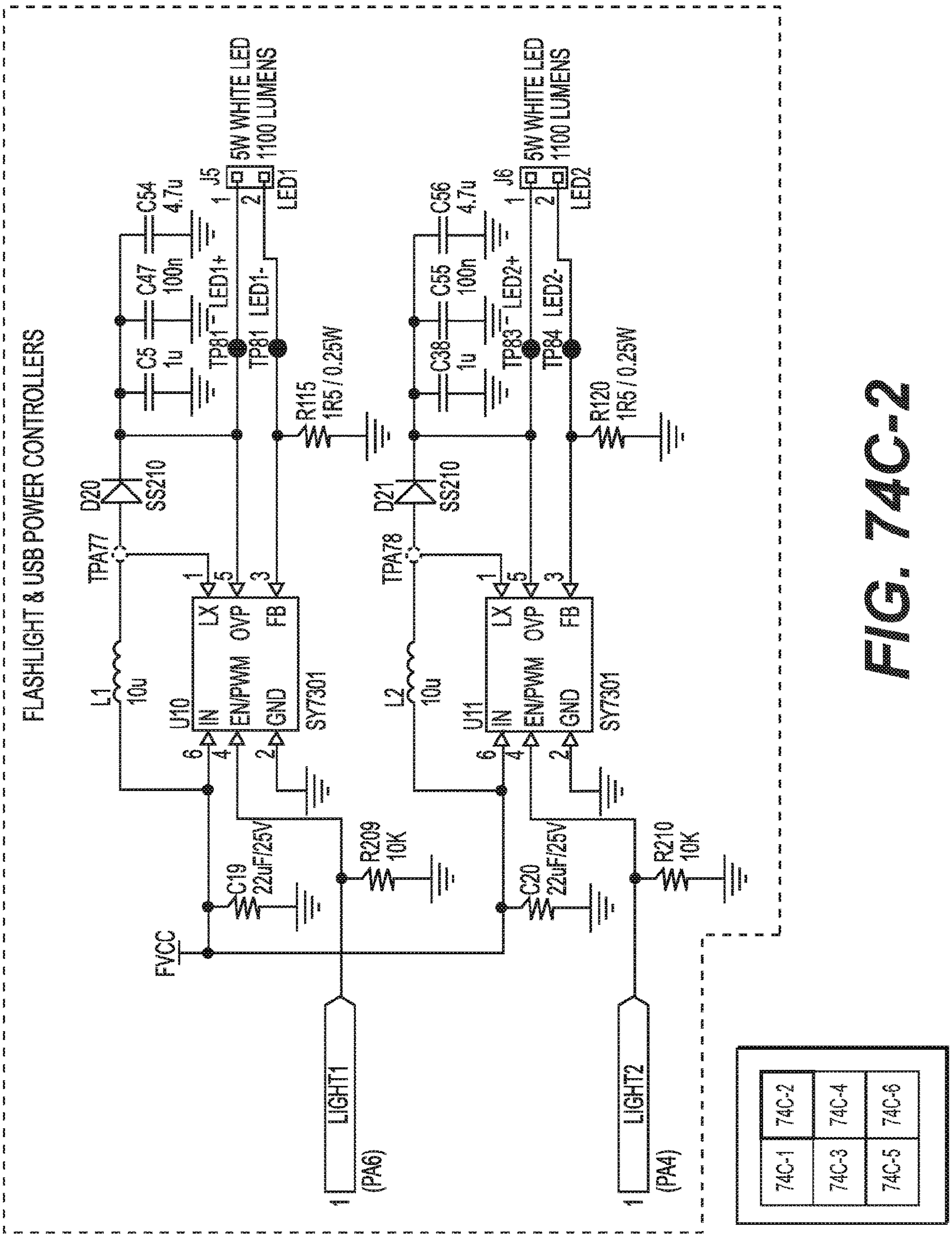
Figures 3, 74C:
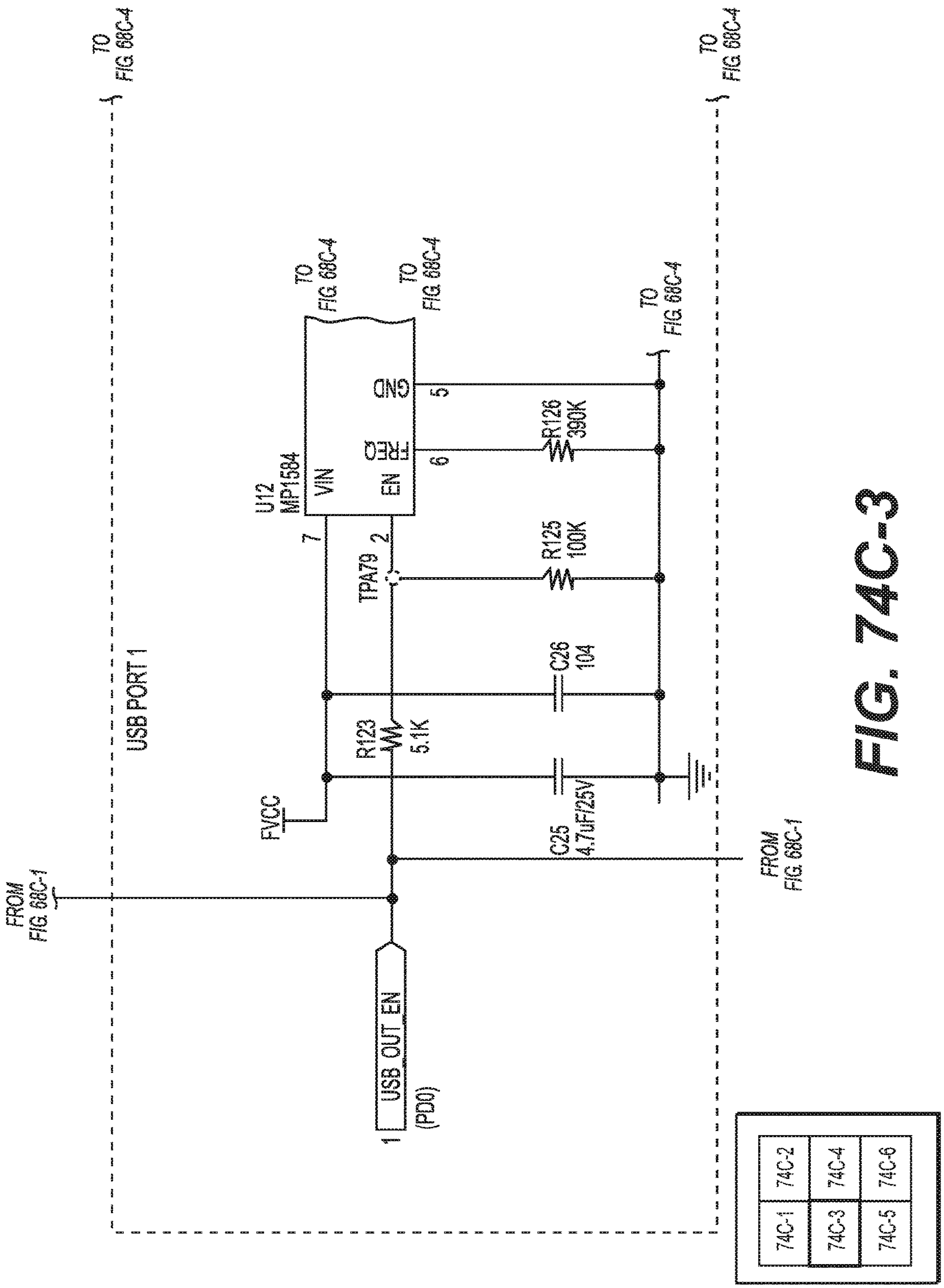
Figures 4, 74C:
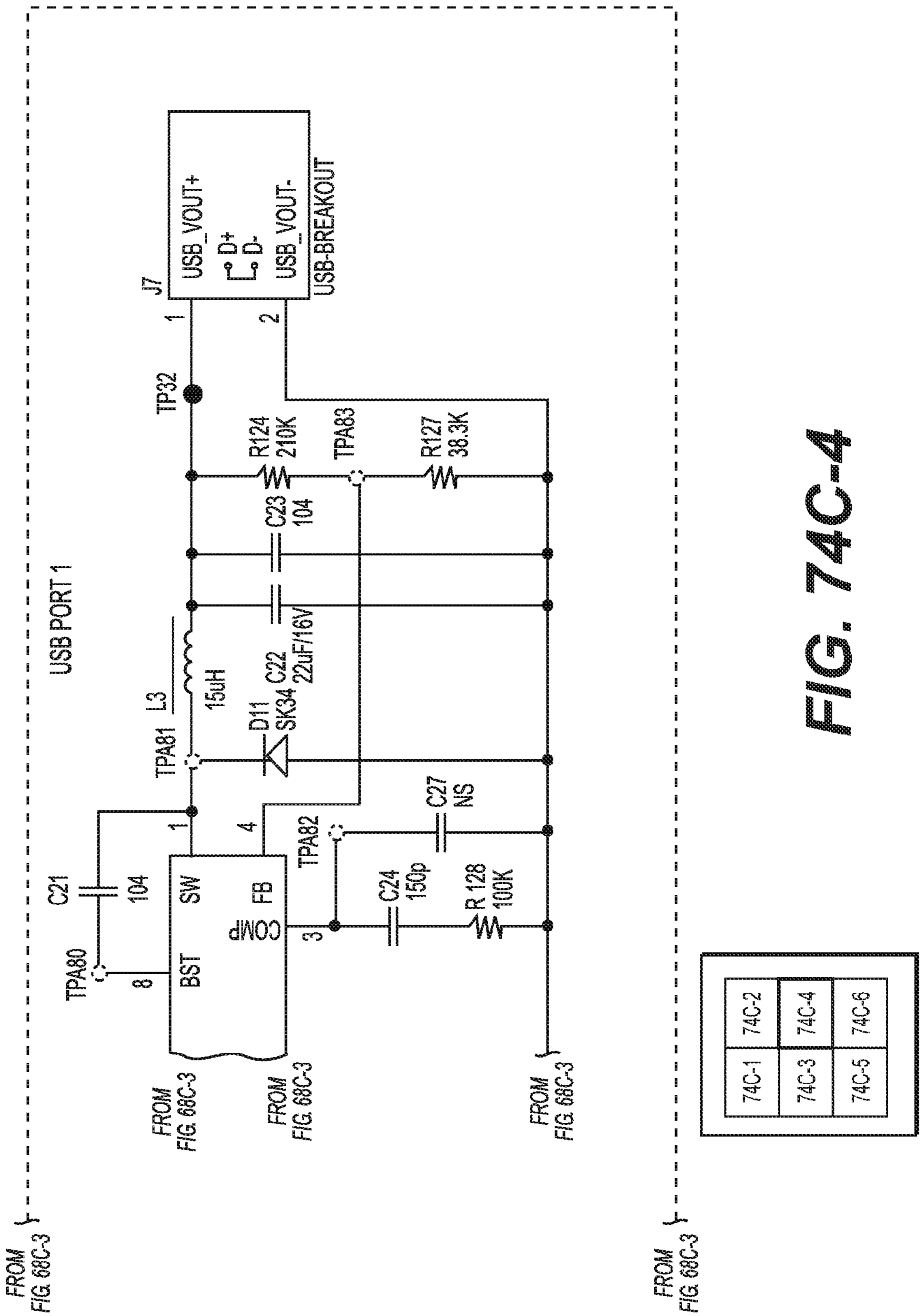
Figures 5, 74C:
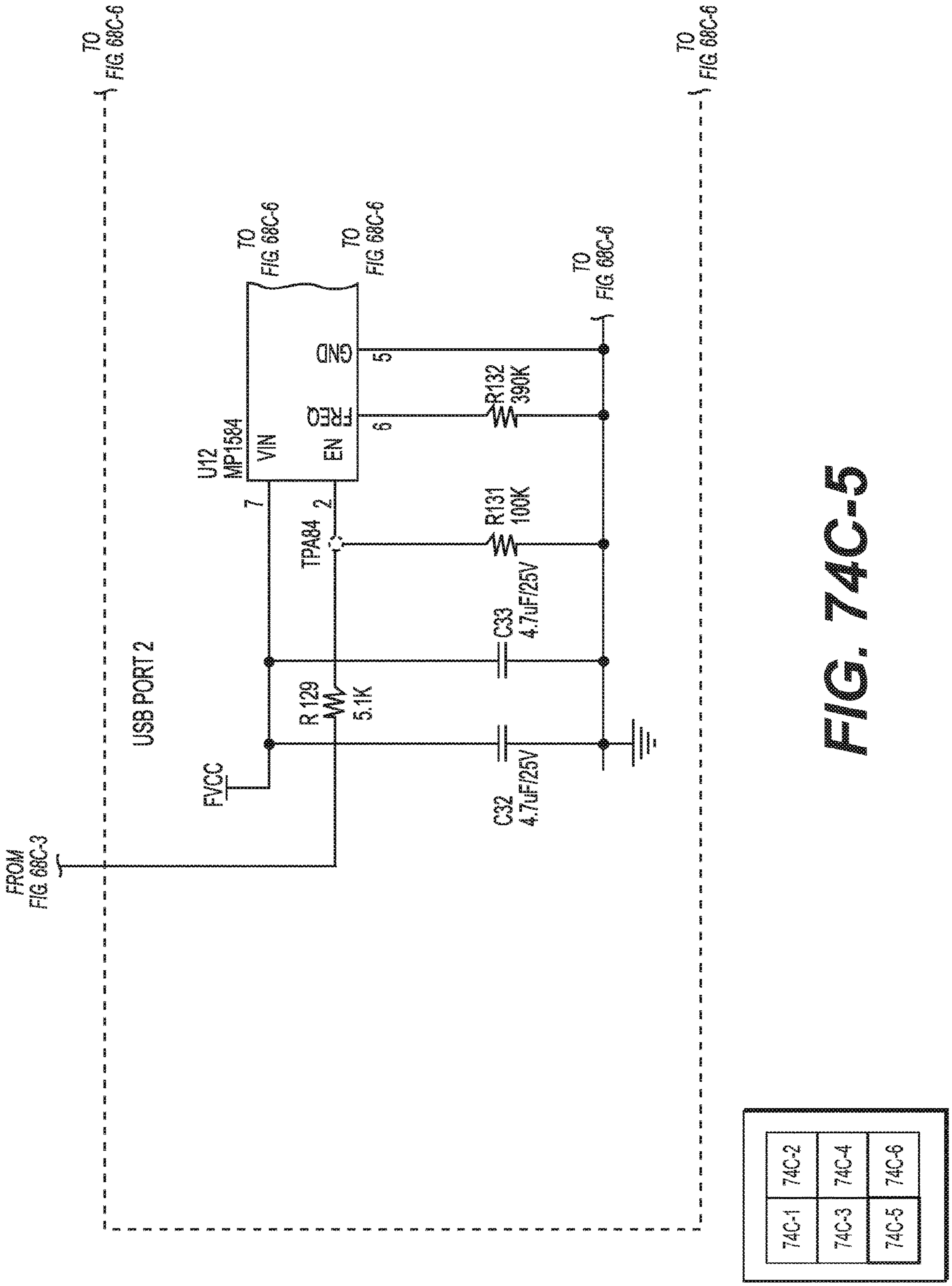
Figures 6, 74C:
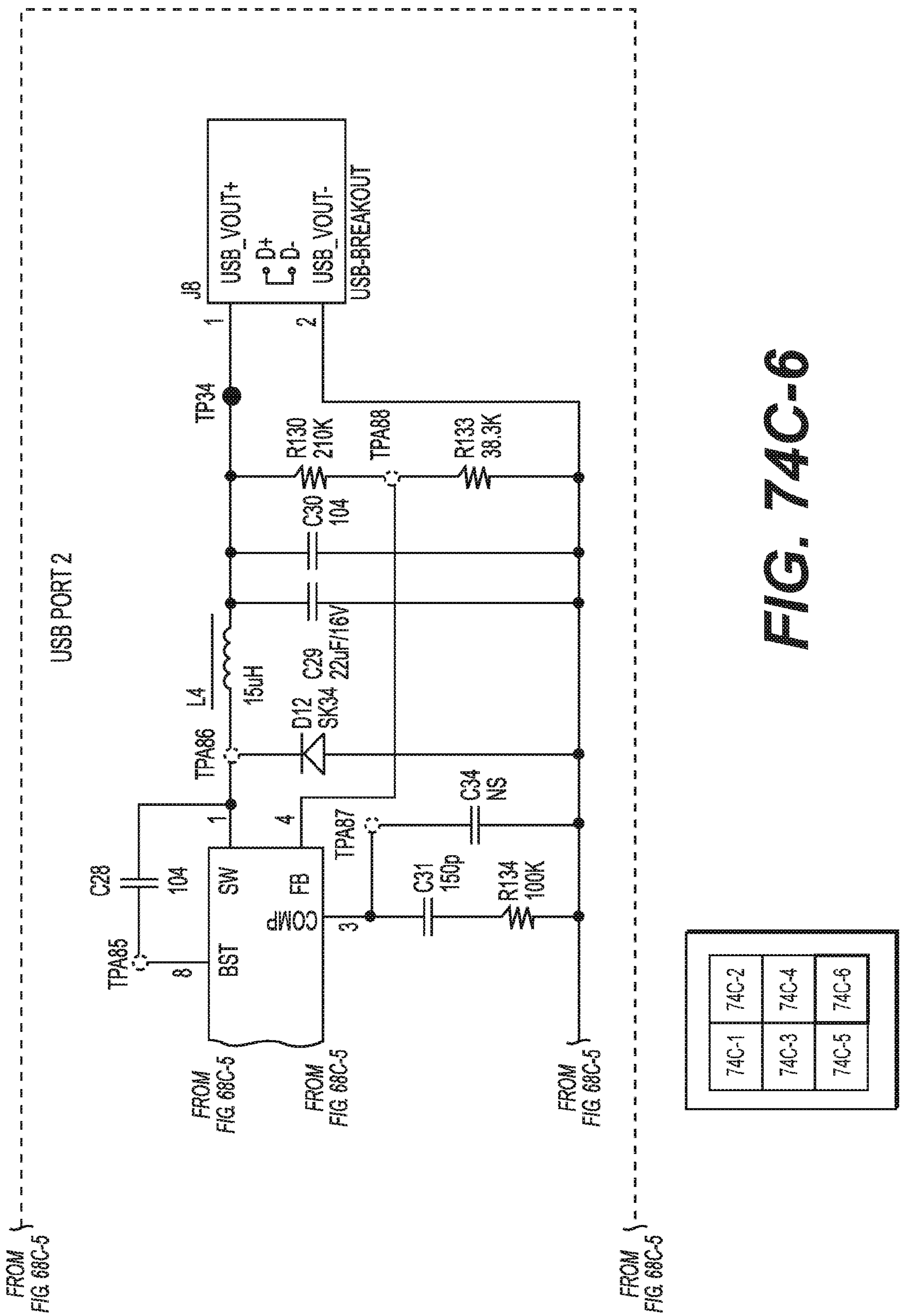
Figures 1, 74D:
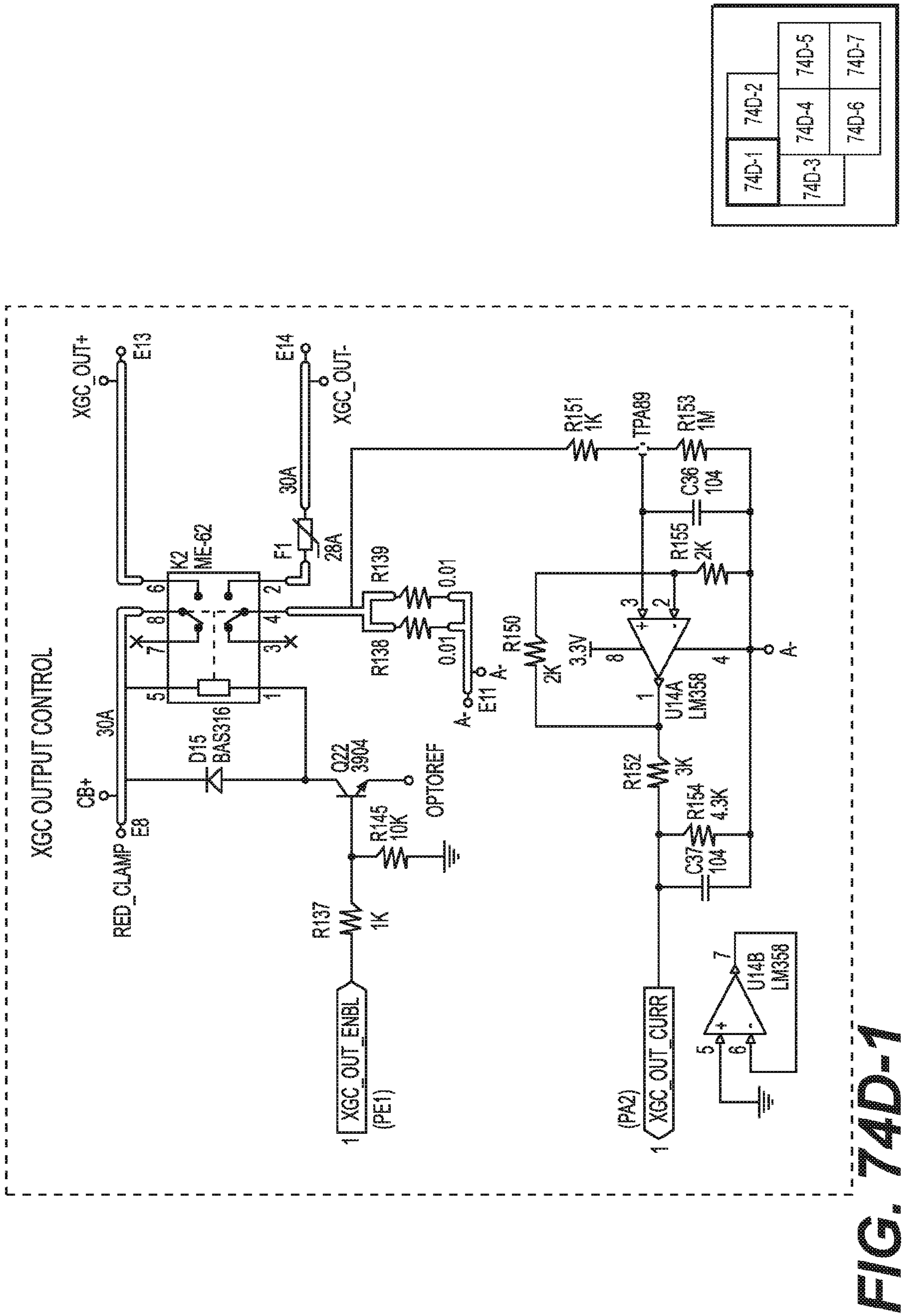
Figures 3, 74D:
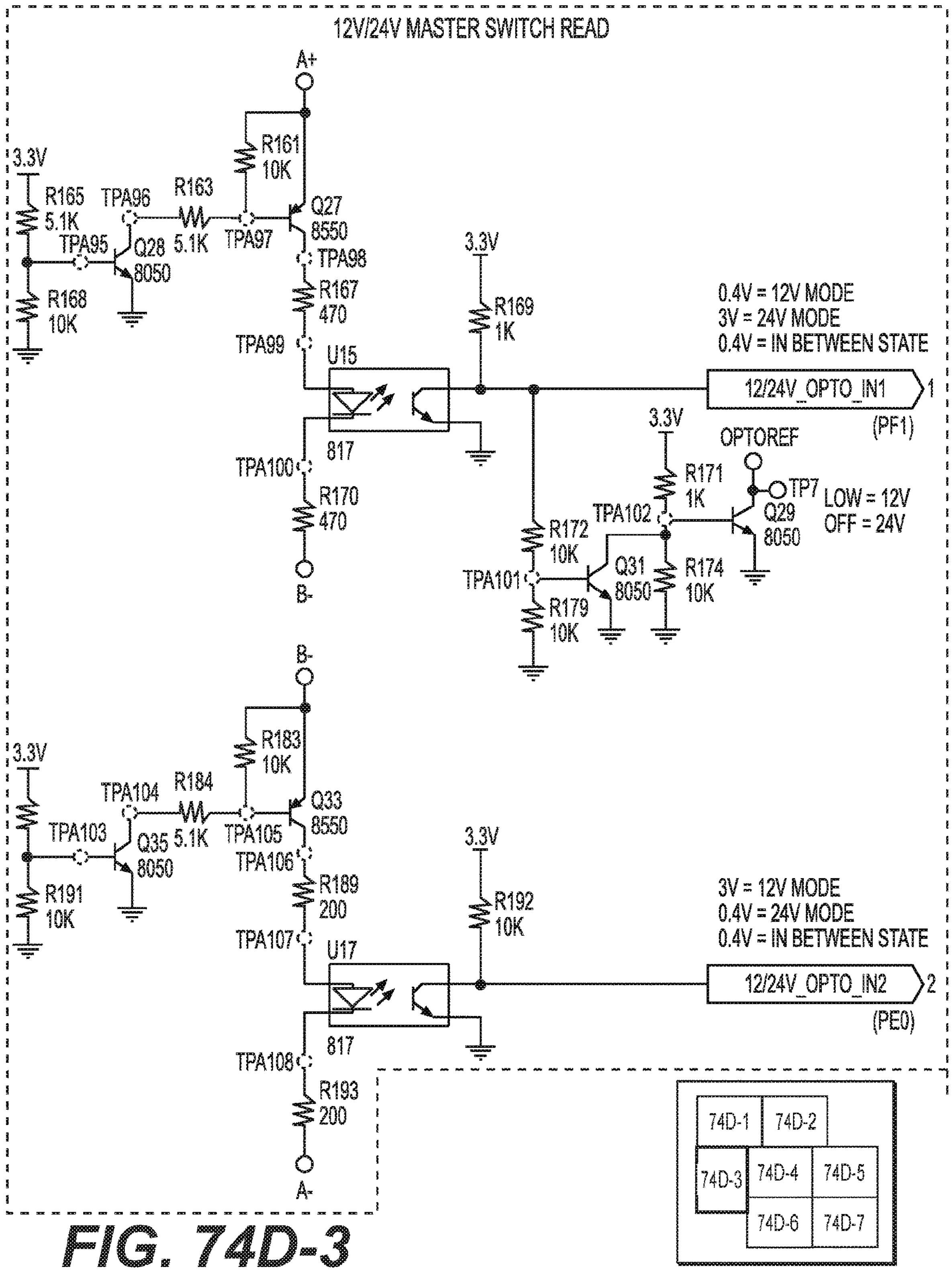
Figure 74D:
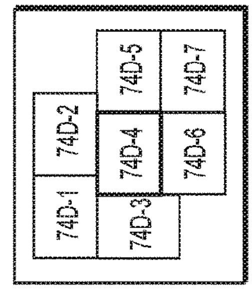
Figure 4:
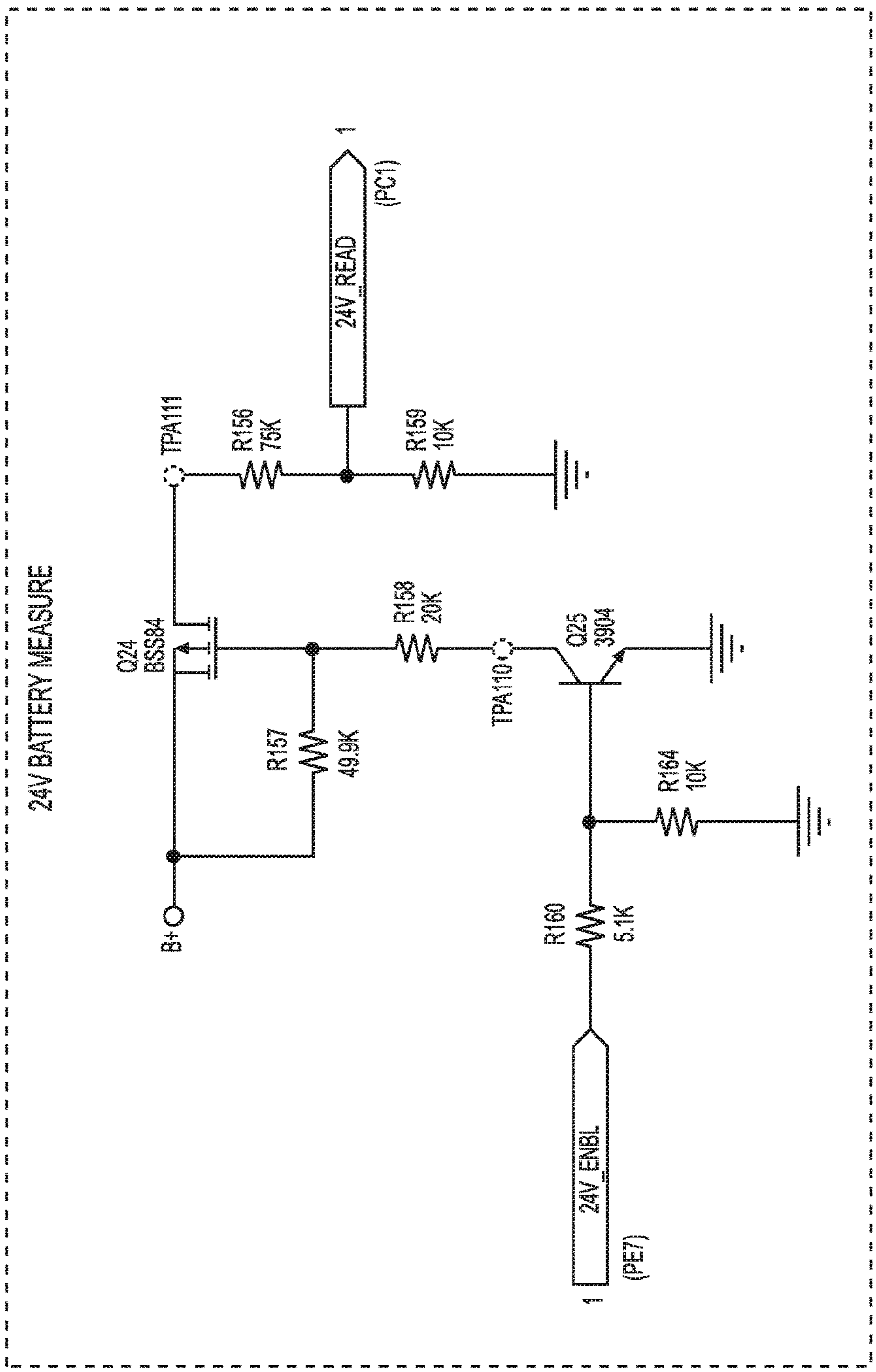
Figure 74D:
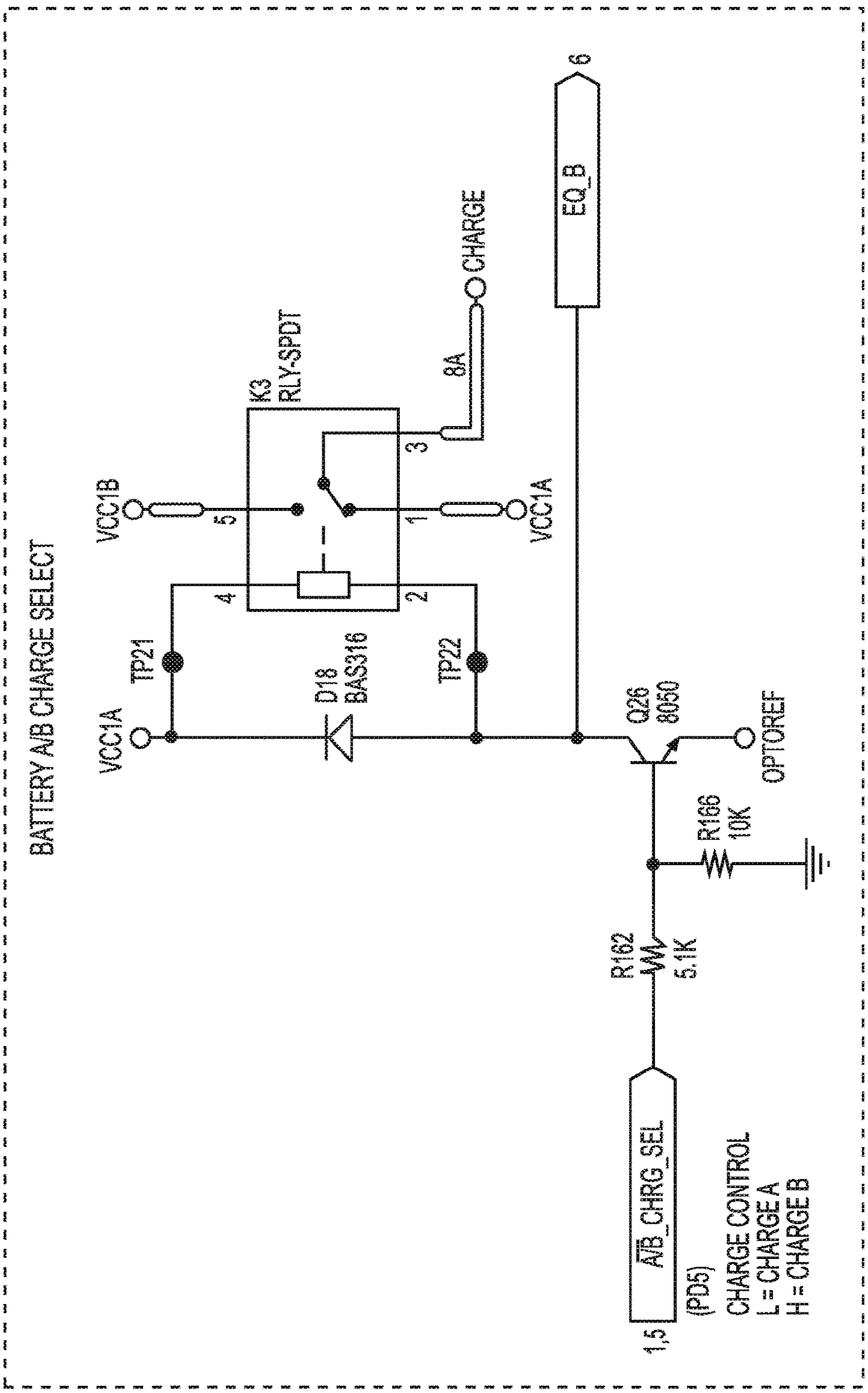
Figure 5:
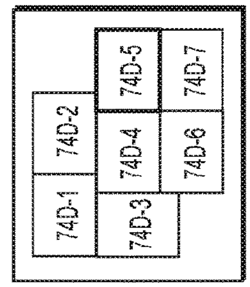
Figure 74D:
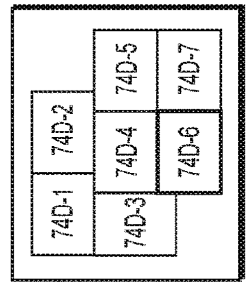
Figure 6:
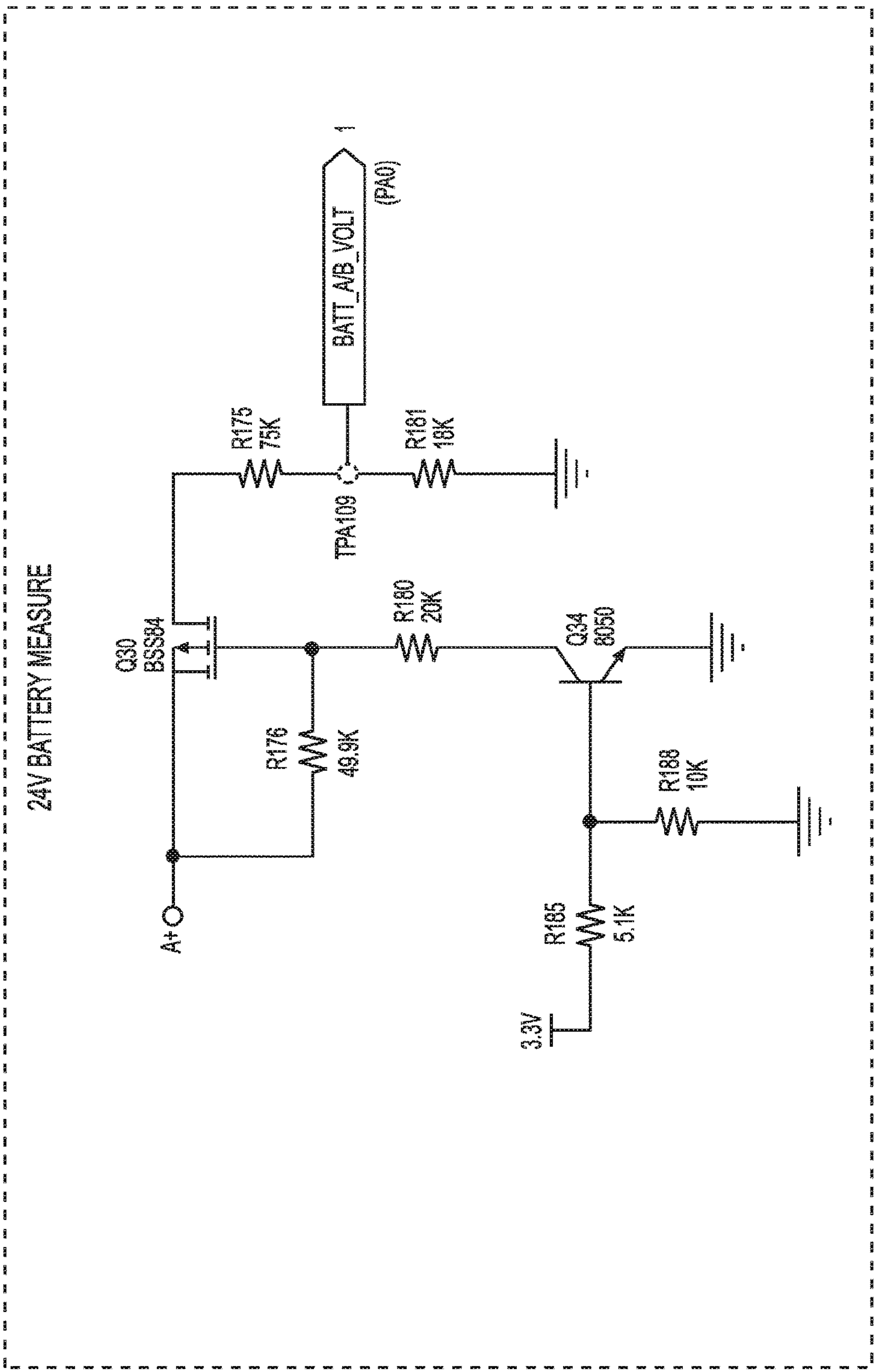
Figures 7, 74D:
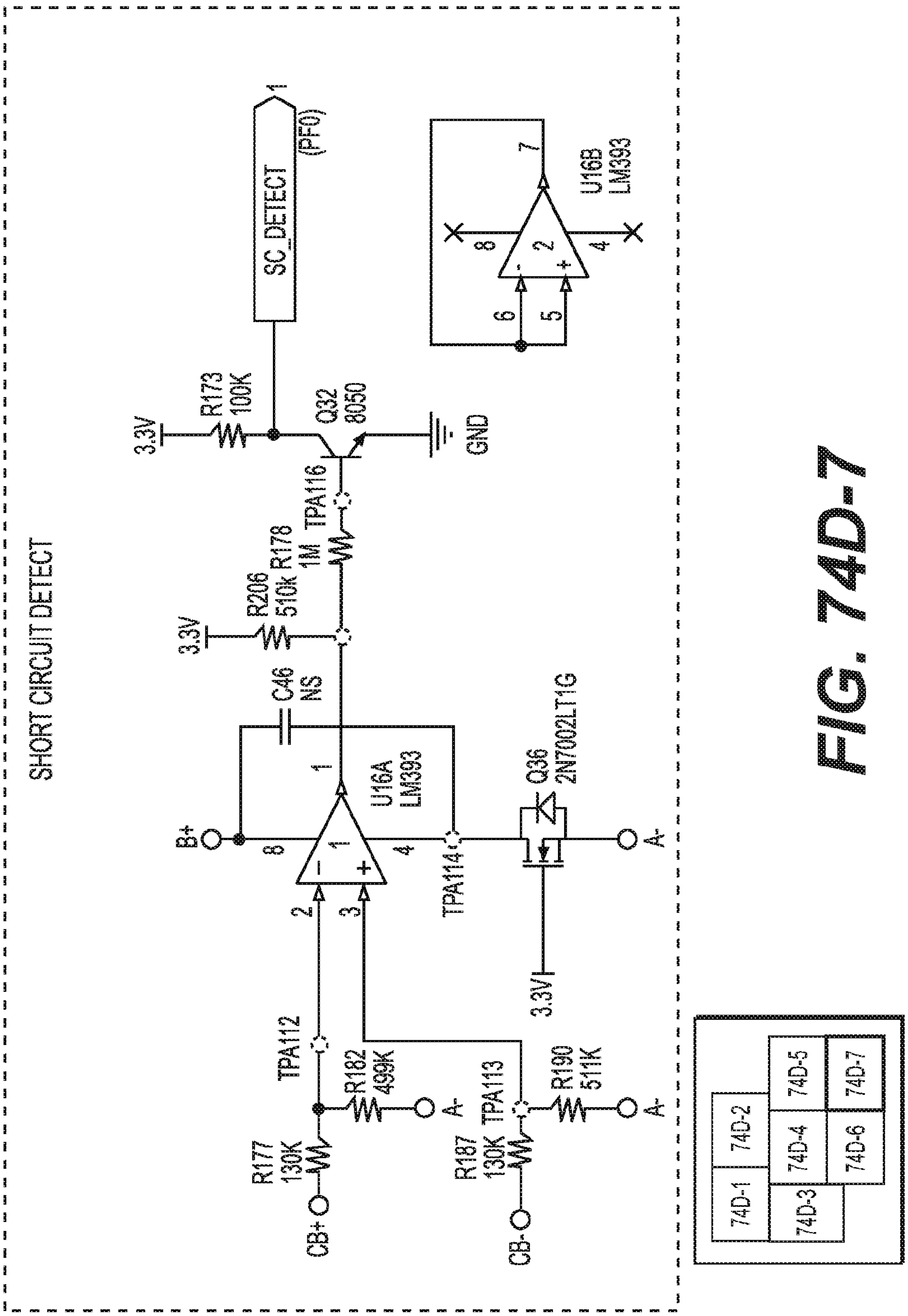
Figures 2, 74E:
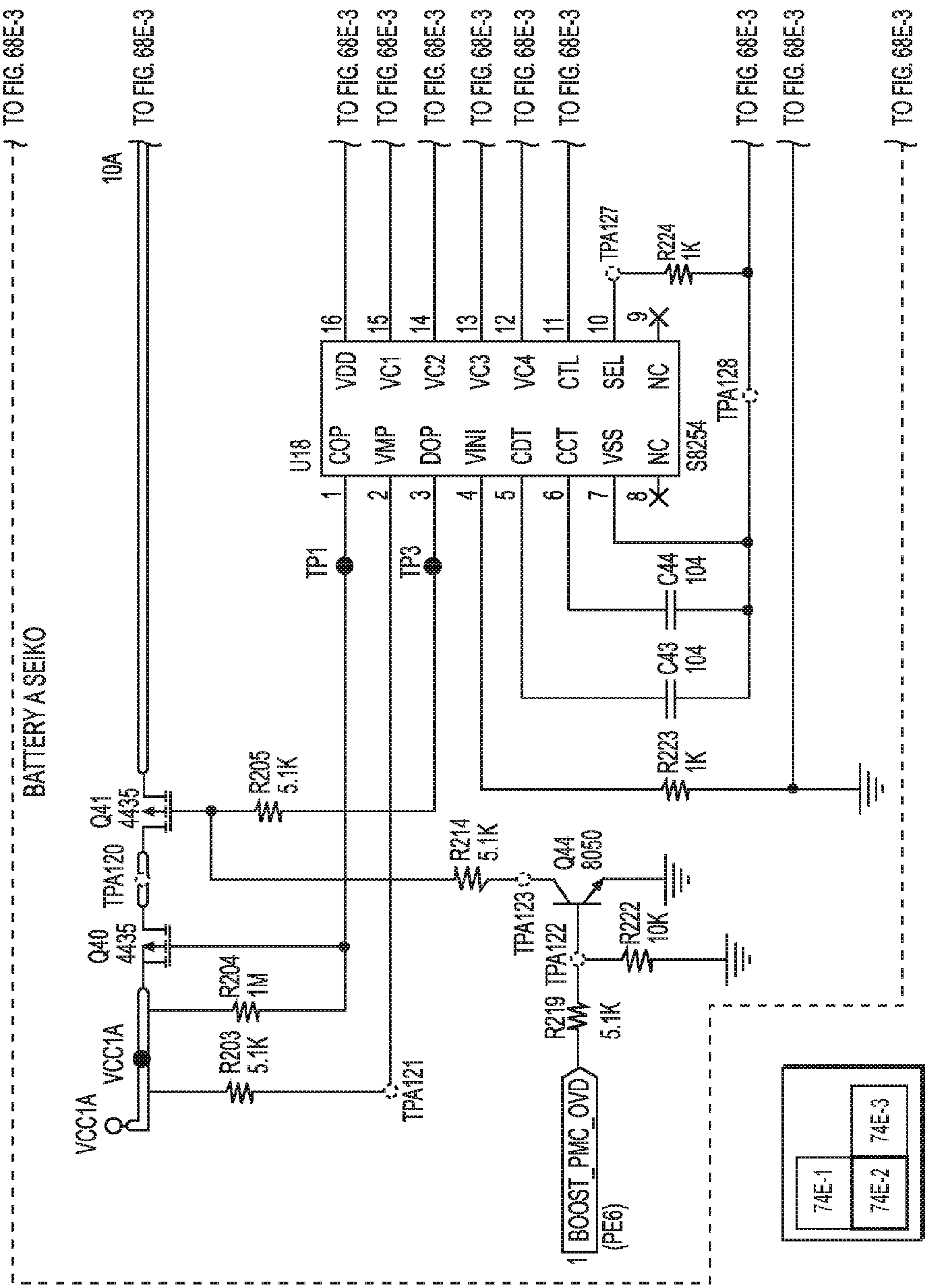
Figures 3, 74E:
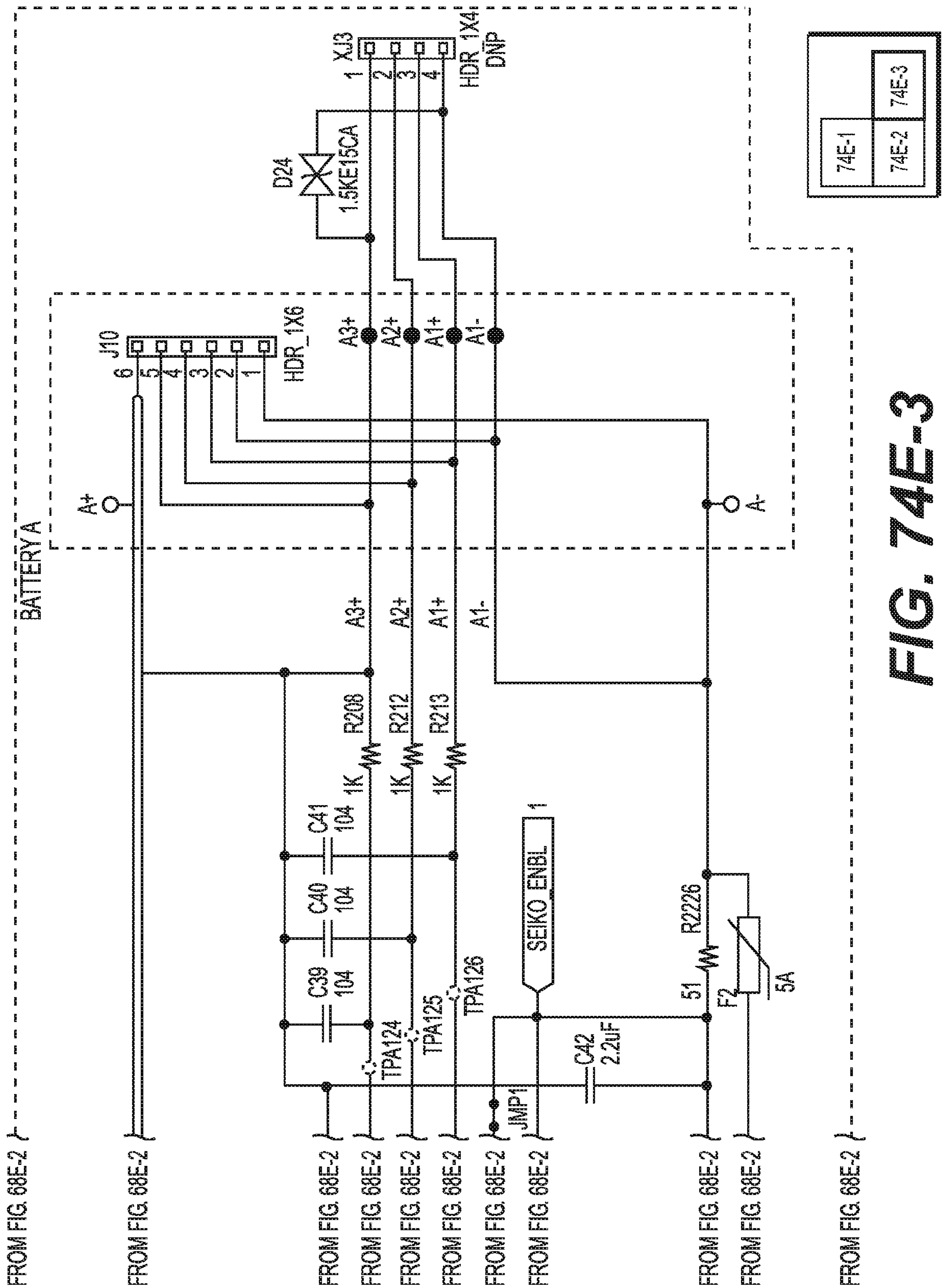
Figures 2, 74F:
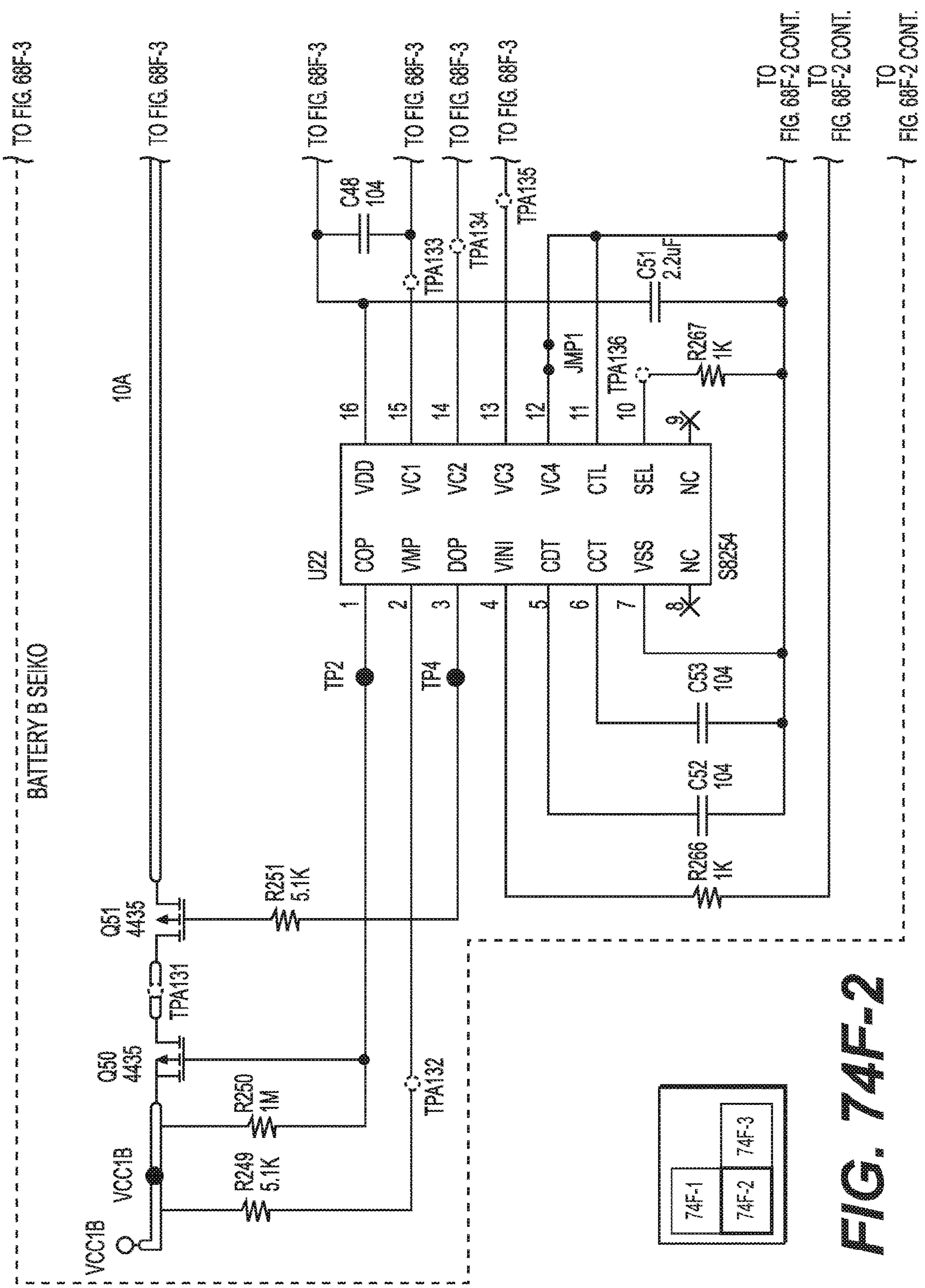
Figures 3, 74F:
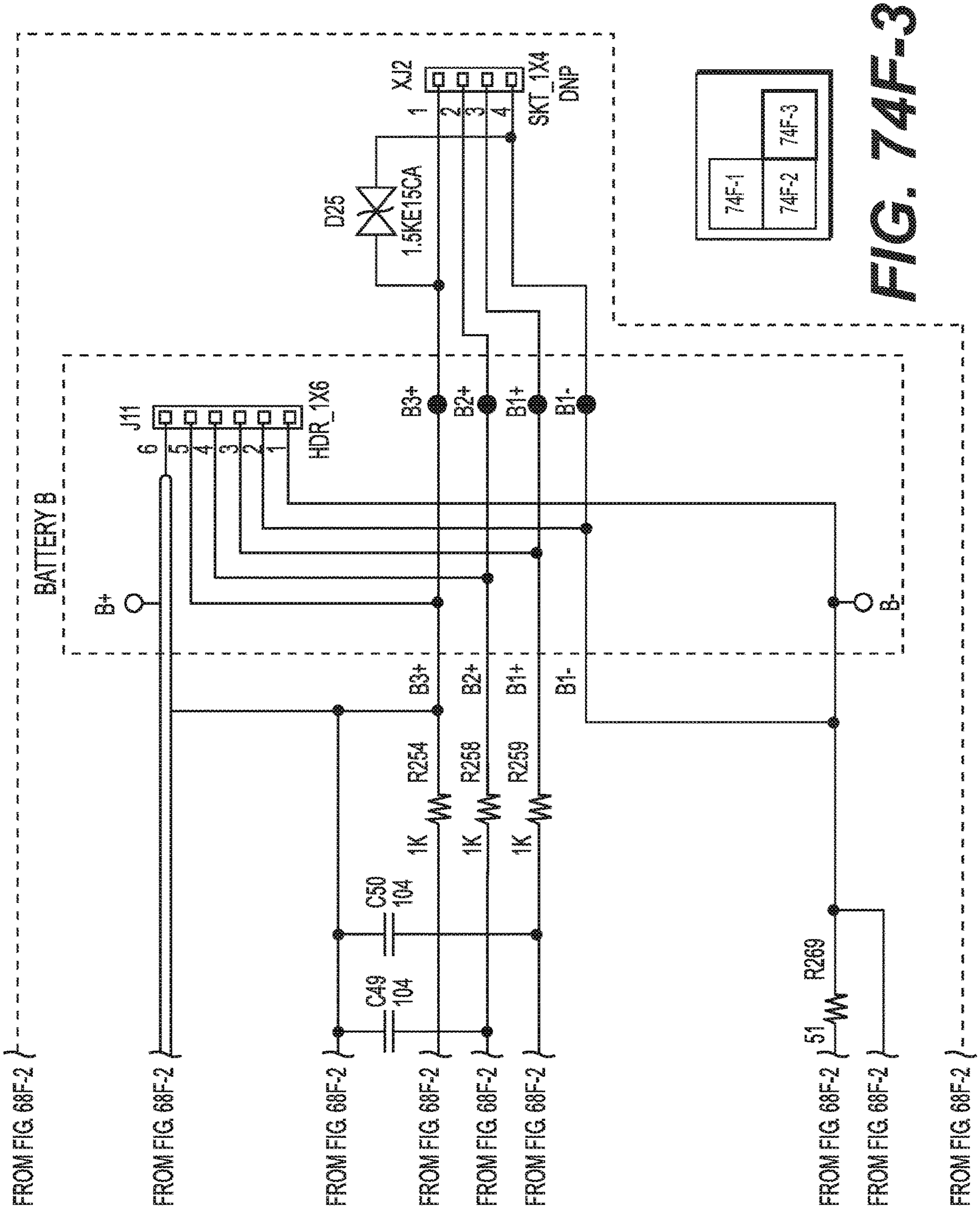
Figure 75:
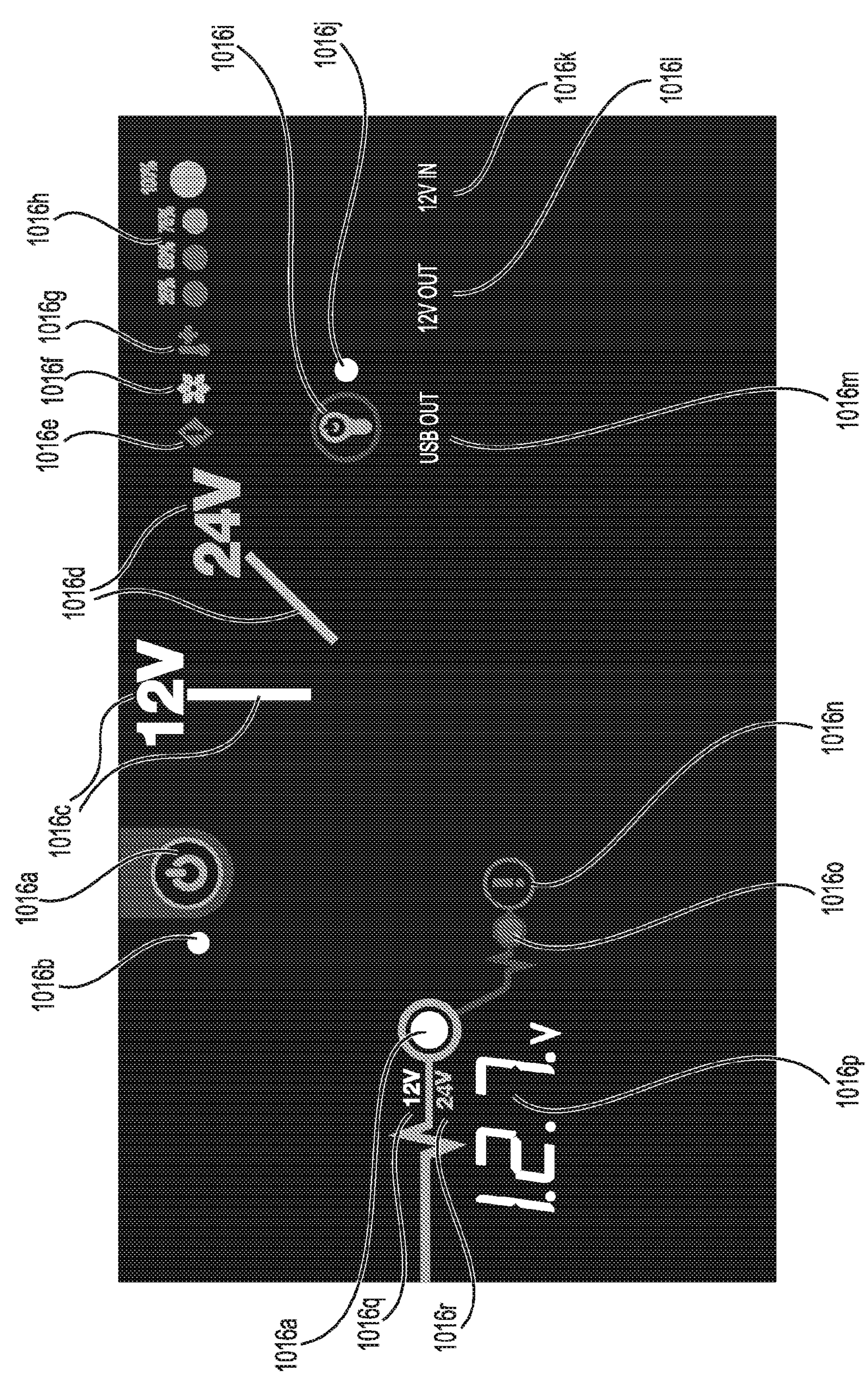
FIG. 75 is a detailed front elevational view of the front display of the portable vehicle battery jump starter shown in FIG. 7.
Figure 76:
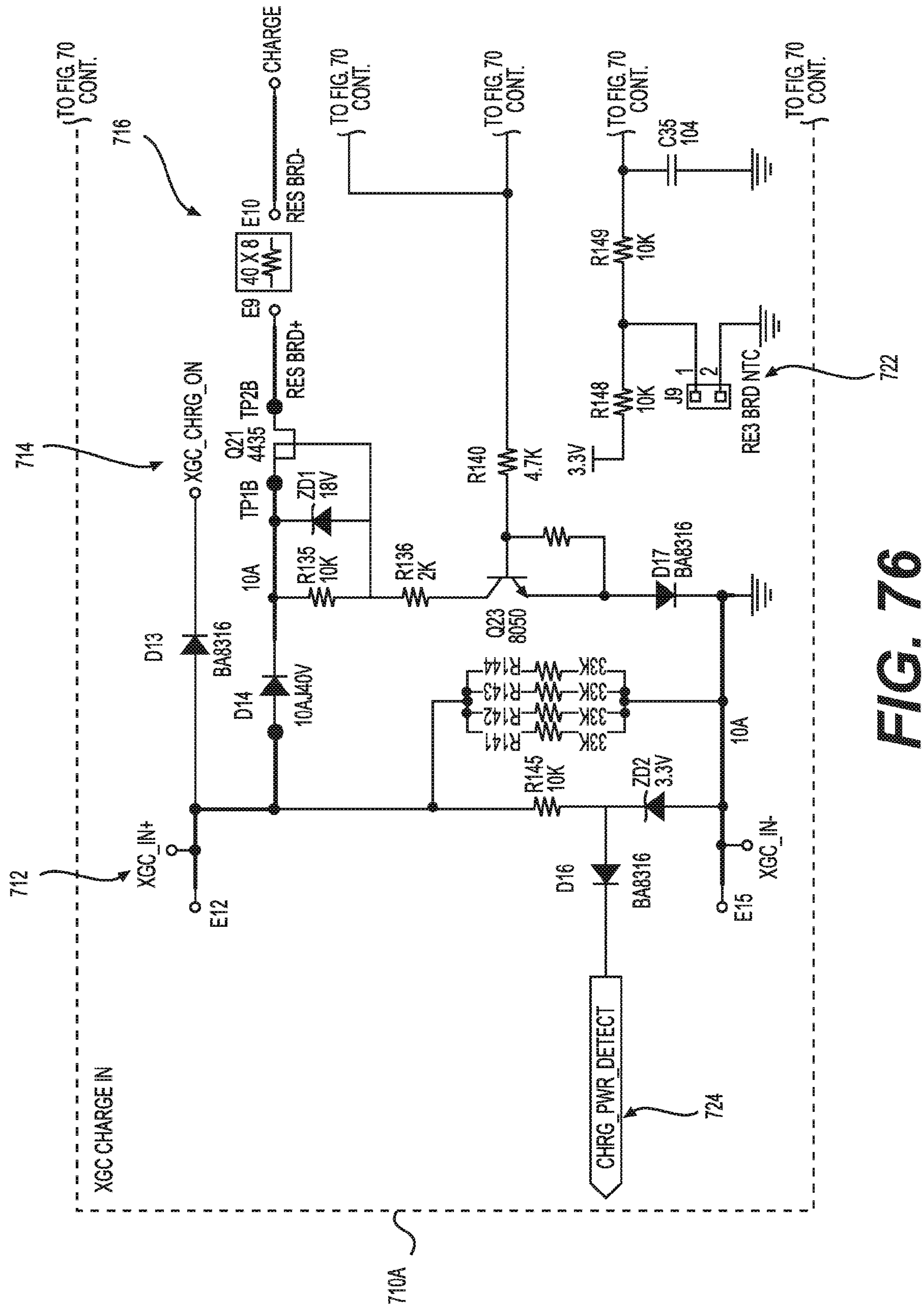
FIG. 76 is an electrical schematic diagram of the leapfrog charging system.
Figure 76:
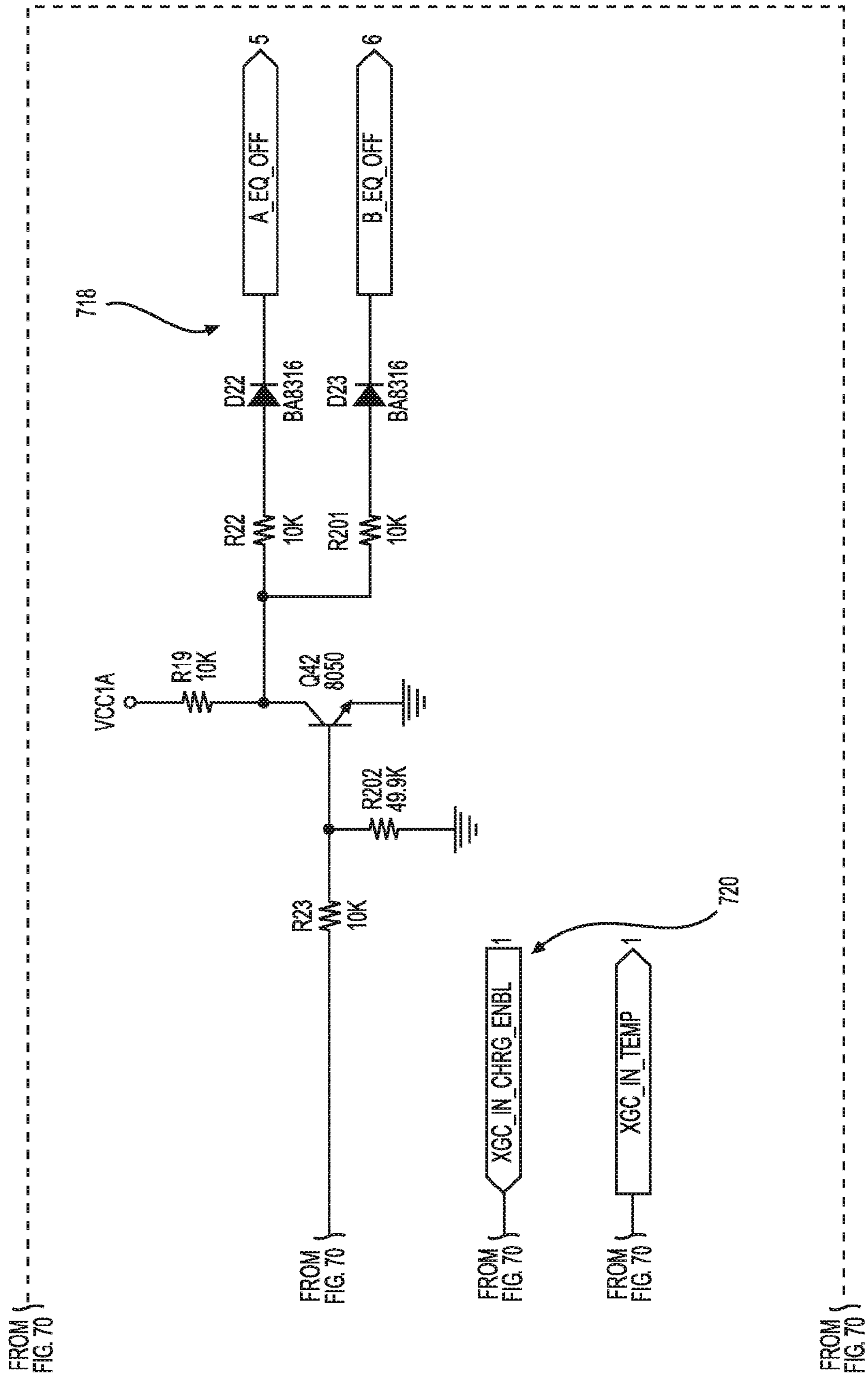
Figure 77:
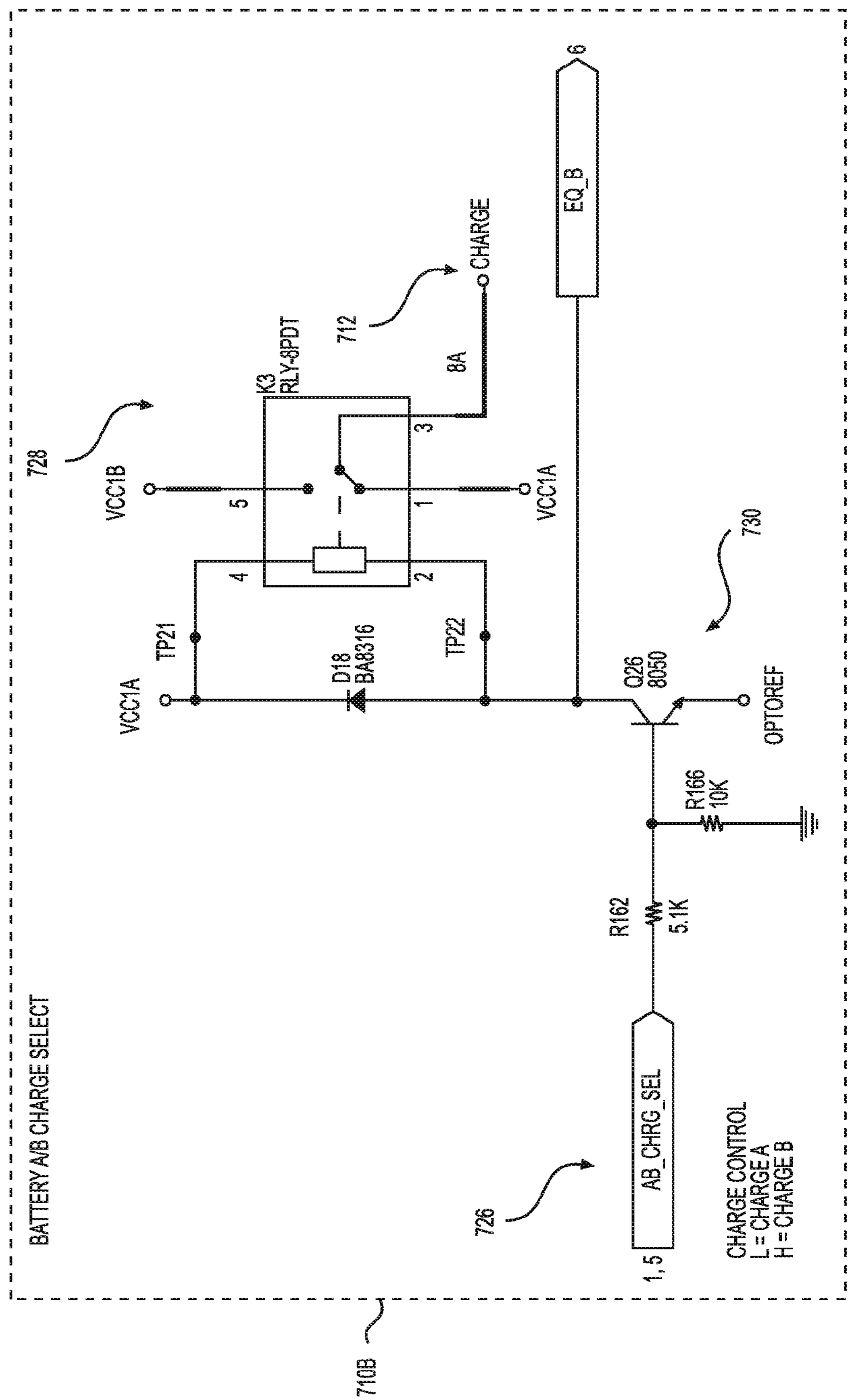
FIG. 77 is an electrical schematic diagram of the improved battery detection system.

The dual diode battery bridge in the form of a back-charge diode module 1148 is shown in FIG. 61. The top channel of diodes 1148*a* support current through one 12V battery 1132, and the bottom channel of diodes 1148*b* support current through the second 12V battery 1132. The combined current from both batteries 1132, 1132 through the two (2) diode channels exits the back-charge diode module 1148 through the copper bar member 1152 leading to the positive output (i.e. positive cam-lock 124*a*) of the battery jump starting and air compressing apparatus 1010.

The back-charge diode module 1148 comprises an upper highly conductive plate 1149*a*, a lower highly conductive plate 1149*b*, and a center highly conductive plate 1149*c* connected together by the channels of diodes 1148*a*, 1148*b*, respectively.

Leapfrog Charging System

The vehicle battery jump starter 1010 or 1110, for example, uses two (2) 12V lithium batteries used for jump-starting vehicles and other system functions. These two individual batteries are used in both series or parallel depending on whether the operator is jumpstarting a 12V vehicle or a 24V vehicle.

The vehicle battery jump starter 1010, 1110, 1210 can be charged using a charging device having a plug-in cord (e.g. 114 V to 126 V (RMS) AC charger) and charging control device (e.g. programmable micro-controller). Each battery is charged on its own by the battery jump starting and air compressing apparatus 1010, 1110, separate from the other battery, but the batteries are kept close in potential during the charging process using a technique called "leapfrog charging". This charging approach insures that both batteries are close to the same potential even if the vehicle battery jump starter apparatus 1010, 1110 is removed from charging early. This provides for equal power delivery during jumpstarts as well as other system functions.

The vehicle battery jump starter 1010, 1110, 1210 is provided with a charging device. For example, the circuit board shown in FIG. 32 can be provided with charging components and a charging circuit for recharging the two (2) Li-ion batteries. The components, for example, includes a programmable microcontroller for controlling the recharging circuit for recharging the Li-ion batteries.

This method is accomplished by charging one battery, starting with the lowest charged battery, until it is approximately 100 mv higher than the other battery, and then switching to charge the other battery. This process continues until both batteries are completely charged.

Safeguards are provided in the vehicle battery jump starter 1010, 1110 to protect against any of the batteries being overcharged as well as sensing if a battery cell is shorted. These safeguards include peak voltage shutoff as well as charge timeouts in software.

The leapfrog charging system and method can be design or configured to charge the rechargeable batteries (e.g. Li-ion batteries) in a charging sequence. The charging sequence can be designed or configured to ensure that both batteries become fully charge regardless of the operations of the battery jump starting and air compressing apparatus 1010, 1110, 1210. In this manner, the batteries are fully charged on a regular basis to maximize the use and life of the batteries.

Further, the charging sequence can be tailored to most effectively charge particular types of rechargeable battery, in particular Li-ion batteries taking into account particular charging properties of the batteries (e.g. reduce heat generation of batteries over a time interval, apply best charging rate(s) for batteries, charging in a sequence increase life of batteries. The charging sequence, for example, can be to partially charge the batteries, one at a time, and back-and-forth. For example, the charging sequence can be configured to incrementally charge the batteries in a back-and-forth sequence until both batteries are fully charged. For example, a voltage increase increment can be selected (e.g. 100 mV) for charging the batteries in a back-and-forth sequence.

In addition, the charging sequencing between the two batteries can be selected or programmed to provide back-to-back charging of one battery two or more increments before switching to the other battery for charging. Also, the charging sequence can include one or more pauses to prevent the charging battery from becoming too hot (e.g. temperature limit) or so that the charging sequence matches with the charging chemistry of the charging battery.

Highly Conductive Frame

Figure 35:
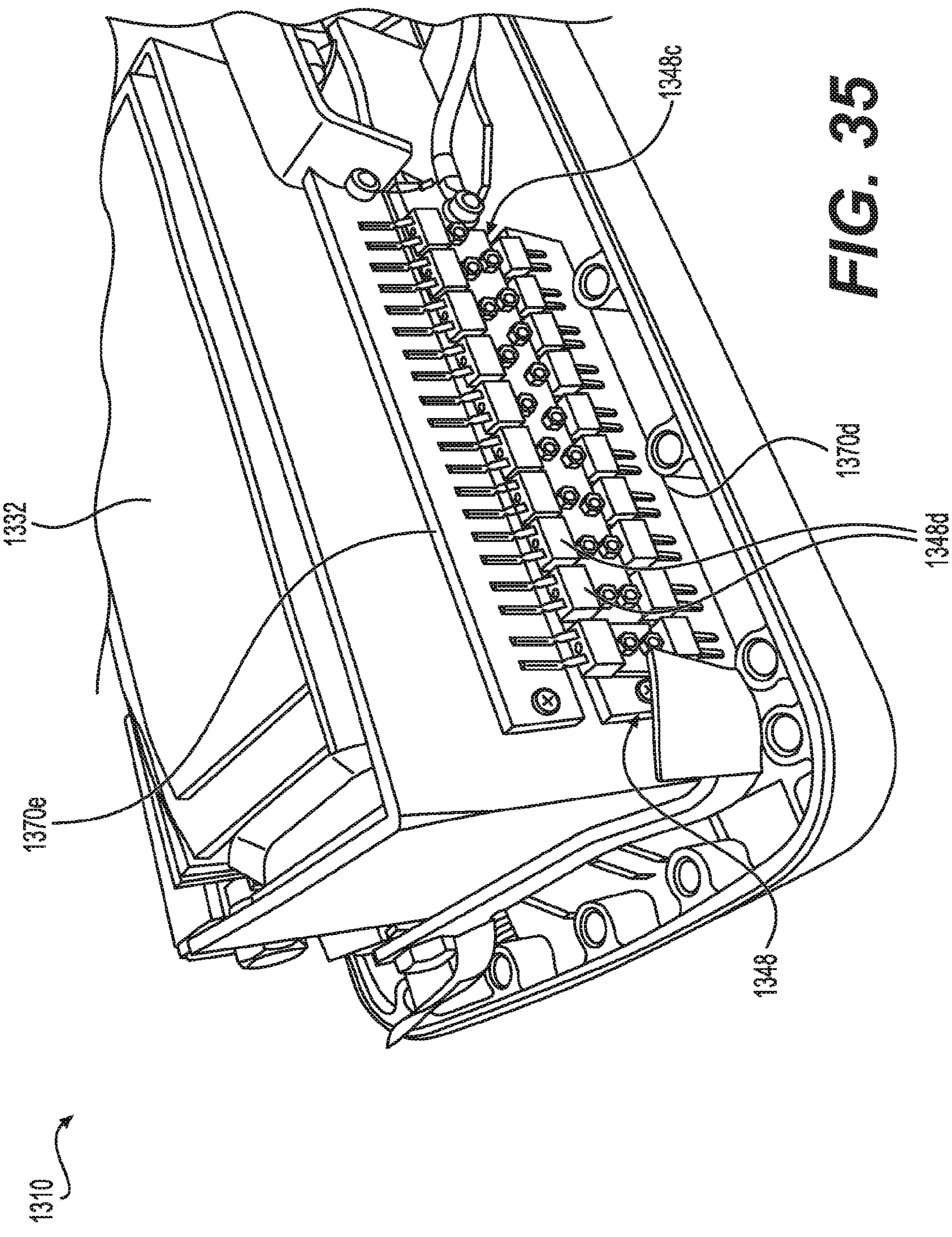
FIG. 35 is a partial rear perspective view of the portable vehicle battery jump starter shown in FIG. 32 with the cover removed.
Figure 36:
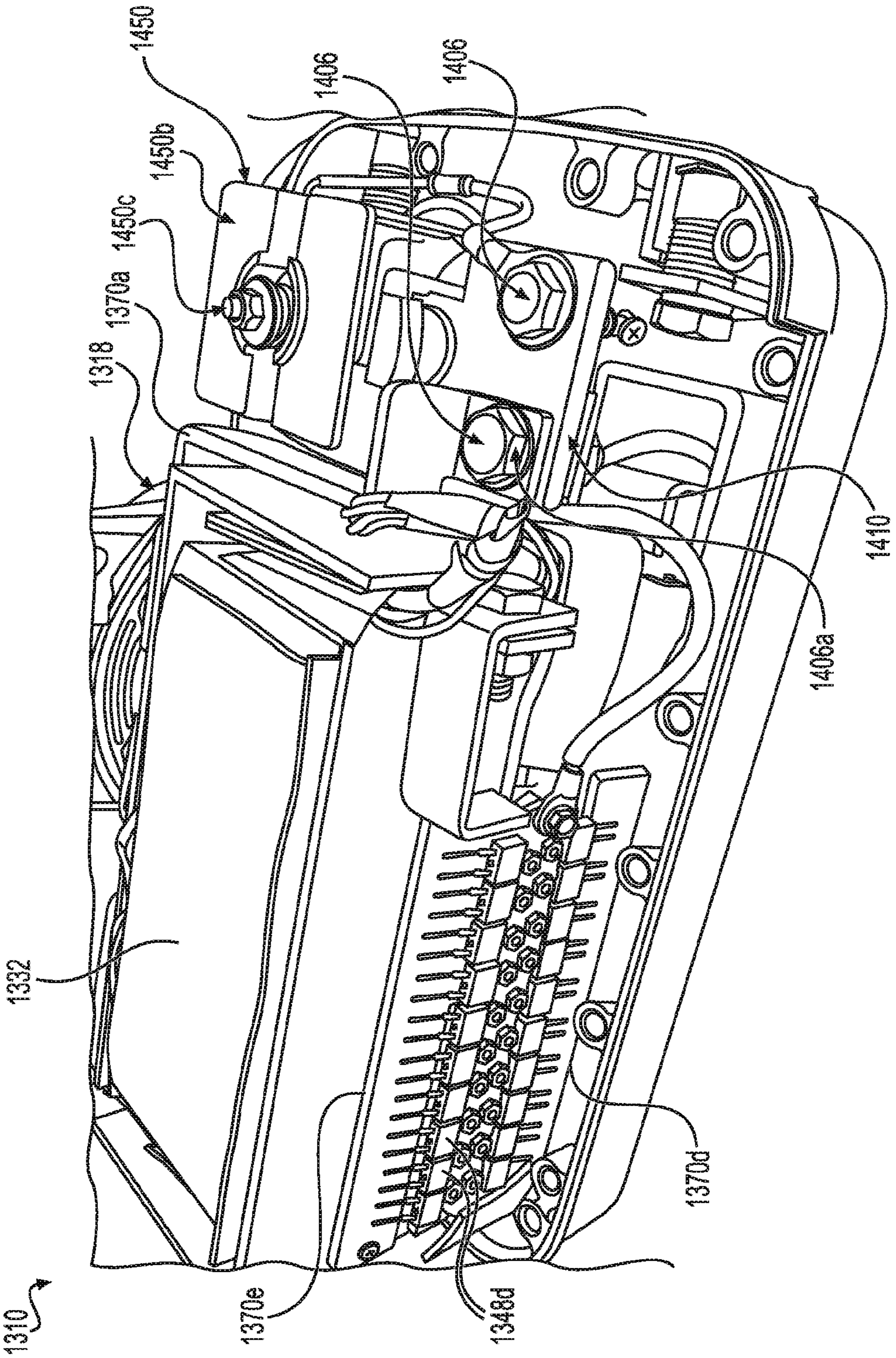
FIG. 36 is a partial rear perspective view of the portable vehicle battery jump starter shown in FIG. 32 with the cover removed.
Figure 37:
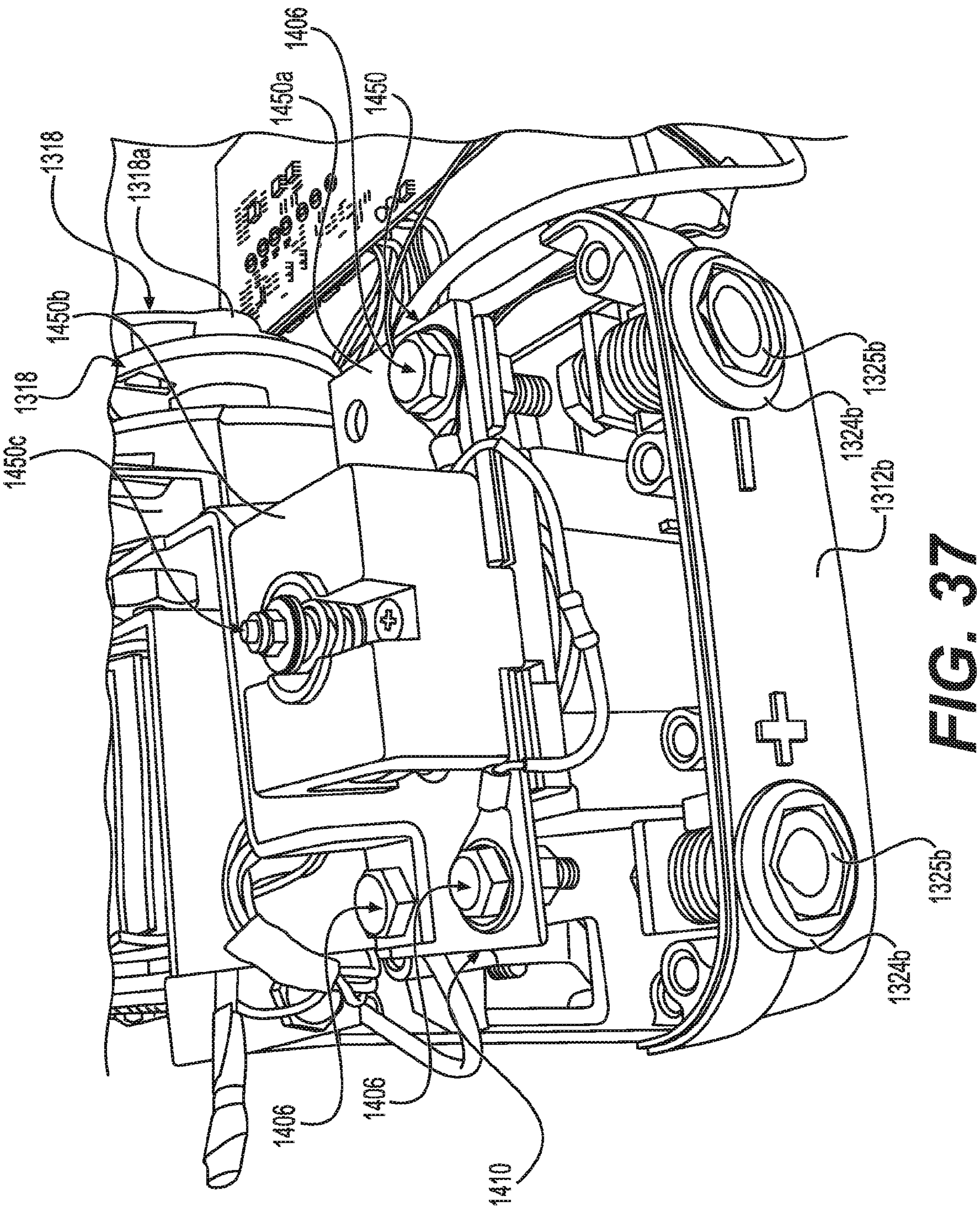
FIG. 37 is a disassembled partial left side perspective view of the portable vehicle battery jump starter shown in FIG. 32 with the cover removed.
Figure 38:
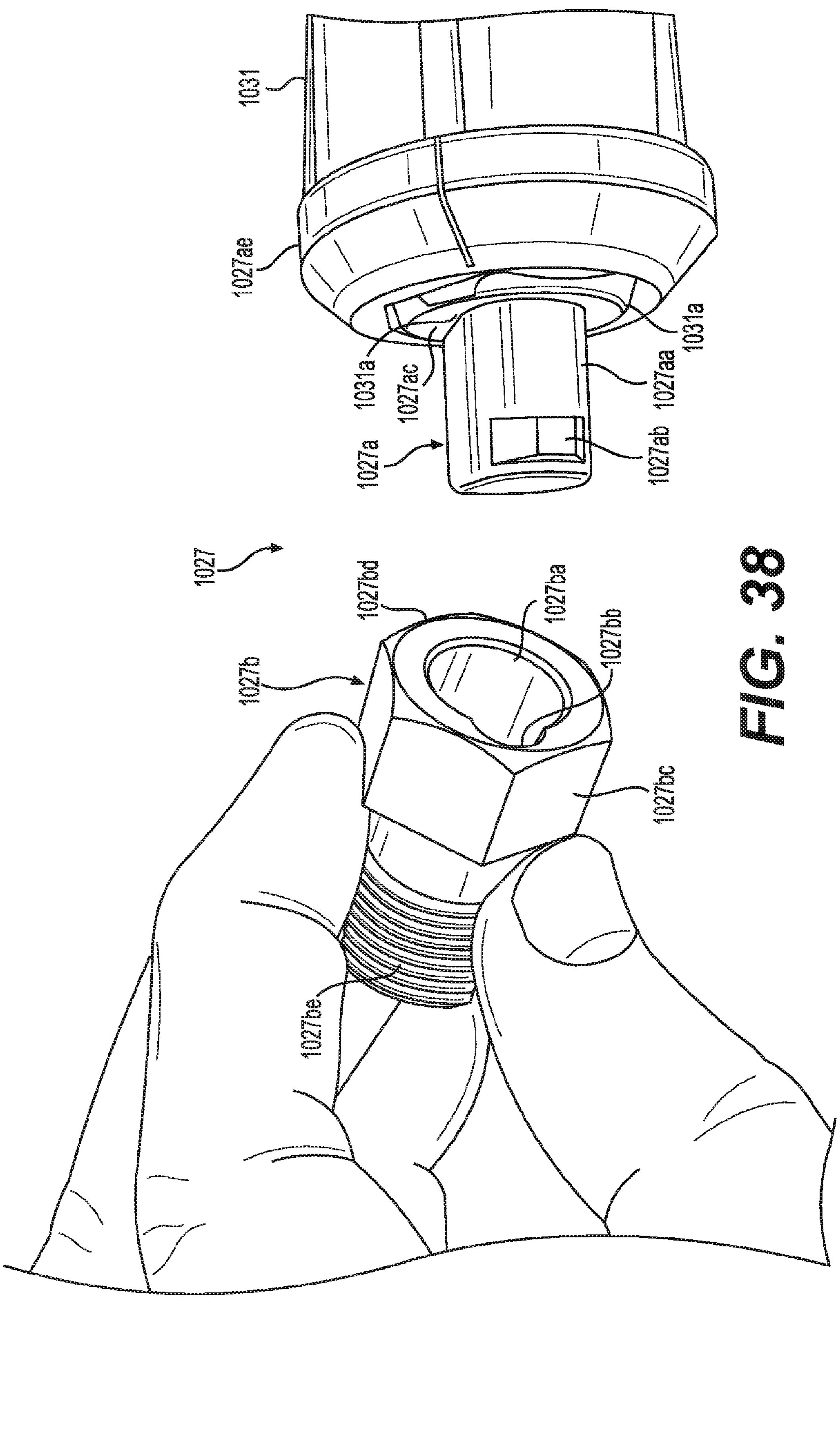
FIG. 38 is a perspective view of the cam-lock connecting device according to the present invention for use, for example, with the portable vehicle battery jump starter according to the present invention shown with the male cam-lock end disconnected from the female cam-lock end.
Figure 39:
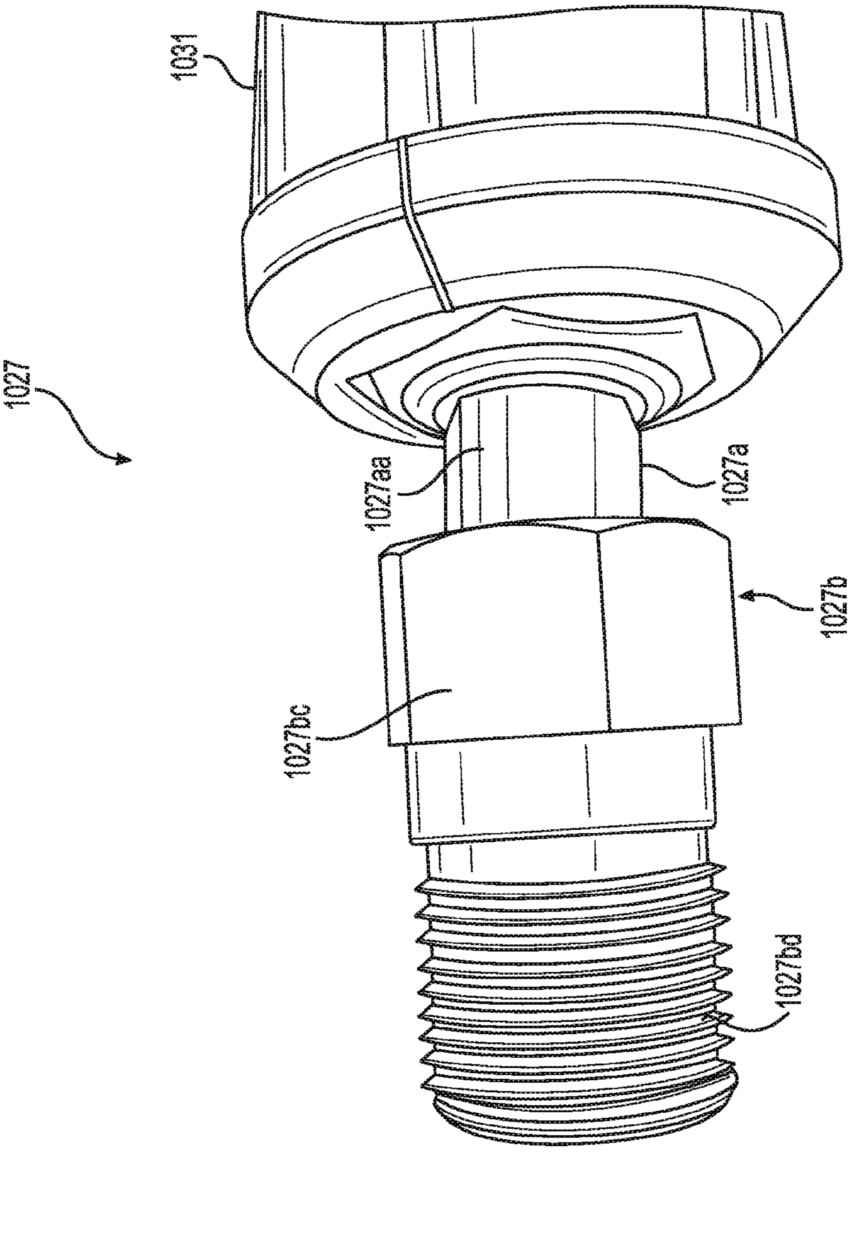
FIG. 39 is a perspective view of the cam-lock connecting device shown in FIG. 38 with the male cam-lock end partially connected to the female cam-lock end.

The details of the highly conductive frame 1470, are shown in FIGS. 62-68. The highly conductive frame 1470 can replace the conductive wiring FIG. 16 of the portable battery jump starting and air compressing apparatus 1010, the highly conductive frame 1170 (FIG. 22) of the vehicle battery jump starter 110, and the highly conductive frames of the portable battery jump starting and air compressing apparatus 1210 (FIG. 26) and the portable vehicle battery jump starter 1310 (FIG. 35).

The highly conductive frame 1470, for example, can be a highly conductive semi-rigid or rigid frame made of semi-rigid or rigid highly conductive material (e.g. copper, aluminum, plated metal, gold plated metal, silver plated metal, steel, coated steel, stainless steel). The highly conductive frame 1470 is structurally stable (i.e. does not move or flex)

so that it does not contact and electrically short with components or parts of the portable jump starting device. The more rigid the highly conductive frame the more structurally stable is the highly conductive frame. The highly conductive frame 1470 connects to the two (2) batteries, for example Li-ion batteries 1032 (FIG. 16) or batteries 1132 (FIG. 22) to, for example, the cam-locks 1024*a*, 1024*b* or cam-locks 1124*a*, 1124*b* (FIG. 22). The cam-locks connect to the detachable battery cable, for example, battery cables 1056, 1058 (FIG. 15).

Figure 24:
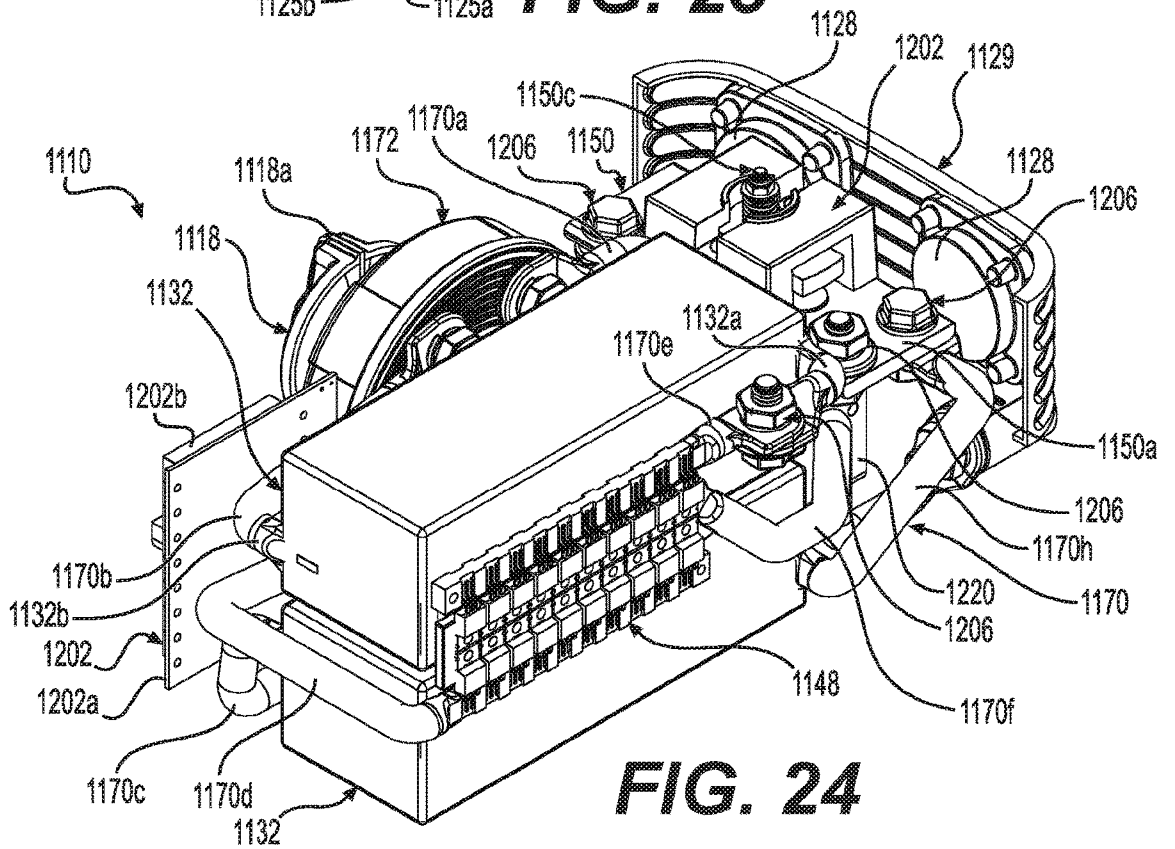
FIG. 24 is a rear and right side perspective view of the portable vehicle battery jump starter shown in FIG. 7 with the cover removed.
Figure 26:
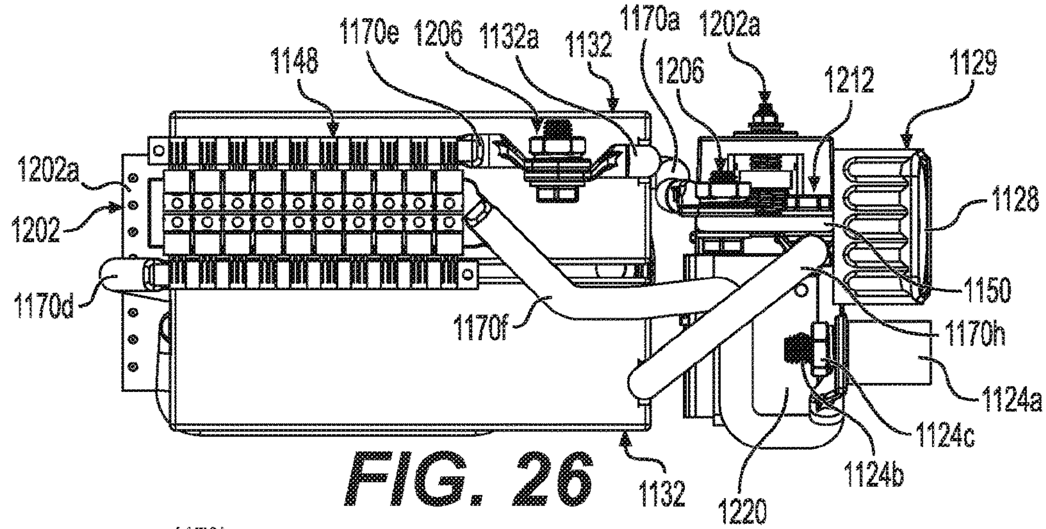
FIG. 26 is a rear elevational view of the portable vehicle battery jump starter shown in FIG. 1 with the cover removed.
Figure 27:
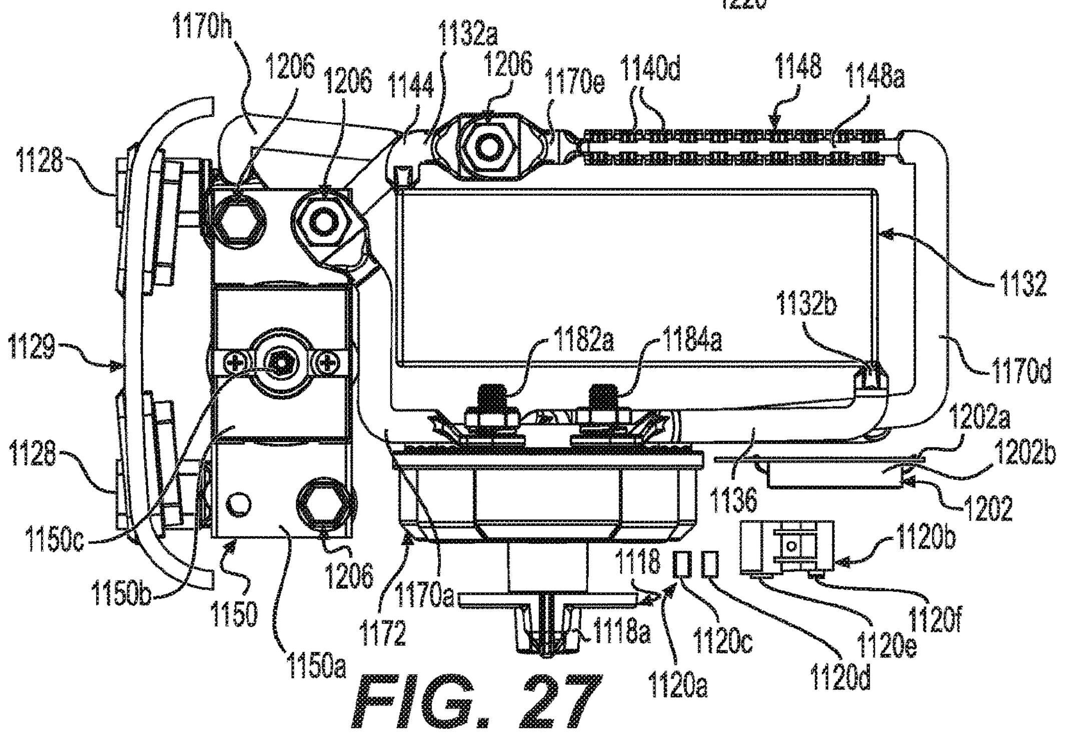
FIG. 27 is a top planar view of the portable vehicle battery jump starter shown in FIG. 7 with the cover removed.
Figure 28:
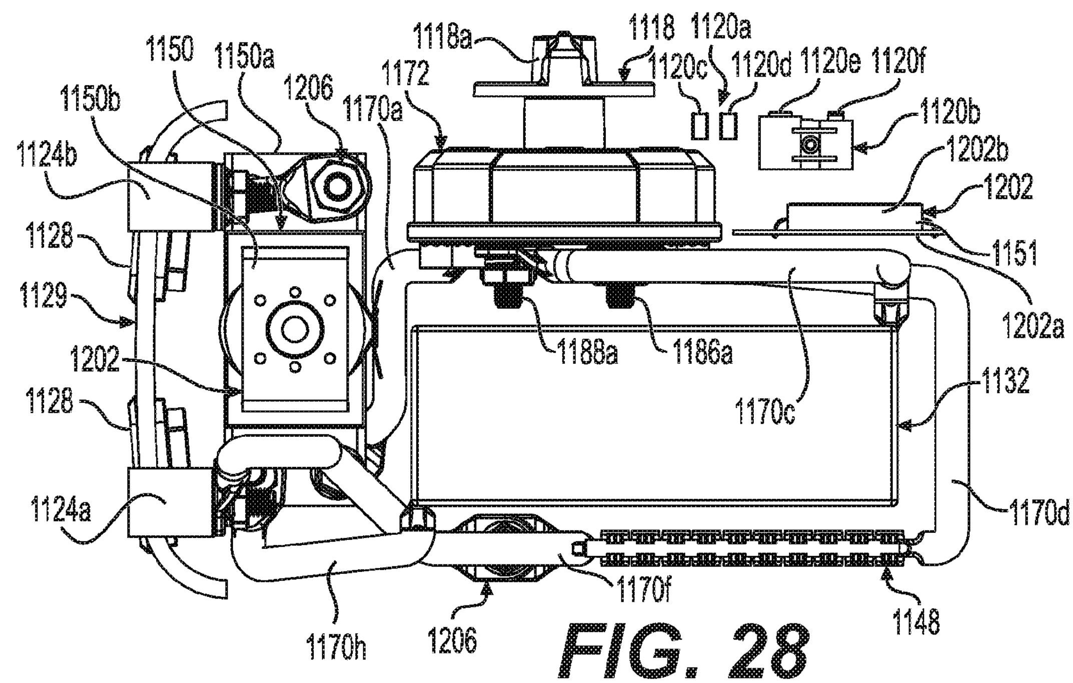
FIG. 28 is a bottom planar view of the portable vehicle battery jump starter shown in FIG. 7 with the cover removed.
Figure 29:
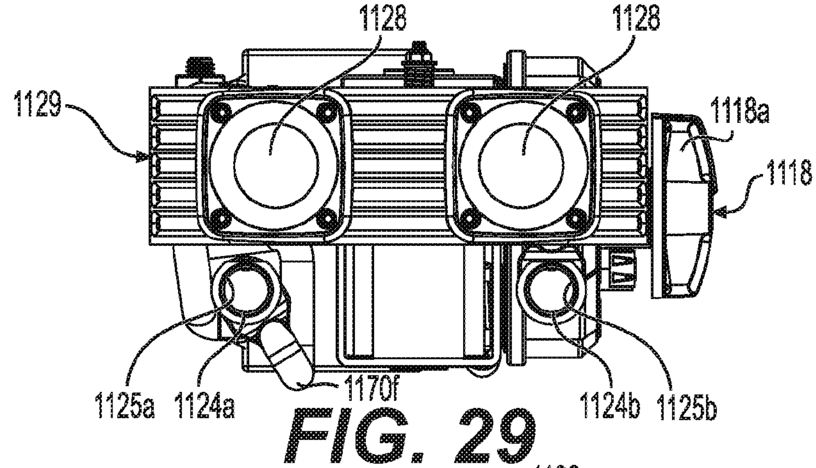
FIG. 29 is a left side elevational view of the portable vehicle battery jump starter shown in FIG. 7 with the cover removed.
Figure 30:
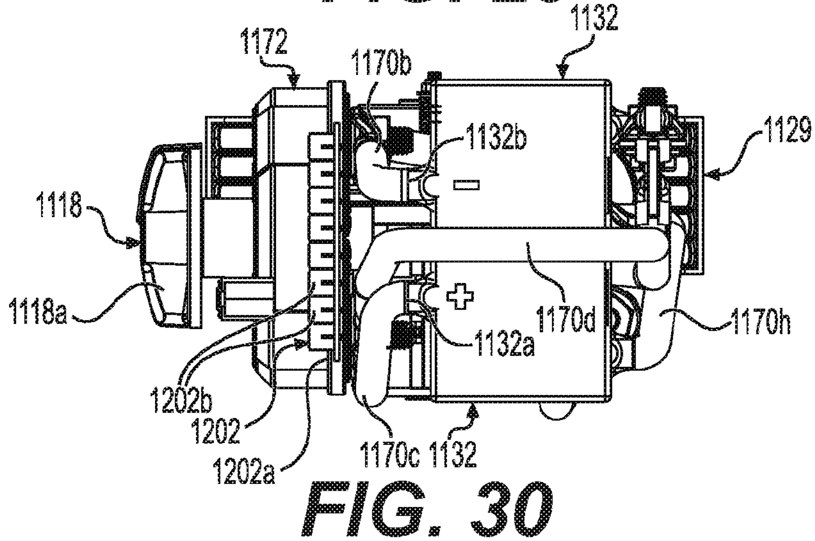
FIG. 30 is a right side elevational view of the portable vehicle battery jump starter shown in FIG. 7 with the cover removed.
Figure 31:
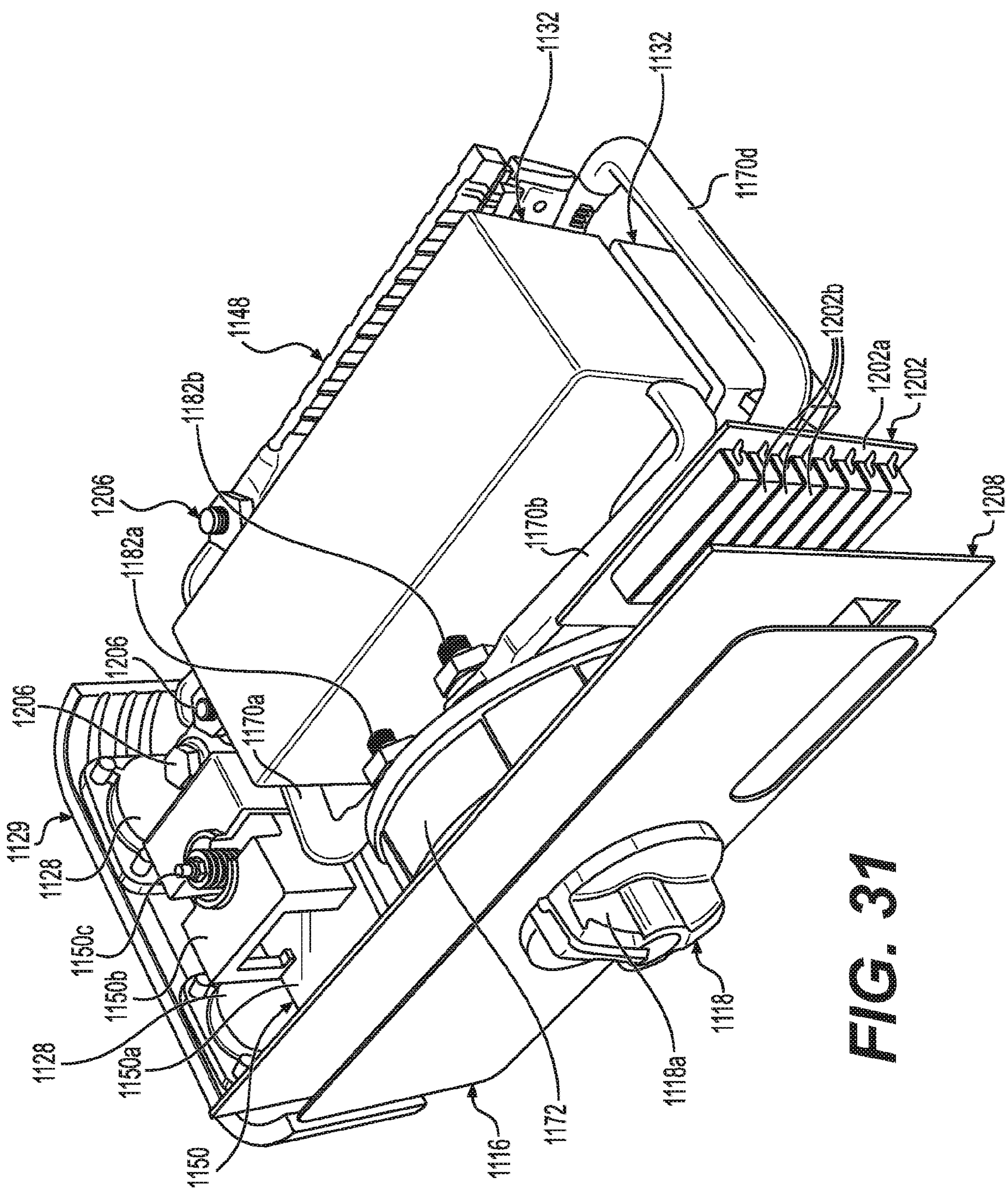
FIG. 31 is a front and top perspective view of the portable vehicle battery jump starter shown in FIG. 7 with the cover removed.
Figure 32:
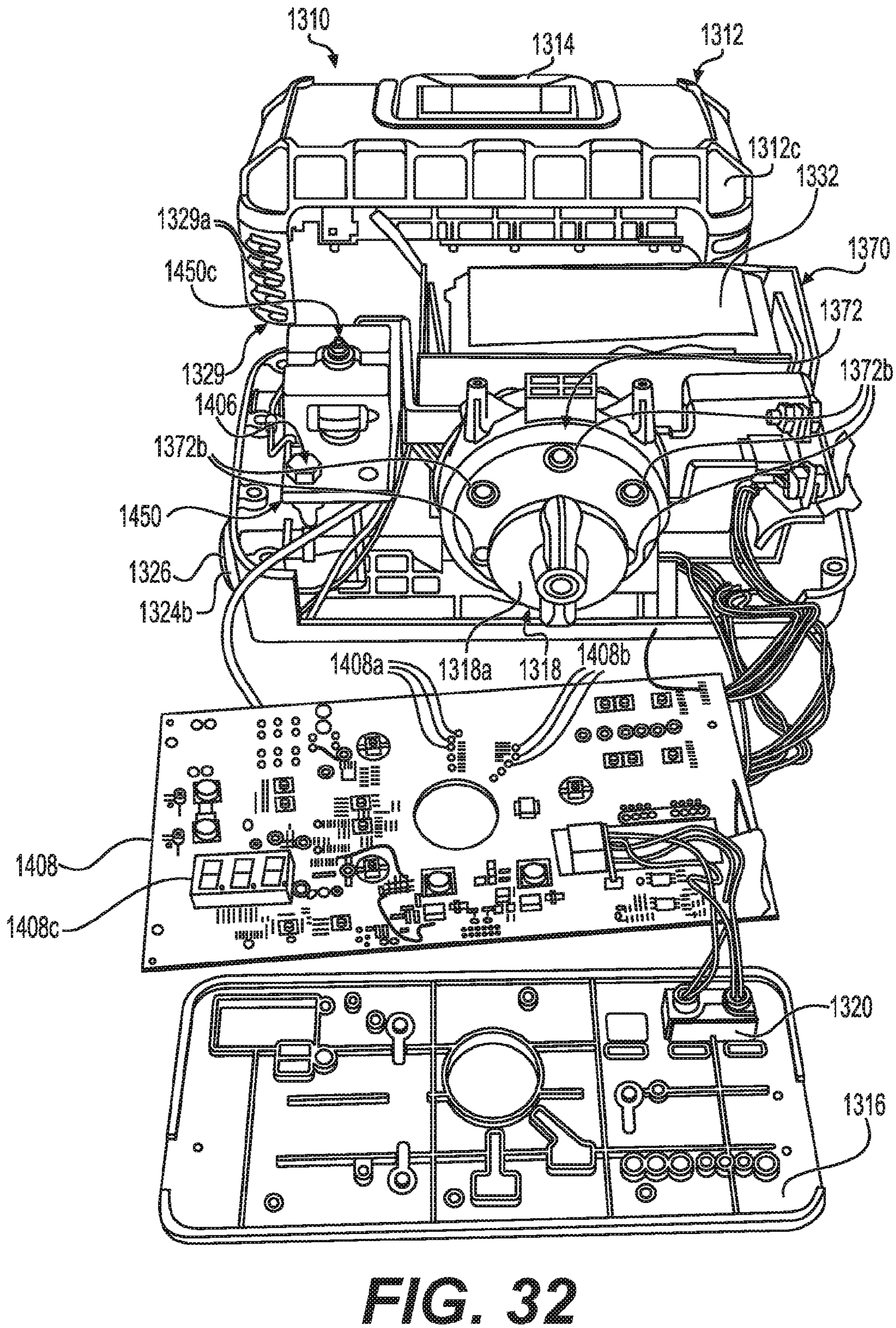
FIG. 32 is a disassembled front perspective view of a third embodiment of the portable vehicle battery jump starter according to the present invention with the cover removed.
Figure 33:
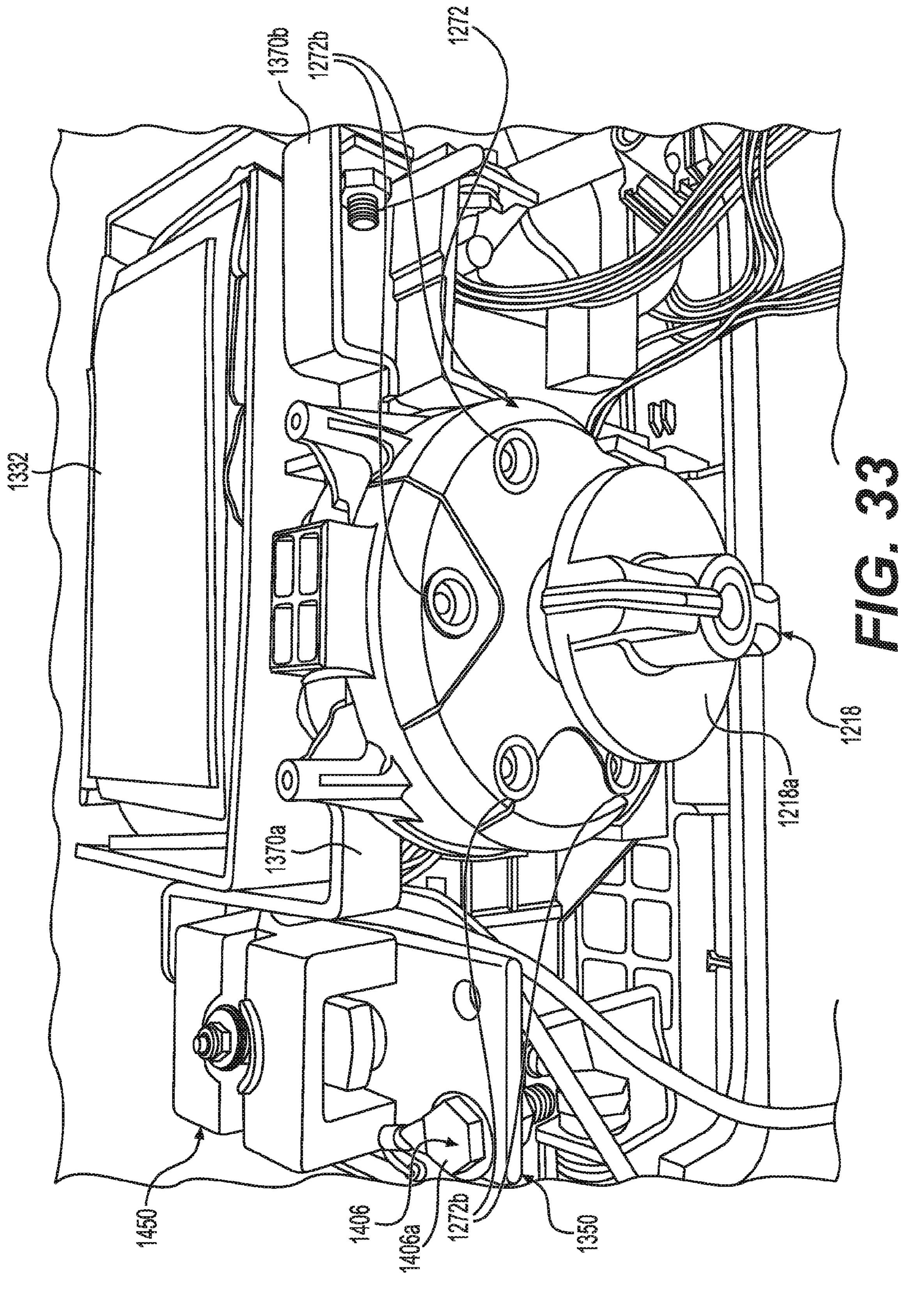
FIG. 33 is a disassembled partial front perspective view of the portable vehicle battery jump starter shown in FIG. 32 with the cover removed.
Figure 34:
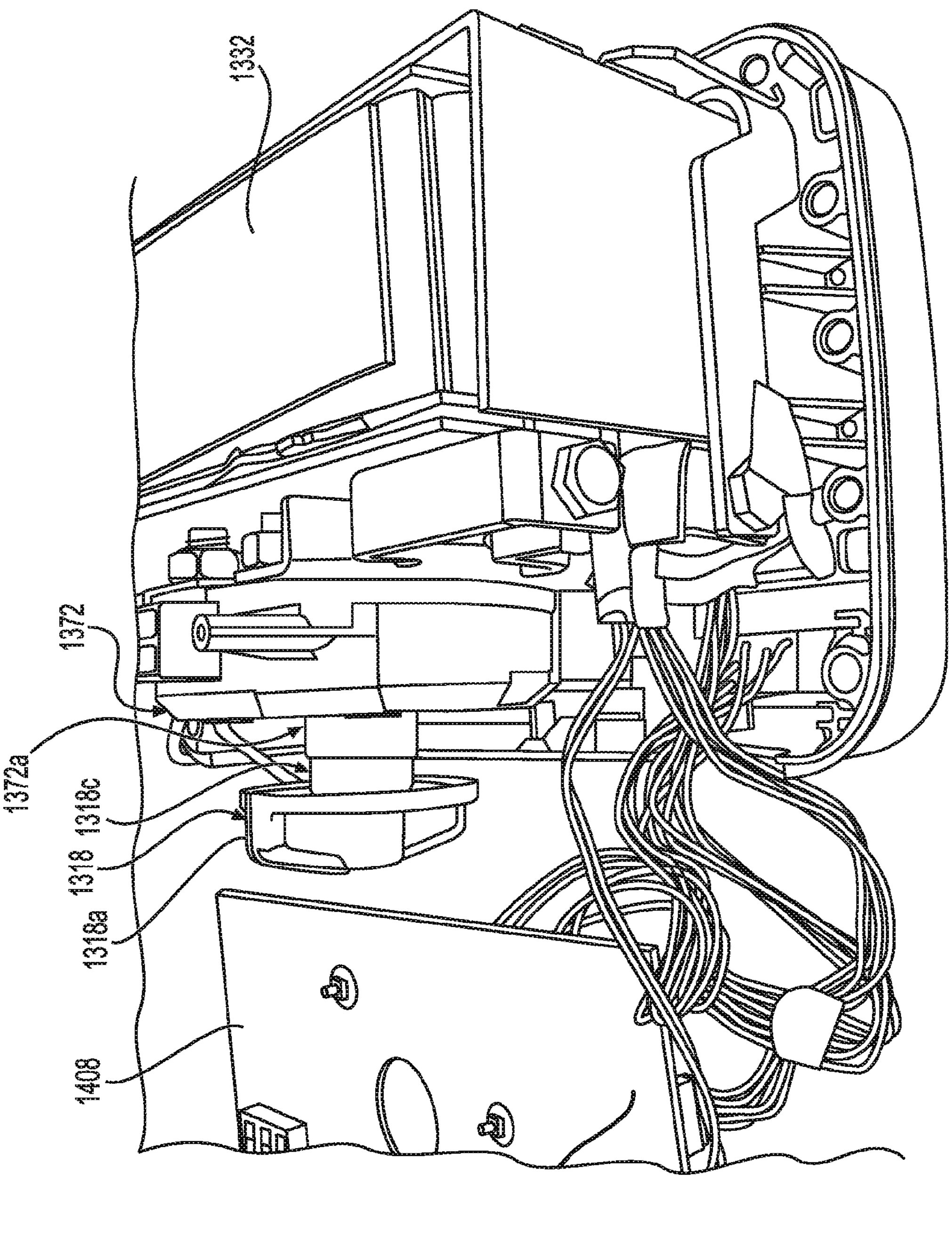
FIG. 34 is a disassembled partial right side perspective view of the portable vehicle battery jump starter shown in FIG. 32 with the cover removed.

The highly conductive frame 1470 comprises multiple highly conductive frame members. For example, highly conductive frame members 1470*a*, 1470*b*, 1470*c*, 1470*d* connect to the control switch such as the terminals 1082*a*, 1084*a*, 1086*a*, 1088*a* (FIG. 20) of the control switch 1018 (FIG. 18). The highly conductive frame members 1470*d*, 1470*e*, 1470*f* form part of the reverse flow diode assembly 1148 (FIG. 24). The highly conductive frame member 1470*f* connected to the positive cam-lock such as positive cam-lock 1024*a* (FIGS. 7 and 15) and positive cam-lock 1124*a* (FIG. 26). The highly conductive frame member 1470*g* connects to the negative cam-lock such as negative cam-lock 1024*b* (FIG. 7) or negative cam-lock 1024*b* (FIG. 25). The highly conductive frame member 1470*h* connects to the smart switch 1150 (FIG. 22).

The highly conductive frame 1470 is a three-dimensional (3D) structure configured to enclose the Li-ion batteries such Li-ion batteries 1132 (FIGS. 22-31). This arrangement provides the shortest conductive pathways from the Li-ion batteries 1132 to the other internal electrical components of the portable jump starting device 1110 to maximize the power output between the positive cam-lock 1124*a* and negative cam-lock 1124*b*.

The highly conductive frame members 1470*a-h* are provided with ends having through holes to accommodate highly conductive fasteners 1206 (e.g. bolts and nuts), as shown in FIGS. 22-31. Further, the highly conductive frame members 470*a-h* are made of flat bar stock bent at one or more locations so as to wrap around the Li-ions batteries such Li-ion batteries 1132. For example, the highly conductive frame members 1470*a-h* are bent at multiple locations to form a three-dimensional (3D) frame structure. For example, the highly conductive frame members 1470*a-h* can have bent ends provided with ring-shaped through holes. Alternatively, the high conductive frame 1470 can be made as a single piece (e.g. single piece of plate bent into shape, multiple pieced welded or soldered together, machined from a block of stock material).

The highly conductive frame 1470 is made from flat highly conductive plate stock material (e.g. flat strips of copper stock material cut to length and bent and drilled).

Battery Assembly

The Li-ion battery assembly 1133 according to the present invention is shown in FIGS. 69-72.

1The Li-ion battery assembly 1133 comprises the Li-ion battery 1132, positive highly conductive battery member 1132*a*, and negative highly conductive battery member 1132*b*. The Li-ion battery comprises multiple Li-ion battery cells 1132*c* layered one on top of the other.

The positive foil ends 1132*d* of the Li-ion battery cells 1132*c* are connected (e.g. soldered, welded, and/or mechanically fastened) to the positive highly conductive battery member 1132*a*. The negative foil ends 1132*e* (negative end) of the Li-ion battery cells 1132*c* are connected (e.g. soldered, welded, and/or mechanically fastened) to the negative highly conductive battery member 1132*b*. The positive highly conductive battery member 1132*a* and the negative highly conductive battery member 1132*b* are made from highly conductive flat plate or bar stock material (e.g. copper plate, aluminum plate, steel plate, coated plate, gold plated plate, silver plated plate, coated plate). The positive highly conductive battery member 1132*a* is provided with a through hole 1132*aa* located at an end extending a distance outwardly from and oriented transversely relative to the Li-ion battery 1132. The negative highly conductive battery member 1132*b* is provided with a through hole 1132*ba* located at an end extending a distance outwardly from and oriented transversely relative to the Li-ion battery 1132.

The highly conductive battery members 1132*a*, 1132*b* are made of relatively thick plate or bar material. The foil ends 1132*d*, 1132*e* of the battery cells 1132*c* can at least partially or fully wrap around the highly conductive battery members 1132*a*, 1312*b*. As shown in the assembled Li-ion battery assembly 1133 shown in FIG. 69, the highly conductive battery members are oriented flat against the opposite ends of the Li-ion battery, and are covered with protective heat shrink material until installed in an electronic device such as the portable jump starting device 1110.

For example, the highly conductive battery members 1132*a*, 1132*b* are connected by highly conductive fasteners (e.g. nuts and bolts) to the highly conductive frame such as highly conductive frame 1170 (FIGS. 22-31) or highly conductive frame 1470 (FIGS. 62-68) of any of the portable jump starting devices 1010, 1110, 1210, 1310. A heat shrink material is wrapped around the assembled battery 1132 and highly conductive members 1132*a*, 1132*b* to complete the assembly.

Vehicle Battery Jump Starter with Air Pump

Figure 79:
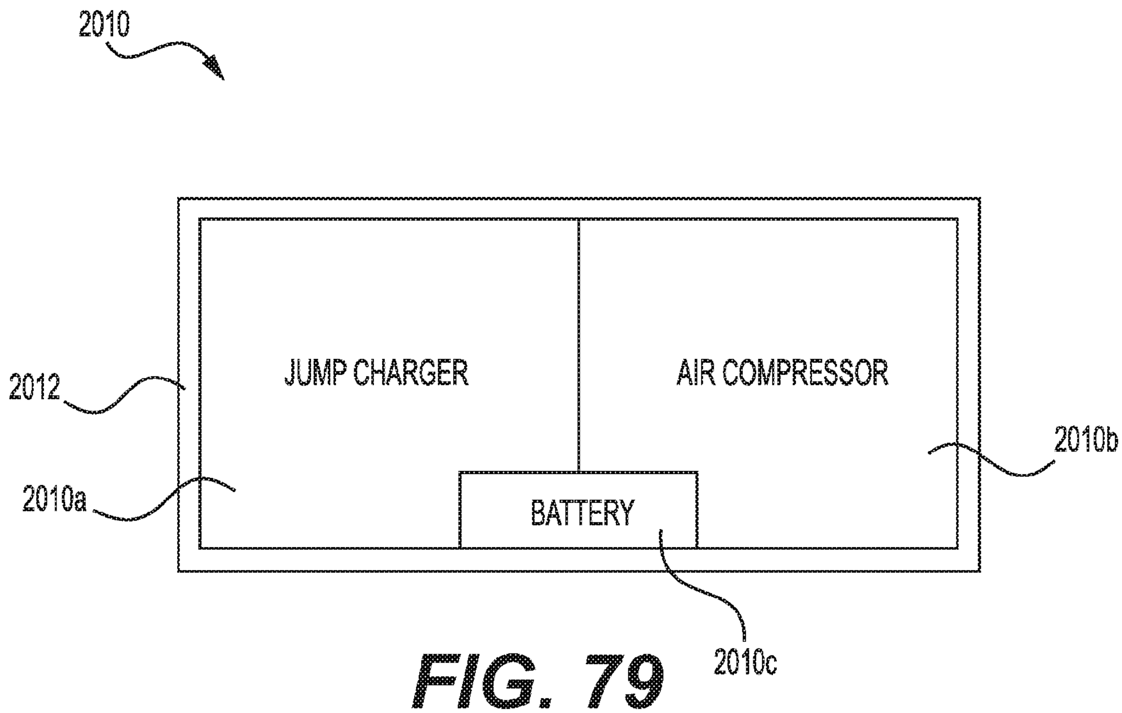
FIG. 79 is a front perspective view of the portable vehicle battery jump starter shown in FIG. 7 with an air pump.

FIG. 79 is diagrammatic views showing a jump starter/air pump device 2010 comprising a jump starter or jump charger 2010*a*, an air pump or air compressor 2010*b*, and a rechargeable battery 2010*c* (e.g. Li-ion rechargeable battery). The jump starter or jump charger 2010*a*, the air pump or air compressor 2010*b*, and the rechargeable battery 2010*c* can be located in a single cover 2012 (e.g. housing or casing), or alternatively in separate covers (e.g. covers connecting together, one cover nesting within other cover, and one covering docketing within other cover). For example, the air pump or air compressor 2010*b* can be removable installed within the jump starter or jump charger 2010*a*. In FIG. 79, the jump starter or jump charger 2010*a* is located side-by-side with the air pump or air compressor 2010*b*.

The air pump, for example, can comprise one or more selected from the group consisting of an air compressor, rotary air compressor, reciprocal air compressor, an air tank, electric motor, hydraulic motor, pneumatic motor, control, conduits, and air hose. Other known air pump constructions, arrangements, or systems can be used in the jump starter/air pump device 2010.

The control for the air pump or air compressor 2010*b* can be incorporated into the MCU 1 shown in FIG. 1 and/or a separate control can be provided, a controlled, for example, by the MCU 1. The jump starter or jump charger 2010*a* and air pump or air compressor 2010*b* can be powered by the same battery (e.g. rechargeable battery, rechargeable Li-ion battery located within or outside the cover 20120 shown in FIG. 795). Alternatively, the jump starter or jump charge 410*a* and air pump or air compressor can be powered with separate batteries (e.g. separate rechargeable battery, separate Li-ion battery).

Figure 80:
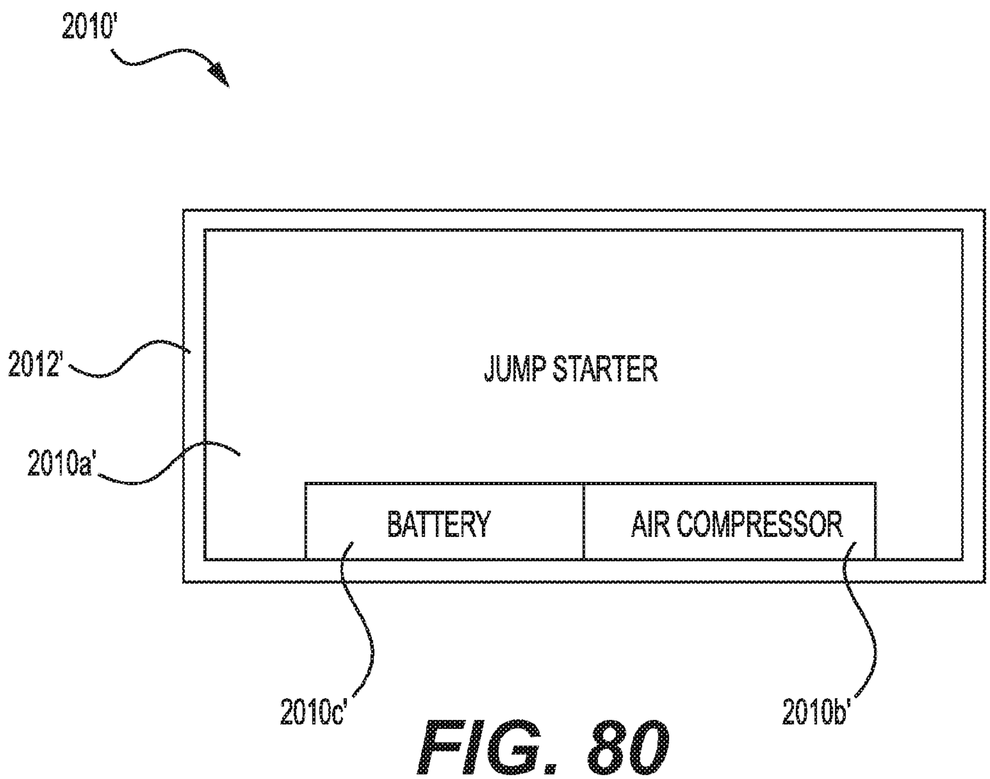
FIG. 80 is a block diagram of the portable vehicle battery jump starter with air pump according to the present invention.

FIG. 80 is a diagrammatic view showing a jump starter/air pump device 2010' comprising a jump starter or jump charger 2010*a*', an air pump or air compressor 2010*b*', and a rechargeable battery 2010*c*' (e.g. Li-ion rechargeable battery). The jump starter or jump charger 2010*a*', the air pump or air compressor 2010*b*', and the rechargeable battery 2010*c*' can be located in a single cover 2012 (e.g. housing or casing), or alternatively in separate covers (e.g. covers connecting together, one cover nesting within other cover, and one covering docketing within other cover). For example, the air pump or air compressor 2010*b* can be removable installed within the jump starter or jump charger 2010*a*. In FIG. 80, the air pump or air compressor 2010*b*' and the rechargeable battery 2010*c*' are located with the jump starter 2010*a*" itself.

Figure 78:
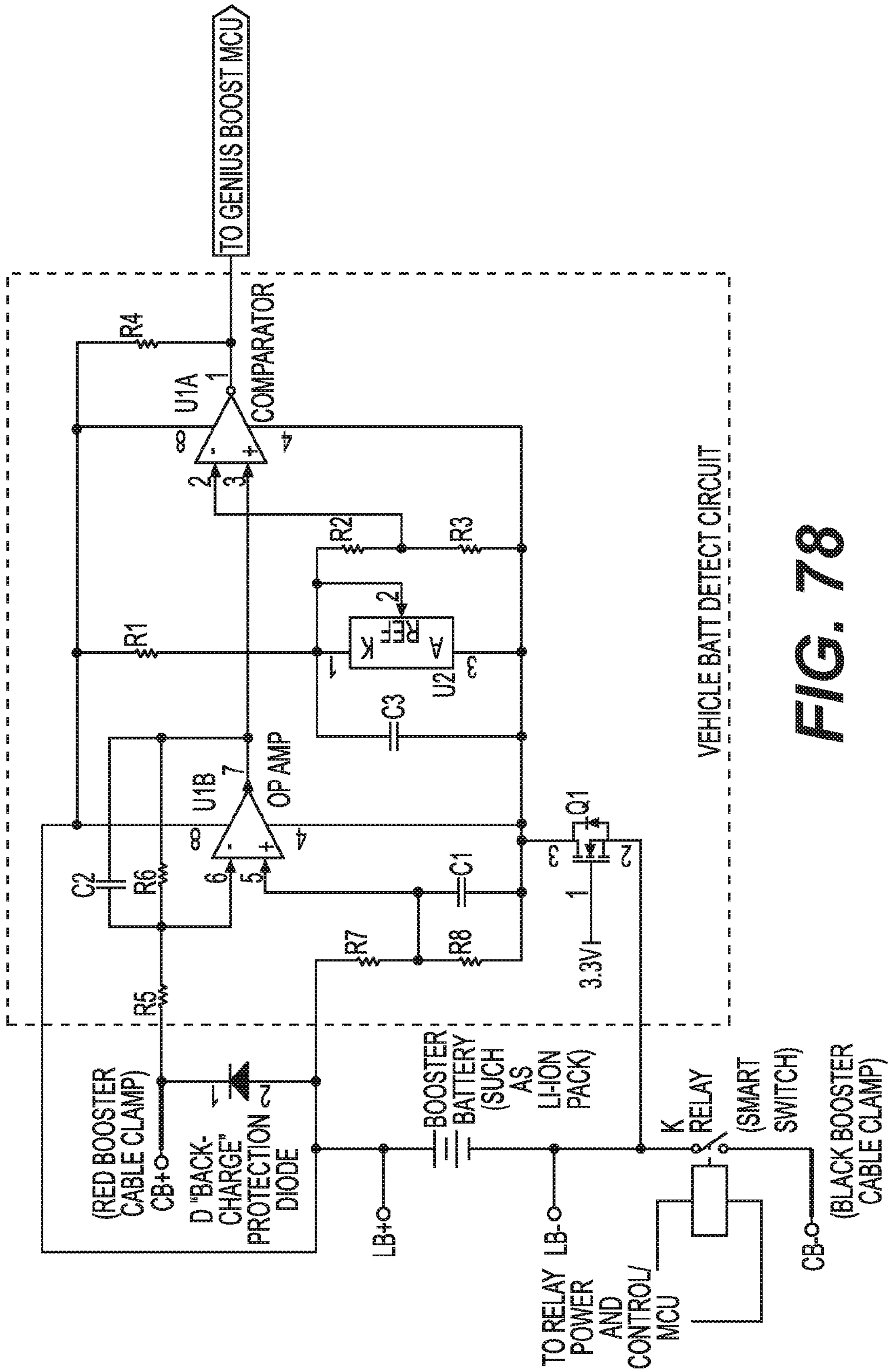
FIG. 78 is an electrical schematic diagram of the improved battery detection system.
Figure 81:
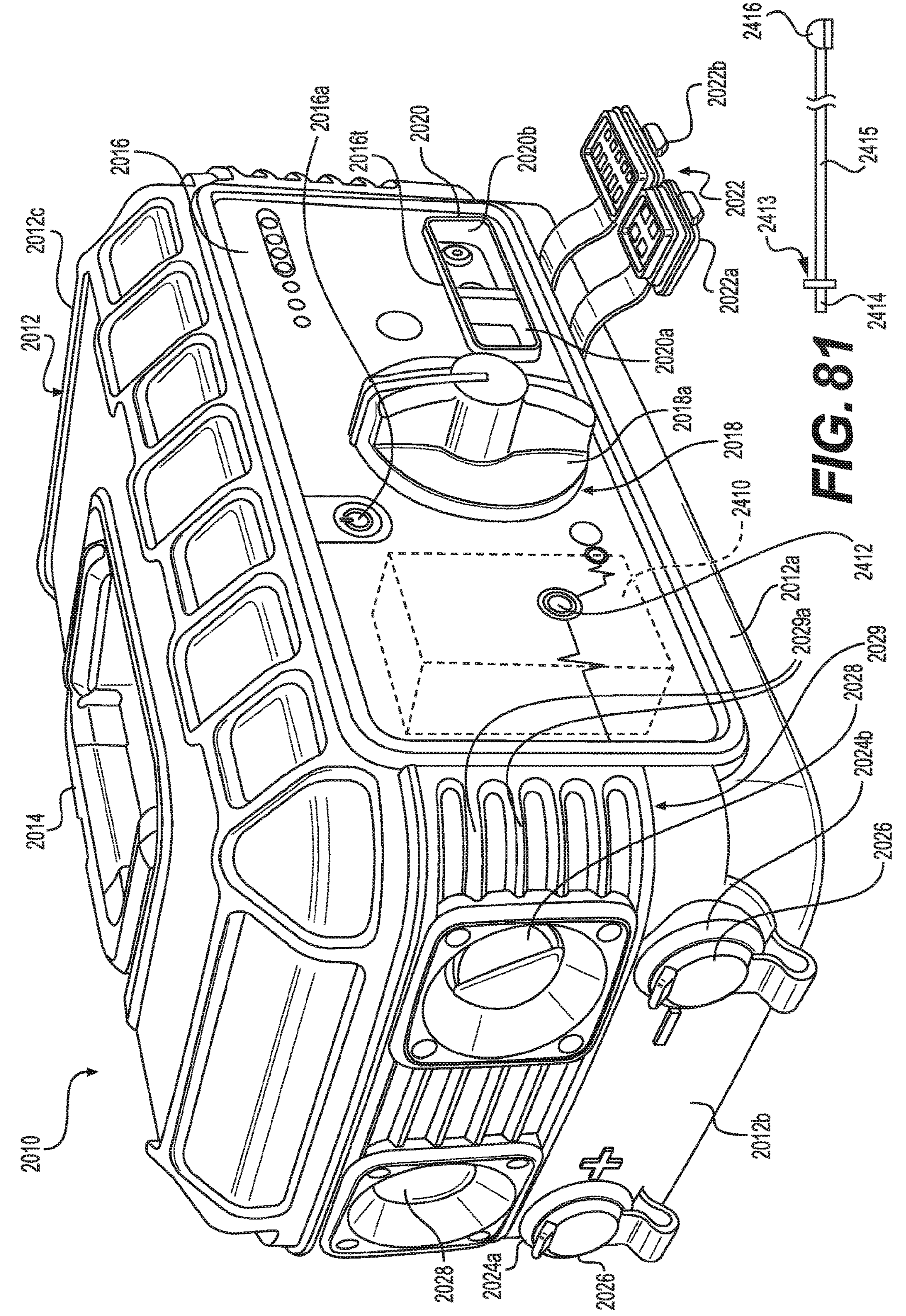
FIG. 81 is another block diagram of the portable vehicle battery jump starter with air pump according to the present invention.

FIG. 81 shows a jump starter/air pump device 2010 according to the present invention. For example, the vehicle battery jump starter shown in FIG. 7, is provided with an air pump 2410 to provide components and features of both a jump starter and an air pump located in the same cover 2012 (e.g. cover, housing, or casing). The jump starter/air pump device 2010 contains all of the components and parts of the jump starter device 1010 shown in FIGS. 7-78, and described above, in combination with the components and parts of an air pump (e.g. air pump 2410*b* shown in FIG. 79) to supply pressurized air, an air supply port 2412, an air hose connector 2413 having a connecting end 2414, an external air hose 2415, and an air valve connector 2416 (e.g. tire valve connector). The air hose connector 2413, external air hose 2415, and air valve connector 2416 are connected together, for example, and removably connected as a unit from the jump starter/air pump device 2010.

The jump starter/air pump device 2010 can have a single battery (e.g. Li-ion battery) for supplying electrical power to the jump starter or jump charger 2010*a* (FIG. 79) and/or the air pump or air compressor 2010*b*. A manual or electrical switch can be incorporated to allow powering both the jump starter or jump charger 2010*a* and the air pump or air compressor 2010*b* at the same time, or selectively. Again, alternatively, the jump starter/air pump device 2010 comprises two or more batteries for independently supplying electrical power to the jump starter or jump charger 2010*a* and the air pump or air compressor 2010*b*.

The jump starter/air pump device 2010 can include a fan for cooling down same before, during and/or after use. Alternatively, or in addition, the jump starter/air pump device 2010 can used the air pump or air compressor 2010*b* to supply cooling air internally to cool down the combined jump starter/air compressor 2010. For example, the internal air pump 2410 can have a vent and/or valve to controllably release air within the cover 2012 and out a vent to cool same.

The jump starter/air pump device 2010 can be controlled (e.g. manual or electrical switch) and operated (e.g. with control and control circuit and/or MCU1) to utilize one or more batteries (e.g. rechargeable battery(ies), rechargeable Li-ion battery(ies)) located, for example, within the jump starter/air pump device 2010 to power the jump starter or jump charger 2010*a* and the air pump or air compressor 2010*b*. Alternatively, the one or more batteries, for example, located within the jump starter/air pump device 2010 in combination with an external battery (e.g. vehicle battery) can be utilized to electrically power the jump starter/air pump device 2010. For example, the jump starter/air pump device 2010 can be electrically connected to the vehicle battery using the cable assembly with clamps and/or connected to the cigarette lighter port using a power cable. The jump starter/air pump device 20100 can include the following additional features:

1) a digital air pressure (e.g. psi) gauge or display (e.g. a digital air pressure gauge located on the front display located on the cover of the combined jump starter/air pump 2010);
2) a switch for presetting a target air pressure (e.g. a switch on the front display or cover, in addition to the display);
3) separately powering the jump starter/air pump device 2010 (e.g. manual and/or auto switch connected to power circuit);
4) providing one battery operating modes (e.g. one Li-ion battery powers both jump starter or jump charger 2010*a* and the air pump or air compressor 2010*b*);
5) providing multiple batteries providing various operating modes (e.g. using one or two batteries to operate jump starter device and/or air compressor device;
6) use DC or AC power with appropriate charger or converter to charge battery(ies) and/or power the jump starter or jump charger 2010*a* and the air pump or air compressor 2010*b* (e.g. integrated electrical and air supply port (e.g. a single port located on cover and configured to provide power connection and air supply connection);
7) operating cooling fan in various modes (e.g. cooling fan operates only when the jump starter/air pump device 2010 is operating; cooling fan operates after a jump starter run; internal temperature sensor with preset temperature level controls operation of the cooling fan; and
8) cooling fan powered by separate battery (e.g. a separate battery is provided for powering cooling fan when simultaneously operating combined jump starter/air pump 2010).

The invention having been thus described, it will be apparent to those skilled in the art that the same may be varied in many ways without departing from the spirit or scope of the invention. Any and all such variations are intended to be encompassed within the scope of the following claims.

The invention claimed is:

1. A vehicle battery jump starter with air pump device, the device comprising:

a cover;

an internal power supply disposed within the cover, the internal power supply comprises a rechargeable battery;

a vehicle battery jump starter disposed within the cover, the jump starter configured to jump start a vehicle battery, the vehicle battery jump starter connected to and powered by the rechargeable battery during operation of the vehicle battery jump starter;

an air pump disposed within the cover, the air pump configured for providing a supply of pressurized air, the air pump connected to and powered by the rechargeable battery during operation of the air pump; and a USB input port for charging the rechargeable battery.

2. The device according to claim 1, wherein the rechargeable battery is a lithium ion battery.

3. The device according to claim 1, wherein the USB input port comprises a USB input connector and a USB charge circuit, the USB charge circuit electrically connecting the USB input connector to the rechargeable battery during charging operation of the rechargeable battery.

4. The device according to claim 3, wherein the USB charge circuit is configured to increase the voltage between the USB input connector to the rechargeable battery for charging the rechargeable battery.

5. The device according to claim 4, wherein the USB charge circuit comprises a DC-DC converter.

6. The device according to claim 5, further comprising a micro controller configured for controlling the operation of the vehicle battery jump starter with air pump device.

7. The device according to claim 6, wherein the DC-DC convert can be turned on and off via a control circuit by an output of the microcontroller.

8. The device according to claim 1, further comprising an air hose.

9. The device according to claim 1, wherein the cover comprises an air supply port for connecting with the air hose.

10. The device according to claim 9, wherein the cover and air pump provide an air supply port for connecting with the hose.

11. The device according to claim 9, further comprising an internal air hose connecting the air pump to the air supply port.

12. The device according to claim 1, wherein the internal power supply is a single rechargeable battery supplying power to vehicle battery jump starter and the air pump.

13. The device according to claim 1, wherein the internal power supply comprises a first rechargeable battery for powering the vehicle battery jump starter and a second rechargeable battery for powering the air pump.

14. The device according to claim 1, further comprising a switch for selectively switching the rechargeable battery for powering the vehicle battery jump starter or the air pump.

15. The device according to claim 14, wherein the switch is configured to also supply power from the rechargeable battery to both the vehicle battery jump starter and the air pump.

16. The device according to claim 1, further comprising an internal fan for cooling the device.

17. The device according to claim 1, wherein the air pump comprise an air compressor.

18. The device according to claim 17, wherein the air compressor is a rotary air compressor.

19. The device according to claim 17, wherein the air pump further comprises an air tank connected to the air supply port.

20. The device according to claim 17, wherein the air pump is connected to the air supply port.

21. The device according to claim 1, further comprising:

at least one output port providing positive and negative polarity outputs;

a vehicle battery isolation sensor connected in circuit with said positive and negative polarity outputs, configured to detect presence of a vehicle battery connected between said positive and negative polarity outputs;

a reverse polarity sensor connected in circuit with said positive and negative polarity outputs, configured to detect polarity of a vehicle battery connected between said positive and negative polarity outputs;

a power FET switch connected between said internal power supply and said output port; and a microcontroller configured to receive input signals from said vehicle isolation sensor and said reverse polarity sensor, and to provide an output signal to said power FET switch, such that said power FET switch is turned on to connect said internal power supply to said output port in response to signals from said sensors indicating the presence of a vehicle battery at said output port and proper polarity connection of positive and negative terminals of said vehicle battery with said positive and negative polarity outputs.

22. The device according to claim 1, further comprising a USB output port for powering or charging electronic devices.

23. The device according to claim 22, wherein the USB output port comprises a USB output connector and a USB output circuit, the USB output circuit electrically connecting the rechargeable battery to the USB output connector during powering or charging electronic devices.

* * * * *